US012043688B2

(12) United States Patent
Do et al.

(10) Patent No.: US 12,043,688 B2
(45) Date of Patent: Jul. 23, 2024

(54) NICKEL CATALYSTS WITH TWO ALKALI IONS FOR HOMOPOLYMERIZATION AND COPOLYMERIZATION

(71) Applicant: UNIVERSITY OF HOUSTON SYSTEM, Houston, TX (US)

(72) Inventors: Loi H. Do, Manvel, TX (US); Thi V. Tran, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 17/982,917

(22) Filed: Nov. 8, 2022

(65) Prior Publication Data

US 2024/0101727 A1 Mar. 28, 2024

Related U.S. Application Data

(60) Provisional application No. 63/392,560, filed on Jul. 27, 2022, provisional application No. 63/402,749, filed on Aug. 31, 2022.

(51) Int. Cl.
*C08F 4/70* (2006.01)
*C08F 2/06* (2006.01)
*C08F 210/02* (2006.01)

(52) U.S. Cl.
CPC .............. *C08F 4/7098* (2013.01); *C08F 2/06* (2013.01); *C08F 210/02* (2013.01)

(58) Field of Classification Search
CPC ......... B01J 27/16; B01J 27/1853; B01J 31/24
USPC ............................................ 526/171; 556/22
See application file for complete search history.

(56) References Cited

U.S. PATENT DOCUMENTS 7,153,916 B2 12/2006 Tanabiki et al.
11,358,134 B2 6/2022 Do et al.
2010/0121008 A1* 5/2010 Marks .................... C07F 15/04 526/171
2017/0137549 A1 5/2017 Carrow et al.
2021/0260567 A1 8/2021 Do et al.
2024/0101726 A1 3/2024 Do et al.
2024/0117076 A1 4/2024 Do et al.
2024/0166775 A1 5/2024 Do et al.

FOREIGN PATENT DOCUMENTS

CN 105061505 A 11/2015
WO 2024025605 A1 2/2024
WO 2024025606 A1 2/2024
WO 2024025607 A1 2/2024
WO 2024025608 A1 2/2024

OTHER PUBLICATIONS

ISR and WO for PCT/US2022/079451, dated Mar. 16, 2023, 11 pages.
ISR and WO for PCT/US2022/079469 dated Feb. 2, 2023, 11 pages.
ISR and WO for PCT/US2022/079492, dated Feb. 3, 2023, 10 pages.
ISR and WO for PCT/US2022/079504, dated Mar. 16, 2023, 15 pages.
Tran et al., Nickel-Alkali Heterobimetallic Catalysts for Ethylene Polymerization, Aug. 2020, 15 pages.

(Continued)

*Primary Examiner* — Fred M Teskin
(74) *Attorney, Agent, or Firm* — NIXON PEABODY LLP

(57) ABSTRACT

This invention relates to nickel catalysts with alkali ions for homopolymerization and copolymerization.

20 Claims, 31 Drawing Sheets

(56) References Cited

OTHER PUBLICATIONS

Tran et al., Elucidating Secondary Metal Cation Effets on Nickel Olefin Polymerization catalysts, ACS Catalysts, Aug. 11, 2020, 10:18 pp. 10760-10772.
Liu et al., Stellated Ag—Pt bimetallic nanoparticles: An effective platform for catalytic activity tuning, Scientific Reports, 4:3969, Feb. 5, 2014 [retrieved on Jan. 3, 2023] Retrieved from the internet: <URL https://www.nature.com/articles/srep03969> pp. 1-7.
Loi Do, Polymerization Catalysts On-Demand: Customizing Polyolefins by Cation Selection, Texas A&M University, Presentation, Nov. 10, 2021.
Tran et al., Customizing Polymers by Controlling Cation Switching Dynamics in Non-Living Polymerization, J. Am. Chem. Soc. 2022, 144, 37, 17129-17139.
Tran et. Al., Customizing Polymers by Controlling Cation Switching Dynamics in Non-Living Polymerization, J. Am. Chem. Soc. 2022, 144, 37, 17129-17139, Supporting Information.

* cited by examiner

Binding of $M^+$ to Nickel Complexes

Structures of Ni2-M Complexes cis-Ni2-Li trans-Ni2-Cs $^{31}$P NMR Spectra of Ni1/Li$^+$/Na$^+$ Under Non-Switching Conditions $^{1}H$ NMR Spectra of Ni2/$Cs^{+}$ Under Switching Conditions Steric Map of Ni2-Li Steric Map of Ni2-Na Steric Map of Ni2-K Steric Map of Ni2-Cs

NICKEL CATALYSTS WITH TWO ALKALI IONS FOR HOMOPOLYMERIZATION AND COPOLYMERIZATION

CROSS-REFERENCE TO RELATED APPLICATIONS

This application claims the benefit under 35 U.S.C. § 119(e) of U.S. Provisional Patent Application No. 63/392,560 filed on Jul. 27, 2022, and U.S. Provisional Patent Application No. 63/402,749 filed on Aug. 31, 2022, both of which are incorporated herein by reference in their entirety.

STATEMENT REGARDING FEDERALLY SPONSORED RESEARCH OR DEVELOPMENT

This invention was made with government support under Grant No. CHE-1750411 awarded by the National Science Foundation. The government has certain rights in the invention.

FIELD OF THE INVENTION

This invention relates to nickel catalysts with alkali ions for homopolymerization and copolymerization.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

Controlling the chain growth process in non-living polymerization reactions is a problem because chain termination typically occurs faster than the time it takes to apply external stimuli. Therefore, there is an ongoing need for improvements in order to better understand how to control the chain growth process in non-living polymerization reactions. The embodiments of the present invention address that need.

SUMMARY OF THE INVENTION

The following embodiments and aspects thereof are described and illustrated in conjunction with compositions, methods, and articles of manufacture which are meant to be exemplary and illustrative, not limiting in scope.

In various embodiments, the present invention provides a catalyst composition, comprising at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10): wherein the bimetallic catalyst complex of Formula (7) has the structure:

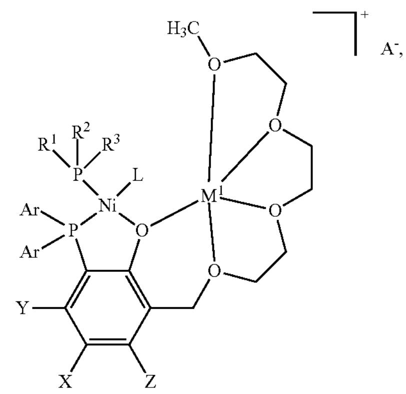

wherein the bimetallic catalyst complex of Formula (8) has the structure:

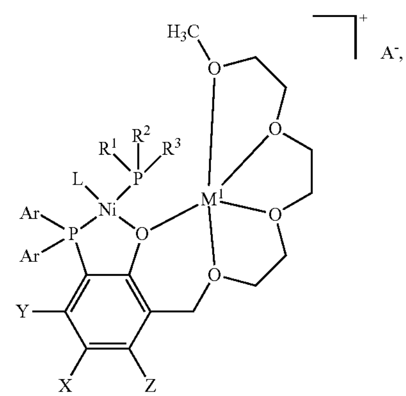

wherein the bimetallic catalyst complex of Formula (9) has the structure:

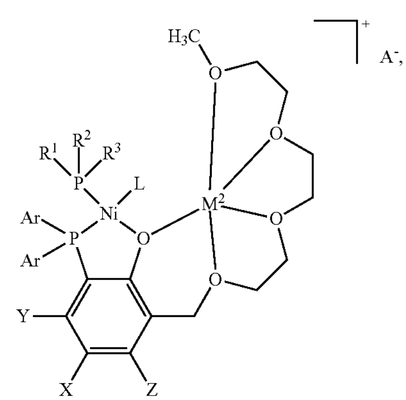

wherein the bimetallic catalyst complex of Formula (10) has the structure:

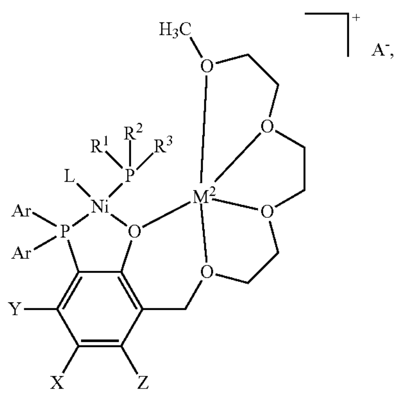

wherein in Formula (7), Formula (8), Formula (9) and Formula (10): Ar is 2,6-dimethoxyphenyl; L is an optionally substituted phenyl group; $M^1$ is Li, Na, K, or Cs; $M^2$ is Li, Na, K, or Cs; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl; wherein $A^-$ is the same in the bimetallic catalyst complex of Formula (7), Formula (8), Formula (9), and Formula (10); wherein Ar is the same in the bimetallic catalyst complex of Formula (7), Formula (8), Formula (9), and Formula (10); wherein L is the same in the bimetallic catalyst complex of Formula (7), Formula (8), Formula (9), and Formula (10); wherein X is the same in the bimetallic catalyst complex of Formula (7), Formula (8), Formula (9), and Formula (10); wherein Y is the same in the bimetallic catalyst complex of Formula (7), Formula (8), Formula (9), and Formula (10); wherein Z is the same in the bimetallic catalyst complex of Formula (7), Formula (8), Formula (9), and Formula (10); wherein $R^1$ is the same in the bimetallic catalyst complex of Formula (7), Formula (8), Formula (9), and Formula (10); wherein $R^2$ is the same in the bimetallic catalyst complex of Formula (7), Formula (8), Formula (9), and Formula (10); wherein $R^3$ is the same in the bimetallic catalyst complex of Formula (7), Formula (8), Formula (9), and Formula (10); wherein $M^1$ is the same in the bimetallic catalyst complex of Formula (7) and Formula (8); wherein $M^2$ is the same in the bimetallic catalyst complex of Formula (9) and Formula (10); and wherein $M^1$ and $M^2$ are different from one another.

In some embodiments, the electron donating group is selected from the group consisting of: alkoxy, phenoxy, amino, alkylamino, dialkylamino, hydroxy, alkyl, and cycloalkyl; and the the electron withdrawing group is selected from the group consisting of: $NO_2$, —CN, —C(O)— alkyl, C(O)Oalkyl, C(O)Nalkyl, —$SO_3H$, —$SO_2$alkyl, —$PO_3H$, —$PO_3$alkyl, —$CF_3$, and halo. In some embodiments, in Formula (7), Formula (8), Formula (9) and Formula (10): Ar is 2,6-dimethoxyphenyl; L is a phenyl group; $M^1$ is Li, Na, K, or Cs; $M^2$ is Li, Na, K, or Cs; $A^-$ is $[(3,5\text{-}(CF_3)_2C_6H_3)_4B]^-$; X is methyl; Y is hydrogen; Z is hydrogen; and $R^1$, $R^2$, and $R^3$ are each methyl; wherein $A^-$ is the same in the bimetallic catalyst complex of Formula (7), Formula (8), Formula (9), and Formula (10); wherein Ar is the same in the bimetallic catalyst complex of Formula (7), Formula (8), Formula (9), and Formula (10); wherein L is the same in the bimetallic catalyst complex of Formula (7), Formula (8), Formula (9), and Formula (10); wherein X is the same in the bimetallic catalyst complex of Formula (7), Formula (8), Formula (9), and Formula (10); wherein Y is the same in the bimetallic catalyst complex of Formula (7), Formula (8), Formula (9), and Formula (10); wherein Z is the same in the bimetallic catalyst complex of Formula (7), Formula (8), Formula (9), and Formula (10); wherein $R^1$ is the same in the bimetallic catalyst complex of Formula (7), Formula (8), Formula (9), and Formula (10); wherein $R^2$ is the same in the bimetallic catalyst complex of Formula (7), Formula (8), Formula (9), and Formula (10); wherein $R^3$ is the same in the bimetallic catalyst complex of Formula (7), Formula (8), Formula (9), and Formula (10); wherein $M^1$ is the same in the bimetallic catalyst complex of Formula (7) and Formula (8); wherein $M^2$ is the same in the bimetallic catalyst complex of Formula (9) and Formula (10); and wherein $M^1$ and $M^2$ are different from one another.

In various embodiments, the present invention provides a method for catalyzing homopolymerization of an optionally substituted olefin, comprising: contacting an optionally substituted olefin with a catalyst composition, comprising at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10), whereby the optionally substituted olefin undergoes homopolymerization.

In some embodiments, the step of contacting the optionally substituted olefin with the catalyst composition is performed in the presence of at least one solvent. In some embodiments, the at least one solvent is a non-polar solvent, a polar solvent, or combination thereof. In some embodiments, the method further comprises contacting at least one activator with the catalyst composition and the optionally substituted olefin. In some embodiments, the at least one activator is selected from the group consisting of $Ni(COD)_2$, triarylborane, methylaluminoxane, and trialkylaluminum. In some embodiments, the optionally substituted olefin is an optionally substituted terminal olefin or an optionally substituted internal olefin. In some embodiments, the optionally substituted olefin is ethylene.

In various embodiments, the present invention provides a polymer formed by a method for catalyzing homopolymerization of an optionally substituted olefin. In some embodiments, the the polymer is monomodal or bimodal.

In various embodiments, the present invention provides a method for catalyzing copolymerization of a first optionally substituted olefin and at least one other optionally substituted olefin, comprising: contacting a first optionally substituted olefin and at least one other optionally substituted olefin with a catalyst composition, comprising at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10), whereby the first optionally substituted olefin and the at least one other optionally substituted olefin undergoes copolymerization, and wherein the first optionally substituted olefin and the at least one other optionally substituted olefin are different from one another.

In some embodiments, the step of contacting the first optionally substituted olefin and the at least one other optionally substituted olefin with the catalyst composition is performed in the presence of at least one solvent. In some embodiments, the at least one solvent is a non-polar solvent, a polar solvent, or combination thereof. In some embodiments, the method further comprises contacting at least one activator with the catalyst composition, the first optionally substituted olefin, and the at least one other optionally substituted olefin. In some embodiments, the at least one activator is selected from the group consisting of $Ni(COD)_2$, triarylborane, methylaluminoxane, and trialkylaluminum. In some embodiments, the first optionally substituted olefin and the at least one other optionally substituted olefin are each independently an optionally substituted terminal olefin or an optionally substituted internal olefin.

In various embodiments, the present invention provides a copolymer formed by the method for catalyzing copolymerization of a first optionally substituted olefin and at least one other optionally substituted olefin. In some embodiments, the copolymer is monomodal or bimodal.

Exemplary embodiments are illustrated in referenced figures. It is intended that the embodiments and figures disclosed herein are to be considered illustrative rather than restrictive.

BRIEF DESCRIPTION OF THE DRAWINGS

(FIG. 2B) The molecular structures of cis-Ni2-Li (left) and trans-Ni2-Cs (right) are shown with displacement ellipsoids drawn at 50% probability. The borate anions were omitted for clarity.

(FIG. 7B) $^1H$ NMR spectra (toluene-$d_8$/$Et_2O$-$d_{10}$ (98:2), 600 MHz, RT) of Ni2 with $CsBAr^F_4$. The addition of $Cs^+$ led to clear upfield shifts of the resonances corresponding to the benzylic and PEG hydrogen atoms.

(FIG. 8A) The reaction of Ni1/$Ni(COD)_2$ with various ratios of $LiBAr^F_4$/$NaBAr^F_4$ in toluene/$Et_2O$ (100:0.2) in the presence of ethylene. The GPC traces are provided and the full polymerization data are given in Table 13. (FIG. 8B) The reaction of Ni2/$Ni(COD)_2$ with various amounts of $CsBAr^F_4$ in toluene/hexane (1:3) in the presence of ethylene. The polymerization data are given in Table 14.

FIG. 27A-FIG. 271 depicts in accordance with various embodiments of the invention, GPC chromatograms of the polyethylene obtained in Table 13, in which various Ni1: $Na^+$:$Li^+$ ratios were used. The black traces are the raw data and the Gaussian fits are shown in dashed and dotted traces.

DETAILED DESCRIPTION OF THE INVENTION

Figures 1A, 1B, 1C:
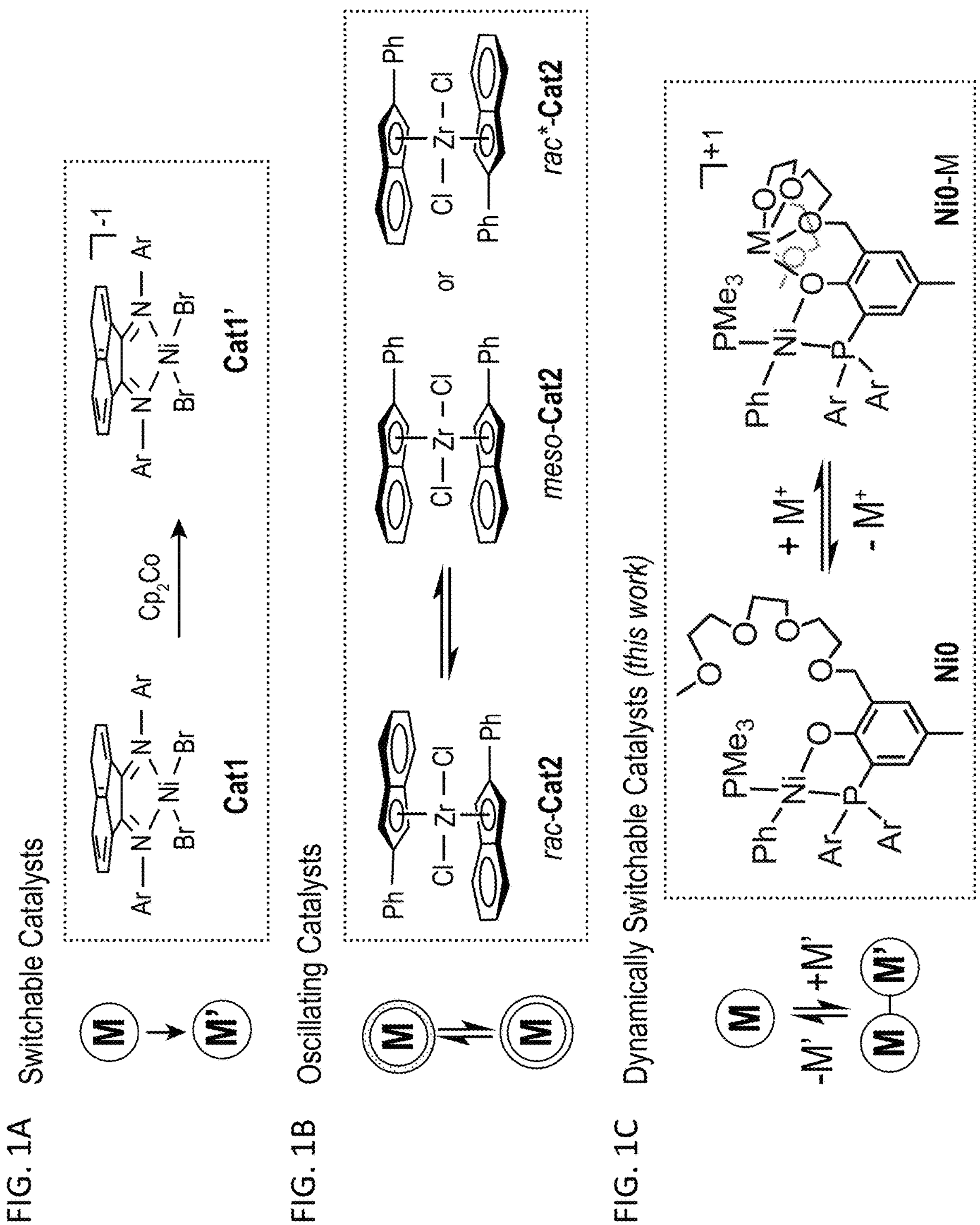
FIG. 1A-FIG. 1C depicts in accordance with various embodiments of the invention, representative examples of switchable (FIG. 1A), oscillating (FIG. 1B), and dynamically switchable (FIG. 1C) catalysts that produce monodispersed polymers ($Đ \leq 2$) in olefin polymerization studies. Complexes Cat1, Cat1', Ni0, and Ni0-Cs are non-living whereas all forms of Cat2 are living. Ar=2,6-$iPr_2Ph$ in Cat1 and 2-MeOPh or 2,6-$(MeO)_2Ph$ in Ni0.

All references cited herein are incorporated by reference in their entirety as though fully set forth. Unless defined otherwise, technical and scientific terms used herein have the same meaning as commonly understood by one of ordinary skill in the art to which this invention belongs.

One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, systems, articles of manufacture, apparatus, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Although the open-ended term "comprising," as a synonym of terms such as including, containing, or having, is used herein to describe and claim the invention, the present invention, or embodiments thereof, may alternatively be described using alternative terms such as "consisting of" or "consisting essentially of."

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

"Optional" or "optionally" means that the subsequently described circumstance may or may not occur, so that the description includes instances where the circumstance occurs and instances where it does not.

In some embodiments, the numbers expressing quantities of reagents, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein the term "monomodal" is well-known in the art and generally refers to a polymer distribution having a single relative maximum as determined analytically using instruments such as gel permeation chromatography.

As used herein the term "bimodal" is well-known in the art and generally refers to a polymer distribution having two relative maxima or evidencing two normal distributions as determined analytically using instruments such as gel permeation chromatography.

As used herein the term "copolymer" is well-known in the art and generally refers to polymers comprising repeat units from two or more monomers. For example, in some embodiments, the copolymers disclosed herein are copolymers of ethylene and at least one other optionally substituted olefin.

As used herein the term "copolymerization" is well-known in the art and generally refers to a type of polymerization which forms a copolymer.

As used herein the term "random copolymer" is well-known in the art and refers to a copolymer with no preferred ordering of the repeat units from the two or more monomers.

As used herein the term "block copolymer" is well-known in the art and refers to a copolymer comprising two or more homopolymer units linked by covalent bonds.

As used herein the term "gradient copolymer" is well-known in the art and refers to a copolymer in which the change in monomer composition is gradual from predominantly one monomer species to predominantly the other monomer species.

As used herein the term "homopolymer" is well-known the art and generally refers to polymers composed of repeat units from a single monomer. For example, in some embodiments, the homopolymer is polyethylene.

As used herein the term "homopolymerization" is well-known in the art and generally refers to a type of polymerization which forms a homopolymer.

As used herein the term "weakly coordinating anion" is well-known in the art and generally refers to a large bulky anion capable of delocalization of the negative charge of the anion. Suitable weakly coordinating anions include, but are not limited to, tetrakis(3,5-bis(trifluoromethyl)phenylborate, tetrakis(pentafluorophenyl)borate, tetraphenylborate, trifluoromethylsulfonate, hexafluorophosphate, hexafluoroantimonate, or tetrafluoroborate. The coordinating ability of such anions is known and described in the literature (Strauss. S. et al., Chem. Rev. 1993, 93, 927).

As used herein the term "electron donating group" is well-known in the art and generally refers to a functional group or atom that pushes electron density away from itself, towards other portions of the molecule, e.g., through resonance and/or inductive effects.

As used herein the term "electron withdrawing group" is well-known in the art and generally refers to a functional group or atom that pulls electron density towards itself, away from other portions of the molecule, e.g., through resonance and/or inductive effects.

As used herein, the term "alkyl" means a straight or branched, saturated aliphatic radical having a chain of carbon atoms. $C_x$ alkyl and $C_x$-$C_y$alkyl are typically used where X and Y indicate the number of carbon atoms in the chain. For example, $C_1$-$C_6$alkyl includes alkyls that have a chain of between 1 and 6 carbons (e.g., methyl, ethyl, propyl, isopropyl, butyl, sec-butyl, isobutyl, tert-butyl, pentyl, neopentyl, hexyl, and the like). Alkyl represented along with another radical (e.g., as in arylalkyl) means a straight or branched, saturated alkyl divalent radical having the number of atoms indicated or when no atoms are indicated means a bond, e.g., ($C_6$-$C_{10}$)aryl($C_0$-$C_3$)alkyl includes phenyl, benzyl, phenethyl, 1-phenylethyl 3-phenylpropyl, and the like. Backbone of the alkyl can be optionally inserted with one or more heteroatoms, such as N, O, or S.

In preferred embodiments, a straight chain or branched chain alkyl has 30 or fewer carbon atoms in its backbone (e.g., $C_1$-$C_{30}$ for straight chains, $C_3$-$C_{30}$ for branched chains), and more preferably 20 or fewer. Likewise, preferred cycloalkyls have from 3-10 carbon atoms in their ring structure, and more preferably have 5, 6 or 7 carbons in the ring structure. The term "alkyl" (or"lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

Non-limiting examples of substituents of a substituted alkyl can include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like.

As used herein, the term "alkenyl" refers to unsaturated straight-chain, branched-chain or cyclic hydrocarbon radicals having at least one carbon-carbon double bond. $C_x$ alkenyl and $C_x$-$C_y$alkenyl are typically used where X and Y indicate the number of carbon atoms in the chain. For example, $C_2$-$C_6$alkenyl includes alkenyls that have a chain of between 2 and 6 carbons and at least one double bond, e.g., vinyl, allyl, propenyl, isopropenyl, 1-butenyl, 2-butenyl, 3-butenyl, 2-methylallyl, 1-hexenyl, 2-hexenyl, 3-hexenyl, and the like). Alkenyl represented along with another radical (e.g., as in arylalkenyl) means a straight or branched, alkenyl divalent radical having the number of atoms indicated. Backbone of the alkenyl can be optionally inserted with one or more heteroatoms, such as N, O, or S.

As used herein, the term "alkynyl" refers to unsaturated hydrocarbon radicals having at least one carbon-carbon triple bond. $C_x$ alkynyl and $C_x$-$C_y$alkynyl are typically used where X and Y indicate the number of carbon atoms in the chain. For example, $C_2$-$C_6$alkynyl includes alkynls that have a chain of between 2 and 6 carbons and at least one triple bond, e.g., ethynyl, 1-propynyl, 2-propynyl, 1-butynyl, isopentynyl, 1,3-hexa-diyn-yl, n-hexynyl, 3-pentynyl, 1-hexen-3-ynyl and the like. Alkynyl represented along with another radical (e.g., as in arylalkynyl) means a straight or branched, alkynyl divalent radical having the number of atoms indicated. Backbone of the alkynyl can be optionally inserted with one or more heteroatoms, such as N, O, or S.

The terms "alkylene," "alkenylene," and "alkynylene" refer to divalent alkyl, alkelyne, and alkynylene" radicals. Prefixes $C_x$ and $C_x$-$C_y$ are typically used where X and Y indicate the number of carbon atoms in the chain. For example, $C_1$-$C_6$alkylene includes methylene, (—$CH_2$—), ethylene (—$CH_2CH_2$—), trimethylene (—$CH_2CH_2CH_2$—), tetramethylene (—$CH_2CH_2CH_2CH_2$—), 2-methyltetramethylene (—$CH_2CH(CH_3)CH_2CH_2$—), pentamethylene (—$CH_2CH_2CH_2CH_2CH_2$—) and the like).

As used herein, the term "alkylidene" means a straight or branched unsaturated, aliphatic, divalent radical having a general formula $=CR_aR_b$. Non-limiting examples of $R_a$ and $R_b$ are each independently hydrogen, alkyl, substituted alkyl, alkenyl, or substituted alkenyl. $C_x$ alkylidene and $C_x$-$C_y$alkylidene are typically used where X and Y indicate the number of carbon atoms in the chain. For example, $C_2$-$C_6$alkylidene includes methylidene ($=CH_2$), ethylidene ($=CHCH_3$), isopropylidene ($=C(CH_3)_2$), propylidene ($=CHCH_2CH_3$), allylidene ($=CH—CH=CH_2$), and the like).

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

As used herein, the term "halogen" or "halo" refers to an atom selected from fluorine, chlorine, bromine and iodine. The term "halogen radioisotope" or "halo isotope" refers to a radionuclide of an atom selected from fluorine, chlorine, bromine and iodine.

A "halogen-substituted moiety" or "halo-substituted moiety", as an isolated group or part of a larger group, means an aliphatic, alicyclic, or aromatic moiety, as described herein, substituted by one or more "halo" atoms, as such terms are defined in this application. For example, halo-substituted alkyl includes haloalkyl, dihaloalkyl, trihaloalkyl, perhaloalkyl and the like (e.g. halosubstituted ($C_1$-$C_3$)alkyl includes chloromethyl, dichloromethyl, difluoromethyl, trifluoromethyl (—$CF_3$), 2,2,2-trifluoroethyl, perfluoroethyl, 2,2,2-trifluoro-1,1-dichloroethyl, and the like).

The term "aryl" refers to monocyclic, bicyclic, or tricyclic fused aromatic ring system. $C_x$ aryl and $C_x$-$C_y$aryl are typically used where X and Y indicate the number of carbon atoms in the ring system. For example, $C_6$-$C_{12}$ aryl includes aryls that have 6 to 12 carbon atoms in the ring system. Exemplary aryl groups include, but are not limited to, pyridinyl, pyrimidinyl, furanyl, thienyl, imidazolyl, thiazolyl, pyrazolyl, pyridazinyl, pyrazinyl, triazinyl, tetrazolyl, indolyl, benzyl, phenyl, naphthyl, anthracenyl, azulenyl, fluorenyl, indanyl, indenyl, naphthyl, phenyl, tetrahydronaphthyl, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl, and the like. In some embodiments, 1, 2, 3, or 4 hydrogen atoms of each ring can be substituted by a substituent.

The term "heteroaryl" refers to an aromatic 5-8 membered monocyclic, 8-12 membered fused bicyclic, or 11-14 membered fused tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively. $C_x$ heteroaryl and $C_x$-$C_y$heteroaryl are typically used where X and Y indicate the number of carbon atoms in the ring system. For example, $C_4$-$C_9$ heteroaryl includes heteroaryls that have 4 to 9 carbon atoms in the ring system. Heteroaryls include, but are not limited to, those derived from benzo[b]furan, benzo[b]thiophene, benzimidazole, imidazo[4,5-c]pyridine, quinazoline, thieno[2,3-c]pyridine, thieno[3,2-b]pyridine, thieno[2, 3-b]pyridine, indolizine, imidazo[1,2a]pyridine, quinoline, isoquinoline, phthalazine, quinoxaline, naphthyridine, quinolizine, indole, isoindole, indazole, indoline, benzoxazole, benzopyrazole, benzothiazole, imidazo[1,5-a]pyridine, pyrazolo[1,5-a]pyridine, imidazo[1,2-a]pyrimidine, imidazo[1,2-c]pyrimidine, imidazo[1,5-a]pyrimidine, imidazo[1,5-c]pyrimidine, pyrrolo[2,3-b]pyridine, pyrrolo[2,3c]pyridine, pyrrolo[3,2-c]pyridine, pyrrolo[3,2-b]pyridine, pyrrolo[2,3-d]pyrimidine, pyrrolo[3,2-d]pyrimidine, pyrrolo[2,3-b]pyrazine, pyrazolo[1,5-a]pyridine, pyrrolo[1,2-b]pyridazine, pyrrolo[1,2-c]pyrimidine, pyrrolo[1,2-a]pyrimidine, pyrrolo[1,2-a]pyrazine, triazo[1,5-a]pyridine, pteridine, purine, carbazole, acridine, phenazine, phenothiazene, phenoxazine, 1,2-dihydropyrrolo[3,2,1-hi]indole, indolizine, pyrido[1,2-a]indole, 2(1H)-pyridinone, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. Some exemplary heteroaryl groups include, but are not limited to, pyridyl, furyl or furanyl, imidazolyl, benzimidazolyl, pyrimidinyl, thiophenyl or thienyl, pyridazinyl, pyrazinyl, quinolinyl, indolyl, thiazolyl, naphthyridinyl, 2-amino-4-oxo-3,4-dihydropteridin-6-yl, tetrahydroisoquinolinyl, and the like. In some embodiments, 1, 2, 3, or 4 hydrogen atoms of each ring may be substituted by a substituent.

The term "cyclyl" or "cycloalkyl" refers to saturated and partially unsaturated cyclic hydrocarbon groups having 3 to 12 carbons, for example, 3 to 8 carbons, and, for example, 3 to 6 carbons. $C_x$cyclyl and $C_x$-$C_y$cycyl are typically used where X and Y indicate the number of carbon atoms in the ring system. For example, $C_3$-$C_8$ cyclyl includes cyclyls that have 3 to 8 carbon atoms in the ring system. The cycloalkyl group additionally can be optionally substituted, e.g., with 1, 2, 3, or 4 substituents. $C_3$-$C_{10}$cyclyl includes cyclopropyl, cyclobutyl, cyclopentyl, cyclohexyl, cyclohexenyl, 2,5-cyclohexadienyl, cycloheptyl, cyclooctyl, bicyclo[2.2.2]octyl, adamantan-1-yl, decahydronaphthyl, oxocyclohexyl, dioxocyclohexyl, thiocyclohexyl, 2-oxobicyclo[2.2.1]hept-1-yl, and the like.

Aryl and heteroaryls can be optionally substituted with one or more substituents at one or more positions, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "heterocyclyl" refers to a nonaromatic 4-8 membered monocyclic, 8-12 membered bicyclic, or 11-14 membered tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively). $C_x$heterocyclyl and $C_x$-$C_y$heterocyclyl are typically used where X and Y indicate the number of carbon atoms in the ring system. For example, $C_4$-$C_y$heterocyclyl includes heterocyclyls that have 4-9 carbon atoms in the ring system. In some embodiments, 1, 2 or 3 hydrogen atoms of each ring can be substituted by a substituent. Exemplary heterocyclyl groups include, but are not limited to piperazinyl, pyrrolidinyl, dioxanyl, morpholinyl, tetrahydrofuranyl, piperidyl, 4-morpholyl, 4-piperazinyl, pyrrolidinyl, perhydropyrrolizinyl, 1,4-diazaperhydroepinyl, 1,3-dioxanyl, 1,4-dioxanyl and the like.

The terms "bicyclic" and "tricyclic" refers to fused, bridged, or joined by a single bond polycyclic ring assemblies.

The term "cyclylalkylene" means a divalent aryl, heteroaryl, cyclyl, or heterocyclyl.

As used herein, the term "fused ring" refers to a ring that is bonded to another ring to form a compound having a bicyclic structure when the ring atoms that are common to both rings are directly bound to each other. Non-exclusive examples of common fused rings include decalin, naphthalene, anthracene, phenanthrene, indole, furan, benzofuran, quinoline, and the like. Compounds having fused ring systems can be saturated, partially saturated, cyclyl, heterocyclyl, aromatics, heteroaromatics, and the like.

As used herein, the term "carbonyl" means the radical —C(O)—. It is noted that the carbonyl radical can be further substituted with a variety of substituents to form different carbonyl groups including acids, acid halides, amides, esters, ketones, and the like.

The term "carboxy" means the radical —C(O)O—. It is noted that compounds described herein containing carboxy moieties can include protected derivatives thereof, i.e., where the oxygen is substituted with a protecting group. Suitable protecting groups for carboxy moieties include benzyl, tert-butyl, and the like. The term "carboxyl" means —COOH.

The term "cyano" means the radical —CN.

The term, "heteroatom" refers to an atom that is not a carbon atom. Particular examples of heteroatoms include, but are not limited to nitrogen, oxygen, sulfur and halogens. A "heteroatom moiety" includes a moiety where the atom by which the moiety is attached is not a carbon. Examples of heteroatom moieties include —N═, —$NR^N$—, —$N^+(O^-)$═, —O—, —S— or —$S(O)_2$—, —$OS(O)_2$—, and —SS—, wherein $R^N$ is H or a further substituent.

The term "hydroxy" means the radical —OH.

The term "imine derivative" means a derivative comprising the moiety —C(NR)—, wherein R comprises a hydrogen or carbon atom alpha to the nitrogen.

The term "nitro" means the radical —$NO_2$.

An "oxaaliphatic," "oxaalicyclic", or "oxaaromatic" mean an aliphatic, alicyclic, or aromatic, as defined herein, except where one or more oxygen atoms (—O—) are positioned between carbon atoms of the aliphatic, alicyclic, or aromatic respectively.

An "oxoaliphatic," "oxoalicyclic", or "oxoaromatic" means an aliphatic, alicyclic, or aromatic, as defined herein, substituted with a carbonyl group. The carbonyl group can be an aldehyde, ketone, ester, amide, acid, or acid halide.

As used herein, the term, "aromatic" means a moiety wherein the constituent atoms make up an unsaturated ring system, all atoms in the ring system are $sp^2$ hybridized and the total number of pi electrons is equal to 4n+2. An aromatic ring can be such that the ring atoms are only carbon atoms (e.g., aryl) or can include carbon and non-carbon atoms (e.g., heteroaryl).

The terms "alkoxyl" or "alkoxy" as used herein refers to an alkyl group, as defined above, having an oxygen radical attached thereto. Representative alkoxyl groups include methoxy, ethoxy, propyloxy, tert-butoxy, n-propyloxy, isopropyloxy, n-butyloxy, iso-butyloxy, and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O-alkynyl. Aroxy can be represented by —O-aryl or O-heteroaryl, wherein aryl and heteroaryl are as defined below. The alkoxy and aroxy groups can be substituted as described above for alkyl.

The term "aralkyl", as used herein, refers to an alkyl group substituted with an aryl group (e.g., an aromatic or heteroaromatic group).

The term "alkylthio" refers to an alkyl group, as defined above, having a sulfur radical attached thereto. In preferred embodiments, the "alkylthio" moiety is represented by one of —S— alkyl, —S-alkenyl, and —S-alkynyl. Representative alkylthio groups include methylthio, ethylthio, and the like. The term "alkylthio" also encompasses cycloalkyl groups, alkene and cycloalkene groups, and alkyne groups. "Arylthio" refers to aryl or heteroaryl groups.

The term "sulfinyl" means the radical —SO—. It is noted that the sulfinyl radical can be further substituted with a variety of substituents to form different sulfinyl groups including sulfinic acids, sulfinamides, sulfinyl esters, sulfoxides, and the like.

The term "sulfonyl" means the radical —$SO_2$—. It is noted that the sulfonyl radical can be further substituted with a variety of substituents to form different sulfonyl groups including sulfonic acids (—$SO_3H$), sulfonamides, sulfonate esters, sulfones, and the like.

The term "thiocarbonyl" means the radical —C(S)—. It is noted that the thiocarbonyl radical can be further substituted with a variety of substituents to form different thiocarbonyl groups including thioacids, thioamides, thioesters, thioketones, and the like.

As used herein, the term "amino" means —$NH_2$. The term "alkylamino" means a nitrogen moiety having at least one straight or branched unsaturated aliphatic, cyclyl, or heterocyclyl radicals attached to the nitrogen. For example, representative amino groups include —$NH_2$, —$NHCH_3$, —$N(CH_3)_2$, —$NH(C_1$-$C_{10}$alkyl), —$N(C_1$-$C_{10}$alkyl$)_2$, and the like. The term "alkylamino" includes "alkenylamino," "alkynylamino," "cyclylamino," and "heterocyclylamino." The term "arylamino" means a nitrogen moiety having at least one aryl radical attached to the nitrogen. For example —NHaryl, and —N(aryl$)_2$. The term "heteroarylamino" means a nitrogen moiety having at least one heteroaryl radical attached to the nitrogen. For example —NHheteroaryl, and —N(heteroaryl$)_2$. Optionally, two substituents together with the nitrogen can also form a ring. Unless indicated otherwise, the compounds described herein containing amino moieties can include protected derivatives thereof. Suitable protecting groups for amino moieties include acetyl, tertbutoxycarbonyl, benzyloxycarbonyl, and the like.

The term "aminoalkyl" means an alkyl, alkenyl, and alkynyl as defined above, except where one or more substituted or unsubstituted nitrogen atoms (—N—) are positioned between carbon atoms of the alkyl, alkenyl, or alkynyl. For example, an ($C_2$-$C_6$) aminoalkyl refers to a chain comprising between 2 and 6 carbons and one or more nitrogen atoms positioned between the carbon atoms.

The term "alkoxyalkoxy" means —O-(alkyl)-O-(alkyl), such as —$OCH_2CH_2OCH_3$, and the like.

The term "alkoxycarbonyl" means —C(O)O-(alkyl), such as —C(=O)$OCH_3$, —C(=O)$OCH_2CH_3$, and the like.

The term "alkoxyalkyl" means -(alkyl)-O-(alkyl), such as —$CH_2OCH_3$, —$CH_2OCH_2CH_3$, and the like.

The term "aryloxy" means —O-(aryl), such as —O-phenyl, —O-pyridinyl, and the like.

The term "arylalkyl" means -(alkyl)-(aryl), such as benzyl (i.e., —$CH_2$phenyl), —$CH_2$— pyrindinyl, and the like.

The term "arylalkyloxy" means —O-(alkyl)-(aryl), such as —O-benzyl, —O—$CH_2$-pyridinyl, and the like.

The term "cycloalkyloxy" means —O-(cycloalkyl), such as —O-cyclohexyl, and the like.

The term "cycloalkylalkyloxy" means —O-(alkyl)-(cycloalkyl), such as-$OCH_2$cyclohexyl, and the like.

The term "aminoalkoxy" means —O-(alkyl)-$NH_2$, such as —$OCH_2NH_2$, —$OCH_2CH_2NH_2$, and the like.

The term "mono- or di-alkylamino" means —NH(alkyl) or —N(alkyl)(alkyl), respectively, such as —$NHCH_3$, —$N(CH_3)_2$, and the like.

The term "mono- or di-alkylaminoalkoxy" means —O-(alkyl)-NH(alkyl) or —O-(alkyl)-N(alkyl)(alkyl), respectively, such as —$OCH_2NHCH_3$, —$OCH_2CH_2N(CH_3)_2$, and the like.

The term "arylamino" means —NH(aryl), such as —NH-phenyl, —NH-pyridinyl, and the like.

The term "arylalkylamino" means —NH-(alkyl)-(aryl), such as —NH-benzyl, —$NHCH_2$— pyridinyl, and the like.

The term "alkylamino" means —NH(alkyl), such as —$NHCH_3$, —$NHCH_2CH_3$, and the like.

The term "cycloalkylamino" means —NH-(cycloalkyl), such as —NH-cyclohexyl, and the like.

The term "cycloalkylalkylamino"-NH-(alkyl)-(cycloalkyl), such as —$NHCH_2$— cyclohexyl, and the like.

It is noted in regard to all of the definitions provided herein that the definitions should be interpreted as being open ended in the sense that further substituents beyond those specified may be included. Hence, a $C_1$ alkyl indicates that there is one carbon atom but does not indicate what are the substituents on the carbon atom. Hence, a $C_1$ alkyl comprises methyl (i.e., —$CH_3$) as well as —$CR_aR_bR_c$ where $R_a$, $R_b$, and $R_c$ can each independently be hydrogen or any other substituent where the atom alpha to the carbon is a heteroatom or cyano. Hence, $CF_3$, $CH_2OH$ and $CH_2CN$ are all $C_1$ alkyls.

Unless otherwise stated, structures depicted herein are meant to include compounds which differ only in the presence of one or more isotopically enriched atoms. For example, compounds having the present structure except for the replacement of a hydrogen atom by a deuterium or tritium, or the replacement of a carbon atom by a $^{13}C$- or $^{14}C$-enriched carbon are within the scope of the invention.

In various embodiments, compounds of the present invention as disclosed herein may be synthesized using any synthetic method available to one of skill in the art. Non-limiting examples of synthetic methods used to prepare various embodiments of compounds of the present invention are disclosed in the Examples section herein.

As used herein, the term "substituted" refers to independent replacement of one or more (typically 1, 2, 3, 4, or 5) of the hydrogen atoms on the substituted moiety with substituents independently selected from the group of substituents listed below in the definition for "substituent" or otherwise specified.

As used herein, the terms "substituent" and "substituents" refers to groups that are typically added to other groups or parent compounds to enhance desired properties or give desired effects. Substituents can be protected or unprotected and can be added to one available site or to many available sites in a parent compound. Substituents may also be further substituted with other substituents and may be attached directly or via a linking group such as an alkyl or hydrocarbyl group to a parent compound. In general, a non-hydrogen substituent can be any substituent that can be bound to an atom of the given moiety that is specified to be substituted. Examples of substituents include, but are not limited to, acyl, acylamino, acyloxy, aldehyde, alicyclic, aliphatic, alkanesulfonamido, alkanesulfonyl, alkaryl, alkenyl, alkoxy, alkoxycarbonyl, alkyl, alkylamino, alkylcarbanoyl, alkylene, alkylidene, alkylthios, alkynyl, amide, amido, amino, aminoalkyl, aralkyl, aralkylsulfonamido, arenesulfonamido, arenesulfonyl, aromatic, aryl, arylamino, arylcarbanoyl, aryloxy, azido, carbamoyl, carbonyl, carbonyls including ketones, carboxy, carboxylates, $CF_3$, cyano (CN), cycloalkyl, cycloalkylene, ester, ether, haloalkyl, halogen, halogen, heteroaryl, heterocyclyl, hydroxy, hydroxyalkyl, imino, iminoketone, ketone, mercapto, nitro, oxaalkyl, oxo, oxoalkyl, phosphoryl (including phosphonate and phosphinate), silyl groups, sulfonamido, sulfonyl (including sulfate, sulfamoyl and sulfonate), thiols, and ureido moieties, each of which may optionally also be substituted or unsubstituted. In some cases, two substituents, together with the carbon(s) to which they are attached to, can form a ring. Additional, non-limiting examples of substituents include halogen, hydroxyl, alkyl, alkenyl, alkynyl, acyl (—C(O)Raa), carboxyl (—C(O)O-Raa), aliphatic groups, alicyclic groups, alkoxy, substituted oxo (—O—Raa), aryl, aralkyl, heterocyclic, heteroaryl, heteroarylalkyl, amino (—NRbbRcc), imino (=NRbb), amido (—C(O)N-RbbRcc or —N(Rbb)C(O)Raa), azido (—N3), nitro (—NO2), cyano (—CN), carbamido (—OC(O)NRbbRcc or —N(Rbb)C(O)ORaa), ureido (—N(Rbb)C(O)NRbbRcc), thioureido (—N(Rbb)C(S)NRbbRcc), guanidinyl (—N(Rbb)C(=NRbb)NRbbRcc), amidinyl (—C(=NRbb)-NRbbRcc or —N(Rbb)C(NRbb)Raa), thiol (—SRbb), sulfinyl (—S(O)Rbb), sulfonyl (—S(O)2Rbb), sulfonamidyl (—S(O)2NRbbRcc or —N(Rbb)$S(O)_2$Rbb) and conjugate groups. Wherein each Raa, Rbb and Rcc is, independently, H, an optionally linked chemical functional group or a further substituent group with a preferred list including without limitation H, alkyl, alkenyl, alkynyl, aliphatic, alkoxy, acyl, aryl, aralkyl, heteroaryl, alicyclic, heterocyclic and heteroarylalkyl.

Synthesis and Characterization of Ni Complexes

Controlling the chain growth process in non-living polymerization reactions is difficult because chain termination typically occurs faster than the time it takes to apply an external trigger. To overcome this limitation, we developed a strategy to regulate non-living polymerizations by exploiting the chemical equilibria between a metal catalyst and secondary metal cations. We prepared two nickel phenoxyphosphine-polyethylene glycol variants, one with 2-methoxyphenyl (Ni1) and another with 2,6-dimethoxyphenyl (Ni2) phosphine substituents. Ethylene polymerization studies using these complexes in the presence of alkali salts revealed that chain growth is strongly dependent on electronic effects whereas chain termination is dependent on both steric and electronic effects. Surprisingly, by adjusting the solvent polarity, we can favor polymerizations via non-switching or dynamic switching modes. For example, in a 100:0.2 mixture of toluene/diethyl ether, reactions of Ni1 and both $Li^+$ and $Na^+$ cations in the presence of ethylene yielded bimodal polymers with different relative fractions depending on the $Li^+/Na^+$ ratio used. Surprisingly, in a 98:2 mixture of toluene/diethyl ether, reactions of Ni2 and $Cs^+$ in the presence of ethylene generated monomodal polyethylene with dispersity (Đ)<2.0 and increasing molecular weight as the amount of $Cs^+$ added increased. Solution studies by NMR spectroscopy showed that cation exchange between the nickel complexes and alkali cations in 98:2 toluene/diethyl ether is fast on the NMR timescale, which without being bound by theory, supports our proposed dynamic switching mechanism.

Figure 2A:
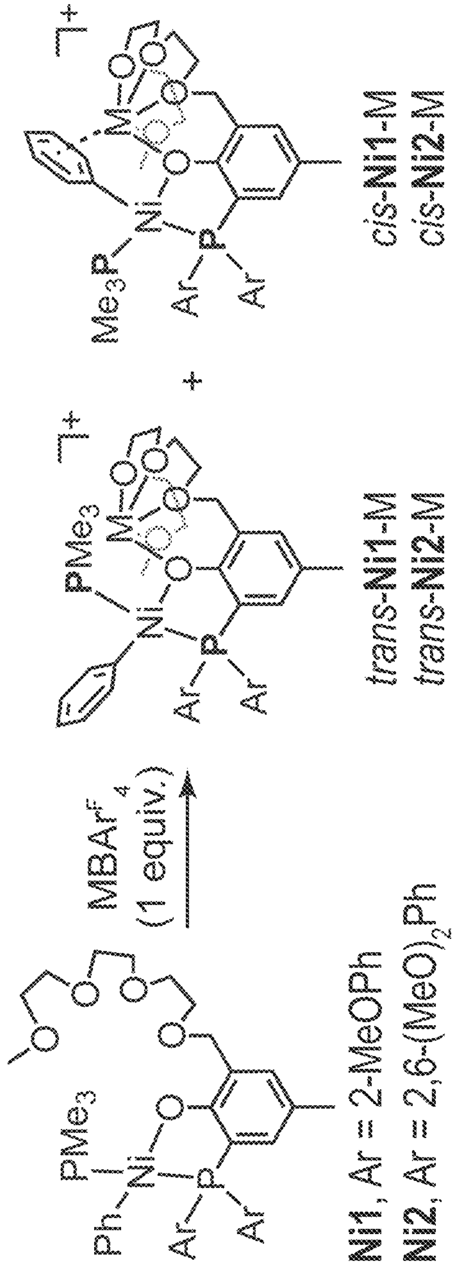
FIG. 2A-FIG. 2B depicts in accordance with various embodiments of the invention, (FIG. 2A) the addition of $M^+$ (where $M^+$=$Li^+$, $Na^+$, $K^+$, and $Cs^+$) to the nickel complexes (Ni1 or Ni2) led to formation of trans and cis isomers. The ratio of trans-Ni-M:cis-Ni-M depends on the alkali ion and solvent conditions.
Figures 11A, 11B, 11C:
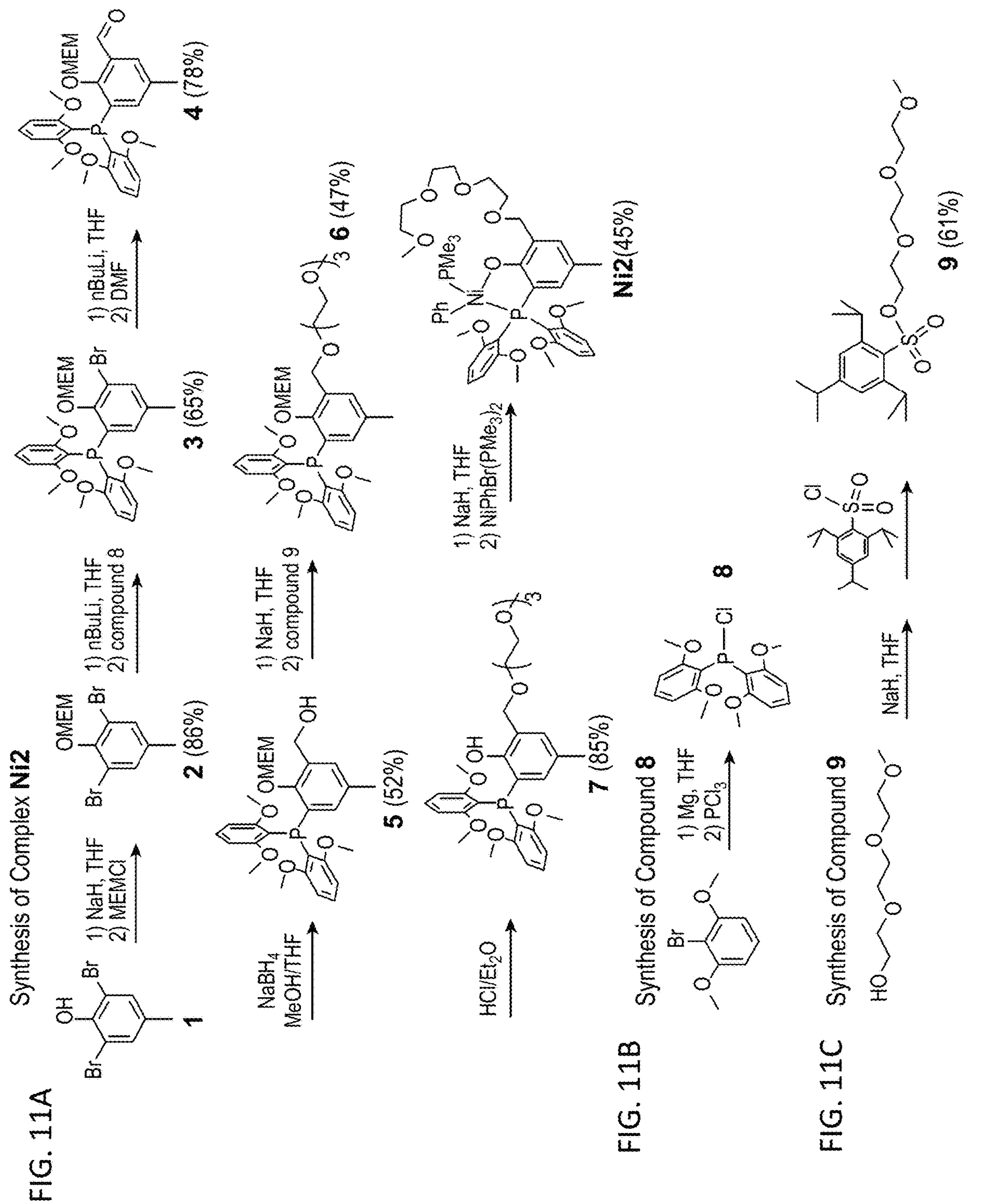
FIG. 11A-FIG. 11C depicts in accordance with various embodiments of the invention, synthesis of compounds 8 (FIG. 11B), 9 (FIG. 11C), and Ni2 (FIG. 11A).

Our first-generation Ni1 complex (Tran, T. V.; Nguyen, Y. H., Do, L. H. Development of Highly Productive Nickel-Sodium Phenoxyphosphine Ethylene Polymerization Catalysts and their Reaction Temperature Profiles. *Polymr. Chem.* 2019, 10, 3718-3721; Tran, T. V.; Karas, L. J.; Wu, J. I.; Do, L. H. Elucidating Secondary Metal Cation Effects on Nickel Olefin Polymerization Catalysts. *ACS Catal.* 2020, 10, 10760-10772) which contains 2-methoxyphenyl phosphine substituents, in combination with alkali ions gave olefin polymerization catalysts that were among some of the most productive late transition metal catalysts reported to date (FIG. 2A). Encouraged by these results, we prepared a new Ni2 complex that features more sterically bulky 2,6-dimethoxyphenyl phosphine substituents. First, the ligand derivative 7 was synthesized using a procedure outlined in FIG. 11A-FIG. 11C. Metalation of 7 was readily accomplished by treating the compound with sodium hydride, followed by mixing with $[NiPhBr(PMe_3)_2]$ to give $[Ni(Ph)(PMe_3(7)]$ (Ni2) in 45% yield. This Ni2 complex was fully characterized by NMR spectroscopy and elemental analysis as provided herein.

Alkali Cation Binding

To study the coordination chemistry of Ni2 with alkali ions, we used UV-vis absorption spectroscopy. When $Cs^+$ was added to Ni2 in diethyl ether, the band at ~370 nm decreased with formation of clear isosbestic points, suggesting that it had converted to new Ni2-Cs species. Based on the method of continuous variation (FIG. 12-FIG. 15), (Renny, J. S.; Tomasevich, L. L.; Tallmadge, E. H.; Collum, D. B. Method of Continuous Variations. Applications of Job Plots to the Study of Molecular Associations in Organometallic Chemistry. Angew. Chem., Int. Ed. 2013, 52, 11998-12013) the results showed that Ni2 formed 1:1 complexes with $M^+$ (where $M=Li^+$, $Na^+$, $K^+$, or $Cs^+$). Although our polymerization reactions below were conducted in solvent mixtures containing only small percentages of $Et_2O$, it was necessary to use neat diethyl ether to fully solubilize excess $M^+$ salts in these experiments.

TABLE 1

Comparison of Select Ni2—M Atomic Distances[a]

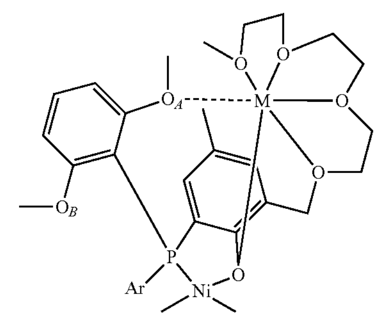

Ni2-M

| Distance (Å) | Ni2—Li | Ni2—Na | Ni2—K | Ni2—Cs |
|---|---|---|---|---|
| Ni—M. | 3.56 (4.86) | 3.59 (5.00) | 3.59 (5.25) | 3.75 (5.53) |
| $O_A$—M | 4.22 (4.34) | 3.07 (4.48) | 2.94 (4.73) | 3.16 5.01) |

[a]Distances in parentheses are the sum of the Van der Waals radii between two atoms (Batsanov, S. S. Van der Waals Radii of Elements. Inorg. Mater. 2001, 37, 871-885). The $PMe_3$ and Ph ligands coordinated to Ni were omitted for clarity.

Figure 2B:
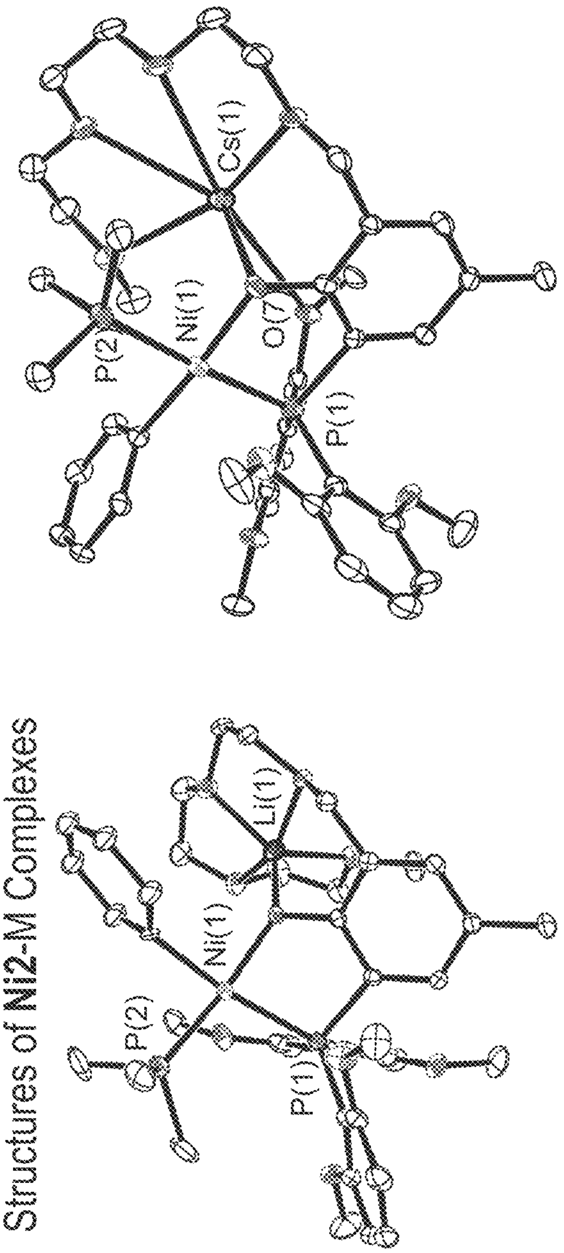

To obtain structural characterization of the heterobimetallic complexes, we grew single crystals by combining Ni2 with 1 equiv. of $MBAr^F_4$ ($BAr^F_4{}^-$=tetrakis(3,5-bis(trifluoromethyl)phenyl)borate) in toluene/$Et_2O$ or benzene/$Et_2O$ and then layering with pentane. The crystals of the Ni2-M series were successfully analyzed by X-ray crystallography, showing that the complexes have the formula $[NiM(Ph)(PMe_3)(7)](BAr^F_4)$ (i.e., $[NiM(Ph)(PMe_3)$(phenoxyphosphine-PEG)]$(BAr^F_4)$ (FIG. 29-FIG. 32). As shown in FIG. 29-FIG. 32, the nickel centers have square planar geometries, and the alkali ions are ligated by four oxygen donors from PEG and one oxygen donor from the phenolate group. The Ni2-Li complex is in the cis form (FIG. 2B and FIG. 29), in which its phosphine ligands are adjacent to each other in the nickel square plane, whereas Ni2-Na (FIG. 30), Ni2-K (FIG. 31), and Ni2-Cs (FIG. 2B and FIG. 32) are in the trans form, in which their phosphine ligands are opposite one another. The cis and trans isomer distributions in solution were quantified by $^{31}P$ NMR spectroscopy (Table 10). Surprisingly, the complexes display Ni-M distances of 3.56, 3.59, 3.59, and 3.75 Å for Ni2-Li, Ni2-Na, Ni2-K, and Ni2-Cs, respectively, which are shorter than the sum of their Van der Waals radii (Table 1) (Batsanov, S. S. Van der Waals Radii of Elements. Inorg. Mater. 2001, 37, 871-885). In some complexes, there appears to be coordination by a methoxy substituent to the alkali metal, which forms a steric shield surrounding the top hemisphere of the nickel coordination sphere. Based on the short $O_A$(methoxy)-M distances of 3.07, 2.94, and 3.16 Å for Ni2-Na, Ni2-K, and Ni2-Cs, respectively, these interactions appear to be relatively strong. In contrast, the $O_A$-M separation is only about 4.22 Å in Ni2-Li, which is close to the Van der Waals sum of 4.34 Å.

Figures 3A, 3B, 3C, 3D:
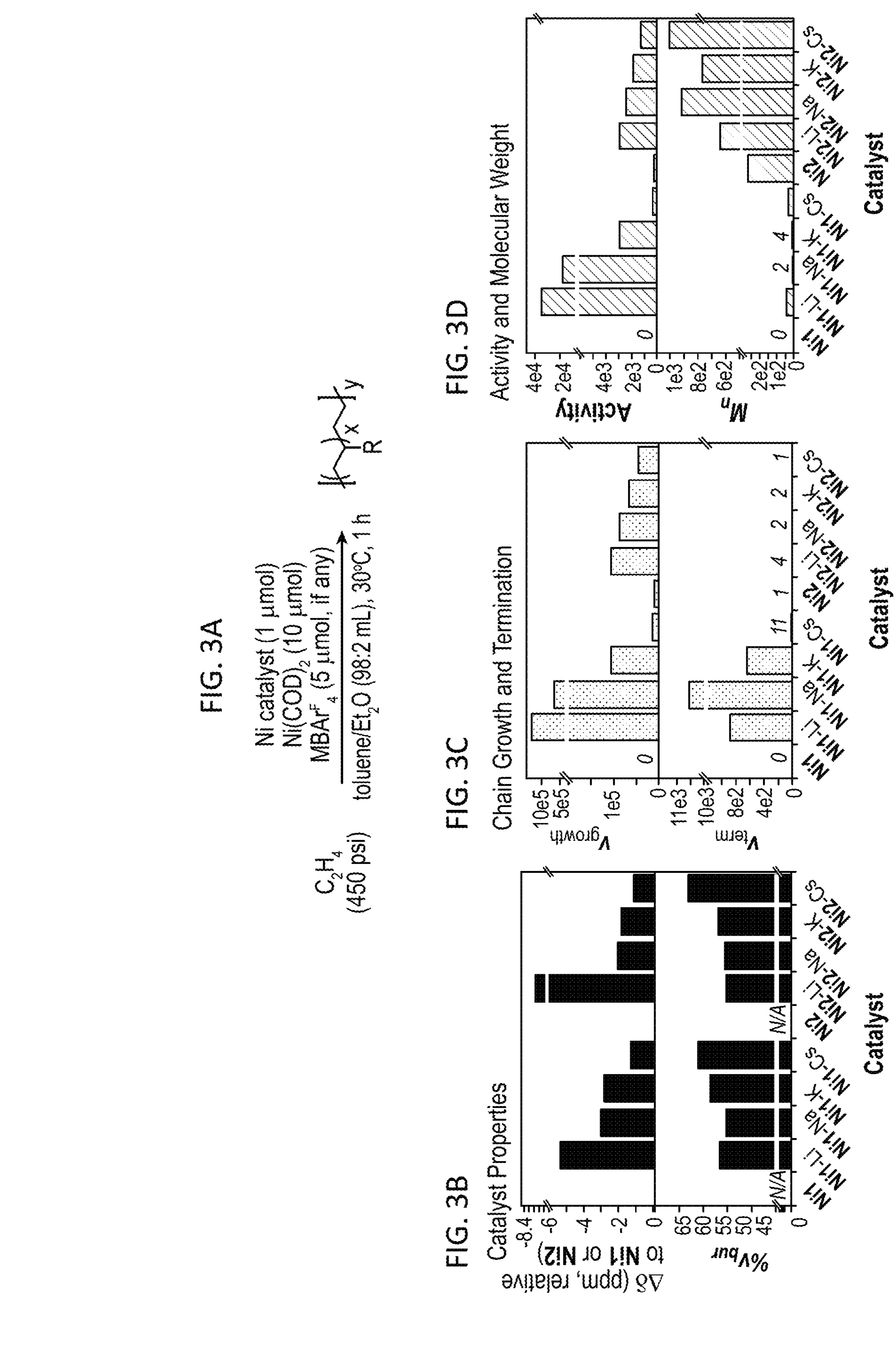
FIG. 3A-FIG. 3D depicts in accordance with various embodiments of the invention, (FIG. 3A) correlating the catalytic properties of the nickel complexes (FIG. 3B) with their ethylene polymerization behavior (FIG. 3C and FIG. 3D). The full polymerization data is provided in Tables 11 and 12. The $v_{growth}$ and $v_{term}$ values were determined using the equations shown in FIG. 4. Units: $v_{growth}$=mol $C_2H_4$/mol Ni·h, $v_{term}$=mol PE/mol Ni·h, activity=kg PE/mol Ni·h, $M_n$=kg/mol.

Next, we calculated the percent buried volume (% $V_{bur}$) of the Ni2-M complexes, which is a measure of the three-dimensional space occupied by the supporting ligand in the primary coordination sphere (Falivene, L.; Credendino, R.;

Poater, A.; Petta, A., Serra, L.; Oliva, R.; Scarano, V.; Cavallo, L. SambVca 2. A Web Tool for Analyzing Catalytic Pockets with Topographic Steric Maps. *Organometallics* 2016, 35, 2286-2293; Falivene, L.; Cao, Z.; Petta, A.; Serra, L.; Poater, A.; Oliva, R.; Scarano, V.; Cavallo, L. Towards the Online Computer-Aided Design of Catalytic Pockets. *Nat. Chem.* 2019, 11, 872-879). Our analysis showed that Ni2-Li, Ni2-Na, Ni2-K, and Ni2-Cs have % $V_{bur}$ of 50.6, 51.3, 53.7, and 66.2%, respectively (FIG. 3B, Table 9). The parent Ni2 complex is a viscous oil so it could not be crystallized for structural analysis. These results are consistent with our previous studies of the Ni1-M complexes, in which we showed that % $V_{bur}$ tracked with both the Ni-M (PEG) distance and the size of $M^+$. For Ni1-M, the steric volume trend was in the order Ni1-Cs>Ni1-K>Ni1-Li>Ni1-Na, whereas that for Ni2-M was Ni2-Cs>Ni1-K>Ni1-Na>Ni1-Li. Although % $V_{bur}$ is a convenient metric for comparing the steric bulk between different complexes, it does not consider structural rigidity or conformational changes during catalysis. Because Ni2 contains more sterically bulky aryl substituents than Ni1 (i.e., 2,6-dimethoxyphenyl rather than 2-methoxyphenyl), we hoped that the Ni2 would have more restricted molecular motion than the Ni1 in solution. As we discuss herein below, the structural differences between Ni1 and Ni2 surprisingly have profound impacts on their catalytic performance.

We found that complexation of alkali ions to Ni1 reduced the electron density at the nickel center to different extents, depending on the relative Lewis acidity of $M^+$ (i.e., $Li^+$>$Na^+$>$K^+$>$Cs^+$). When the $^{31}$P NMR spectra of various Ni1-M species were measured, it was observed that their chemical shifts reflected their electronic nature. For example, the differences in S relative to that in Ni1 (Δδ=δ(Ni1-M)−δ(Ni1, 13.3 ppm)) were −5.4, −3.0, −2.8, and −1.3 ppm for Ni1-Li, Ni1-Na, Ni1-K, and Ni1-Cs, respectively, (FIG. 3B, Table 7). When we applied a similar analysis to the $^{31}$P NMR spectra of Ni2-M, we obtained Δδ values of −7.9, −2.0, −1.8, and −1.1 ppm for Ni2-Li, Ni2-Na, Ni2-K, and Ni2-Cs, respectively (Δδ=S(Ni2-M)−δ(Ni2, −3.48 ppm)). Without being bound by theory, these results suggest that the nickel-alkali complexes are electronically tuned in accordance with the Lewis acidity of $M^+$. Qualitatively, $Na^+$ and $K^+$ have similar electron-withdrawing effects whereas Li is the most and $Cs^+$ is the least electron-withdrawing. Without being bound by theory the NMR spectra of Ni1 and Ni2 suggest that they are electronically different.

Ethylene Polymerization

Our ethylene polymerization studies using Ni1 with and without $M^+$ were reported previously and are summarized in FIG. 3A-FIG. 3D, Table 11) (Tran, T. V.; Nguyen, Y. H.; Do, L. H. Development of Highly Productive Nickel-Sodium Phenoxyphosphine Ethylene Polymerization Catalysts and their Reaction Temperature Profiles. *Polym. Chem.* 2019, 10, 3718-3721; Tran, T. V.; Karas, L. J.; Wu, J. I.; Do, L. H. Elucidating Secondary Metal Cation Effects on Nickel Olefin Polymerization Catalysts. *ACS Catal.* 2020, 10, 10760-10772). With the Ni2 complexes in hand, we proceeded to evaluate its reactivity with ethylene. Inside the glovebox, the nickel complex, $MBAr^F_4$ (if any), and the activator $Ni(COD)_2$ (COD=1,5-cyclooctadiene) were combined in toluene/$Et_2O$ and loaded into a syringe. This solution was injected into an autoclave containing ethylene-saturated solvent to give a final mixture containing toluene/$Et_2O$ in 98:2 ratio. The reactor was then pressurized to 450 psi of ethylene and allowed to stir at 30° C. for 1 h (Table 12). In the absence of M, Ni2 showed moderate activity ($2.79\times10^2$ kg/mol·h) and produced linear polyethylene (PE) with moderate molecular weight ($M_n$=$2.71\times10^2$ kg/mol). The activity increased by 10.5×, 8.6×, 6.7×, and 4.5× when $Li^+$, $Na^+$, $K^+$, and $Cs^+$ were added, respectively (FIG. 3D). The Ni2-M catalysts also afforded linear polyethylene (PE) but with significantly higher molecular weights than that of the parent Ni2 catalyst alone. In fact, the polymers obtained from Ni2-Na and Ni2-Cs were within the ultra-high molecular weight range ($1.23\times10^3$ kg/mol and $1.42\times10^3$ kg/mol, respectively). In most cases, their polyethylene (PE) dispersities ($Đ=M_w/M_n$) were below 2.0, suggesting, without being bound by theory, that the Ni2-M species are single site catalysts.

TABLE 2

Polymerizations Performed at 90° C.

| Entry | Cat. | Salt | Act.[f] | $M_n$[g] | Đ | Chains/Ni |
|---|---|---|---|---|---|---|
| 1[a] | Ni1 | none | 0 | — | — | — |
| 2[b] | Ni1 | $Li^+$ | 13000 | 2.1 | 2.2 | 6238 |
| 3[a] | Ni1 | $Na^+$ | 4800 | 0.9 | 1.5 | 5356 |
| 4[c] | Ni1 | $K^+$ | 10000 | 1.1 | 1.6 | 4527 |
| 5[c] | Ni1 | $Cs^+$ | 23000 | 15.7 | 1.4 | 730 |
| 6[d] | Ni2 | none | 23000 | 40.6 | 2.0 | 567 |
| 7[d] | Ni2 | $Li^+$ | 49500 | 15.2 | 2.6 | 3257 |
| 8[d] | Ni2 | $Na^+$ | 58500 | 30.7 | 1.8 | 1906 |
| 9[d] | Ni2 | $K^+$ | 18500 | 49.8 | 1.6 | 371 |
| 10[d] | Ni2 | $Cs^+$ | 23500 | 117.3 | 1.7 | 200 |
| 11[e] | Ni2 | $Cs^+$ | 33000 | 185.2 | 1.5 | 178 |

[a]Polymerization conditions: Ni1 (0.5 μmol), $MBAr^F_4$ (1 μmol, if any), $Ni(COD)_2$ (4 μmol), ethylene (450 psi), 100 mL toluene, 1 h.
[b]Ni1 (0.1 μmol), $LiBAr^F_4$ (0.2 μmol), $Ni(COD)_2$ (0.8 μmol).
[c]Same as condition a, except the reaction was performed for 30 min.
[d]Ni2 (1.0 μmol), $MBAr^F_4$ (5.0 μmol, if any), $Ni(COD)_2$ (10 μmol), ethylene (450 psi), 98 mL toluene/2 mL $Et_2O$, 1 h.
[e]Ni2 (0.1 μmol), $MBAr^F_4$ (0.5 μmol), $Ni(COD)_2$ (1 μmol).
[f]Activity = kg/mol · h.
[g]$M_n$ = kg/mol.

When the reaction temperature was increased, our Ni2-M complexes showed excellent catalytic performance (Table 2 and Table 12). For example, the activity of Ni2-Li increased 16.8× going from 30° C. to 90° C. (i.e., from $2.94\times10^3$ to $4.95\times10^4$ kg/mol Ni-h). However, its polyethylene (PE) molecular weight dropped from $6.85\times10^2$ to $1.52\times10^1$ kg/mol. Without being bound by theory, this inverse effect of temperature on catalyst activity and polymer molecular weight (MW) is commonly observed and may be due to partial catalyst degradation at elevated temperatures or the rate of chain termination increasing faster than the rate of chain growth (Rhinehart, J. L.; Brown, L. A.; Long, B. K. A Robust Ni(II) α-Diimine Catalyst for High Temperature Ethylene Polymerization. J. Am. Chem. Soc. 2013, 135, 16316-16319; Takeuchi, D.; Takano, S., Takeuchi, Y.; Osakada, K. Ethylene Polymerization at High Temperatures Catalyzed by Double-Decker-Type Dinuclear Iron and Cobalt Complexes. Dimer Effect on Stability of the Catalyst and Polydispersity of the Product. *Organometallics* 2014, 33, 5316-5323). Under all temperature regimes, except for Ni2-Cs at 30° C. (Table 12, entry 5), greater than 1 polymer chains were produced per nickel indicating, without being bound by theory, that our catalysts are non-living. At 90° C., about 200-6000 polymers per nickel were obtained using Ni1-M and Ni2-M (Table 2).

Surprisingly, in comparison to other thermally stable nickel catalysts reported in the literature (e.g., Cat3 (Wang, X.-l.; Zhang, Y.-p.; Wang, F.; Pan, L.; Wang, B.; Li, Y.-s. Robust and Reactive Neutral Nickel Catalysts for Ethylene Polymerization and Copolymerization with a Challenging 1,1-Disubstituted Difunctional Polar Monomer. *ACS Catal.* 2021, 11, 2902-2911), Cat4 (Rhinehart, J. L.; Brown, L. A.;

Long, B. K. A Robust Ni(II) α-Diimine Catalyst for High Temperature Ethylene Polymerization. *J. Am. Chem. Soc.* 2013, 135, 16316-16319), and Cat5 (Zhang, Y.; Mu, H.; Pan, L.; Wang, X.; Li, Y. Robust Bulky [P,O] Neutral Nickel Catalysts for Copolymerization of Ethylene with Polar Vinyl Monomers. *ACS Catal.* 2018, 8, 5963-5976) in Table 18), our Ni2-Cs complex is a novel and unexpected improvement and stands out due to its ability to achieve high activity ($3.30\times10^4$ kg/mol Ni·h) while maintaining moderate polymer molecular weight ($M_n=1.85\times10^2$ kg/mol, $Đ=1.5$) at 90° C. Without being bound by theory, these results suggest that steric blocking using pendant cations may be as effective as using sandwich ligand motifs. Catalysts that are thermally stable and exhibit high performance at elevated temperatures are particularly attractive in industrial applications.

Figure 4:
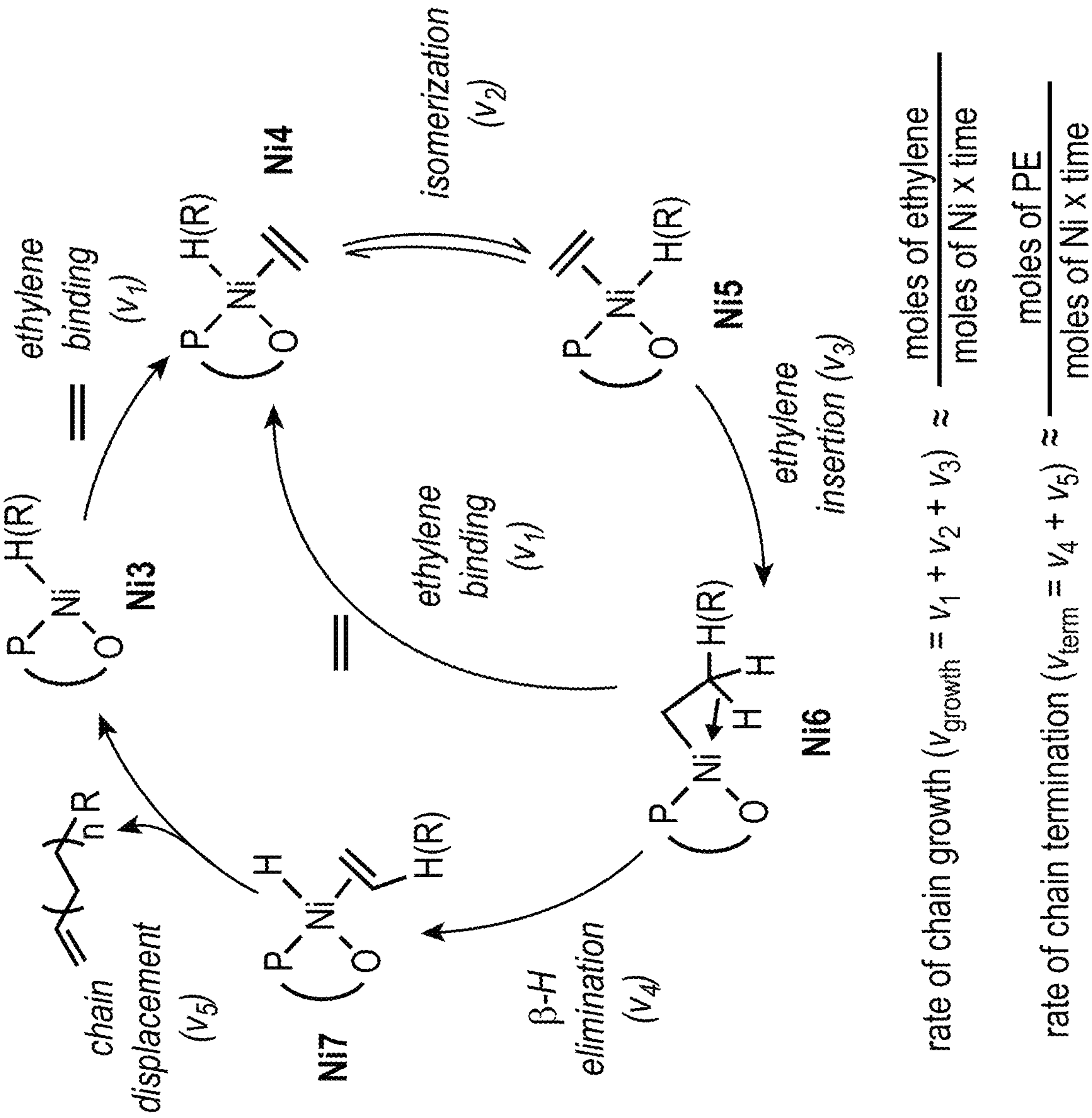
FIG. 4 depicts in accordance with various embodiments of the invention, without being bound by theory, a proposed catalytic cycle for ethylene polymerization by Ni(P,O-donor) complexes. The rate approximation for $v_{growth}$ and $v_{term}$ are also shown.

As depicted in FIG. 4, without being bound by theory the mechanism of coordination-insertion polymerization is proposed to involve ethylene binding to the vacant site of Ni3 to form Ni4, isomerization from Ni4 to Ni5, and then monomer insertion to yield Ni6. Chain propagation can continue from Ni6 to extend the polymer chain or chain termination can occur via β-hydride elimination to Ni7 and subsequent chain displacement. To extract information about the chain growth and chain termination rates in our reactions, we calculated $v_{growth}$ and $v_{term}$, respectively, using the equations shown in FIG. 4. (Nakano, R.; Chung, L. W.; Watanabe, Y.; Okuno, Y.; Okumura, Y.; Ito, S.; Morokuma, K.; Nozaki, K. Elucidating the Key Role of Phosphine-Sulfonate Ligands in Palladium-Catalyzed Ethylene Polymerization: Effect of Ligand Structure on the Molecular Weight and Linearity of Polyethylene. *ACS Catal.* 2016, 6, 6101-6113; Chan, M. S. W.; Deng, L.; Ziegler, T. Density Functional Study of Neutral Salicylaldiminato Nickel(II) Complexes as Olefin Polymerization Catalysts. *Organometallics* 2000, 19, 2741-2750). Comparison of these rates revealed several interesting trends. First, chain growth is strongly dependent on electronic effects. Both Ni1 and Ni2 showed significant $v_{growth}$ enhancement in the presence of $M^+$ in the order $Li^+>Na^+>K^+>Cs^+$ (FIG. 3C), which follows their Lewis acidity trend. Without being bound by theory, this observation suggests that more electron-poor Ni complexes undergo monomer propagation faster than their electron-rich counterparts. If olefin insertion ($v_3$) is the rate limiting step in polymerization, the overall catalyst activity is thus greatly influenced by the electronic nature of the catalyst (FIG. 3D).

Second, without being bound by theory, chain termination is most likely dependent on both electronic and steric factors since $v_{term}$ does not track with any single parameter alone (cf. FIG. 3B vs. FIG. 3C). At 30° C., $v_{term}$ for Ni1-M ranged from $1.06\times10^1$ to $1.05\times10^4$ mol PE/mol Ni·h ($\Delta v_{term}=1.0\times10^4$), whereas $v_{term}$ for Ni2-M ranged from 0.9 to 4.3 mol PE/mol Ni·h ($\Delta v_{term}=3.4$). The significantly lower $v_{term}$ values for Ni2-M relative to those for Ni1-M surprisingly indicate the Ni2-M is much less prone to chain termination than the Ni1-M. It has been proposed that both electronic and steric effects can impact a catalyst's tendency to undergo chain termination. For example, electron-poor complexes are more likely to form stronger β-agostic interactions between the metal center and the C—H bond of a coordinated alky chain, which would lead to more facile β-hydride elimination. However, steric effects could also influence chain termination because bulky substituents protect the metal center from undergoing polymer chain displacement, which would decrease $v_{term}$. The dramatic differences in $v_{term}$ for Ni1-M vs. Ni2-M could be rationalized in terms of both factors. First, Ni2-M is more electron-rich than Ni1-M so the former may engage in weaker C—H interactions and exhibit reduced propensity towards β-hydride elimination compared to the latter. Second, complex Ni2-M is more structurally shielded than Ni1-M due to coordination of one of its methoxy groups to the alkali metal (Table 1) (Batsanov, S. S. Van der Waals Radii of Elements. Inorg. Mater. 2001, 37, 871-885). This rigidified framework blocks off the apical nickel site from incoming monomer, which would prevent ethylene associative chain transfer. Thus, for Ni2-M, both electronic and steric factors reinforce each other, leading to smaller $v_{term}$ values in comparison to those for Ni1-M. Because polymer molecular weight is proportional to $v_{growth}/v_{term}$ and $v_{term}$ is influenced by both electronic and steric factors, the chain length of a growing polymer must, therefore, be controlled by both electronic and steric factors.

Figure 5A:
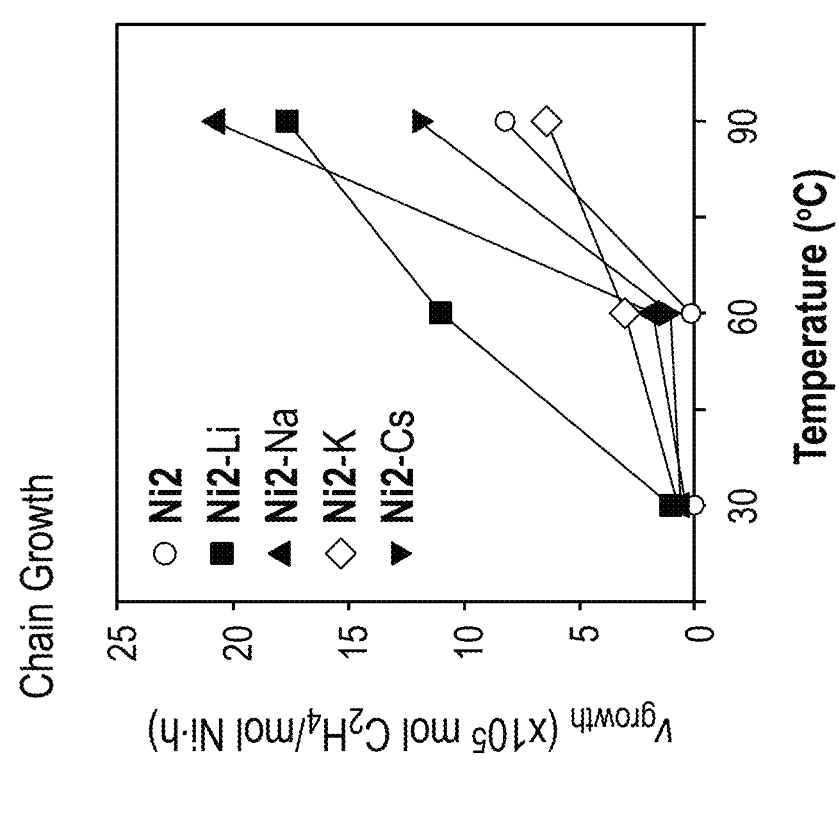
FIG. 5A-FIG. 5B depicts in accordance with various embodiments of the invention, plots showing the effect of temperature on the chain growth ($v_{growth}$, FIG. 5A) and chain termination ($v_{term}$, FIG. 5B) rates of the nickel catalysts in ethylene polymerization. The complete polymerization data are provided in Table 12.
Figure 5B:
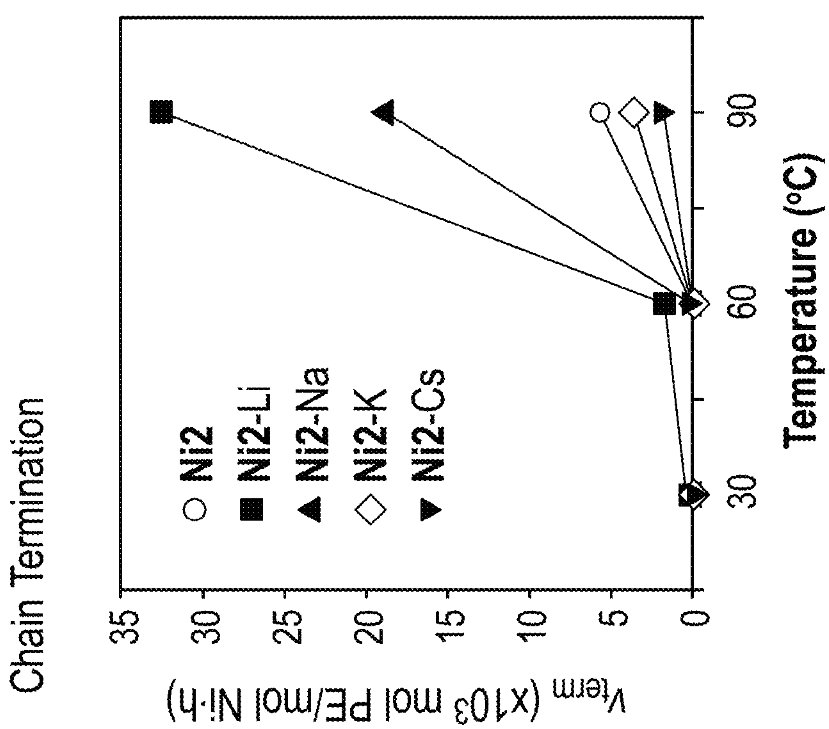

Third, our polymerization results indicated that temperature has a more dramatic effect on chain termination than chain growth rates (Table 12). For example, $v_{growth}$ for the various nickel complexes increased by 2-10× from 30° C. to 60° C. and 10-82× from 30° C. to 90° C. (FIG. 5A). In comparison, $v_{term}$ was enhanced by 4-40× from 30 to 60° C. and 40-950× from 30 to 90° C. (FIG. 5B). Without being bound by theory, these changes most likely reflect the relative energies of the activation barriers for chain growth vs. chain termination.

Secondary Cation Exchange

Figure 6A:
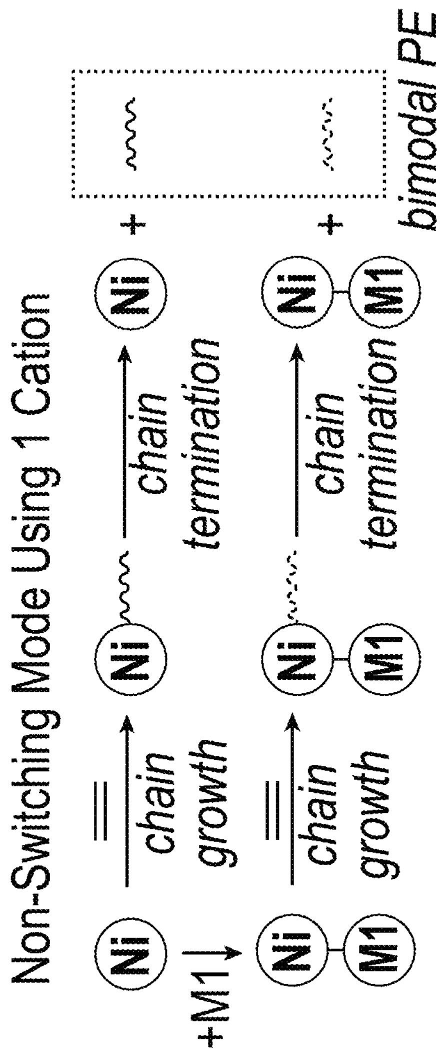
FIG. 6A-FIG. 6B depicts in accordance with various embodiments of the invention, without being bound by theory a proposed process for both non-switching (FIG. 6A) and dynamic switching (FIG. 6B) modes in olefin polymerization by non-living cation-tunable nickel complexes using 1 cation. The squiggly lines represent polymer segments produced by different catalyst forms. In this work, both "blocks" comprise entirely of ethylene. However, it may be possible to use this strategy to produce block copolymers when starting with more than one type of monomer.
Figure 6B:
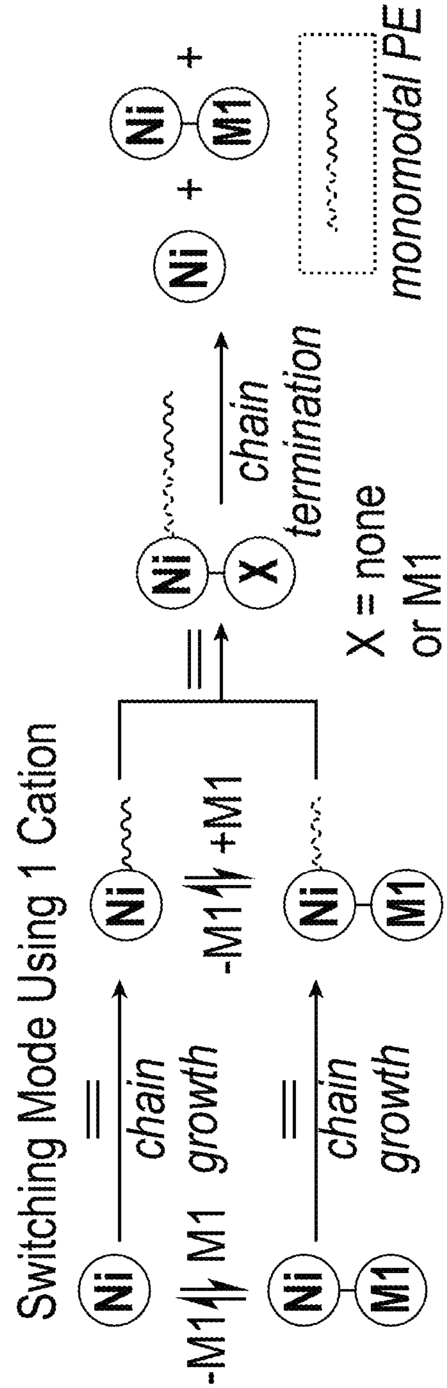
Figure 25A:
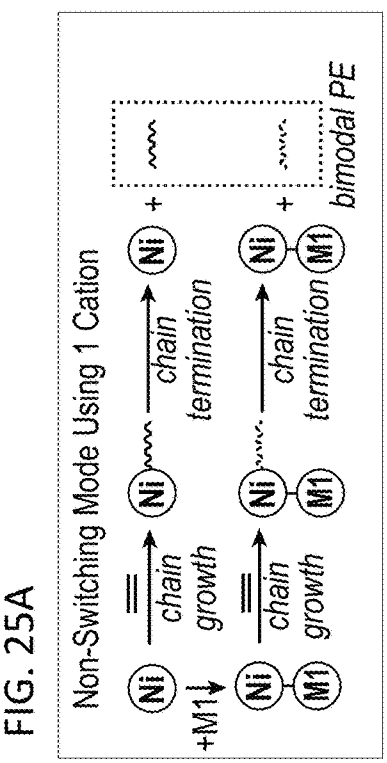
FIG. 25A-FIG. 25D depicts in accordance with various embodiments of the invention, Proposed process for both non-switching (FIG. 25A, FIG. 25C) and dynamic switching (FIG. 25B, FIG. 25D) modalities in olefin polymerization by non-living cation-tunable nickel complexes. It is possible that species with nuclearity greater than 2 could form but are not considered in FIG. 25A-FIG. 25D. The squiggly lines represent polymer segments produced by different catalyst forms. Here, both "blocks" comprise entirely of ethylene. However, without being bound by theory, it may be possible to use this strategy to produce block copolymers when starting with more than one type of monomer.
Figure 25B:
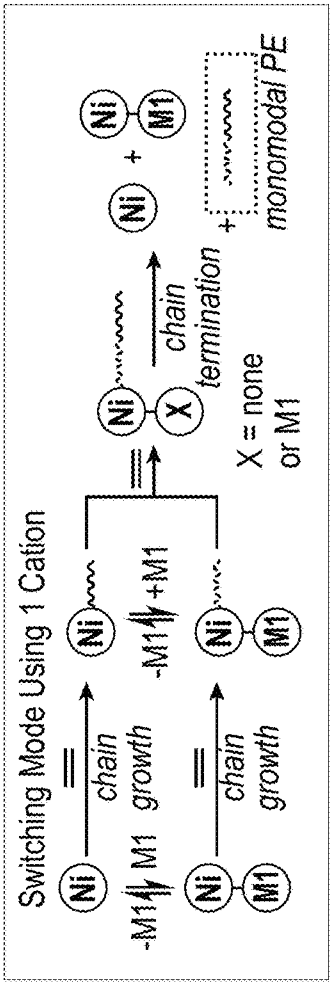
Figure 25C:
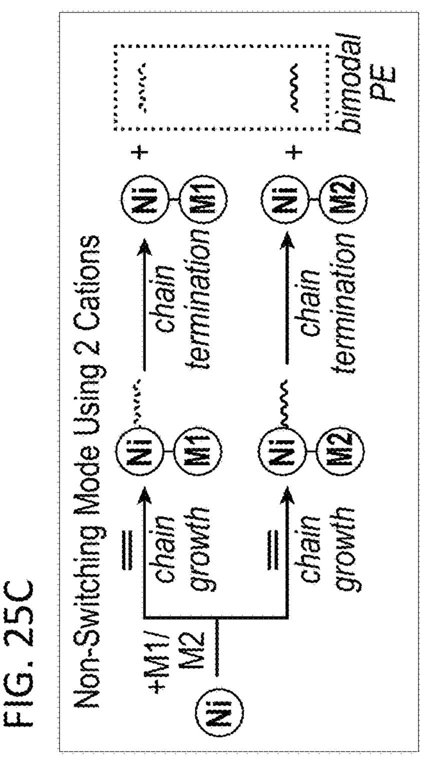
Figure 25D:
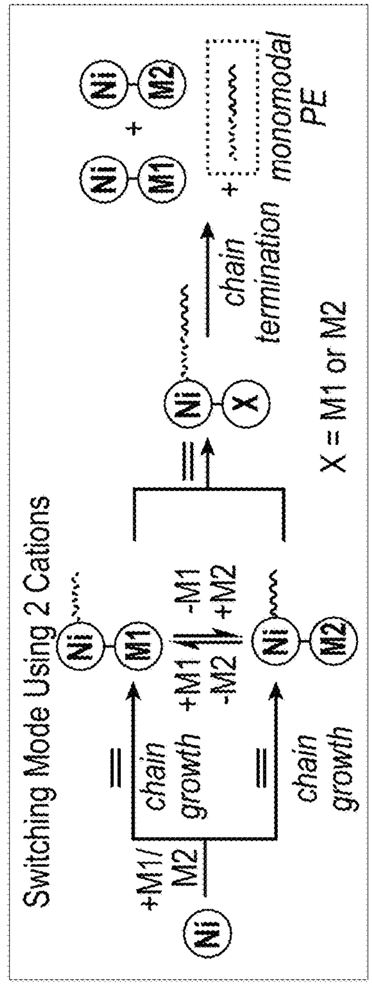

We also investigated whether we could manipulate the cation exchange equilibria of our nickel complexes to control polymerization. Without being bound by theory, in the non-switching regime (FIG. 6A), we hypothesized that combining a Ni catalyst with substoichiometric amounts of M1 (any secondary cation) would yield a mixture of Ni and Ni-M1 species. Reaction of these complexes with ethylene would afford a bimodal polymer distribution, in which one polymer is generated entirely by Ni and the other by Ni-M1. We also hypothesized that non-switching polymerization could also be accomplished using Ni with two or more different cations (FIG. 25C). Without being bound by theory, in the dynamic switching regime (FIG. 6B), we hypothesized that secondary cations can exchange between different Ni species faster than the rate of chain termination. When only one cation is used (i.e., M1), chain growth occurs from a catalyst that continuously cycles between Ni and Ni-M1 before chain terminating. Similarly, when two different cations are used (i.e., M1 and M2), each polymer chain would grow from catalysts that interconvert rapidly between Ni-M1 and Ni-M2 (FIG. 25D). Thus, dynamic switching would afford polymer with monomodal distributions and tunable microstructures.

Figure 7A:
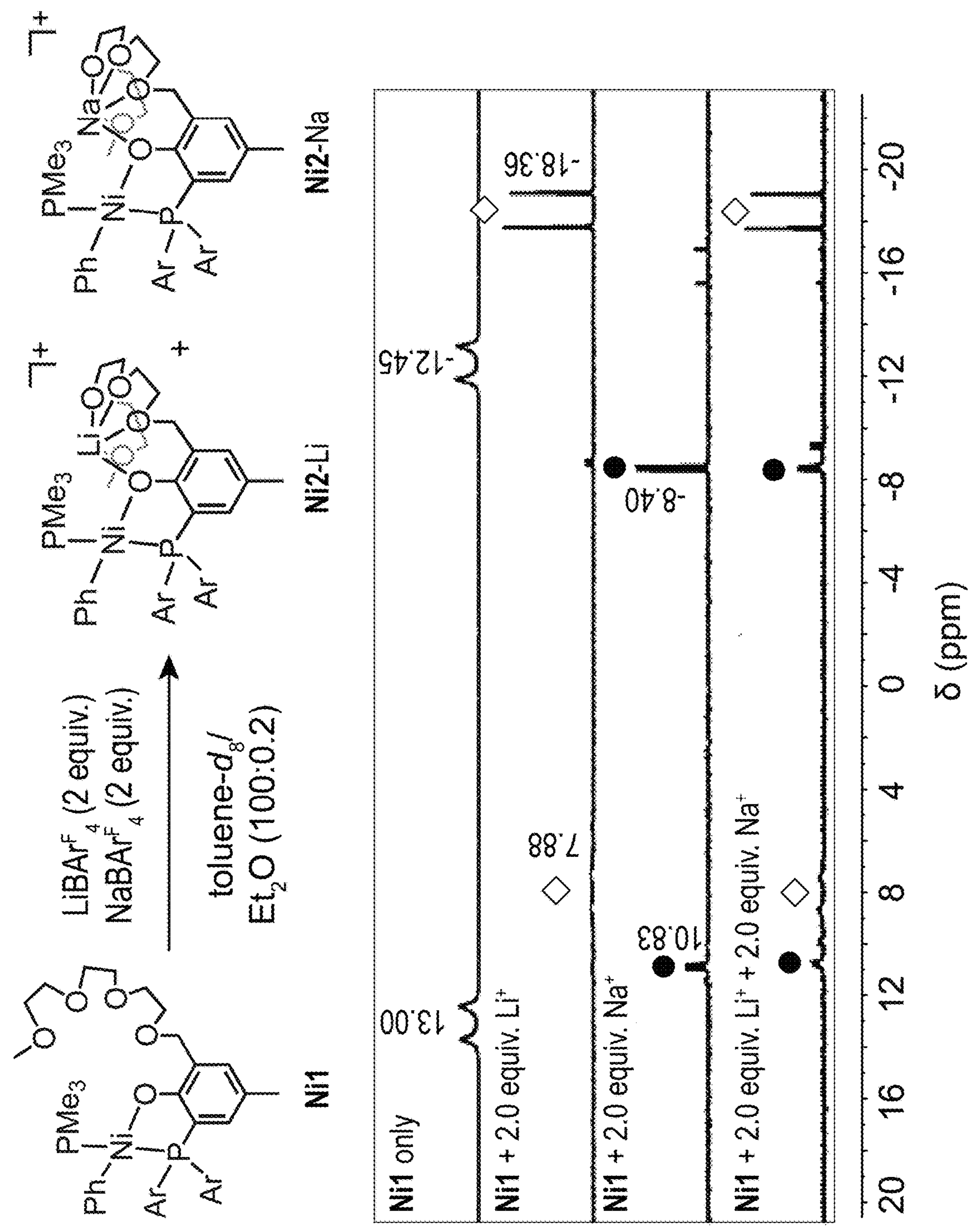
FIG. 7A-FIG. 7B depicts in accordance with various embodiments of the invention, (FIG. 7A) $^{31}P$ NMR spectra (toluene-$d_8$/$Et_2O$ (100:0.2), 202 MHz, RT) of Ni1 with $LiBAr^F_4$ and/or $NaBAr^F_4$. The Ni1/$Li^+$/$Na^+$ sample clearly showed the presence of both Ni1-Li and Ni1-Na. Only the major stereoisomers are labeled in the spectra.

In our metal binding studies, we unexpectedly found that exchange between our Ni complexes and MW was favored in polar solvents but disfavored in non-polar solvents. For example, when Ni1 was combined with 2 equiv. of both $LiBAr^F_4$ and $NaBAr^F_4$ in toluene-$d_8$/$Et_2O$ (100:0.2), which is a low polarity mixture, its $^{31}P$ NMR spectrum clearly shows resonances corresponding to both Ni1-Li (δ=−18.36 and 7.88 ppm) and Ni1-Na (δ=−8.40 and 10.83 ppm) species (FIG. 7A). Without being bound by theory, these results suggest that interconversion between Ni1-Li and Ni1-Na must occur slower than the NMR timescale, which is on the order of milliseconds. For the Ni2 complexes, a non-polar solvent mixture of toluene/hexane (1:3) provided the most ideal conditions for non-switching reactions.

Figure 7B:
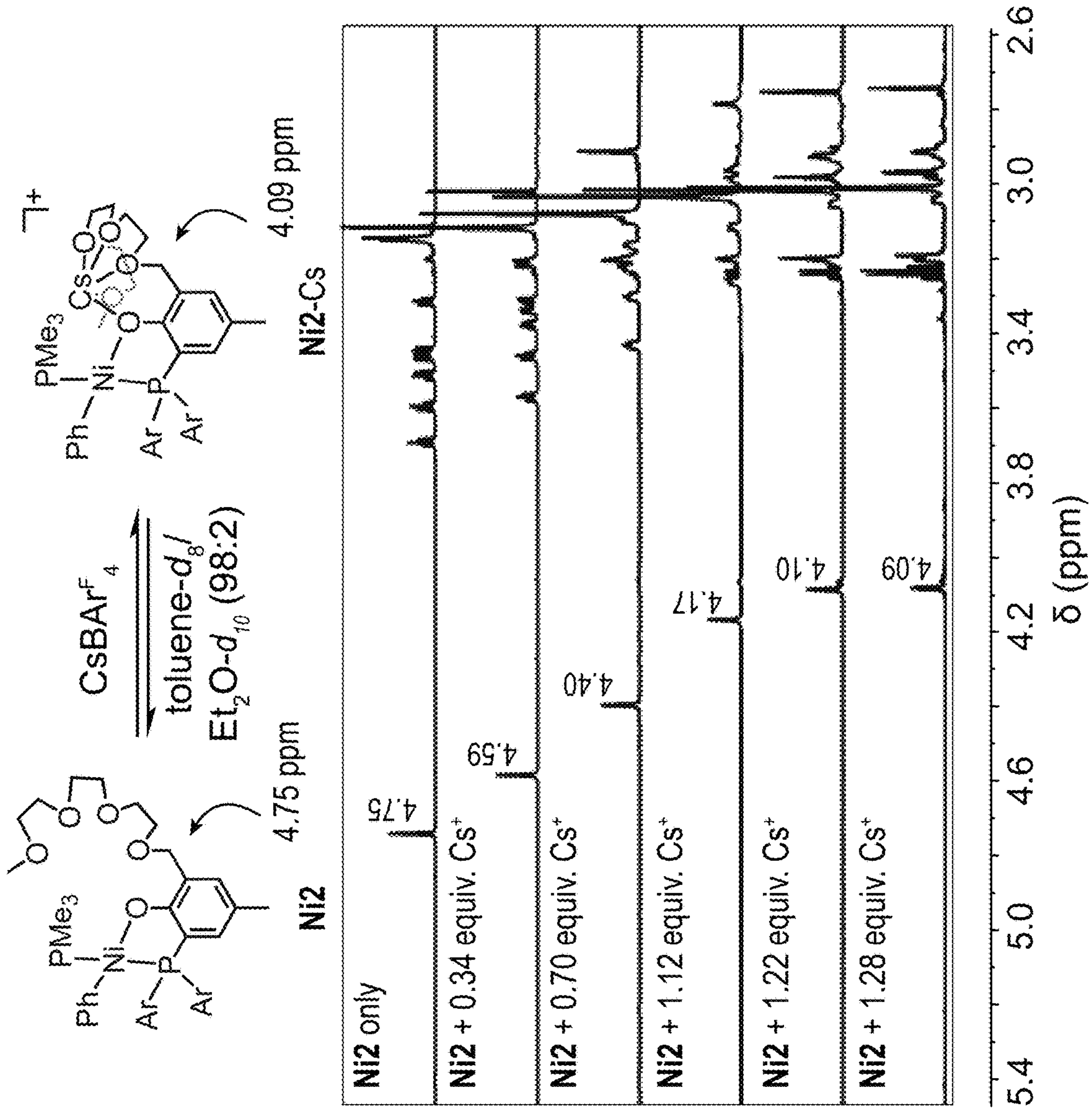
Figure 22:
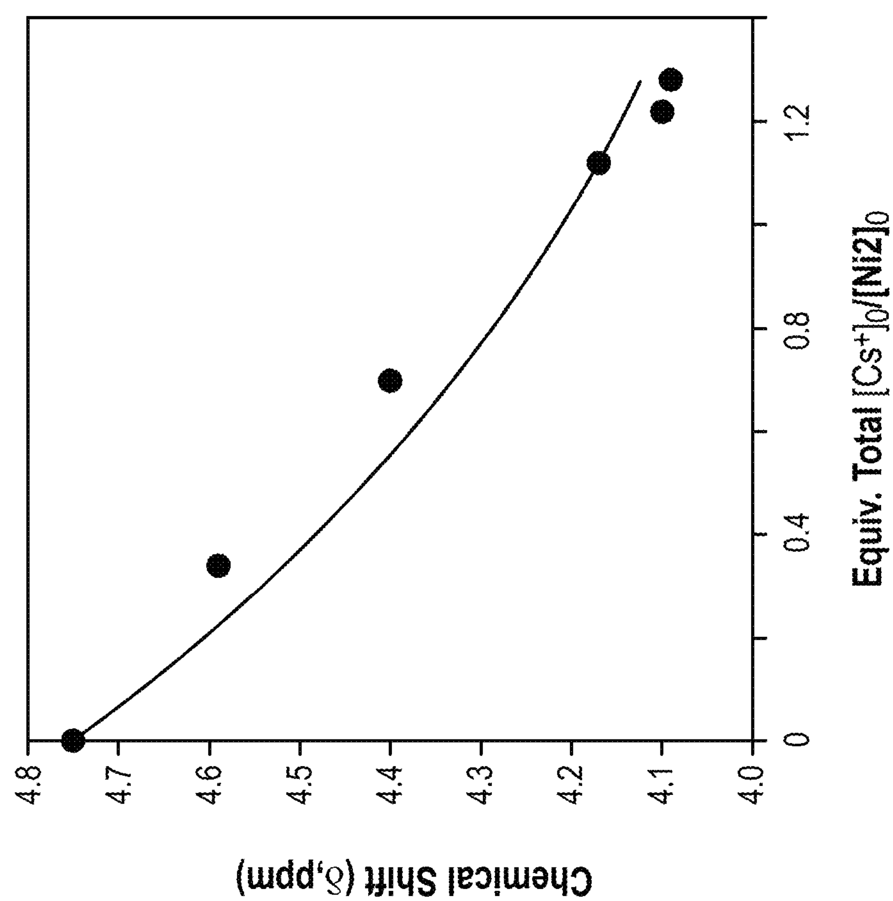
FIG. 22 depicts in accordance with various embodiments of the invention, Plot of the titration data in FIG. 18 for the binding of $Cs^+$ to Ni2 in toluene-$d_8$:$Et_2O$-$d_{10}$ (98:2) at RT. The data were fit using BindFit to a 1:1 binding model to yield $K_a$=199±139 $M^{-1}$ (data points are shown as black dots and the fit is shown as a black curve). Without being bound by theory, the large error in the calculated $K_a$ is most likely due to the lack of data points in the saturated region of the curve, which was not possible to obtain because $CsBAr^F_4$ has low solubility in the solvent mixture.
Figure 23A:
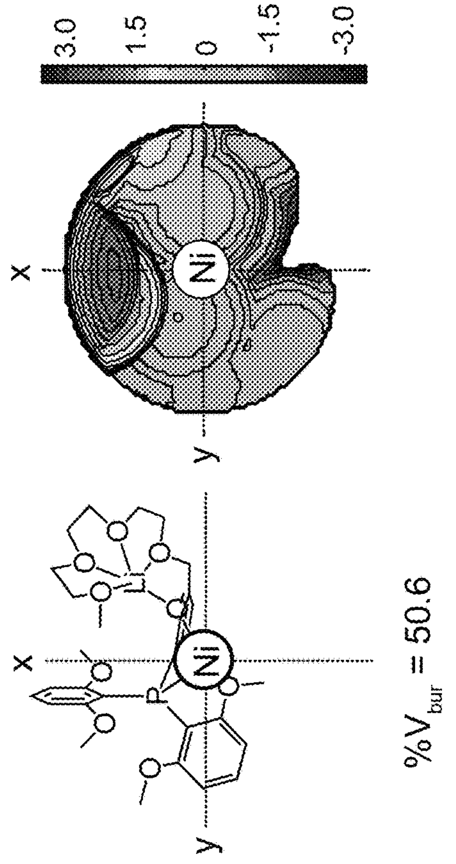
FIG. 23A-FIG. 23D depicts in accordance with various embodiments of the invention, Topographic steric maps of FIG. 23A) Ni2-Li, FIG. 23B) Ni2-Na, FIG. 23C) Ni2-K, and FIG. 23D) Ni2-Cs complexes calculated from their X-ray structures using SambVca 2.1. Only the phenoxyphosphine ligands were considered in the calculation of % $V_{bur}$. The nickel atom was set as the center of the coordination sphere, the nickel square plane defined the xz-plane, and the z-axis bisects the P(1)-Ni(1)-O(1) angle.
Figure 23B:
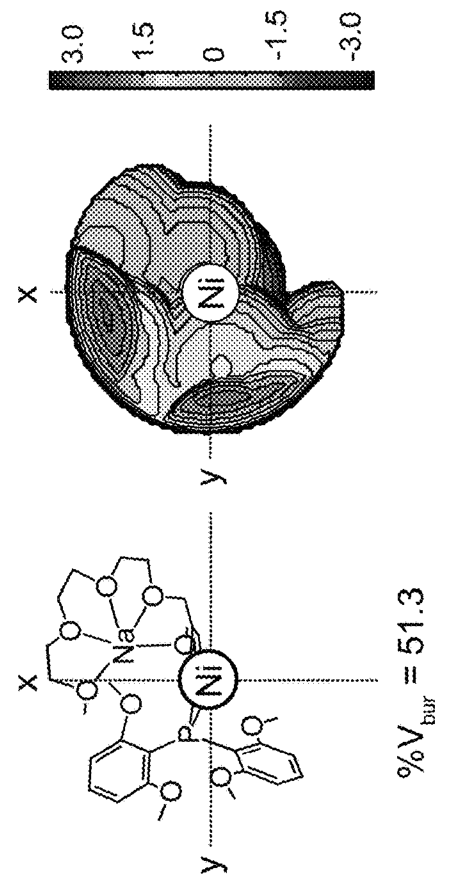
Figure 23C:
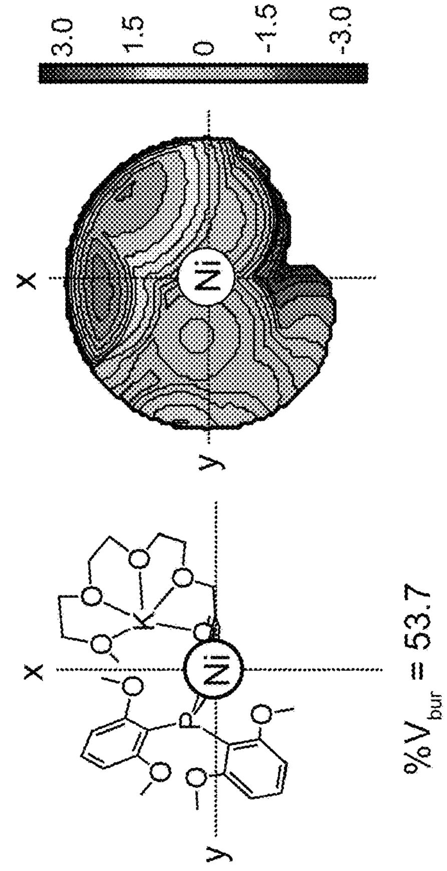
Figure 23D:
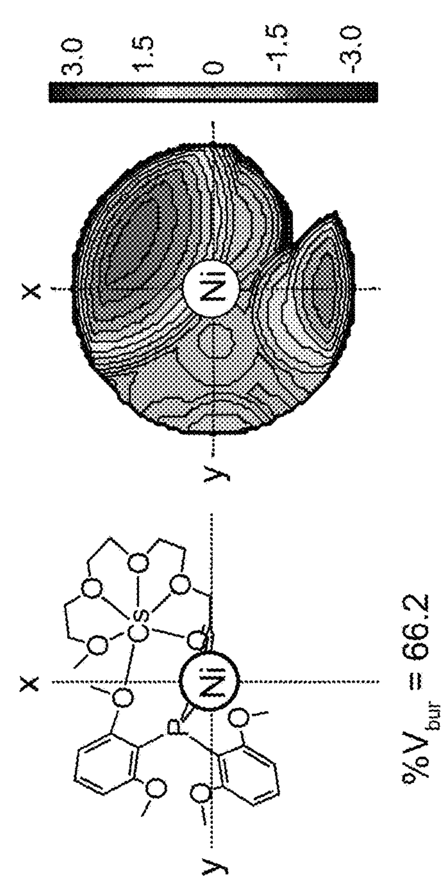

To promote cation exchange, we increased the solvent polarity by changing the toluene/$Et_2O$ ratio from 100:0.2 to 98:2. Because $Et_2O$ is a Lewis base, it can displace a coordinated $M^+$ from the PEG chelator and help shuttle it to another mononickel complex. We discovered that too much ether, however, lowers the nickel-alkali binding affinity so the amount of $Et_2O$ used must be precisely controlled. As shown in FIG. 7B, when various equiv. of $CsBAr^F_4$ was added to a solution containing Ni2, the $^1H$ NMR resonances gradually shifted upfield. For example, the benzylic signal of Ni2 at 4.75 ppm appeared at 4.09 ppm when 1.28 equiv. of $Cs^+$ was introduced. Without being bound by theory, these results suggest that the Ni2 and Ni2-Cs species formed in solution are rapidly interconverting and their resonances are averaged out in their NMR spectra. Attempts were made to determine the binding constant between Ni2 and $Cs^+$ based on their NMR chemical shifts (FIG. 22). Unfortunately, we were unable to obtain satisfactory fit of the binding curve because there were insufficient data points in the saturated region of the isotherm due to the limited solubility of $Cs^+$ in toluene/$Et_2O$ (98:2). Studies using competition experiments may be more suitable for determining $K_a$ values under our experimental conditions. For reference, the complexation of $Cs^+$ with a 15-crown-5 ether macrocycle, which contains five oxygen ether donors, has $K_a$=~1000 $M^1$ in acetonitrile at 25° C. (values in toluene/$Et_2O$ were not reported). It has generally been found that acyclic ethers exhibit lower alkali ion affinities than that of analogous cyclic ethers so our PEGylated catalysts may be able to bind $Cs^+$ with $K_a$<1000 $M^{-1}$ in acetonitrile. Without being bound by theory, we also found that increasing the reaction temperature could also increase the cation exchange rates.

Non-Switching Polymerization

Figure 8A:
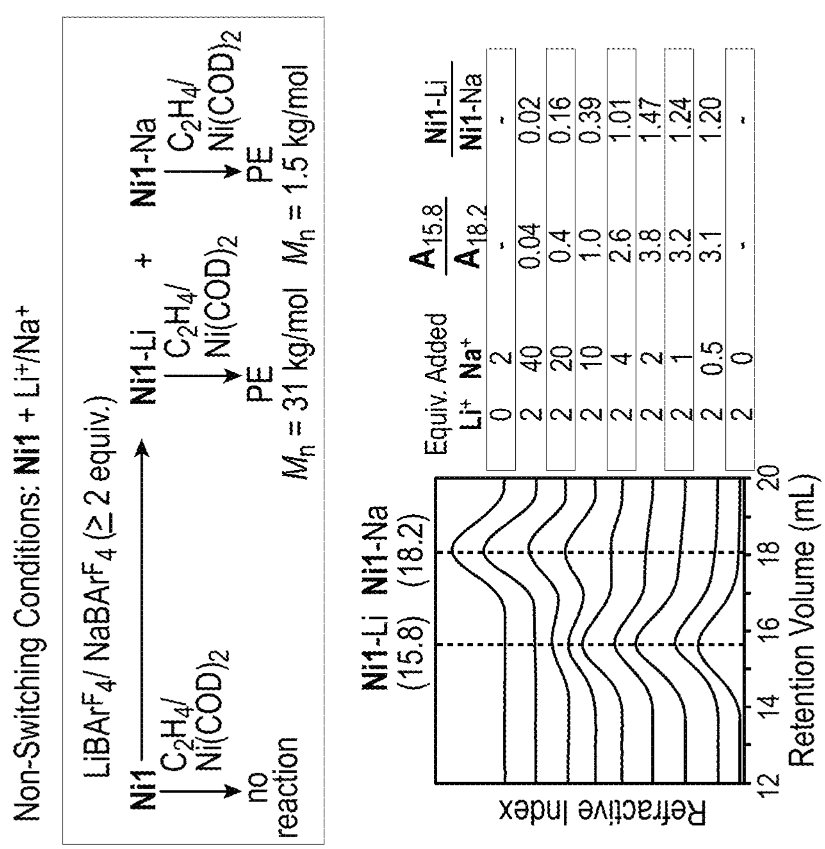
FIG. 8A-FIG. 8B depicts in accordance with various embodiments of the invention, ethylene polymerization using nickel catalysts under non-switching conditions at 30° C.

After identifying the solvent combinations needed to control secondary metal exchange rates, we next determined whether our cation-switching strategy could be used to regulate polymerization. We tested two different scenarios under non-switching conditions. In one set of experiments, Ni1 was mixed with different ratios of $Li^+$:$Na^+$ in toluene/$Et_2O$ (100:0.2), keeping the total amount of salt used to ≥4.0 equiv. relative to Ni to favor the formation of Ni1-Li and Ni1-Na species. The quantity of $Li^+$ was held constant but the amount of $Na^+$ added was varied. This mixture was treated with $Ni(COD)_2$ to activate the nickel catalyst, pressurized with ethylene to 450 psi, and then stirred at 30° C. for 0.5 h (Table 13). Analysis of the polymer products obtained by gel permeation chromatography (GPC) showed that reactions containing both $Li^+$ and $Na^+$ afforded polyethylene (PE) with bimodal distributions. The peaks at 15.8 and 18.2 mL retention volume were similar to those obtained from samples produced from Ni1-Li ($M_n$=3.1×$10^1$ kg/mol) and Ni1-Na ($M_n$=1.5 kg/mol), respectively (FIG. 8A). Without being bound by theory, these results suggest that both nickel species were active during polymerization and did not interconvert between each other. The relative amounts of each polymer fraction generated were quantified by integrating their peak areas (i.e., $A_{15.8}$ and $A_{18.2}$). The $A_{15.8}$/$A_{18.2}$ ratio reflects the distribution of Ni1-Li:Ni1-Na in the reaction and the polymerization activities of the corresponding complexes. Our results showed that equal quantities of both polymers were obtained (i.e., $A_{15.8}/A_{18.2}=1.0$) when the Ni1-Li:Ni1-Na ratio was 0.39, which was achieved by adding 2 equiv. of $Li^+$ and 10 equiv. of $Na^+$ to a solution of Ni1. Because the solubility of the salts and binding affinity of Ni1 for $Li^+$ vs. $Na^+$ are different, the exact amount of $MBAr^F_4$ needed to obtain a specific bimodal polymer distribution must be determined empirically. Based on data fitting, we obtained the relationship $A_{15.8}/A_{18.2}=-4.11e^{(-3.28(Li+/Na+))}+3.38$ (Eq. 1, FIG. 24). Using this equation, it is possible to calculate the amounts of $Li^+$ and $Na^+$ salts needed with Ni1 to prepare specific polymer blends.

Figure 8B:
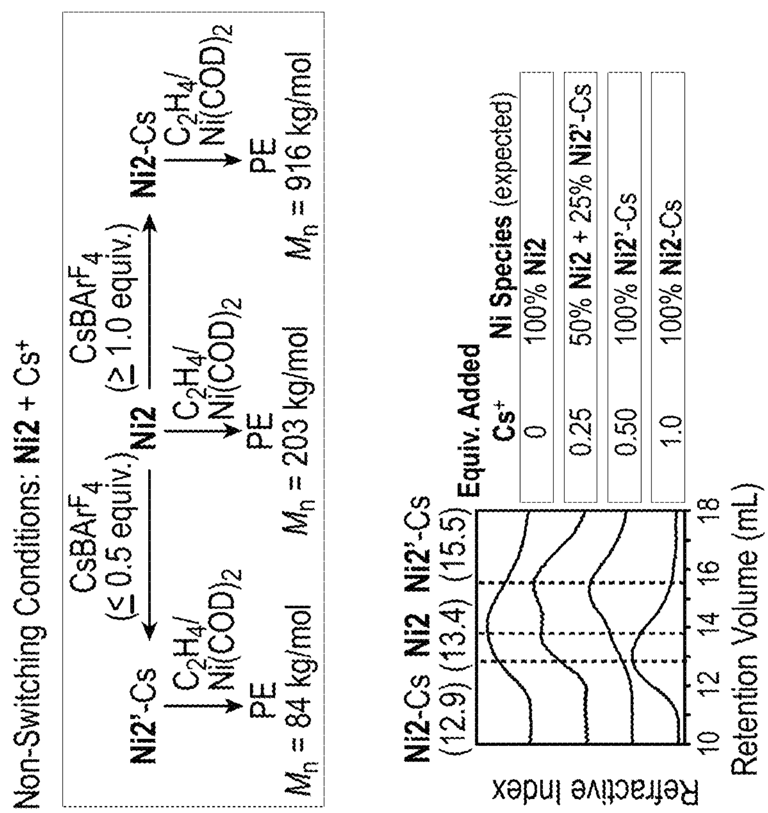
Figure 20:
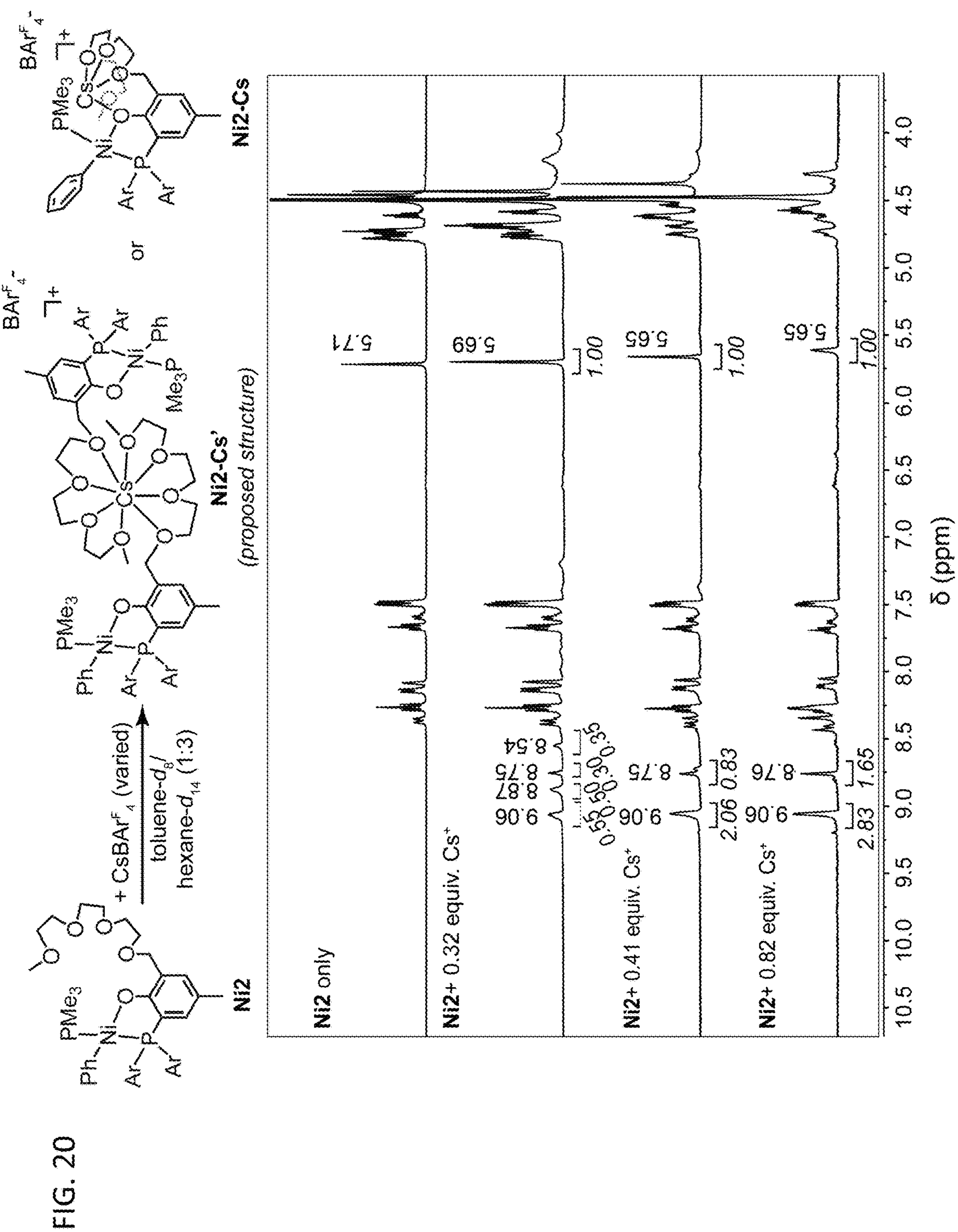
FIG. 20 depicts in accordance with various embodiments of the invention, $^1$H NMR spectra (400 MHz) of complex Ni2 (9.0 mM) before and after the addition of various equivalence of $CsBAr^F_4$ in toluene-$d_8$:hexane-$d_{14}$ (1:3) at RT. The relative amounts of cesium salt present in each sample were calculated based on the peak integration values for the benzylic vs. $BAr^F_4{}^-$ hydrogen atoms, not on the amount of salt added in the experiment. Spectrum with Ni2+0.32 equiv. $Cs^+$ shows two different sets of aromatic C—H peaks corresponding to the $BArF_4{}^-$ anion.
Figure 21:
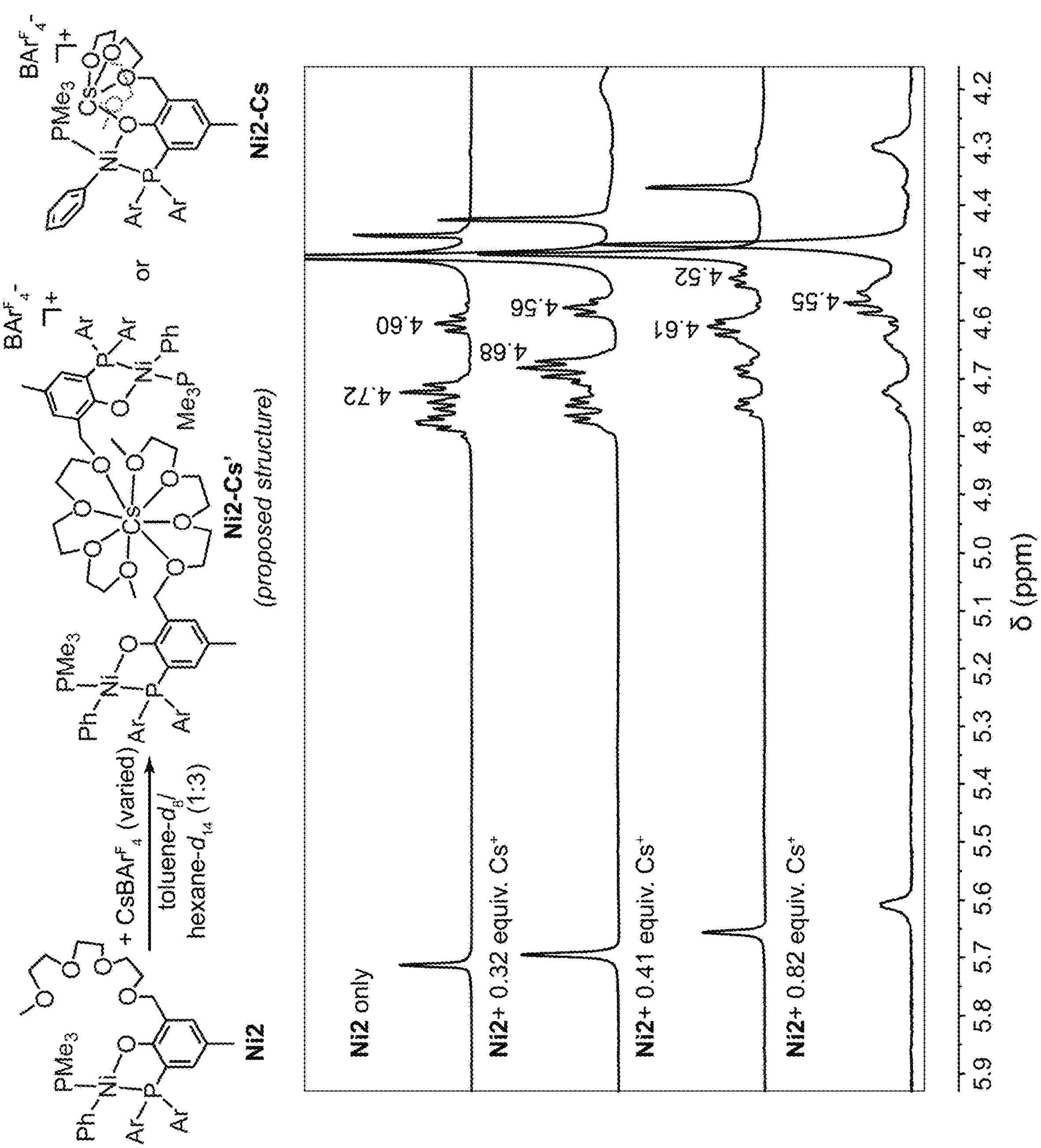
FIG. 21 depicts in accordance with various embodiments of the invention, $^1$H NMR spectra (400 MHz) showing the PEG region of complex Ni2 (9.0 mM) before and after the addition of various equivalence of $CsBAr^F_4$ in toluene-$d_8$: hexane-$d_{14}$ (1:3) at RT. The full spectra are shown in FIG. 20. The relative amounts of cesium salt present in each sample were calculated based on the peak integration values for the benzylic vs. $BAr^F_4{}^-$ hydrogen atoms, not on the amount of salt added in the experiment.

In a second set of experiments, we performed ethylene polymerization studies using Ni2 with varying amounts of $CsBAr^F_4$ in the non-polar mixture toluene/hexane (1:3). When 0.25 equiv. of $Cs^+$ was used, a bimodal polymer was obtained showing GPC peaks at 13.4 and 15.5 mL (FIG. 8B, Table 14). The product at 13.4 mL matched that generated by Ni2 in the absence of alkali ions ($M_n$=2.03×$10^2$ kg/mol). Without being bound by theory, the peak at 15.5 mL ($M_n$=8.40×$10^1$ kg/mol) suggests that a new unidentified nickel-cesium species (Ni2'-Cs) was involved in polymerization since the 1:1 nickel:cesium Ni2-Cs gave monodispersed polymers with a GPC retention volume of 12.9 mL ($M_n$=9.16×$10^2$ kg/mol). We hypothesize that the composition of Ni2'-Cs, in one possibility is that it is a 2:1 nickel:cesium species based on results from our titration studies. As shown in FIG. 20 and FIG. 21, when up to ~0.5 equiv. of $CsBAr^F_4$ was added to Ni2 in toluene-$d_8$/hexane-$d_{14}$ (1:3) at RT, the benzylic peak shifted from 5.71 to 5.65 ppm, suggesting that a new nickel species had formed.

When 0.5 equiv. of $Cs^+$ was combined with Ni2 in polymerization, the GPC trace of the polyethylene (PE) isolated showed a major peak at 15.5 mL retention volume (FIG. 8B). Based on stoichiometry, addition of 0.5 equiv. of $Cs^+$ to Ni2 is expected to yield 100% of a 2:1 nickel:cesium species. Our observation that this reaction provided nearly monodispersed polyethylene (PE) is consistent with there being only one major active species during polymerization.

Our polymerization results above demonstrate that under non-switching conditions, we can readily access multimodal polymers with exquisite control over the relative distribution of the different fractions. This method is complementary to those such as melt blending, multi-site polymerization, or multi-zone cascades to generate all-polyolefin composites. Our approach is advantageous because it does not require high temperature (e.g., >150° C.) or special equipment to prepare different polyolefin blends.

Dynamic Switching Polymerization

Figure 9A:
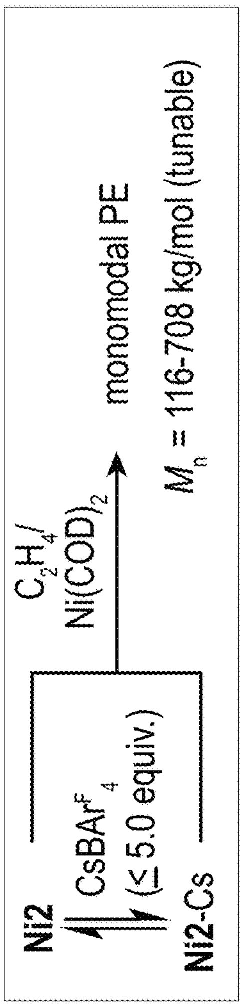
FIG. 9A-FIG. 9C depicts in accordance with various embodiments of the invention, the reaction of Ni2 with up to 5.0 equiv. of $CsBAr^F_4$ in toluene/$Et_2O$ (98:2), followed by activation with $Ni(COD)_2$ in the presence of ethylene at 60° C. The empirical formula was derived by fitting the $\chi$ vs. $M_n$ data to a single exponential growth function. The polymerization data are given in Table 16.
Figure 9B:
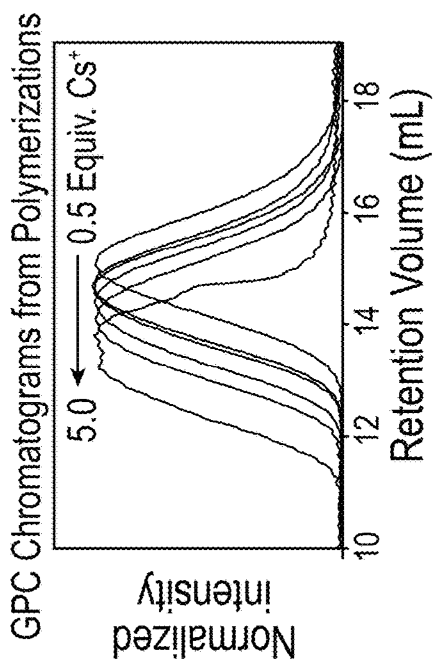
Figure 9C:
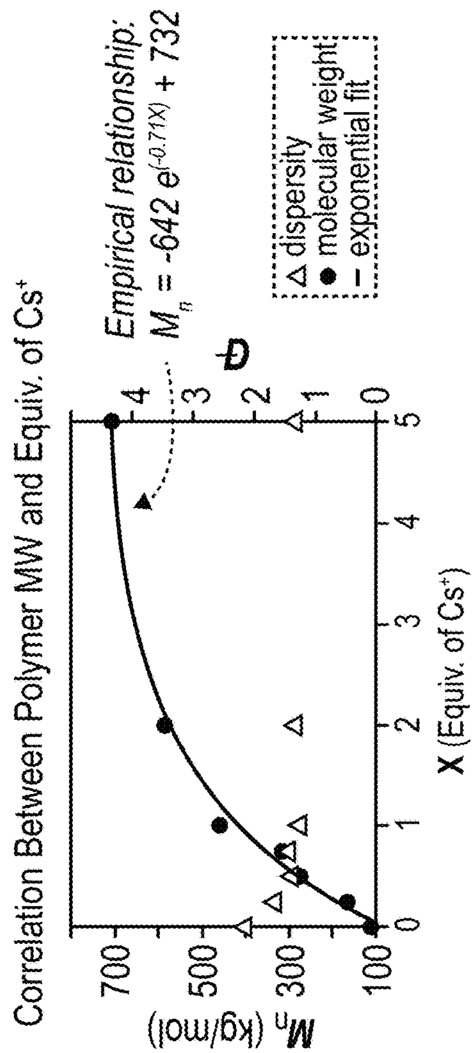

To demonstrate dynamic switching polymerization, we carried out reactions in toluene/$Et_2O$ (98:2), which was the solvent mixture found in our metal binding investigations to favor cation exchange (FIG. 7B). In one study, we combined Ni2/$Ni(COD)_2$ with various equiv. of $CsBAr^F_4$ in toluene/$Et_2O$ (98:2) and then pressurized the reactor with 450 psi of ethylene at 60° C. for 1 h (FIG. 9A-FIG. 9C Table 16). When we analyzed the polyethylene (PE) products, we observed that their molecular weights increased when larger amounts of $Cs^+$ were present ($M_n$=1.16×$10^2$ to 7.08×$10^2$ kg/mol). Importantly, the dispersity ($Đ$) values of all polymers obtained from the Ni2+$Cs^+$ reactions were <2.0, which suggests, without being bound by theory, that the active species responsible for polymerization are non-living single site catalysts. Similar results were obtained when the reactions were performed at 30° C. (Table 15). Without being bound by theory, these observations strongly support our proposed mechanism for dynamic switching (FIG. 6B), in which individual polyethylene (PE) chains grow from the same nickel centers as they continuously interconvert between Ni2 and Ni2-Cs states before chain termination. A plot of the equiv. of $Cs^+$ added (X) vs. $M_Q$ of the polymer showed saturation behavior (FIG. 9B), indicating that the catalyst exists predominantly in the Ni2-Cs form when >1.0 equiv. of $Cs^+$ was added. An excellent fit of the data was achieved using an exponential mathematical function (R=0.99), which revealed the relationship $M_n=-642e^{(-0.71\chi)}+732$ (Eq. 2). Using this empirically derived formula, it is possible to calculate the appropriate amount of $Cs^+$ needed to synthesize monodispersed polyethylene (PE) with molecular weights between $1.16\times10^2$ and $7.08\times10^2$ kg/mol. This high level of control is generally difficult to achieve in non-living polymerization.

Figure 10:
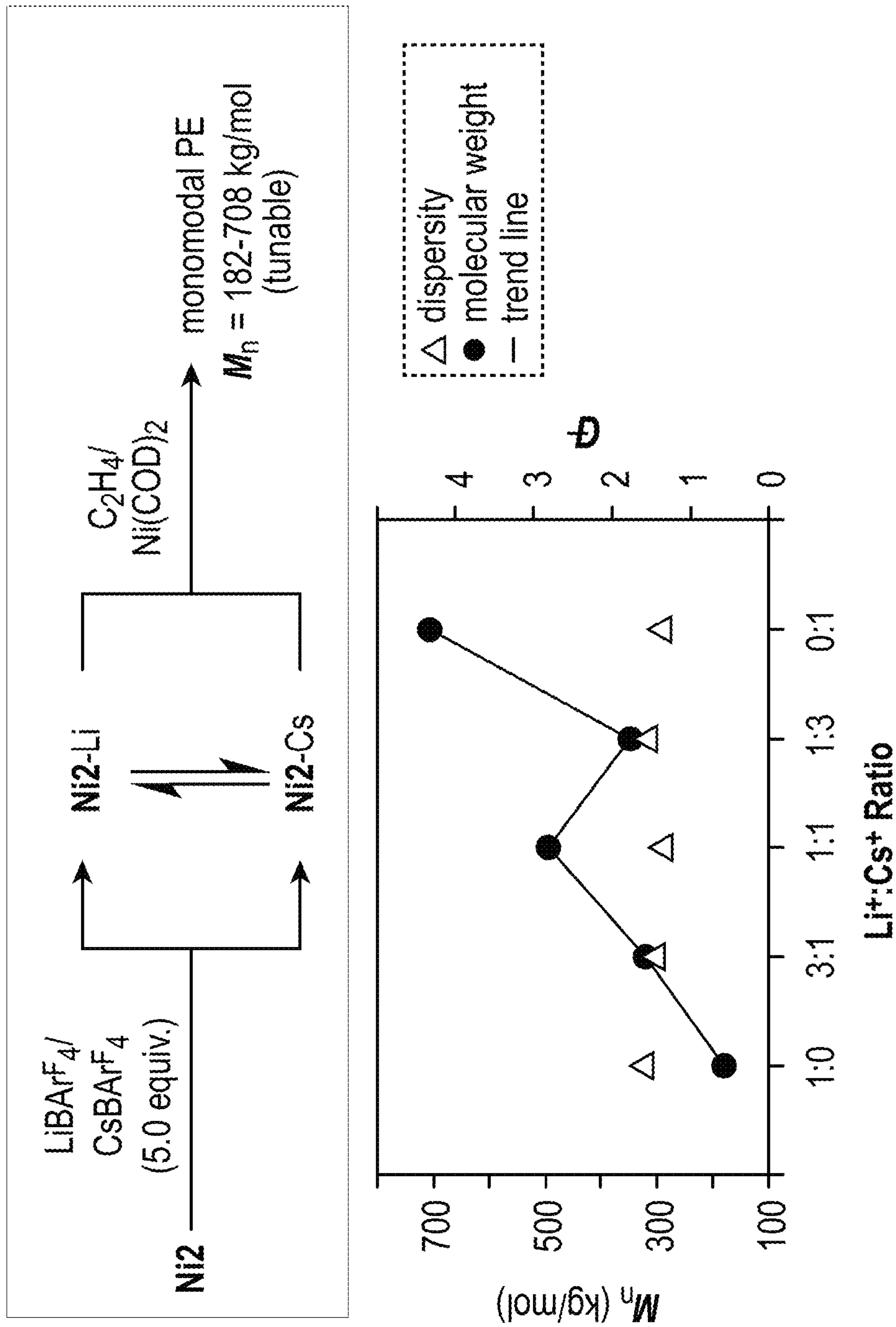
FIG. 10 depicts in accordance with various embodiments of the invention, the reaction of Ni2 with various ratios of $LiBAr^F_4$/$CsBAr^F_4$ (5.0 equiv. of salt total relative to Ni) in toluene/$Et_2O$ (98:2), followed by activation with $Ni(COD)_2$ in the presence of ethylene 30° C. The polymerization data are given in Table 17.

Next, we explored whether dynamic switching polymerization could be induced using two different $M^+$ ions (FIG. 25D). In these reactions, we added both $LiBAr^F_4$ and $CsBAr^F_4$ (5.0 equiv. of salt total relative to nickel) to toluene/$Et_2O$ (98:2) solutions containing Ni2/Ni$(COD)_2$ and then stirred the reactions under 450 psi of ethylene at 60° C. for 1 h (Table 17). The $Li^+$ and $Cs^+$ salts were selected for this experiment because Ni2-Li and Ni2-Cs produce the shortest and longest polymer chains in this nickel series, respectively. We performed reactions using $Li^+$:$Cs^+$ ratios of 1:0, 3:1, 1:1, 1:3, and 0:1 and obtained polymers with dispersity Đ <2.0 in all cases (FIG. 10), again showing that polymerization is occurring from discrete catalytically active species. The polymer MA increased with less $Li^+$ relative to $Cs^+$, except in the 1:3 reaction in which the polyethylene (PE) molecular weight decreased. The lack of a clear trend in $M_n$ as a function of the $Li^+$:$Cs^+$ ratio suggests that perhaps dynamic switching is occurring not only between Ni2-Li and Ni2-Cs active sites. Without being bound by theory, is it possible that other unidentified nickel-alkali complexes could form under certain $Li^+$:$Cs^+$ ratios. Regardless of the exact identities of the catalytically active species, these results are consistent with a dynamic switching mechanism because the polyethylene (PE) molecular weight changed with different $Li^+$:$Cs^+$ ratios while the polymer dispersities remained constant.

To the best of our knowledge, the examples above are the first demonstrations of using cations to dynamically regulate non-living polymerization processes. This tunability could be extremely versatile because it affords a high level of control that was not possible previously.

Conclusions

Herein, we have significantly expanded our understanding of cation-tunable catalysts and their applications in polymer synthesis. We prepared a nickel phenoxyphosphine-PEG catalyst (Ni2) featuring 2,6-dimethoxyphenyl. The addition of alkali ions to Ni2 afforded the corresponding Ni2-M species that surprisingly resulted in different ethylene polymerization behavior depending on the identity of $M^+$. In general, Ni2-M showed lower activity but gave polyethylene (PE) with higher molecular weight than that of the corresponding Ni1-M species. Complex Ni2-Cs is notable for its ability to generate ultra-high molecular weight polyethylene (e.g., $M_n>10^3$ kg/mol) and operate at high catalytic efficiency under elevated temperatures. Our polymerization results revealed that electronic effects strongly influence the chain growth rates of our nickel catalysts, whereas both steric and electronic effects influence their chain termination rates. Without being bound by theory, with hypothesize that because Ni2-M has greater steric protection of its axial sites than Ni1-M, the Ni2-M is less susceptible to chain displacement by incoming monomer than the Ni1-M. This structural effect is further reinforced by electronic effects, in which the more electron-rich Ni2-M forms weaker C—H agostic interactions with its coordinated polymer chain and thus, has reduced propensity to undergo chain termination compared to that by its more electron-poor Ni1-M counterpart.

An unexpected result of our cation-tunable catalysts is that we can manipulate their secondary metal exchange equilibria to regulate non-living polymerization. It was discovered that in low polarity solvent mixtures, such as toluene/$Et_2O$ (100:0.2) or toluene/hexane (1:3), $M^+$ does not switch between nickel complexes. Therefore, by adjusting the ratio of Ni:M1:M2 (if using two different cations), the amounts of Ni, Ni-M1, and Ni-M2 species present in solution could be carefully controlled, which ultimately determines the fractional composition of the polymer distribution. Our method used to prepare polyolefin blends does not require high temperature or special apparatus. Surprisingly, we found that when ethylene polymerizations were carried out in slightly more polar solvent mixtures, specifically toluene/$Et_2O$ (98:2), exchange of $M^+$ between two nickel complexes is faster than the NMR timescale (~$10^3$ s). Polymerizations under dynamic switching conditions gave monodispersed polyethylene (PE) (Đ <2.0) with varying molecular weights depending on the Ni:Ni-M1 or Ni-M1:Ni-M2 ratios. Without being bound by theory our results support a dynamic switching mechanism, in which a polymer chain extends from the same nickel center throughout the chain growth process while the catalyst cycles between two different states (e.g., Ni2 and Ni2-Cs in FIG. 9A-FIG. 9B) before chain termination. Because the various nickel species have different $v_{growth}$ and $v_{term}$ rates, the molecular weights of the polymer products are determined by the different contributions of the relevant actives species during catalysis. Importantly, we have unexpectedly shown that cation-based dynamic switching is fast enough to impact the microstructure of polymers obtained from non-living polymerization reactions, which has not yet been demonstrated using other switching modalities (e.g., using photo, redox, or thermal triggers).

The work described herein as provided in various embodiments of the invention bridges the gap between living and non-living polymerization reactions by enabling the generation of many polymers per catalyst while allowing for chain growth control. As described herein, using the same catalyst, we can access a wide range of polymers with different molecular weights and molecular weight distributions, which may be useful for studying structure-function relationships or developing new polymer applications. For example, dynamic switching may be used to access block copolymers from a pool of different polar olefins and for investigating the cation exchange behavior of our nickel complexes with higher valent metal ions (e.g., $M^{2+}$, $M^{3+}$, etc.). Additionally, dynamic switching may be applied to other polymerization processes, such as $CO_2$ and epoxide copolymerization, or even small-molecule synthesis. Furthermore, dynamic switching may be used to promote different steps in cascade processes. The significance of the work described herein is that it provides a new strategy to increase the control and complexity of catalytic reactions.

VARIOUS EMBODIMENTS OF THE INVENTION

Catalysts of Formula (1), Formula (2), Formula (1-A), Formula (2-A), Formula (1-B), Formula (2-B).

In various embodiments, the present invention provides a catalyst having a structure selected from Formula (1) and Formula (2):

Formula (1)

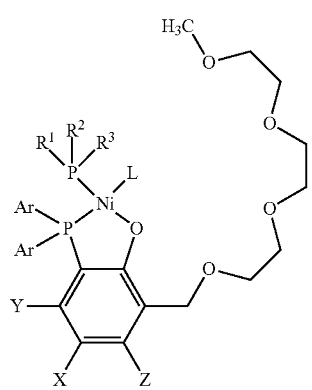

, and

-continued

Formula (2)

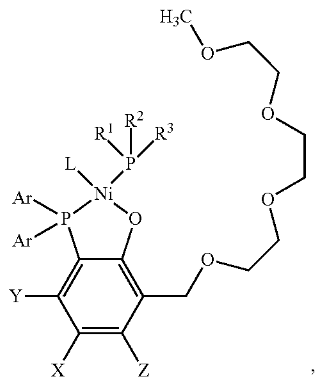

wherein in Formula (1) and Formula (2):

Ar is 2,6-dimethoxyphenyl;

L is an optionally substituted phenyl group;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a catalyst having a structure of Formula (1):

Formula (1)

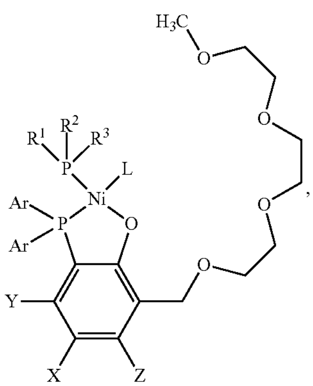

wherein,

Ar is 2,6-dimethoxyphenyl;

L is an optionally substituted phenyl group;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a catalyst having a structure of Formula (2):

Formula (2)

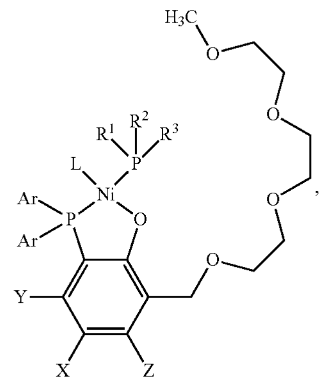

wherein,

Ar is 2,6-dimethoxyphenyl;

L is an optionally substituted phenyl group;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a catalyst having a structure selected from Formula (1-A) and Formula (2-A):

Formula (1-A)

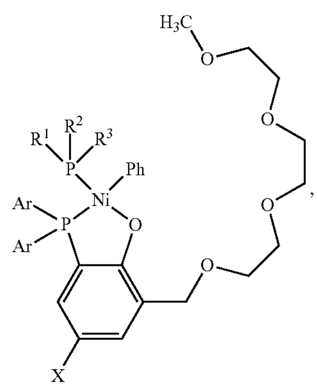

and

Formula (2-A)

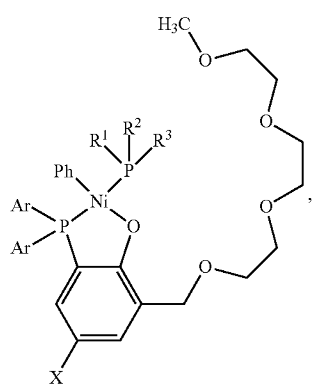

wherein in Formula (1-A) and Formula (2-A):

Ar is 2,6-dimethoxyphenyl;

Ph is a phenyl group;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a catalyst having a structure of Formula (1-A):

Formula (1-A)

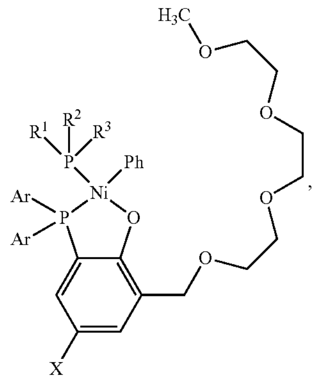

wherein,

Ar is 2,6-dimethoxyphenyl;

Ph is a phenyl group;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a catalyst having a structure of Formula (2-A):

Formula (2-A)

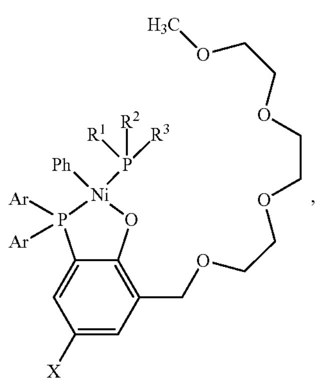

wherein,

Ar is 2,6-dimethoxyphenyl;

Ph is a phenyl group;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a catalyst having a structure selected from Formula (1-B) and Formula (2-B):

Formula (1-B)

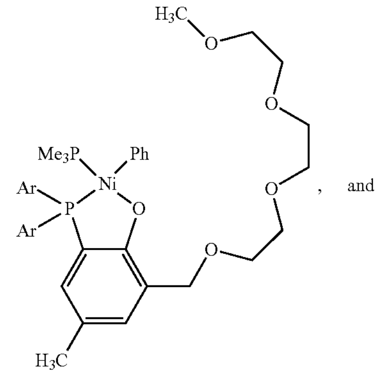

Formula (2-B)

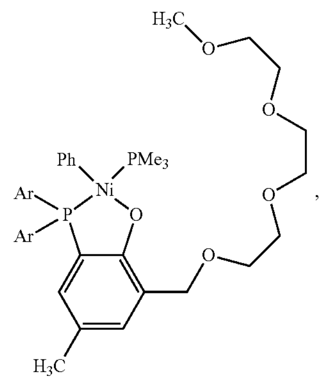

wherein in Formula (1-B) and Formula (2-B):

Ar is 2,6-dimethoxyphenyl;

Ph is a phenyl group; and $PMe_3$ is trimethylphosphine.

In various embodiments, the present invention provides a catalyst having a structure of Formula (1-B):

Formula (1-B)

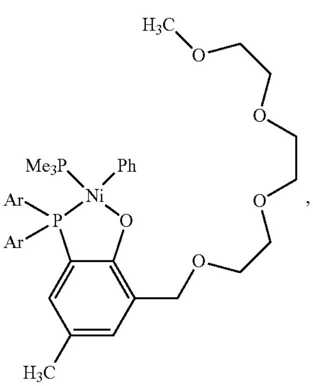

wherein,

Ar is 2,6-dimethoxyphenyl;

Ph is a phenyl group; and $PMe_3$ is trimethylphosphine.

In various embodiments, the present invention provides a catalyst having a structure of Formula (2-B):

Formula (2-B)

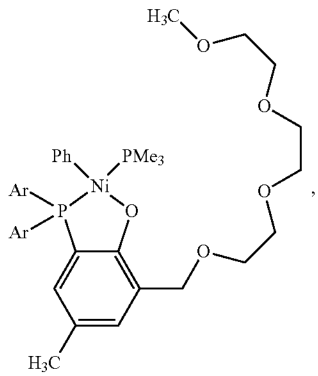

wherein,

Ar is 2,6-dimethoxyphenyl;

Ph is a phenyl group; and $PMe_3$ is trimethylphosphine.

In some embodiments, the catalyst of Formula (1-A) is a catalyst of Formula (1). In some embodiments, the catalyst of Formula (1-B) is a catalyst of Formula (1). In some embodiments, the catalyst of Formula (2-A) is a catalyst of Formula (2). In some embodiments, the catalyst of Formula (2-B) is a catalyst of Formula (2).

In some embodiments, the electron donating group is selected from the group consisting of: alkoxy, amino, hydroxy, and alkyl, and cycloalkyl. In some embodiments, the electron donating group is selected from the group consisting of: alkoxy, phenoxy, amino, alkylamino, dialkylamino, hydroxy, alkyl, and cycloalkyl. In some embodiments, alkyl is selected from the group consisting of: $—CH_3$, $—CH_2CH_3$, $—CH_2CH_2CH_3$, and $—CH(CH_3)_2$. In some embodiments, the electron withdrawing group is selected from the group consisting of: $NO_2$, —CN, —C(O)-alkyl, and halo. In some embodiments, the electron withdrawing group is selected from the group consisting of: $NO_2$, —CN, —C(O)-alkyl, C(O)Oalkyl, C(O)Nalkyl, $—SO_3H$, $—SO_2R$, $—PO_3H$, $—PO_3R$, $—CF_3$, and halo. In some embodiments, the electron withdrawing group is selected from the group consisting of: $NO_2$, —CN, —C(O)-alkyl, C(O)Oalkyl, C(O)Nalkyl, $—SO_3H$, $—SO_2$alkyl, $—PO_3H$, $—PO_3$alkyl, $—CF_3$, and halo.

In some embodiments, the phenyl group is

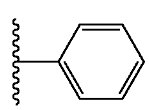

In some embodiments, L is an optionally substituted phenyl group. In some embodiments, the optionally substituted phenyl group is selected from the group consisting of phenyl, 2-methoxyphenyl, 4-methoxyphenyl, 2-acetylphenyl, or 2-(N-acetylamino)phenyl). In some embodiments, L is a phenyl group.

In some embodiments, $R^1$, $R^2$, and $R^3$ are each independently selected from optionally substituted aryl, optionally substituted alkyl, and optionally substituted cycloalkyl. In some embodiments, optionally substituted aryl is selected from the group consisting of phenyl, pentafluorophenyl, 2-methoxyphenyl, 2-methylphenyl, and 4-trifluoromethylphenyl. In some embodiments, optionally substituted alkyl is selected from the group consisting of methyl, ethyl, propyl, isopropyl, or tert-butyl. In some embodiments, optionally substituted cycloalkyl is cyclohexyl or adamantyl.

Methods for Catalyzing Homopolymerization of an Optionally Substituted Olefin

In various embodiments, the present invention provides a method for catalyzing homopolymerization of an optionally substituted olefin, comprising: combining or contacting an optionally substituted olefin with the catalyst of Formula (1), Formula (2), Formula (1-A), Formula (2-A), Formula (1-B), or Formula (2-B), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with the catalyst of Formula (1), or Formula (2), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with the catalyst of Formula (1-A), or Formula (2-A), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with the catalyst of Formula (1-B), or Formula (2-B), or combinations thereof, whereby the optionally substituted olefin undergoes homopolymerization.

In some embodiments, the step of combining or contacting the optionally substituted olefin with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for catalyzing homopolymerization of an optionally substituted olefin further comprises combining or contacting at least one activator with the catalyst and the optionally substituted olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by the method for catalyzing homopolymerization of an optionally substituted olefin as provided herein. In various embodiments, the present invention provides a homopolymer formed by the method for catalyzing homopolymerization of an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the polymer is a homopolymer. In some embodiments, the homopolymer is monomodal or bimodal. In some embodiments, the homopolymer is monomodal. In some embodiments, the homopolymer is bimodal. In some embodiments, the homopolymer is monomodal, or bimodal, or combination thereof.

Methods for Polymerizing an Optionally Substituted Olefin

In various embodiments, the present invention provides a method for polymerizing an optionally substituted olefin, the method comprising contacting an optionally substituted olefin with the catalyst of Formula (1), Formula (2), Formula (1-A), Formula (2-A), Formula (1-B), or Formula (2-B), or combinations thereof, and at least one activator under conditions effective to polymerize the optionally substituted olefin.

In various embodiments, the present invention provides a method for polymerizing an optionally substituted olefin, the method comprising contacting an optionally substituted olefin with the catalyst of Formula (1), or Formula (2), or combinations thereof, and at least one activator under conditions effective to polymerize the optionally substituted olefin.

In various embodiments, the present invention provides a method for polymerizing an optionally substituted olefin, the method comprising contacting an optionally substituted olefin with the catalyst of Formula (1-A), or Formula (2-A), or combinations thereof, and at least one activator under conditions effective to polymerize the optionally substituted olefin.

In various embodiments, the present invention provides a method for polymerizing an optionally substituted olefin, the method comprising contacting an optionally substituted olefin with the catalyst of Formula (1-B), or Formula (2-B), or combinations thereof, and at least one activator under conditions effective to polymerize the optionally substituted olefin.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the optionally substituted olefin with the catalyst and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from tetrahydrofuran, diethyl ether, dichloromethane, chloroform, N,N-dimethylforamide, dimethylsulfoxide, ethyl acetate, acetone, and water, and any combinations thereof.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by the method for polymerizing an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof.

Methods for Catalyzing Copolymerization of a First Olefin and at Least One Other Olefin In various embodiments, the present invention provides method for catalyzing copolymerization of a first olefin and at least one other olefin, comprising: combining or contacting a first olefin and at least one other olefin with the catalyst of Formula (1), Formula (2), Formula (1-A), Formula (2-A), Formula (1-B), or Formula (2-B), or combinations thereof, whereby the first olefin and the at least one other olefin undergoes copolymerization, and wherein the first olefin and the at least one other olefin are different from one another.

In various embodiments, the present invention provides method for catalyzing copolymerization of a first olefin and at least one other olefin, comprising: combining or contacting a first olefin and at least one other olefin with the catalyst of Formula (1), or Formula (2), or combinations thereof, whereby the first olefin and the at least one other olefin undergoes copolymerization, and wherein the first olefin and the at least one other olefin are different from one another.

In various embodiments, the present invention provides method for catalyzing copolymerization of a first olefin and at least one other olefin, comprising: combining or contacting a first olefin and at least one other olefin with the catalyst of Formula (1-A), or Formula (2-A), or combinations thereof, whereby the first olefin and the at least one other olefin undergoes copolymerization, and wherein the first olefin and the at least one other olefin are different from one another.

In various embodiments, the present invention provides method for catalyzing copolymerization of a first olefin and at least one other olefin, comprising: combining or contacting a first olefin and at least one other olefin with the catalyst of Formula (1-B), or Formula (2-B), or combinations thereof, whereby the first olefin and the at least one other olefin undergoes copolymerization, and wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another. In some embodiments, the step of combining or contacting the first olefin and the at least one other olefine with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the first olefin is selected from the group consisting of ethylene, propene, and styrene. In some embodiments the at least one other olefin is selected from the group consisting of 1-hexene, 1-octene, allyl benzene, acrylamide, acrylic acid, acrylic ester, vinyl halide, vinyl alcohol, and allyl alcohol. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for catalyzing copolymerization of a first olefin and at least one other olefin further comprises combining or contacting at least one activator with the catalyst, the first olefin, and the at least one other olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first olefin is ethylene.

In various embodiments, the present invention provides a copolymer formed by the method for catalyzing copolymerization of a first olefin and at least one other olefin.

In various embodiments, the present invention provides a polymer formed by the method for catalyzing copolymerization of a first olefin and at least one other olefin. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Methods for Copolymerizing a First Olefin and at Least One Other Olefin

In various embodiments, the present invention provides a method for copolymerizing a first olefin and at least one other olefin, the method comprising contacting the first olefin and the at least one other olefin with the catalyst of Formula (1), Formula (2), Formula (1-A), Formula (2-A), Formula (1-B), or Formula (2-B), or combinations thereof; and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the catalyst of Formula (1), or Formula (2), or combinations thereof; and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the catalyst of Formula (1-A), or Formula (2-A), or combinations thereof, and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the catalyst of Formula (1-B), or Formula (2-B), or combinations thereof; and at least one activator under conditions effective to copolymerize the first olefin and the at least one other olefin, wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the first olefin and the at least one other olefin with the catalyst and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first olefin is ethylene.

In various embodiments, the present invention provides a copolymer formed by the method for copolymerizing a first olefin and at least one other olefin as provided herein. In various embodiments, the present invention provides a polymer formed by the method for copolymerizing a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method for Making a Compound

In various embodiments, the present invention provides a method for making a compound, the method comprising contacting a reactant with a catalyst of Formula (1), Formula (2), Formula (1-A), Formula (2-A), Formula (1-B), or Formula (2-B), or combinations thereof, under conditions effective to make the compound. In some embodiments the reactant is methylaluminoxane, trialkylaluminium, alkyllithium, alkyl magnesium halide, or dialklylzinc.

In some embodiments, the step of contacting the reactant with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for making a compound further comprises contacting at least one activator with the catalyst and the reactant. In some embodiments, at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method.

Method for Making a Compound

In various embodiments, the present invention provides a method for making a compound, the method comprising contacting a first reactant and at least one other reactant with a catalyst of Formula (1), Formula (2), Formula (1-A), Formula (2-A), Formula (1-B), or Formula (2-B), or combinations thereof, under conditions effective to make the compound.

In some embodiments, the step of contacting the first reactant and the at least one other reactant with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, a method for making a compound further comprises contacting at least one activator with the catalyst, the first reactant, and the at least one other reactant. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method is a cascade method. In some embodiments, the first reactant and the at least one other reactant are different from one another.

Method of Making a Polymer

In various embodiments, the present invention provides a method of making a polymer, comprising contacting a monomer with a catalyst of Formula (1), Formula (2), Formula (1-A), Formula (2-A), Formula (1-B), or Formula (2-B), or combinations thereof.

In some embodiments, the monomer is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the step of contacting the monomer with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, method of making a polymer further comprises contacting at least one activator with the catalyst and the monomer. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the monomer is an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the monomer is an optionally substituted terminal olefin or an optionally substituted internal olefin. In some embodiments, the monomer is selected from the group consisting of ethylene, an optionally substituted terminal olefin, and an optionally substituted internal olefin. In some embodiments, the monomer is ethylene.

In various embodiments, the present invention provides a polymer made by the method of making a polymer as provided herein. In some embodiments, the polymer is bimodal or monomodal. In some embodiments, the polymer is bimodal. In some embodiments, the polymer is monomodal. In some embodiments, the polymer is monomodal, or bimodal, or combination thereof.

Method of Making a Copolymer

In various embodiments, the present invention provides a method of making a copolymer, comprising contacting a first monomer and at least one other monomer with a catalyst of Formula (1), Formula (2), Formula (1-A), Formula (2-A), Formula (1-B), or Formula (2-B), or combinations thereof, wherein the first monomer and the at least one other monomer are different from one another.

In some embodiments, the first monomer and the at least one other monomer are different from one another. In some embodiments, the at least one other monomer is at least one second monomer. In some embodiments, the first monomer and the at least one second monomer are different from one another. In some embodiments, the step of contacting the first monomer and the at least one other monomer with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method of making a copolymer further comprises contacting at least one activator with the catalyst, the first monomer, and the at least one other monomer. In some embodiments, the first monomer is ethylene, propene, 1-butene, 1-hexene, 1-octene, styrene, or allyl bezene. In some embodiments, the at least one other monomer is acrylamide, acrylic acid, acrylic ester, vinyl halide, vinyl alcohol, or allyl alcohol).

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first monomer and the at least one other monomer are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first monomer and the at least one other monomer are each independently an optionally substituted terminal olefin or an optionally substituted internal olefin. In some embodiments, the first monomer and the at least one other monomer are each independently ethylene, an optionally substituted terminal olefin, or an optionally substituted internal olefin. In some embodiments, the optionally substituted terminal olefin is selected from the group consisting of propene, butene, 1-hexene, 1-heptene, I-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first monomer is ethylene.

In various embodiments, the present invention provides a copolymer made by a method of making a copolymer as provided herein. In various embodiments, the present invention provides a polymer made by a method of making a copolymer as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof. In some embodiments, the first monomer is $CO_2$; and the at least one other monomer is an epoxide.

Heterobimetallic Catalysts of Formula (3), Formula (4), Formula (3-A), Formula (4-A), Formula (3-B), or Formula (4-B).

In various embodiments, the present invention provides a heterobimetallic catalyst having a structure selected from Formula (3) and Formula (4):

Formula (3)

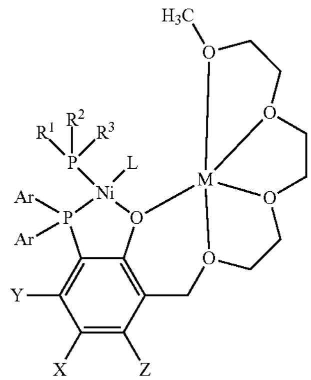

, and

Formula (4)

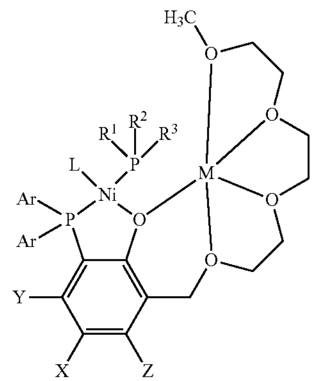

, wherein in Formula (3) and Formula (4):
- Ar is 2,6-dimethoxyphenyl;
- L is an optionally substituted phenyl group;
- M is Li, Na, K, or Cs;
- X, Y, and Z are each independently selected from hydrogen, an electron donating group, and an electron withdrawing group; and
- $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure of Formula (3):

Formula (3)

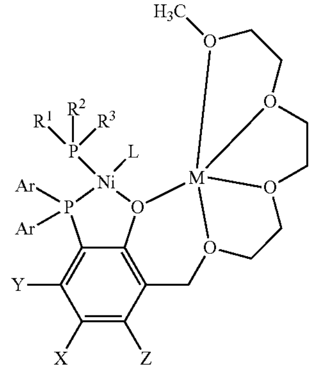

, wherein,

Ar is 2,6-dimethoxyphenyl;

L is an optionally substituted phenyl group;

M is Li, Na, K, or Cs;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure of Formula (4):

Formula (4)

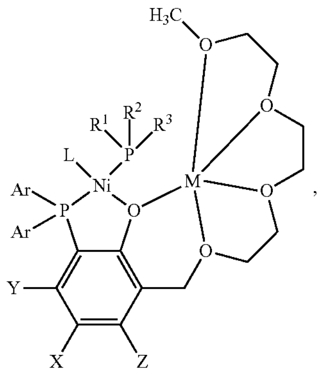

wherein,

Ar is 2,6-dimethoxyphenyl;

L is an optionally substituted phenyl group;

M is Li, Na, K, or Cs;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure selected from Formula (3-A) and Formula (4-A):

Formula (3-A)

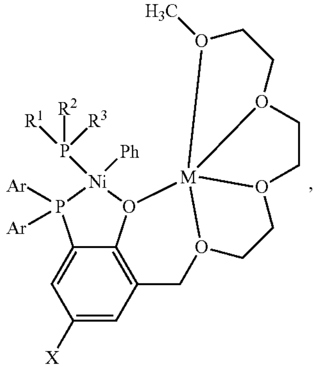

and

-continued

Formula (4-A)

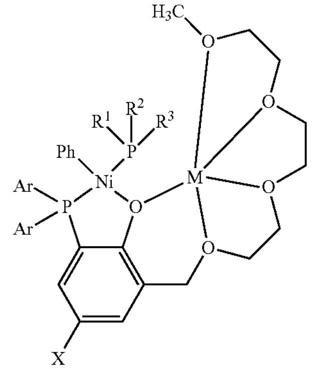

wherein in Formula (3-A) and Formula (4-A):

Ar is 2,6-dimethoxyphenyl;

Ph is a phenyl group;

M is Li, Na, K, or Cs;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure of Formula (3-A):

Formula (3-A)

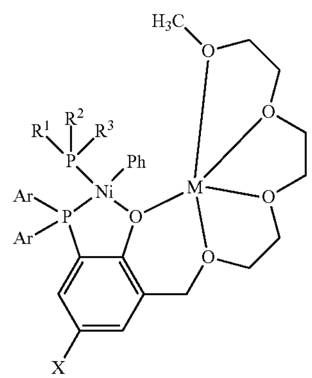

wherein,

Ar is 2,6-dimethoxyphenyl;

Ph is a phenyl group;

M is Li, Na, K, or Cs; X is hydrogen, an electron donating group, or an electron withdrawing group; and $R^1$, $R^2$, and R; are each independently selected from optionally substituted aryl, optionally substituted alkyl, and optionally substituted cycloalkyl.

In various embodiments, the present invention provides a heterobimetallic catalyst having a structure of Formula (4-A):

Formula (4-A)

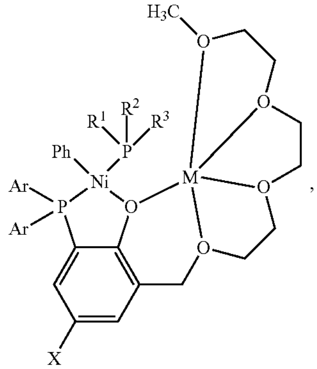

wherein,

Ar is 2,6-dimethoxyphenyl;

Ph is a phenyl group;

M is Li, Na, K, or Cs;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure selected from Formula (3-B) and Formula (4-B);

Formula (3-B)

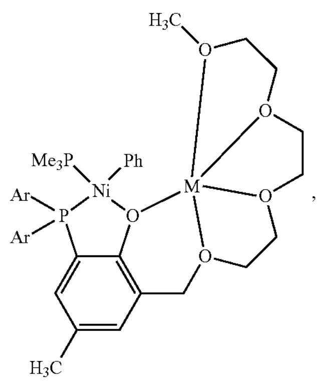

and

Formula (4-B)

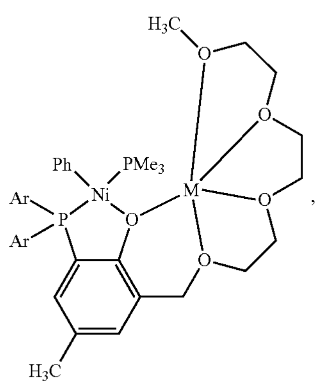

wherein in Formula (3-B) and Formula (4-B):

Ar is 2,6-dimethoxyphenyl;

Ph is a phenyl group;

M is Li, Na, K, or Cs; and $PMe_3$ is trimethylphosphine.

In various embodiments, the present invention provides a heterobimetallic catalyst having a structure of Formula (3-B):

Formula (3-B)

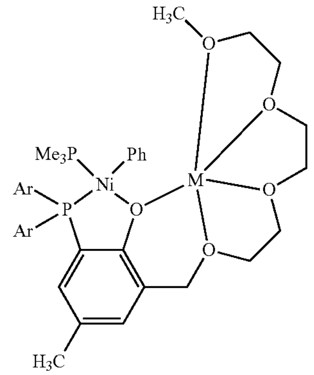

wherein,

Ar is 2,6-dimethoxyphenyl;

Ph is a phenyl group;

M is Li, Na, K, or Cs; and $PMe_3$ is trimethylphosphine.

In various embodiments, the present invention provides a heterobimetallic catalyst having a structure of Formula (4-B):

Formula (4-B)

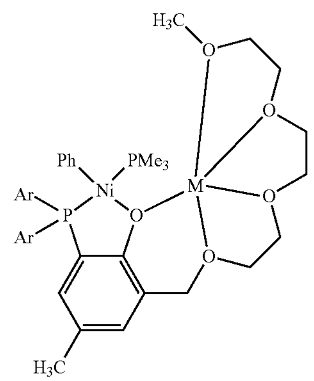

wherein,

Ar is 2,6-dimethoxyphenyl;

Ph is a phenyl group;

M is Li, Na, K, or Cs; and $PMe_3$ is trimethylphosphine.

In some embodiments, the heterobimetallic catalyst of Formula (3-A) is a heterobimetallic catalyst of Formula (3). In some embodiments, the heterobimetallic catalyst of Formula (3-B) is a heterobimetallic catalyst of Formula (3). In some embodiments, the heterobimetallic catalyst of Formula (4-A) is a heterobimetallic catalyst of Formula (4). In some embodiments, the heterobimetallic catalyst of Formula (4-B) is a heterobimetallic catalyst of Formula (4).

In some embodiments M is Li, Na, K, or Cs. In some embodiments, M is Li. In some embodiments, M is Na. In some embodiments, M is K. In some embodiments, M is Cs.

In some embodiments, the electron donating group is selected from the group consisting of: alkoxy, amino, hydroxy, and alkyl. In some embodiments, the electron donating group is selected from the group consisting of: alkoxy, phenoxy, amino, alkylamino, dialkylamino, hydroxy, alkyl, and cycloalkyl. In some embodiments, alkyl is selected from the group consisting of: —$CH_3$, —$CH_2CH_3$, —$CH_2CH_2CH_3$, and —$CH(CH_3)_2$. In some embodiments, the electron withdrawing group is selected from the group consisting of: $NO_2$, —CN, —C(O)-alkyl, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2R$, —$PO_3H$, —$PO_3R$, —$CF_3$, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2$alkyl, —$PO_3H$, —$PO_3$alkyl, —$CF_3$, and halo.

In some embodiments, the phenyl group is

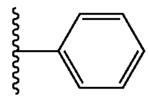

.

In some embodiments, L is an optionally substituted phenyl group. In some embodiments, the optionally substituted phenyl group is selected from the group consisting of phenyl, 2-methoxyphenyl, 4-methoxyphenyl, 2-acetylphenyl, or 2-(N-acetylamino)phenyl). In some embodiments, L is a phenyl group.

In some embodiments, $R^1$, $R^2$, and $R^3$ are each independently selected from optionally substituted aryl, optionally substituted alkyl, and optionally substituted cycloalkyl. In some embodiments, optionally substituted aryl is selected from the group consisting of phenyl, pentafluorophenyl, 2-methoxyphenyl, 2-methylphenyl, and 4-trifluoromethylphenyl. In some embodiments, optionally substituted alkyl is selected from the group consisting of methyl, ethyl, propyl, isopropyl, or tert-butyl. In some embodiments, optionally substituted cycloalkyl is cyclohexyl or adamantyl.

Methods for Catalyzing Homopolymerization of an Optionally Substituted Olefin

In various embodiments, the present invention provides a method for catalyzing homopolymerization of an optionally substituted olefin, comprising: combining or contacting an optionally substituted olefin with a heterobimetallic catalyst of Formula (3), Formula (4), Formula (3-A), Formula (4-A), Formula (3-B), or Formula (4-B), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with a heterobimetallic catalyst of Formula (3), or Formula (4), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with a heterobimetallic catalyst of Formula (3-A), or Formula (4-A), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with a heterobimetallic catalyst of Formula (3-B), or Formula (4-B), or combinations thereof, whereby the optionally substituted olefin undergoes homopolymerization.

In some embodiments, the step of combining or contacting the optionally substituted olefin with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for catalyzing homopolymerization of an optionally substituted olefin further comprises combining or contacting at least one activator with the heterobimetallic catalyst and the optionally substituted olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by the method for catalyzing homopolymerization of an optionally substituted olefin as provided herein. In various embodiments, the present invention provides a homopolymer formed by the method for catalyzing homopolymerization of an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the polymer is a homopolymer. In some embodiments, the homopolymer is monomodal or bimodal. In some embodiments, the homopolymer is monomodal. In some embodiments, the homopolymer is bimodal. In some embodiments, the homopolymer is monomodal, or bimodal, or combination thereof.

Methods for Polymerizing an Optionally Substituted Olefin

In various embodiments, the present invention provides method for polymerizing an optionally substituted olefin, the method comprising contacting an optionally substituted olefin with a heterobimetallic catalyst of Formula (3), Formula (4), Formula (3-A), Formula (4-A), Formula (3-B), or Formula (4-B), or combinations thereof; and at least one activator under conditions effective to polymerize the optionally substituted olefin.

In various embodiments, the present invention provides method for polymerizing an optionally substituted olefin, the method comprising contacting an optionally substituted olefin with a heterobimetallic catalyst of Formula (3), or Formula (4), or combinations thereof; and at least one activator under conditions effective to polymerize the optionally substituted olefin.

In various embodiments, the present invention provides method for polymerizing an optionally substituted olefin, the method comprising contacting an optionally substituted olefin with a heterobimetallic catalyst of Formula (3-A), or Formula (4-A), or combinations thereof; and at least one activator under conditions effective to polymerize the optionally substituted olefin.

In various embodiments, the present invention provides method for polymerizing an optionally substituted olefin, the method comprising contacting an optionally substituted olefin with a heterobimetallic catalyst of Formula (3-B), or Formula (4-B), or combinations thereof; and at least one activator under conditions effective to polymerize the optionally substituted olefin.

In some embodiments, the at least one activator is $Ni(COD)_2$ is triarylborane. In some embodiments, the at least one activator is selected from the group consisting of $Ni(COD)_2$, triarylborane, methylaluminoxane, and trialkylaluminum.

In some embodiments, the step of contacting the optionally substituted olefin with the heterobimetallic catalyst and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from tetrahydrofuran, diethyl ether, dichloromethane, chloroform, N,N-dimethylforamide, dimethylsulfoxide, ethyl acetate, acetone, and water, and any combinations thereof.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by the method for polymerizing an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof.

Methods for Catalyzing Copolymerization of a First Olefin and at Least One Other Olefin In various embodiments, the present invention provides a method for catalyzing copolymerization of a first olefin and at least one other olefin, comprising: combining or contacting a first olefin and at least one other olefin with a heterobimetallic catalyst of Formula (3), Formula (4), Formula (3-A), Formula (4-A), Formula (3-B), or Formula (4-B), or combinations thereof, whereby the first olefin and the at least one other olefin undergoes copolymerization, and wherein the first olefin and the at least one other olefin are different from one another.

In various embodiments, the present invention provides a method for catalyzing copolymerization of a first olefin and at least one other olefin, comprising: combining or contacting a first olefin and at least one other olefin with a heterobimetallic catalyst of Formula (3), or Formula (4), or combinations thereof, whereby the first olefin and the at least one other olefin undergoes copolymerization, and wherein the first olefin and the at least one other olefin are different from one another.

In various embodiments, the present invention provides a method for catalyzing copolymerization of a first olefin and at least one other olefin, comprising: combining or contacting a first olefin and at least one other olefin with a heterobimetallic catalyst of Formula (3-A), or Formula (4-A), or combinations thereof, whereby the first olefin and the at least one other olefin undergoes copolymerization, and wherein the first olefin and the at least one other olefin are different from one another.

In various embodiments, the present invention provides a method for catalyzing copolymerization of a first olefin and at least one other olefin, comprising: combining or contacting a first olefin and at least one other olefin with a heterobimetallic catalyst of Formula (3-B), or Formula (4-B), or combinations thereof, whereby the first olefin and the at least one other olefin undergoes copolymerization, and wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the step of combining or contacting the first olefin and the at least one other olefin with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the first olefin is selected from the group consisting of ethylene, propene, and styrene. In some embodiments the at least one other olefin is selected from the group consisting of 1-hexene, 1-octene, allyl benzene, acrylamide, acrylic acid, acrylic ester, vinyl halide, vinyl alcohol, and allyl alcohol. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for catalyzing copolymerization of a first olefin and at least one other olefin further comprises combining or contacting at least one activator with the heterobimetallic catalyst, the first olefin, and the at least one other olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first olefin is ethylene.

In various embodiments, the present invention provides a polymer formed by the method for catalyzing copolymerization of a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Methods for Copolymerizing a First Olefin and at Least One Other Olefin

In various embodiments, the present invention provides a method for copolymerizing a first olefin and at least one other olefin, the method comprising contacting the first olefin and the at least one other olefin with the heterobimetallic catalyst of Formula (3), Formula (4), Formula (3-A), Formula (4-A), Formula (3-B), or Formula (4-B), or combinations thereof; and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the heterobimetallic catalyst of Formula (3), or Formula (4), or combinations thereof; and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the heterobimetallic catalyst of Formula (3-A), or Formula (4-A), or combinations thereof; and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the heterobimetallic catalyst of Formula (3-B), or Formula (4-B), or combinations thereof; and at least one activator under conditions effective to copolymerize the first olefin and the at least one other olefin, wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the first olefin and the at least one other olefin with the heterobimetallic catalyst and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the first olefin and the at least one other olefin are each independently an optionally substituted olefin. In some embodiments, the optionally substituted olefin is selected from the group consisting of ethylene, propene, butene, I-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the first olefin is ethylene.

In various embodiments, the present invention provides a polymer formed by the method for copolymerizing a first olefin and at least one other olefin as provided herein. In various embodiments, the present invention provides a polymer formed by the method for copolymerizing a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method of Making a Compound

In various embodiments, the present invention provides a method for making a compound, the method comprising contacting a reactant with a catalyst of Formula (3), Formula (4), Formula (3-A), Formula (4-A), Formula (3-B), or Formula (4-B), or combinations thereof, under conditions effective to make the compound.

In some embodiments the reactant is methylaluminoxane, trialkylaluminium, alkyllithium, alkyl magnesium halide, or dialklylzinc.

In some embodiments, the step of contacting the reactant with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for making a compound further comprises contacting at least one activator with the catalyst and the reactant. In some embodiments, at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method.

Method for Making a Compound

In various embodiments, the present invention provides a method for making a compound, the method comprising contacting a first reactant and at least one other reactant with a heterobimetallic catalyst of Formula (3), Formula (4), Formula (3-A), Formula (4-A), Formula (3-B), or Formula (4-B), or combinations thereof under conditions effective to make the compound.

In some embodiments, the step of contacting the first reactant and the at least one other reactant with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, method for making a compound further comprises contacting at least one activator with the catalyst, the first reactant, and the at least one other reactant. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method. In some embodiments, the first reactant and the at least one other reactant are different from one another.

Methods of Making a Polymer

In various embodiments, the present invention provides method of making a polymer, comprising contacting a monomer with the heterobimetallic catalyst of Formula (3), Formula (4), Formula (3-A), Formula (4-A), Formula (3-B), or Formula (4-B), or combinations thereof.

In various embodiments, the present invention provides method of making a polymer, comprising contacting a monomer with the heterobimetallic catalyst of Formula (3), or Formula (4), or combinations thereof.

In various embodiments, the present invention provides method of making a polymer, comprising contacting a monomer with the heterobimetallic catalyst of Formula (3-A), or Formula (4-A), or combinations thereof.

In various embodiments, the present invention provides method of making a polymer, comprising contacting a monomer with the heterobimetallic catalyst of Formula (3-B), or Formula (4-B), or combinations thereof.

In some embodiments, the monomer is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the step of contacting the monomer with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method of making a polymer further comprises contacting at least one activator with the heterobimetallic catalyst and the monomer. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the monomer is an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the monomer is an optionally substituted terminal olefin or an optionally substituted internal olefin. In some embodiments, the monomer is selected from the group consisting of ethylene, an optionally substituted terminal olefin, and an optionally substituted internal olefin. In some embodiments, the monomer is ethylene.

In some embodiments, the polymer is bimodal or monomodal. In some embodiments, the polymer is bimodal. In some embodiments, the polymer is monomodal. In some embodiments, the polymer is monomodal, or bimodal, or combination thereof. In various embodiments, the present invention provides a polymer made by the method of making a polymer as provided herein. In some embodiments, the polymer is monomodal or bimodal. In some embodiments, the polymer is monomodal. In some embodiments, the polymer is bimodal. In some embodiments, the polymer is monomodal, bimodal, or combination thereof.

Methods of Making a Copolymer

In various embodiments, the present invention provides a method of making a copolymer, comprising contacting a first monomer and at least one other monomer with a heterobimetallic catalyst of Formula (3), Formula (4), Formula (3-A), Formula (4-A), Formula (3-B), or Formula (4-B), or combinations thereof, wherein the first monomer and the at least one other monomer are different from one another.

In various embodiments, the present invention provides a method of making a copolymer, comprising contacting a first monomer and at least one other monomer with a heterobimetallic catalyst of Formula (3), or Formula (4), or combinations thereof, wherein the first monomer and the at least one other monomer are different from one another.

In various embodiments, the present invention provides a method of making a copolymer, comprising contacting a first monomer and at least one other monomer with a heterobimetallic catalyst of Formula (3-A), or Formula (4-A), or combinations thereof, wherein the first monomer and the at least one other monomer are different from one another.

In various embodiments, the present invention provides a method of making a copolymer, comprising contacting a first monomer and at least one other monomer with a heterobimetallic catalyst of Formula (3-B), or Formula (4-B), or combinations thereof, wherein the first monomer and the at least one other monomer are different from one another.

In some embodiments, the first monomer and the at least one other monomer are different from one another. In some embodiments, the at least one other monomer is at least one second monomer. In some embodiments, the first monomer and the at least one second monomer are different from one another.

In some embodiments, the step of contacting the first monomer and the at least one other monomer with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method of making a copolymer further comprises contacting at least one activator with the heterobimetallic catalyst, the first monomer, and the at least one other monomer. In some embodiments, the first monomer is ethylene, propene, 1-butene, 1-hexene, 1-octene, styrene, or allyl bezene. In some embodiments, the at least one other monomer is acrylamide, acrylic acid, acrylic ester, vinyl halide, vinyl alcohol, or allyl alcohol).

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first monomer and the at least one other monomer are each independently an optionally substituted olefin. In some embodiments, the optionally substituted olefin is selected from the group consisting of ethylene, propene, butene, I-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first monomer and the at least one other monomer are each independently an optionally substituted terminal olefin or an optionally substituted internal olefin. In some embodiments, the first monomer and the at least one other monomer are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first monomer is ethylene.

In various embodiments, the present invention provides a polymer formed by the method for catalyzing copolymerization of a first monomer and at least one other monomer. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer.

In various embodiments, the present invention provides a copolymer made by a method of making a copolymer as provided herein. In various embodiments, the present invention provides a polymer made by a method of making a copolymer as provided herein. In some embodiments, the polymer is a copolymer. In some embodiments, the copolymer is selected from the group consisting of a random copolymer, block copolymer, and gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, bimodal, or combination thereof. In some embodiments, the first monomer is $CO_2$; and the at least one other monomer is an epoxide.

Bimetallic Catalyst Complexes of Formula (5), Formula (6), Formula (5-A). Formula (6-A), Formula (5-B), or Formula (6-B).

In various embodiments, the present invention provides a bimetallic catalyst complex having a structure selected from Formula (5) and Formula (6):

Formula (5)

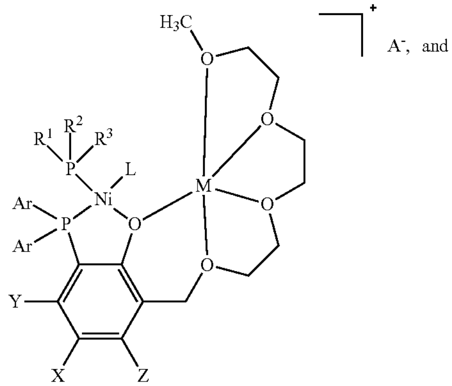

Formula (6)

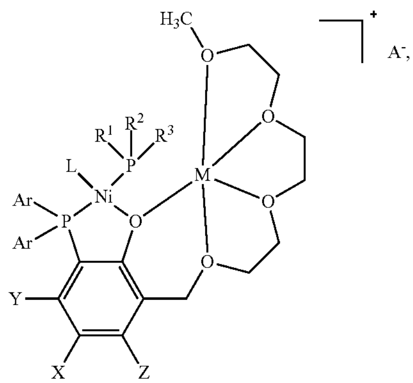

wherein in Formula (5) and Formula (6):

Ar is 2,6-dimethoxyphenyl;

L is an optionally substituted phenyl group;

M is Li, Na, K, or Cs;

$A^-$ is a weakly coordinating anion;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure of Formula (5):

Formula (5)

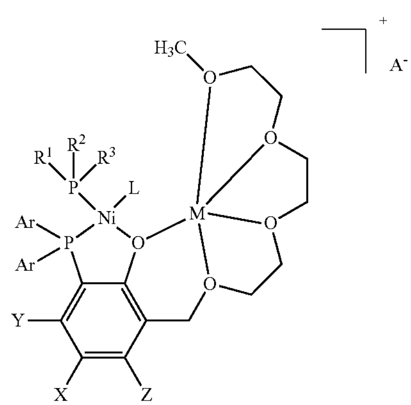

wherein,

Ar is 2,6-dimethoxyphenyl;

L is an optionally substituted phenyl group;

M is Li, Na, K, or Cs;

K is a weakly coordinating anion;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure of Formula (6):

Formula (6)

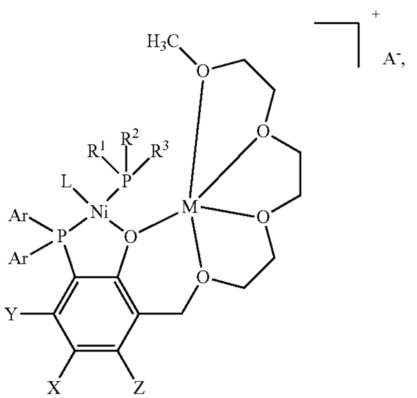

wherein,

Ar is 2,6-dimethoxyphenyl;

L is an optionally substituted phenyl group;

M is Li, Na, K, or Cs;

$A^-$ is a weakly coordinating anion;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure selected from Formula (5-A) and Formula (6-A):

Formula (5-A)

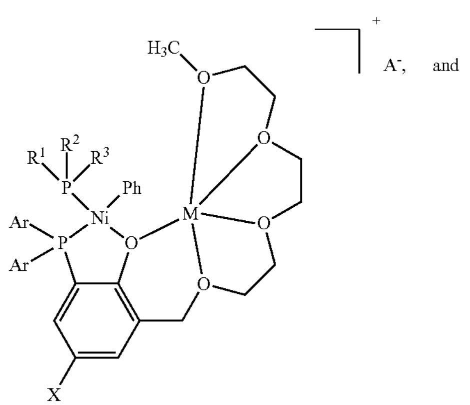

-continued

Formula (6-A)

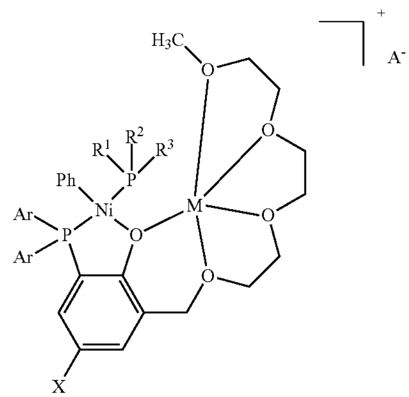

wherein Formula (5-A) and Formula (6-A):

Ar is 2,6-dimethoxyphenyl;

Ph is a phenyl group;

M is Li, Na, K, or Cs;

$A^-$ is a weakly coordinating anion;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure of Formula (5-A):

Formula (5-A)

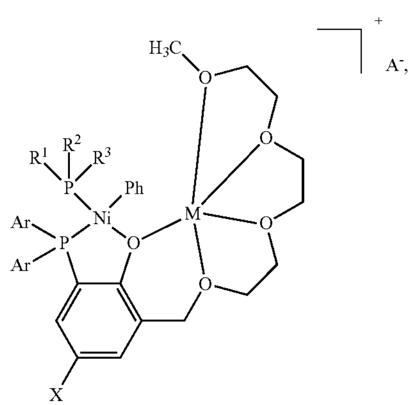

wherein,

Ar is 2,6-dimethoxyphenyl;

Ph is a phenyl group;

M is Li, Na, K, or Cs;

$A^-$ is a weakly coordinating anion;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure of Formula (6-A):

Formula (6-A)

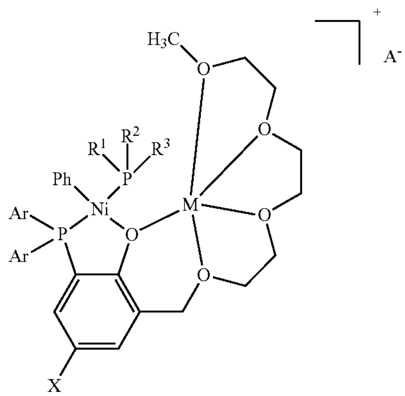

wherein,

Ar is 2,6-dimethoxyphenyl;

Ph is a phenyl group;

M is Li, Na, K, or Cs;

$A^-$ is a weakly coordinating anion;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure selected from Formula (5-B) and Formula (6-B):

Formula (5-B)

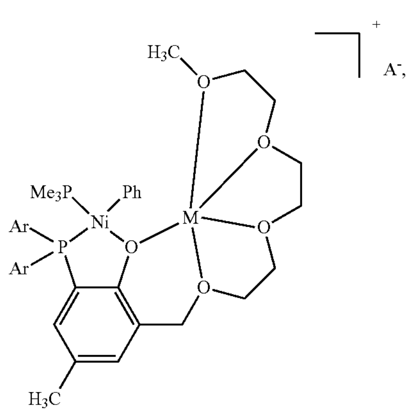

and

-continued

Formula (6-B)

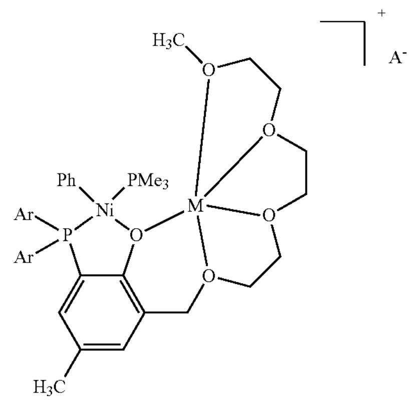

wherein Formula (5-B) and Formula (6-B):

Ar is 2,6-dimethoxyphenyl;

Ph is a phenyl group;

M is Li, Na, K, or Cs;

$A^-$ is $[(3,5\text{-}(CF_3)_2C_6H_3)_4B]^-$; and $PMe_3$ is trimethylphosphine.

In various embodiments, the present invention provides a bimetallic catalyst complex having a structure of Formula (5-B) is:

Formula (5-B)

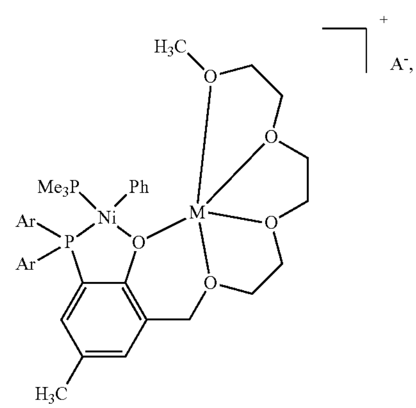

wherein,

Ar is 2,6-dimethoxyphenyl;

Ph is a phenyl group;

M is Li, Na, K, or Cs;

$A^-$ is $[(3,5\text{-}(CF_3)_2C_6H_3)_4B]^-$; and $PMe_3$ is trimethylphosphine.

In various embodiments, the present invention provides a bimetallic catalyst complex having a structure of Formula (6-B):

Formula (6-B)

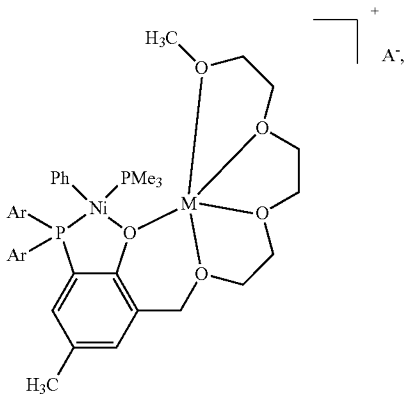

wherein,
Ar is 2,6-dimethoxyphenyl;
Ph is a phenyl group;
M is Li, Na, K, or Cs;
$A^-$ is $[(3,5\text{-}(CF_3)_2C_6H_3)_4B]^-$; and
$PMe_3$ is trimethylphosphine.

In some embodiments, the bimetallic catalyst complex of Formula (5-A) is a bimetallic catalyst complex of Formula (5). In some embodiments, the bimetallic catalyst complex of Formula (5-B) is a bimetallic catalyst complex of Formula (5). In some embodiments, the bimetallic catalyst complex of Formula (6-A) is a bimetallic catalyst complex of Formula (6). In some embodiments, the bimetallic catalyst complex of Formula (6-B) is a bimetallic catalyst complex of Formula (6).

In some embodiments, Ar is 2,6-dimethoxyphenyl; L is a phenyl group; M is Li, Na, K, or Cs; A is $[(3,5\text{-}(CF_3)_2C_6H_3)_4B]^-$; X is methyl; Y is hydrogen; Z is hydrogen; and $R^1$, $R^2$, and $R^3$ are each methyl.

In some embodiments, K is a weakly coordinating anion. In some embodiments, the weakly coordinating anion is selected from the group consisting of tetrakis(3,5-bis(trifluoromethyl)phenylborate, tetrakis(pentafluorophenyl)borate, tetraphenylborate, trifluoromethylsulfonate, hexafluorophosphate, hexafluoroantimonate, and tetrafluoroborate. In some embodiments, tetrakis(3,5-bis(trifluoromethyl)phenylborate is represented as $[(3,5\text{-}(CF_3)_2C_6H_3)_4B]^-$. In some embodiments, tetrakis(3,5-bis(trifluoromethyl)phenylborate is represented as $BAr^F{}_4{}^-$.

In some embodiments M is Li, Na, K, or Cs. In some embodiments, M is Li. In some embodiments, M is Na. In some embodiments, M is K. In some embodiments, M is Cs.

In some embodiments, the electron donating group is selected from the group consisting of: alkoxy, amino, hydroxy, and alkyl. In some embodiments, the electron donating group is selected from the group consisting of: alkoxy, phenoxy, amino, alkylamino, dialkylamino, hydroxy, alkyl, and cycloalkyl. In some embodiments, alkyl is selected from the group consisting of: —$CH_3$, —$CH_2CH_3$, —$CH_2CH_2CH_3$, and —$CH(CH_3)_2$. In some embodiments, the electron withdrawing group is selected from the group consisting of: $NO_2$, —CN, —C(O)-alkyl, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2R$, —$PO_3H$, —$PO_3R$, —$CF_3$, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2$alkyl, —$PO_3H$, —$PO_3$alkyl, —$CF_3$, and halo.

In some embodiments, the phenyl group is

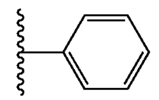

In some embodiments, L is an optionally substituted phenyl group. In some embodiments, the optionally substituted phenyl group is selected from the group consisting of phenyl, 2-methoxyphenyl, 4-methoxyphenyl, 2-acetylphenyl, or 2-(N-acetylamino)phenyl). In some embodiments, L is a phenyl group.

In some embodiments, $R^1$, $R^2$, and $R^3$ are each independently selected from optionally substituted aryl, optionally substituted alkyl, and optionally substituted cycloalkyl. In some embodiments, optionally substituted aryl is selected from the group consisting of phenyl, pentafluorophenyl, 2-methoxyphenyl, 2-methylphenyl, and 4-trifluoromethylphenyl. In some embodiments, optionally substituted alkyl is selected from the group consisting of methyl, ethyl, propyl, isopropyl, or tert-butyl. In some embodiments, optionally substituted cycloalkyl is cyclohexyl or adamantyl.

Method for Catalyzing Homopolymerization of an Optionally Substituted Olefin

In various embodiments, the present invention provides a method for catalyzing homopolymerization of an optionally substituted olefin, comprising: combining or contacting an optionally substituted olefin with the bimetallic catalyst complex of Formula (5), Formula (6), Formula (5-A), Formula (6-A), Formula (5-B), or Formula (6-B), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with the bimetallic catalyst complex of Formula (5), or Formula (6), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with the bimetallic catalyst complex of Formula (5-A), or Formula (6-A), or combinations thereof, whereby the optionally substituted olefin undergoes homopolymerization.

In various embodiments, the present invention provides a method for catalyzing homopolymerization of an optionally substituted olefin, comprising: combining or contacting an optionally substituted olefin with the bimetallic catalyst complex of Formula (5-B), or Formula (6-B), or combinations thereof, whereby the optionally substituted olefin undergoes homopolymerization.

In some embodiments, the step of combining or contacting the optionally substituted olefin with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, method for catalyzing homopolymerization of an optionally substituted olefin further comprises combining or contacting at least one activator with the bimetallic catalyst complex and the optionally substituted olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for catalyzing homopolymerization of an optionally substituted olefin. In various embodiments, the present invention provides a homopolymer formed by the method for catalyzing homopolymerization of an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the polymer is a homopolymer. In some embodiments, the homopolymer is monomodal or bimodal. In some embodiments, the homopolymer is monomodal. In some embodiments, the homopolymer is bimodal. In some embodiments, the homopolymer is monomodal, or bimodal, or combination thereof.

Methods for Polymerizing an Optionally Substituted Olefin

In various embodiments, the present invention provides a method for polymerizing an optionally substituted olefin, the method comprising contacting an optionally substituted olefin with the bimetallic catalyst complex of Formula (5), Formula (6), Formula (5-A), Formula (6-A), Formula (5-B), or Formula (6-B), or combinations thereof, and at least one activator under conditions effective to polymerize the optionally substituted olefin.

In various embodiments, the present invention provides a method for polymerizing an optionally substituted olefin, the method comprising contacting an optionally substituted olefin with the bimetallic catalyst complex of Formula (5), or Formula (6), or combinations thereof, and at least one activator under conditions effective to polymerize the optionally substituted olefin.

In various embodiments, the present invention provides a method for polymerizing an optionally substituted olefin, the method comprising contacting an optionally substituted olefin with the bimetallic catalyst complex of Formula (5-A), or Formula (6-A), or combinations thereof, and at least one activator under conditions effective to polymerize the optionally substituted olefin.

In various embodiments, the present invention provides a method for polymerizing an optionally substituted olefin, the method comprising contacting an optionally substituted olefin with the bimetallic catalyst complex of Formula (5-B), or Formula (6-B), or combinations thereof, and at least one activator under conditions effective to polymerize the optionally substituted olefin.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the optionally substituted olefin with the bimetallic catalyst complex and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from tetrahydrofuran, diethyl ether, dichloromethane, chloroform, N,N-dimethylformamide, dimethylsulfoxide, ethyl acetate, acetone, and water, and any combinations thereof.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for polymerizing an optionally substituted olefin as provided herein. In some embodiments, the polymer is monomodal or bimodal. In some embodiments, the polymer is monomodal. In some embodiments, the polymer is bimodal. In some embodiments, the polymer is monomodal, bimodal, or combination thereof.

Method for Catalyzing Copolymerization of a First Olefin and at Least One Other Olefin In various embodiments, the present invention provides a method for catalyzing copolymerization of a first olefin and at least one other olefin, comprising: combining or contacting a first olefin and at least one other olefin with the bimetallic catalyst complex of Formula (5), Formula (6), Formula (5-A), Formula (6-A), Formula (5-B), or Formula (6-B), or combinations thereof, whereby the first olefin and the at least one other olefin undergoes copolymerization, and wherein the first olefin and the at least one other olefin are different from one another.

In various embodiments, the present invention provides a method for catalyzing copolymerization of a first olefin and at least one other olefin, comprising: combining or contacting a first olefin and at least one other olefin with the bimetallic catalyst complex of Formula (5), or Formula (6), or combinations thereof, whereby the first olefin and the at least one other olefin undergoes copolymerization, and wherein the first olefin and the at least one other olefin are different from one another.

In various embodiments, the present invention provides a method for catalyzing copolymerization of a first olefin and at least one other olefin, comprising: combining or contacting a first olefin and at least one other olefin with the bimetallic catalyst complex of Formula (5-A), Formula (6-A), or combinations thereof, whereby the first olefin and the at least one other olefin undergoes copolymerization, and wherein the first olefin and the at least one other olefin are different from one another.

In various embodiments, the present invention provides a method for catalyzing copolymerization of a first olefin and at least one other olefin, comprising: combining or contacting a first olefin and at least one other olefin with the bimetallic catalyst complex of Formula (5-B), or Formula (6-B), or combinations thereof, whereby the first olefin and the at least one other olefin undergoes copolymerization, and wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the step of combining or contacting the first olefin and the at least one other olefin with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the first olefin is selected from the group consisting of ethylene, propene, and styrene. In some embodiments the at least one other olefin is selected from the group consisting of 1-hexene, 1-octene, allyl benzene, acrylamide, acrylic acid, acrylic ester, vinyl halide, vinyl alcohol, and allyl alcohol. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for catalyzing copolymerization of a first olefin and at least one other olefin further comprises combining or contacting at least one activator with the bimetallic catalyst complex, the first olefin, and the at least one other olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first olefin is ethylene.

In various embodiments, the present invention provides a polymer formed by a method for catalyzing copolymerization of a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method for Copolymerizing a First Olefin and at Least One Other Olefin

In various embodiments, the present invention provides a method for copolymerizing a first olefin and at least one other olefin, the method comprising contacting the first olefin and the at least one other olefin with the bimetallic catalyst complex of Formula (5), Formula (6), Formula (5-A), Formula (6-A), Formula (5-B), or Formula (6-B), or combinations thereof; and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the bimetallic catalyst complex of Formula (5), or Formula (6), or combinations thereof; and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the bimetallic catalyst complex of Formula (5-A), or Formula (6-A), or combinations thereof; and at least one activator under conditions effective to copolymerize the first olefin and the at least one other olefin, wherein the first olefin and the at least one other olefin are different from one another.

In various embodiments, the present invention provides a method for copolymerizing a first olefin and at least one other olefin, the method comprising contacting the first olefin and the at least one other olefin with the bimetallic catalyst complex of Formula (5-B), or Formula (6-B), or combinations thereof; and at least one activator under conditions effective to copolymerize the first olefin and the at least one other olefin, wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the first olefin and the at least one other olefin with the bimetallic catalyst complex and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the first olefin is ethylene.

In various embodiments, the present invention provides a polymer formed by a method for copolymerizing a first olefin and at least one other olefin as provided herein. In various embodiments, the present invention provides a polymer formed by the method for copolymerizing a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method for Making a Compound

In various embodiments, the present invention provides a method for making a compound, the method comprising contacting a reactant with a bimetallic catalyst complex of Formula (5), Formula (6), Formula (5-A), Formula (6-A), Formula (5-B), or Formula (6-B), or combinations thereof, under conditions effective to make the compound.

In some embodiments the reactant is methylaluminoxane, trialkylaluminium, alkyllithium, alkyl magnesium halide, or dialklylzinc.

In some embodiments, the step of contacting the reactant with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for making a compound further comprises contacting at least one activator with the bimetallic catalyst complex and the reactant. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum. In some embodiments, the compound is a small molecule. In some embodiments, the method for making a compound a cascade method.

Method for Making a Compound

In various embodiments, the present invention provides a method for making a compound, the method comprising contacting a first reactant and at least one other reactant with a bimetallic catalyst complex of Formula (5), Formula (6), Formula (5-A), Formula (6-A), Formula (5-B), or Formula (6-B), or combinations thereof, under conditions effective to make the compound.

In some embodiments, the step of contacting the first reactant and the at least one other reactant with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for making the compound further comprises contacting at least one activator with the bimetallic catalyst complex, the first reactant, and the at least one other reactant. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method. In some embodiments, the first reactant and the at least one other reactant are different from one another.

Method of Making a Polymer

In various embodiments, the present invention provides a method of making a polymer, comprising contacting a monomer with the bimetallic catalyst complex of Formula (5), Formula (6), Formula (5-A), Formula (6-A), Formula (5-B), or Formula (6-B), or combinations thereof.

In various embodiments, the present invention provides a method of making a polymer, comprising contacting a monomer with the bimetallic catalyst complex of Formula (5), or Formula (6), or combinations thereof.

In various embodiments, the present invention provides a method of making a polymer, comprising contacting a monomer with the bimetallic catalyst complex of Formula (5-A), Formula (6-A), or combinations thereof.

In various embodiments, the present invention provides a method of making a polymer, comprising contacting a monomer with the bimetallic catalyst complex of Formula (5-B), or Formula (6-B), or combinations thereof.

In some embodiments, the monomer is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the step of contacting the monomer with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method of making a polymer further comprises contacting at least one activator with the bimetallic catalyst complex and the monomer.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the monomer is an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the monomer is an optionally substituted terminal olefin or an optionally substituted internal olefin. In some embodiments, the monomer is selected from the group consisting of ethylene, an optionally substituted terminal olefin, and an optionally substituted internal olefin. In some embodiments, the monomer is ethylene.

In various embodiments, the present invention provides a polymer made by a method of making a polymer as provided herein. In various embodiments, the polymer is bimodal or monomodal. In some embodiments, the polymer is bimodal. In some embodiments, the polymer is monomodal. In some embodiments, the polymer is monomodal, or bimodal, or combination thereof.

Method of Making a Copolymer

In various embodiments, the present invention provides a method of making a copolymer, comprising contacting a first monomer and at least one other monomer with a bimetallic catalyst complex of Formula (5), Formula (6), Formula (5-A), Formula (6-A), Formula (5-B), or Formula (6-B), or combinations thereof, wherein the first monomer and the at least one other monomer are different from one another.

In various embodiments, the present invention provides a method of making a copolymer, comprising contacting a first monomer and at least one other monomer with a bimetallic catalyst complex of Formula (5), or Formula (6), or combinations thereof, wherein the first monomer and the at least one other monomer are different from one another.

In various embodiments, the present invention provides a method of making a copolymer, comprising contacting a first monomer and at least one other monomer with a bimetallic catalyst complex of Formula (5-A), or Formula (6-A), or combinations thereof, wherein the first monomer and the at least one other monomer are different from one another.

In various embodiments, the present invention provides a method of making a copolymer, comprising contacting a first monomer and at least one other monomer with a bimetallic catalyst complex of Formula (5-B), or Formula (6-B), or combinations thereof, wherein the first monomer and the at least one other monomer are different from one another.

In some embodiments, the first monomer and the at least one other monomer are different from one another. In some embodiments, the at least one other monomer is at least one second monomer. In some embodiments, the first monomer and the at least one second monomer are different from one another.

In some embodiments, the step of contacting the first monomer and the at least one other monomer with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method of making a copolymer further comprises contacting at least one activator with the bimetallic catalyst complex, the first monomer, and the at least one other monomer. In some embodiments, the first monomer is ethylene, propene, 1-butene, 1-hexene, 1-octene, styrene, or allyl bezene. In some embodiments, the at least one other monomer is acrylamide, acrylic acid, acrylic ester, vinyl halide, vinyl alcohol, or allyl alcohol.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first monomer and the at least one other monomer are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first monomer and the at least one other monomer are each independently an optionally substituted terminal olefin or an optionally substituted internal olefin. In some embodiments, the first monomer and the at least one other monomer are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first monomer is ethylene.

In various embodiments, the present invention provides a polymer formed by the method for catalyzing copolymerization of a first monomer and at least one other monomer. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer.

In various embodiments, the present invention provides a copolymer made by a method of making a copolymer as provided herein. In various embodiments, the present invention provides a polymer made by a method of making a copolymer as provided herein. In some embodiments, the polymer is a copolymer. In some embodiments, the copolymer is selected from the group consisting of a random copolymer, block copolymer, and gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is bimodal. In some embodiments, the copolymer is monomodal. In some embodiments, the copolymer is monomodal, or bimodal, or combination thereof. In some embodiments, the first monomer is $CO_2$; and the at least one other monomer is an epoxide.

Catalyst Composition Comprising at Least Four Bimetallic Catalyst Complexes: a Bimetallic Catalyst Complex of Formula (7), a Bimetallic Catalyst Complex of Formula (8, a Bimetallic catalyst complex of Formula (9, and a Bimetallic Catalyst Complex of Formula (10).

In various embodiments, the present invention provides a catalyst composition, comprising at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10): wherein the bimetallic catalyst complex of Formula (7) has the structure:

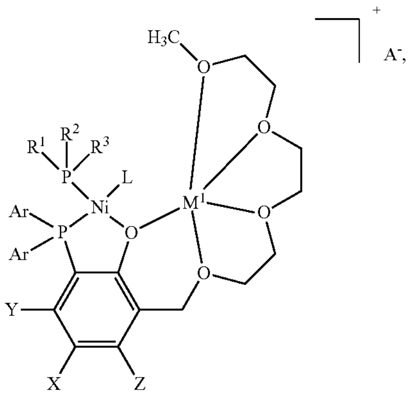

wherein the bimetallic catalyst complex of Formula (8) has the structure:

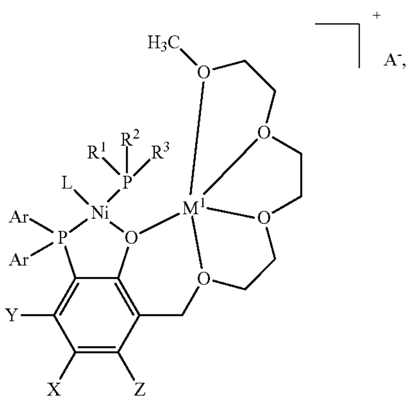

wherein the bimetallic catalyst complex of Formula (9) has the structure:

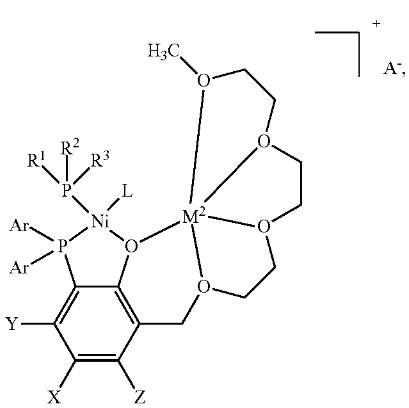

wherein the bimetallic catalyst complex of Formula (10) has the structure:

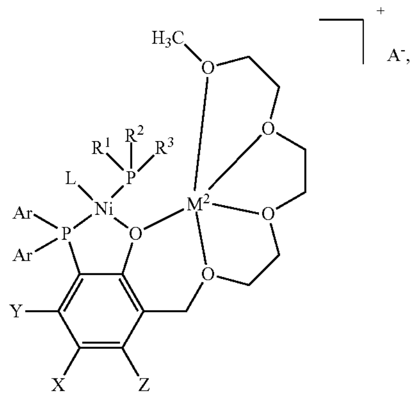

wherein in Formula (7), Formula (8), Formula (9) and Formula (10): Ar is 2,6-dimethoxyphenyl; L is an optionally substituted phenyl group; $M^1$ is Li, Na, K, or Cs; $M^2$ is Li, Na, K, or Cs; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl; wherein $A^-$ is the same in the bimetallic catalyst complex of Formula (7), Formula (8), Formula (9), and Formula (10); wherein Ar is the same in the bimetallic catalyst complex of Formula (7), Formula (8), Formula (9), and Formula (10); wherein L is the same in the bimetallic catalyst complex of Formula (7), Formula (8), Formula (9), and Formula (10); wherein X is the same in the bimetallic catalyst complex of Formula (7), Formula (8), Formula (9), and Formula (10); wherein Y is the same in the bimetallic catalyst complex of Formula (7), Formula (8), Formula (9), and Formula (10); wherein Z is the same in the bimetallic catalyst complex of Formula (7), Formula (8), Formula (9), and Formula (10); wherein $R^1$ is the same in the bimetallic catalyst complex of Formula (7), Formula (8), Formula (9), and Formula (10); wherein $R^2$ is the same in the bimetallic catalyst complex of Formula (7), Formula (8), Formula (9), and Formula (10); wherein $R^3$ is the same in the bimetallic catalyst complex of Formula (7), Formula (8), Formula (9), and Formula (10); wherein $M^1$ is the same in the bimetallic catalyst complex of Formula (7) and Formula (8); wherein $M^2$ is the same in the bimetallic catalyst complex of Formula (9) and Formula (10); and wherein $M^1$ and $M^2$ are different from one another.

In various embodiments, the present invention provides a catalyst composition, comprising at least four bimetallic catalyst complexes, wherein the at least four bimetallic catalyst complexes are selected from: a bimetallic catalyst complex of Formula (7-A), a bimetallic catalyst complex of Formula (8-A), a bimetallic catalyst complex of Formula (9-A), and a bimetallic catalyst complex of Formula (10-A):

wherein the bimetallic catalyst complex of Formula (7-A) has the structure:

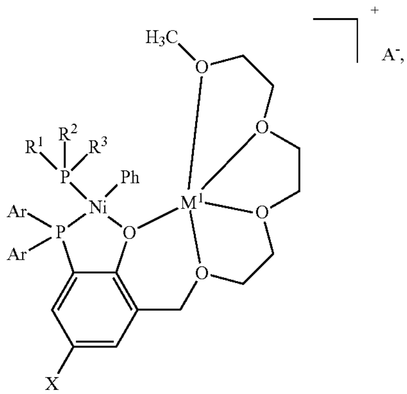

wherein the bimetallic catalyst complex of Formula (8-A) has the structure:

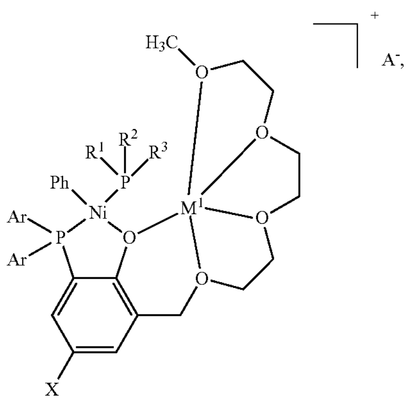

wherein the bimetallic catalyst complex of Formula (9-A) has the structure:

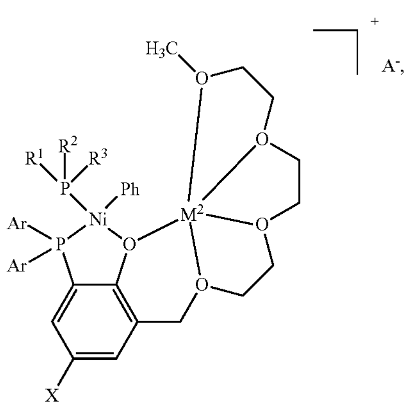

wherein the bimetallic catalyst complex of Formula (10-A) has the structure:

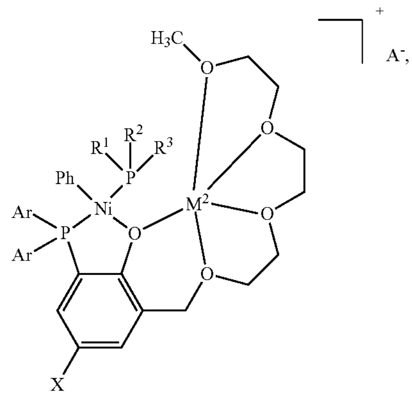

wherein in Formula (7-A), Formula (8-A), Formula (9-A) and Formula (10-A):

Ar is 2,6-dimethoxyphenyl;

Ph is a phenyl group;

$M^1$ is Li, Na, K, or Cs;

$M^2$ is Li, Na, K, or Cs;

$A^-$ is a weakly coordinating anion;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl;

wherein $A^-$ is the same in the bimetallic catalyst complex of Formula (7-A), Formula (8-A), Formula (9-A), and Formula (10-A);

wherein Ar is the same in the bimetallic catalyst complex of Formula (7-A), Formula (8-A), Formula (9-A), and Formula (10-A);

wherein Ph is the same in the bimetallic catalyst complex of Formula (7-A), Formula (8-A), Formula (9-A), and Formula (10-A);

wherein X is the same in the bimetallic catalyst complex of Formula (7-A), Formula (8-A), Formula (9-A), and Formula (10-A);

wherein $R^1$ is the same in the bimetallic catalyst complex of Formula (7-A), Formula (8-A), Formula (9-A), and Formula (10-A);

wherein $R^2$ is the same in the bimetallic catalyst complex of Formula (7-A), Formula (8-A), Formula (9-A), and Formula (10-A);

wherein $R^3$ is the same in the bimetallic catalyst complex of Formula (7-A), Formula (8-A), Formula (9-A), and Formula (10-A);

wherein $M^1$ is the same in the bimetallic catalyst complex of Formula (7-A) and Formula (8-A);

wherein $M^2$ is the same in the bimetallic catalyst complex of Formula (9-A) and Formula (10-A);

and wherein $M^1$ and $M^2$ are different from one another.

In various embodiments, the present invention provides a catalyst composition, comprising at least four bimetallic catalyst complexes, wherein the at least four bimetallic catalyst complexes are selected from: a bimetallic catalyst complex of Formula (7-B), a bimetallic catalyst complex of Formula (8-B), a bimetallic catalyst complex of Formula (9-B), and a bimetallic catalyst complex of Formula (10-B); wherein the bimetallic catalyst complex of Formula (7-B) has the structure:

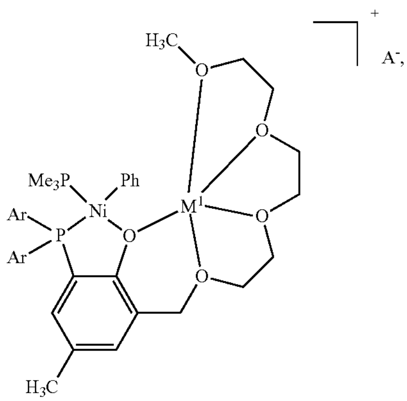

wherein the bimetallic catalyst complex of Formula (8-B) has the structure:

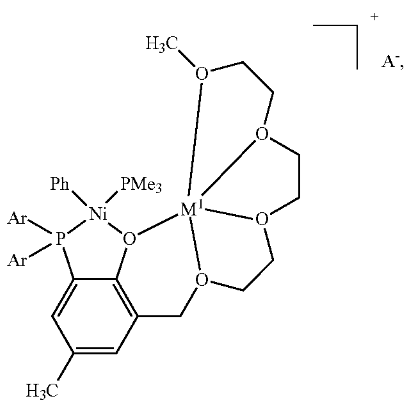

wherein the bimetallic catalyst complex of Formula (9-B) has the structure:

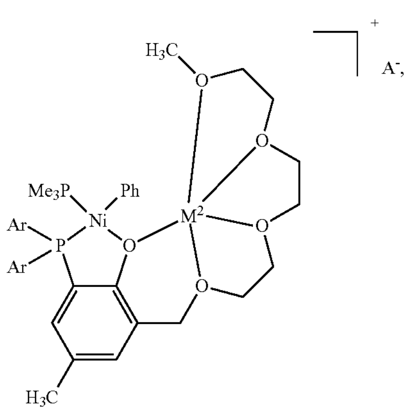

wherein the bimetallic catalyst complex of Formula (10-B) has the structure:

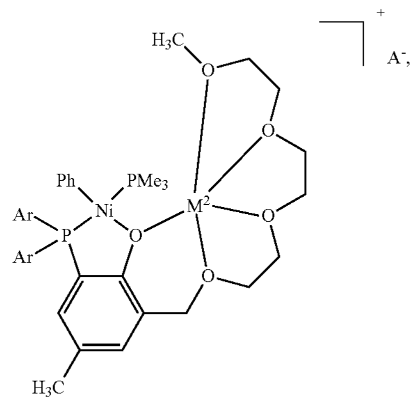

wherein in Formula (7-B), Formula (8-B), Formula (9-B) and Formula (10-B):

Ar is 2,6-dimethoxyphenyl;

Ph is a phenyl group;

$M^1$ is Li, Na, K, or Cs;

$M^2$ is Li, Na, K, or Cs;

$A^-$ is $[(3,5\text{-}(CF_3)_2C_6H_3)_4B]^-$; and $PMe_3$ is trimethylphosphine;

wherein $A^-$ is the same in the bimetallic catalyst complex of Formula (7-B), Formula (8-B), Formula (9-B), and Formula (10-B);

wherein Ar is the same in the bimetallic catalyst complex of Formula (7-B), Formula (8-B), Formula (9-B), and Formula (10-B);

wherein Ph is the same in the bimetallic catalyst complex of Formula (7-B), Formula (8-B), Formula (9-B), and Formula (10-B);

wherein $PMe_3$ is the same in the bimetallic catalyst complex of Formula (7-B), Formula (8-B), Formula (9-B), and Formula (10-B);

wherein $M^1$ is the same in the bimetallic catalyst complex of Formula (7-B) and Formula (8-B);

wherein $M^2$ is the same in the bimetallic catalyst complex of Formula (9-B) and Formula (10-B);

and wherein $M^1$ and $M^2$ are different from one another.

In some embodiments, in Formula (7), Formula (8), Formula (9) and Formula (10): Ar is 2,6-dimethoxyphenyl; L is a phenyl group; $M^1$ is Li, Na, K, or Cs; $M^2$ is Li, Na, K, or Cs; $A^-$ is $[(3,5\text{-}(CF_3)_2C_6H_3)_4B]^-$; X is methyl; Y is hydrogen; Z is hydrogen; and $R^1$, $R^2$, and $R^3$ are each methyl; wherein $A^-$ is the same in the bimetallic catalyst complex of Formula (7), Formula (8), Formula (9), and Formula (10); wherein Ar is the same in the bimetallic catalyst complex of Formula (7), Formula (8), Formula (9), and Formula (10); wherein L is the same in the bimetallic catalyst complex of Formula (7), Formula (8), Formula (9), and Formula (10); wherein X is the same in the bimetallic catalyst complex of Formula (7), Formula (8), Formula (9), and Formula (10); wherein Y is the same in the bimetallic catalyst complex of Formula (7), Formula (8), Formula (9), and Formula (10); wherein Z is the same in the bimetallic catalyst complex of Formula (7), Formula (8), Formula (9), and Formula (10); wherein $R^1$ is the same in the bimetallic catalyst complex of Formula (7), Formula (8), Formula (9), and Formula (10); wherein $R^2$ is the same in the bimetallic catalyst complex of Formula (7), Formula (8), Formula (9), and Formula (10); wherein $R^3$ is the same in the bimetallic catalyst complex of Formula (7), Formula (8), Formula (9), and Formula (10); wherein $M^1$ is the same in the bimetallic catalyst complex of Formula (7) and Formula (8); wherein $M^2$ is the same in the bimetallic catalyst complex of Formula (9) and Formula (10); and wherein $M^1$ and $M^2$ are different from one another.

In some embodiments, the bimetallic catalyst complex of Formula (7-A) is a bimetallic catalyst complex of Formula (7). In some embodiments, the bimetallic catalyst complex of Formula (7-B) is a bimetallic catalyst complex of Formula (7). In some embodiments, the bimetallic catalyst complex of Formula (8-A) is a bimetallic catalyst complex of Formula (8). In some embodiments, the bimetallic catalyst complex of Formula (8-B) is a bimetallic catalyst complex of Formula (8). In some embodiments, the bimetallic catalyst complex of Formula (9-A) is a bimetallic catalyst complex of Formula (9). In some embodiments, the bimetallic catalyst complex of Formula (9-B) is a bimetallic catalyst complex of Formula (9). In some embodiments, the bimetallic catalyst complex of Formula (10-A) is a bimetallic catalyst complex of Formula (10). In some embodiments, the bimetallic catalyst complex of Formula (10-B) is a bimetallic catalyst complex of Formula (10).

In some embodiments, $A^-$ is a weakly coordinating anion. In some embodiments, the weakly coordinating anion is selected from the group consisting of tetrakis(3,5-bis(trifluoromethyl)phenylborate, tetrakis(pentafluorophenyl)borate, tetraphenylborate, trifluoromethylsulfonate, hexafluorophosphate, hexafluoroantimonate, and tetrafluoroborate. In some embodiments, tetrakis(3,5-bis(trifluoromethyl)phenylborate is represented as $[(3,5\text{-}(CF_3)_2C_6H_3)_4B]^-$. In some embodiments, tetrakis(3,5-bis(trifluoromethyl)phenylborate is represented as $BAr^F{}_4{}^-$.

In some embodiments $M^1$ is Li, Na, K, or Cs. In some embodiments, $M^1$ is Li. In some embodiments, $M^1$ is Na. In some embodiments, $M^1$ is K. In some embodiments, $M^1$ is Cs. In some embodiments $M^2$ is Li, Na, K, or Cs. In some embodiments, $M^2$ is Li. In some embodiments, $M^2$ is Na. In some embodiments, $M^2$ is K. In some embodiments, $M^2$ is Cs.

In some embodiments, the electron donating group is selected from the group consisting of: alkoxy, amino, hydroxy, and alkyl. In some embodiments, the electron donating group is selected from the group consisting of: alkoxy, phenoxy, amino, alkylamino, dialkylamino, hydroxy, alkyl, and cycloalkyl. In some embodiments, alkyl is selected from the group consisting of: —$CH_3$, —$CH_2CH_3$, —$CH_2CH_2CH_3$, and —$CH(CH_3)_2$. In some embodiments, the electron withdrawing group is selected from the group consisting of: $NO_2$, —CN, —C(O)-alkyl, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2R$, —$PO_3H$, —$PO_3R$, —$CF_3$, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2$alkyl, —$PO_3H$, —$PO_3$alkyl, —$CF_3$, and halo.

In some embodiments, the phenyl group is

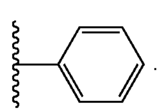

In some embodiments, L is an optionally substituted phenyl group. In some embodiments, the optionally substituted phenyl group is selected from the group consisting of phenyl, 2-methoxyphenyl, 4-methoxyphenyl, 2-acetylphenyl, or 2-(N-acetylamino)phenyl). In some embodiments, L is a phenyl group.

In some embodiments, $R^1$, $R^2$, and $R^3$ are each independently selected from optionally substituted aryl, optionally substituted alkyl, and optionally substituted cycloalkyl. In some embodiments, optionally substituted aryl is selected from the group consisting of phenyl, pentafluorophenyl, 2-methoxyphenyl, 2-methylphenyl, and 4-trifluoromethylphenyl. In some embodiments, optionally substituted alkyl is selected from the group consisting of methyl, ethyl, propyl, isopropyl, or tert-butyl. In some embodiments, optionally substituted cycloalkyl is cyclohexyl or adamantyl.

Method for Catalyzing Homopolymerization of an Optionally Substituted Olefin

In various embodiments, the present invention provides a method for catalyzing homopolymerization of an optionally substituted olefin, comprising: combining or contacting an optionally substituted olefin with the catalyst composition, whereby the optionally substituted olefin undergoes homopolymerization, and wherein the catalyst composition comprises at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10).

In various embodiments, the present invention provides a method for catalyzing homopolymerization of an optionally substituted olefin, comprising: combining or contacting an optionally substituted olefin with the catalyst composition, whereby the optionally substituted olefin undergoes homopolymerization, and wherein the catalyst composition comprises at least four bimetallic catalyst complexes, wherein the at least four bimetallic catalyst complexes are selected from: a bimetallic catalyst complex of Formula (7A), a bimetallic catalyst complex of Formula (8A), a bimetallic catalyst complex of Formula (9A), and a bimetallic catalyst complex of Formula (10A).

In various embodiments, the present invention provides a method for catalyzing homopolymerization of an optionally substituted olefin, comprising: combining or contacting an optionally substituted olefin with the catalyst composition, whereby the optionally substituted olefin undergoes homopolymerization, and wherein the catalyst composition comprises at least four bimetallic catalyst complexes, wherein the at least four bimetallic catalyst complexes are selected from: a bimetallic catalyst complex of Formula (7B), a bimetallic catalyst complex of Formula (8B), a bimetallic catalyst complex of Formula (9B), and a bimetallic catalyst complex of Formula (10B).

In some embodiments, the step of combining or contacting the optionally substituted olefin with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for catalyzing homopolymerization of an optionally substituted olefin further comprises combining or contacting at least one activator with the catalyst and the optionally substituted olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for catalyzing homopolymerization of an optionally substituted olefin as provided herein. In various embodiments, the present invention provides a homopolymer formed by the method for catalyzing homopolymerization of an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the polymer is a homopolymer. In some embodiments, the homopolymer is monomodal or bimodal. In some embodiments, the homopolymer is monomodal. In some embodiments, the homopolymer is bimodal. In some embodiments, the homopolymer is monomodal, or bimodal, or combination thereof.

Method for Polymerizing an Optionally Substituted Olefin

In various embodiments, the present invention provides a method for polymerizing an optionally substituted olefin, the method comprising contacting an optionally substituted olefin with a catalyst composition, and at least one activator under conditions effective to polymerize the optionally substituted olefin, wherein the catalyst composition comprises at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10).

In various embodiments, the present invention provides a method for polymerizing an optionally substituted olefin, the method comprising contacting an optionally substituted olefin with a catalyst composition, and at least one activator under conditions effective to polymerize the optionally substituted olefin, wherein the catalyst composition comprises at least four bimetallic catalyst complexes, wherein the at least four bimetallic catalyst complexes are selected from: a bimetallic catalyst complex of Formula (7A), a bimetallic catalyst complex of Formula (8A), a bimetallic catalyst complex of Formula (9A), and a bimetallic catalyst complex of Formula (10A).

In various embodiments, the present invention provides a method for polymerizing an optionally substituted olefin, the method comprising contacting an optionally substituted olefin with a catalyst composition, and at least one activator under conditions effective to polymerize the optionally substituted olefin, wherein the catalyst composition comprises at least four bimetallic catalyst complexes, wherein the at least four bimetallic catalyst complexes are selected from: a bimetallic catalyst complex of Formula (7B), a bimetallic catalyst complex of Formula (8B), a bimetallic catalyst complex of Formula (9B), and a bimetallic catalyst complex of Formula (10B).

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the optionally substituted olefin with the catalyst composition and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from tetrahydrofuran, diethyl ether, dichloromethane, chloroform, N,N-dimethylformamide, dimethylsulfoxide, ethyl acetate, acetone, and water, and any combinations thereof. In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for polymerizing an optionally substituted olefin as provided herein. In some embodiments, the polymer is monomodal or bimodal. In some embodiments, the polymer is monomodal. In some embodiments, the polymer is bimodal. In some embodiments, the polymer is monmodal, or bimodal, or combination thereof.

Method for Catalyzing Copolymerization of a First Olefin and at Least One Other Olefin In various embodiments, the present invention provides a method for catalyzing copolymerization of a first olefin and at least one other olefin, comprising: combining or contacting a first olefin and at least one other olefin with a catalyst composition, whereby the first olefin and the at least one other olefin undergoes copolymerization, and wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10).

In various embodiments, the present invention provides a method for catalyzing copolymerization of a first olefin and at least one other olefin, comprising: combining or contacting a first olefin and at least one other olefin with a catalyst composition, whereby the first olefin and the at least one other olefin undergoes copolymerization, and wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (7A), a bimetallic catalyst complex of Formula (8A), a bimetallic catalyst complex of Formula (9A), and a bimetallic catalyst complex of Formula (10A).

In various embodiments, the present invention provides a method for catalyzing copolymerization of a first olefin and at least one other olefin, comprising: combining or contacting a first olefin and at least one other olefin with a catalyst composition, whereby the first olefin and the at least one other olefin undergoes copolymerization, and wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (7B), a bimetallic catalyst complex of Formula (8B), a bimetallic catalyst complex of Formula (9B), and a bimetallic catalyst complex of Formula (10B).

In some embodiments, the first olefin and the at least one other olefin are different from one another. In some embodiments, the at least one other olefin is at least one second olefin. In some embodiments, the first olefin and the at least one second olefin are different from one another.

In some embodiments, the step of combining or contacting the first olefin and the at least one other olefin with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the first olefin is selected from the group consisting of ethylene, propene, and styrene. In some embodiments the at least one other olefin is selected from the group consisting of 1-hexene, 1-octene, allyl benzene, acrylamide, acrylic acid, acrylic ester, vinyl halide, vinyl alcohol, and allyl alcohol. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for catalyzing copolymerization of a first olefin and at least one other olefin further comprises combining or contacting at least one activator with the catalyst composition, the first olefin, and the at least one other olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first olefin is ethylene.

In various embodiments, the present invention provides a polymer formed by a method for catalyzing copolymerization of a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method for Copolymerizing a First Olefin and at Least One Other Olefin

In various embodiments, the present invention provides a method for copolymerizing a first olefin and at least one other olefin, the method comprising contacting the first olefin and the at least one other olefin with a catalyst composition, and at least one activator under conditions effective to copolymerize the first olefin and the at least one other olefin, wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10).

In various embodiments, the present invention provides a method for copolymerizing a first olefin and at least one other olefin, the method comprising contacting the first olefin and the at least one other olefin with a catalyst composition, and at least one activator under conditions effective to copolymerize the first olefin and the at least one other olefin, wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (7A), a bimetallic catalyst complex of Formula (8A), a bimetallic catalyst complex of Formula (9A), and a bimetallic catalyst complex of Formula (10A).

In various embodiments, the present invention provides a method for copolymerizing a first olefin and at least one other olefin, the method comprising contacting the first olefin and the at least one other olefin with a catalyst composition, and at least one activator under conditions effective to copolymerize the first olefin and the at least one other olefin, wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (7B), a bimetallic catalyst complex of Formula (8B), a bimetallic catalyst complex of Formula (9B), and a bimetallic catalyst complex of Formula (10B).

In some embodiments, the first olefin and the at least one other olefin are different from one another. In some embodiments, the at least one other olefin is at least one second olefin. In some embodiments, the first olefin and the at least one second olefin are different from one another.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the first olefin and the at least one other olefin with the catalyst composition and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof. In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the first olefin is ethylene.

In various embodiments, the present invention provides a polymer formed by the method for copolymerizing a first olefin and at least one other olefin as provided herein.

In various embodiments, the present invention provides a polymer formed by the method for copolymerizing a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method for Making a Compound

In various embodiments, the present invention provides a method for making a compound, the method comprising contacting a reactant with a catalyst composition under conditions effective to make the compound, wherein the catalyst composition comprises at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10).

In various embodiments, the present invention provides a method for making a compound, the method comprising contacting a reactant with a catalyst composition under conditions effective to make the compound, wherein the catalyst composition comprises at least four bimetallic catalyst complexes, wherein the at least four bimetallic catalyst complexes are selected from: a bimetallic catalyst complex of Formula (7A), a bimetallic catalyst complex of Formula (8A), a bimetallic catalyst complex of Formula (9A), and a bimetallic catalyst complex of Formula (10A).

In various embodiments, the present invention provides a method for making a compound, the method comprising contacting a reactant with a catalyst composition under conditions effective to make the compound, wherein the catalyst composition comprises at least four bimetallic catalyst complexes, wherein the at least four bimetallic catalyst complexes are selected from: a bimetallic catalyst complex of Formula (7B), a bimetallic catalyst complex of Formula (8B), a bimetallic catalyst complex of Formula (9B), and a bimetallic catalyst complex of Formula (10B).

In some embodiments the reactant is methylaluminoxane, trialkylaluminium, alkyllithium, alkyl magnesium halide, or dialklylzinc.

In some embodiments, the step of contacting the reactant with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, AN-dimethylformamide, dimethylsulfoxide, ethyl acetate, acetone, and water, and any combinations thereof.

In some embodiments, the method for making a compound further comprises contacting at least one activator with the catalyst composition and the reactant. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method.

Method for Making a Compound

In various embodiments, the present invention provides a method for making a compound, the method comprising contacting a first reactant and at least one other reactant with a catalyst composition under conditions effective to make the compound, wherein the catalyst composition comprises at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10).

In various embodiments, the present invention provides a method for making a compound, the method comprising contacting a first reactant and at least one other reactant with a catalyst composition under conditions effective to make the compound, wherein the catalyst composition comprises at least four bimetallic catalyst complexes, wherein the at least four bimetallic catalyst complexes are selected from: a bimetallic catalyst complex of Formula (7A), a bimetallic catalyst complex of Formula (8A), a bimetallic catalyst complex of Formula (9A), and a bimetallic catalyst complex of Formula (10A).

In various embodiments, the present invention provides a method for making a compound, the method comprising contacting a first reactant and at least one other reactant with a catalyst composition under conditions effective to make the compound, wherein the catalyst composition comprises at least four bimetallic catalyst complexes, wherein the at least four bimetallic catalyst complexes are selected from: a bimetallic catalyst complex of Formula (7B), a bimetallic catalyst complex of Formula (8B), a bimetallic catalyst complex of Formula (9B), and a bimetallic catalyst complex of Formula (10B).

In some embodiments, the step of contacting the first reactant and the at least one other reactant with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for making a compound further comprises contacting at least one activator with the catalyst composition, the first reactant, and the at least one other reactant. In some embodiments, the at least one activator is $Ni(COD)_2$ and triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method of making a compound is a cascade method. In some embodiments, the first reactant and the at least one other reactant are different from one another.

Methods of Making a Polymer

In various embodiments, the present invention provides a method of making a polymer, comprising contacting a monomer with a catalyst composition, wherein the catalyst composition comprises at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10).

In various embodiments, the present invention provides a method of making a polymer, comprising contacting a monomer with a catalyst composition, wherein the catalyst composition comprises at least four bimetallic catalyst complexes, wherein the at least four bimetallic catalyst complexes are selected from: a bimetallic catalyst complex of Formula (7A), a bimetallic catalyst complex of Formula (8A), a bimetallic catalyst complex of Formula (9A), and a bimetallic catalyst complex of Formula (10A).

In various embodiments, the present invention provides a method of making a polymer, comprising contacting a monomer with a catalyst composition, wherein the catalyst composition comprises at least four bimetallic catalyst complexes, wherein the at least four bimetallic catalyst complexes are selected from: a bimetallic catalyst complex of Formula (7B), a bimetallic catalyst complex of Formula (8B), a bimetallic catalyst complex of Formula (9B), and a bimetallic catalyst complex of Formula (10B).

In some embodiments, the monomer is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the step of contacting the monomer with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method of making a polymer further comprises contacting at least one activator with the catalyst composition and the monomer. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the monomer is an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the monomer is an optionally substituted terminal olefin or an optionally substituted internal olefin. In some embodiments, the monomer is selected from the group consisting of ethylene, an optionally substituted terminal olefin, and an optionally substituted internal olefin. In some embodiments, the monomer is ethylene.

In various embodiments, the present invention provides a polymer made by a method of making a polymer as provided herein. In some embodiments, the polymer is bimodal or monomodal. In some embodiments, the polymer is monomodal. In some embodiments the polymer is bimodal. In some embodiments, the polymer is monomodal, or bimodal, or combination thereof.

Methods of Making a Copolymer

In various embodiments, the present invention provides a method of making a copolymer, comprising contacting a first monomer and at least one other monomer with a catalyst composition, wherein the first monomer and the at least one other monomer are different from one another, and wherein the catalyst composition comprises at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10).

In various embodiments, the present invention provides a method of making a copolymer, comprising contacting a first monomer and at least one other monomer with a catalyst composition, wherein the first monomer and the at least one other monomer are different from one another, and wherein the catalyst composition comprises at least four bimetallic catalyst complexes, wherein the at least four bimetallic catalyst complexes are selected from: a bimetallic catalyst complex of Formula (7A), a bimetallic catalyst complex of Formula (8A), a bimetallic catalyst complex of Formula (9A), and a bimetallic catalyst complex of Formula (10A).

In various embodiments, the present invention provides a method of making a copolymer, comprising contacting a first monomer and at least one other monomer with a catalyst composition, wherein the first monomer and the at least one other monomer are different from one another, and wherein the catalyst composition comprises at least four bimetallic catalyst complexes, wherein the at least four bimetallic catalyst complexes are selected from: a bimetallic catalyst complex of Formula (7B), a bimetallic catalyst complex of Formula (8B), a bimetallic catalyst complex of Formula (9B), and a bimetallic catalyst complex of Formula (10B).

In some embodiments, the first monomer and the at least one other monomer are different from one another. In some embodiments, the at least one other monomer is at least one second monomer. In some embodiments, the first monomer and the at least one second monomer are different from one another.

In some embodiments, the step of contacting the first monomer and the at least one other monomer with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method of making a copolymer further comprises contacting at least one activator with the catalyst composition, the first monomer, and the at least one other monomer. In some embodiments, the first monomer is ethylene, propene, 1-butene, 1-hexene, 1-octene, styrene, or allyl bezene. In some embodiments, the at least one other monomer is acrylamide, acrylic acid, acrylic ester, vinyl halide, vinyl alcohol, or allyl alcohol. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first monomer and the at least one other monomer are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first monomer and the at least one other monomer are each independently an optionally substituted terminal olefin or an optionally substituted internal olefin. In some embodiments, the first monomer and the at least one other monomer are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first monomer is ethylene.

In various embodiments, the present invention provides a polymer formed by the method for catalyzing copolymerization of a first monomer and at least one other monomer. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer.

In various embodiments, the present invention provides a copolymer made by a method of making a copolymer as provided herein. In various embodiments, the present invention provides a polymer made by a method of making a copolymer as provided herein. In some embodiments, the polymer is a copolymer. In some embodiments, the copolymer is selected from the group consisting of a random copolymer, block copolymer, and gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is bimodal or monomodal. In some embodiments, the copolymer is bimodal. In some embodiments, the copolymer is monomodal. In some embodiments, the copolymer is monomodal, or bimodal, or combination thereof. In some embodiments, the first monomer is $CO_2$ and the at least one other monomer is an epoxide.

Heterobimetallic Catalysts of Formula (11), Formula (12), Formula (11-A). Formula (12-A), Formula (11-B), Formula (12-B).

In some embodiments, the present invention provides a heterobimetallic catalyst having a structure selected from Formula (11) and Formula (12):

Formula (11)

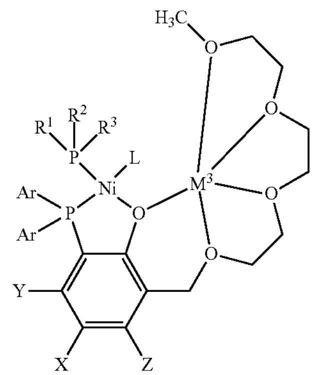

, and

Formula (12)

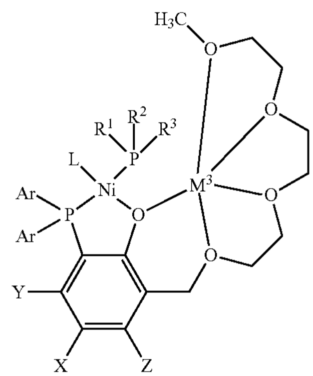

, wherein in Formula (11) and Formula (12):

Ar is 2,6-dimethoxyphenyl;

L is an optionally substituted phenyl group;

$M^3$ is a 2+ cation, 3+ cation, 4+ cation, or 5+ cation;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In some embodiments, the present invention provides a heterobimetallic catalyst having a structure of Formula (11):

Formula (11)

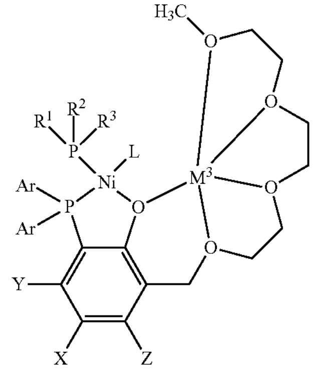

, wherein,

Ar is 2,6-dimethoxyphenyl;

L is an optionally substituted phenyl group;

$M^3$ is a 2+ cation, 3+ cation, 4+ cation, or 5+ cation;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure of Formula (12):

Formula (12)

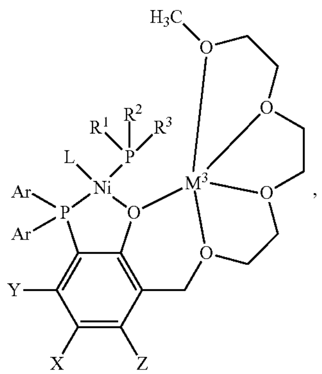

wherein,

Ar is 2,6-dimethoxyphenyl;

L is an optionally substituted phenyl group;

$M^3$ is a 2+ cation, 3+ cation, 4+ cation, or 5+ cation;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure selected from Formula (11-A) and Formula (12-A):

Formula (11-A)

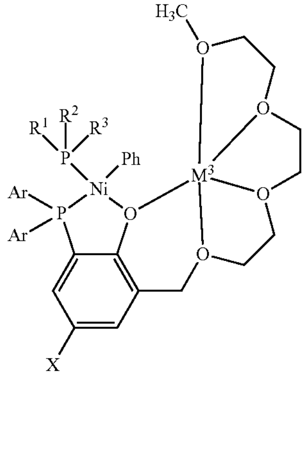

, and

-continued

Formula (12-A)

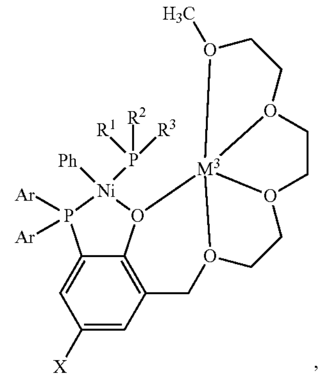

wherein in Formula (11-A) and Formula (12-A):

Ar is 2,6-dimethoxyphenyl;

Ph is a phenyl group;

$M^3$ is a 2+ cation, 3+ cation, 4+ cation, or 5+ cation;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure of Formula (11-A):

Formula (11-A)

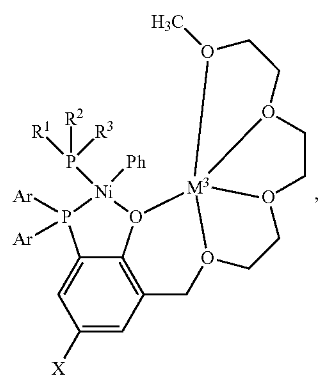

wherein,

Ar is 2,6-dimethoxyphenyl;

Ph is a phenyl group;

$M^3$ is a 2+ cation, 3+ cation, 4+ cation, or 5+ cation;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure of Formula (12-A):

Formula (12-A)

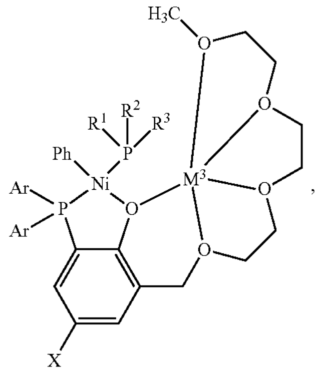

wherein,

Ar is 2,6-dimethoxyphenyl;

Ph is a phenyl group;

$M^3$ is a 2+ cation, 3+ cation, 4+ cation, or 5+ cation;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a heterobimetallic catalyst having a structure selected from Formula (11-B) and Formula (12-B):

Formula (11-B)

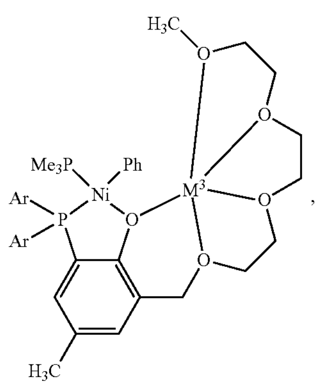

and

Formula (12-B)

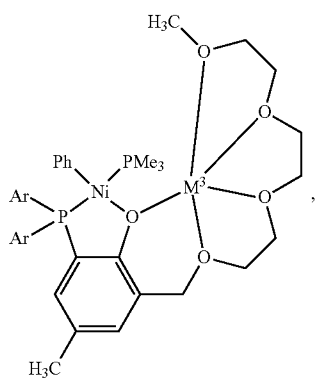

wherein in Formula (11-B) and Formula (12-B):

Ar is 2,6-dimethoxyphenyl;

Ph is a phenyl group;

$M^3$ is a 2+ cation, 3+ cation, 4+ cation, or 5+ cation; and $PMe_3$ is trimethylphosphine.

In various embodiments, the present invention provides a heterobimetallic catalyst having a structure of Formula (11-B):

Formula (11-B)

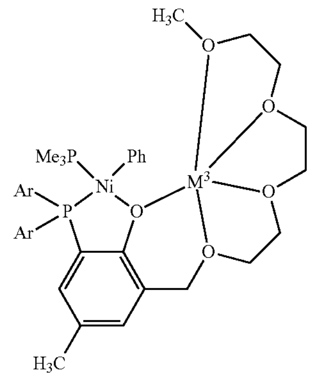

wherein,

Ar is 2,6-dimethoxyphenyl;

Ph is a phenyl group;

$M^3$ is a 2+ cation, 3+ cation, 4+ cation, or 5+ cation; and $PMe_3$ is trimethylphosphine.

In various embodiments, the present invention provides a heterobimetallic catalyst having a structure of Formula (12-B):

Formula (12-B)

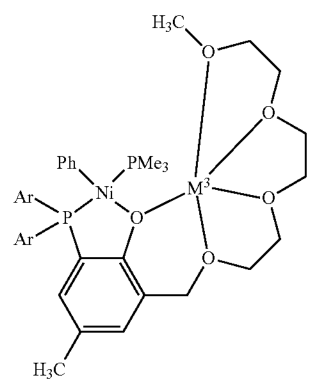

wherein,

Ar is 2,6-dimethoxyphenyl;

Ph is a phenyl group;

$M^3$ is a 2+ cation, 3+ cation, 4+ cation, or 5+ cation; and $PMe_3$ is trimethylphosphine.

In some embodiments, the heterobimetallic catalyst of Formula (11-A) is a heterobimetallic catalyst of Formula (11). In some embodiments, the heterobimetallic catalyst of Formula (11-B) is a heterobimetallic catalyst of Formula (11). In some embodiments, the heterobimetallic catalyst of Formula (12-A) is a heterobimetallic catalyst of Formula (12). In some embodiments, the heterobimetallic catalyst of Formula (12-B) is a heterobimetallic catalyst of Formula (12).

In some embodiments, the electron donating group is selected from the group consisting of: alkoxy, amino, hydroxy, and alkyl. In some embodiments, the electron donating group is selected from the group consisting of: alkoxy, phenoxy, amino, alkylamino, dialkylamino, hydroxy, alkyl, and cycloalkyl. In some embodiments, alkyl is selected from the group consisting of: —$CH_3$, —$CH_2CH_3$, —$CH_2CH_2CH_3$, and —$CH(CH_3)_2$. In some embodiments, the electron withdrawing group is selected from the group consisting of: $NO_2$, —CN, —C(O)-alkyl, and halo. In some embodiments, the electron withdrawing group is selected from the group consisting of: $NO_2$, —CN, —C(O)-alkyl, and halo.

In some embodiments, the phenyl group is

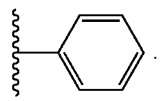

In some embodiments, L is an optionally substituted phenyl group. In some embodiments, the optionally substituted phenyl group is selected from the group consisting of phenyl, 2-methoxyphenyl, 4-methoxyphenyl, 2-acetylphenyl, or 2-(N-acetylamino)phenyl).

In some embodiments, $R^1$, $R^2$, and $R^3$ are each independently selected from optionally substituted aryl, optionally substituted alkyl, and optionally substituted cycloalkyl. In some embodiments, optionally substituted aryl is selected from the group consisting of phenyl, pentafluorophenyl, 2-methoxyphenyl, 2-methylphenyl, and 4-trifluoromethylphenyl. In some embodiments, optionally substituted alkyl is selected from the group consisting of methyl, ethyl, propyl, isopropyl, or tert-butyl. In some embodiments, optionally substituted cycloalkyl is cyclohexyl or adamantyl.

In some embodiments, M; is a 2+ cation. In some embodiments, $M^3$ is a 3+ cation. In some embodiments, $M^3$ is a 4+ cation. In some embodiments, $M^3$ is a 5+ cation. In some embodiments, the 2+ cation is $Mg^{2+}$, $Ca^{2+}$, $Sr^{2+}$, $Ba^{2+}$, $Fe^{2+}$, $Co^{2+}$, $Ni^{2+}$, $Cu^{2+}$, $Zn^{2+}$, $Ru^{2+}$, $Pd^{2+}$, $Os^{2+}$, or $Pt^{2+}$. In some embodiments, the 3+ cation is $Sc^{2+}$, $Mn^{3+}$, $Fe^{3+}$, $Co^{3+}$, $Ga^{3+}$, $Y^{3+}$, $Os^{3+}$, $Rh^{3+}$, $Ir^{3+}$, or $La^{3+}$. In some embodiments, the 4+ cation is $Ti^{4+}$, $Zr^{4+}$, $Hf^{4+}$, or $Ce^{4+}$. In some embodiments, the 5+ cation is $V^{5+}$, $Mn^{5+}$, $Nb^{5+}$, or $Ta^{5+}$.

Method for Catalyzing Homopolymerization of an Optionally Substituted Olefin

In various embodiments, the present invention provides a method for catalyzing homopolymerization of an optionally substituted olefin, comprising: combining or contacting an optionally substituted olefin with a heterobimetallic catalyst of Formula (11), Formula (12), Formula (11-A), Formula (12-A), Formula (11-B), or Formula (12-B), or combinations thereof, whereby the optionally substituted olefin undergoes homopolymerization.

In some embodiments, the step of combining or contacting the optionally substituted olefin with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for catalyzing homopolymerization further comprises combining or contacting at least one activator with the heterobimetallic catalyst and the optionally substituted olefin. In some embodiments, the at least one activator is Ni(COD)z or triarylborane. In some embodiments, the at least one activator is selected from the group consisting of $Ni(COD)_2$, triarylborane, methylaluminoxane, and trialkylaluminum.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, I-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for catalyzing homopolymerization of an optionally substituted olefin as provided herein. In various embodiments, the present invention provides a homopolymer formed by the method for catalyzing homopolymerization of an optionally substituted olefin as provided herein. In some embodiments, the polymer is monomodal or bimodal. In some embodiments the polymer is monomodal. In some embodiments, the polymer is bimodal. In some embodiments, the polymer is monomodal, or bimodal, or combination thereof. In some embodiments, the polymer is a homopolymer. In some embodiments, the homopolymer is monomodal or bimodal. In some embodiments, the homopolymer is monomodal. In some embodiments, the homopolymer is bimodal. In some embodiments, the homopolymer is monomodal, or bimodal, or combination thereof.

Methods for Polymerizing an Optionally Substituted Olefin

In various embodiments, the present invention provides a method for polymerizing an optionally substituted olefin, the method comprising contacting an optionally substituted olefin with a heterobimetallic catalyst of Formula (11), Formula (12), Formula (11-A), Formula (12-A), Formula (11-B), or Formula (12-B), or combinations thereof, and at least one activator under conditions effective to polymerize the optionally substituted olefin.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the optionally substituted olefin with the heterobimetallic catalyst and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from tetrahydrofuran, diethyl ether, dichloromethane, chloroform, N,N-dimethylforamide, dimethylsulfoxide, ethyl acetate, acetone, and water, and any combinations thereof.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, I-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for polymerizing an optionally substituted olefin as provided herein. In some embodiments, the polymer is monomodal or bimodal. In some embodiments, the polymer is monomodal. In some embodiments, the polymer is bimodal. In some embodiments, the polymer is monomodal, bimodal, or combination thereof.

Methods for Catalyzing Copolymerization of a First Olefin and at Least One Other Olefin In various embodiments, the present invention provides a method for catalyzing copolymerization of a first olefin and at least one other olefin, comprising: combining or contacting a first olefin and at least one other olefin with a heterobimetallic catalyst of Formula (11), Formula (12), Formula (11-A), Formula (12-A), Formula (11-B), or Formula (12-B), or combinations thereof, whereby the first olefin and the at least one other olefin undergoes copolymerization, and wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the step of combining or contacting the first olefin and the at least one other olefin with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the first olefin is selected from the group consisting of ethylene, propene, and styrene. In some embodiments the at least one other olefin is selected from the group consisting of 1-hexene, 1-octene, allyl benzene, acrylamide, acrylic acid, acrylic ester, vinyl halide, vinyl alcohol, and allyl alcohol.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for catalyzing copolymerization of a first olefin and at least one other olefin further comprises combining or contacting at least one activator with the heterobimetallic catalyst, the first olefin, and the at least one other olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, I-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first olefin is ethylene.

In various embodiments, the present invention provides a polymer formed by a method for catalyzing copolymerization of a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer.

In some embodiments, the polymer is monomodal or bimodal. In some embodiments, the polymer is monomodal.

In some embodiments, the polymer is bimodal. In some embodiments, the polymer is monomodal, bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Methods for Copolymerizing a First Olefin and at Least One Other Olefin

In various embodiments, the present invention provides a method for copolymerizing a first olefin and at least one other olefin, the method comprising contacting the first olefin and the at least one other olefin with a heterobimetallic catalyst of Formula (11), Formula (12), Formula (11-A), Formula (12-A), Formula (11-B), or Formula (12-B), or combinations thereof, and at least one activator under conditions effective to copolymerize the first olefin and the at least one other olefin, wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the first olefin and the at least one other olefin with the heterobimetallic catalyst and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the first olefin is ethylene.

In various embodiments, the present invention provides a polymer formed by a method for copolymerizing a first olefin and at least one other olefin as provided herein. In various embodiments, the present invention provides a polymer formed by the method for copolymerizing a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer.

In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method for Making a Compound

In various embodiments, the present invention provides a method for making a compound, the method comprising contacting a reactant with a heterobimetallic catalyst of Formula (11), Formula (12), Formula (11-A), Formula (12-A), Formula (11-B), or Formula (12-B), or combinations thereof under conditions effective to make the compound.

In some embodiments the reactant is methylaluminoxane, trialkylaluminium, alkyllithium, alkyl magnesium halide, or dialklylzinc.

In some embodiments, the step of contacting the reactant with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for making a compound further comprises contacting at least one activator with the heterobimetallic catalyst and the reactant. In some embodiments, the at least one activator is Ni(COD)z or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method.

Methods for Making a Compound

In various embodiments, the present invention provides a method for making a compound, the method comprising contacting a first reactant and at least one other reactant with a heterobimetallic catalyst of Formula (11), Formula (12), Formula (11-A), Formula (12-A), Formula (11-B), or Formula (12-B), or combinations thereof under conditions effective to make the compound.

In some embodiments, the step of contacting the first reactant and the at least one other reactant with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for making a compound further comprises contacting at least one activator with the catalyst, the first reactant, and the at least one other reactant. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method. In some embodiments, the first reactant and the at least one other reactant are different from one another.

Methods of Making a Polymer

In various embodiments, the present invention provides a method of making a polymer, comprising contacting a monomer with a heterobimetallic catalyst of Formula (11), Formula (12), Formula (11-A), Formula (12-A), Formula (11-B), or Formula (12-B), or combinations thereof.

In some embodiments, the monomer is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the step of contacting the monomer with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method of making a polymer further comprises contacting at least one activator with the heterobimetallic catalyst and the monomer. In some embodiments, the at least one activator is selected from the group consisting of $Ni(COD)_2$, triarylborane, methylaluminoxane, and trialkylaluminum.

In some embodiments, the monomer is an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the monomer is an optionally substituted terminal olefin or an optionally substituted internal olefin. In some embodiments, the monomer is selected from the group consisting of ethylene, an optionally substituted terminal olefin, and an optionally substituted internal olefin. In some embodiments, the monomer is ethylene.

In various embodiments, the present invention provides a polymer made by a method of making a polymer as provided herein. In some embodiments, the polymer is bimodal or monomodal. In some embodiments, the polymer is monomodal. In some embodiments, the polymer is bimodal. In some embodiments, the polymer is monomodal, bimodal, or combination thereof.

Method of Making a Copolymer

In various embodiments, the present invention provides a method of making a copolymer, comprising contacting a first monomer and at least one other monomer with a heterobimetallic catalyst of Formula (11), Formula (12), Formula (11-A), Formula (12-A), Formula (11-B), or Formula (12-B), or combinations thereof, wherein the first monomer and the at least one other monomer are different from one another.

In some embodiments, the first monomer and the at least one other monomer are different from one another. In some embodiments, the at least one other monomer is at least one second monomer. In some embodiments, the first monomer and the at least one second monomer are different from one another.

In various embodiments, the step of contacting the first monomer and the at least one other monomer with the heterobimetallic catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In various embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In various embodiments, the method of making a copolymer further comprises contacting at least one activator with the heterobimetallic catalyst, the first monomer, and the at least one other monomer. In some embodiments, the first monomer is ethylene, propene, 1-butene, 1-hexene, 1-octene, styrene, or allyl bezene. In some embodiments, the at least one other monomer is acrylamide, acrylic acid, acrylic ester, vinyl halide, vinyl alcohol, or allyl alcohol.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first monomer and the at least one other monomer are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first monomer and the at least one other monomer are each independently an optionally substituted terminal olefin or an optionally substituted internal olefin. In some embodiments, the first monomer and the at least one other monomer are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first monomer is ethylene. In various embodiments, the present invention provides a polymer formed by the method for catalyzing copolymerization of a first monomer and at least one other monomer. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer.

In various embodiments, the present invention provides a copolymer made by a method of making a copolymer as provided herein. In various embodiments, the present invention provides a polymer made by a method of making a copolymer as provided herein. In some embodiments, the polymer is a copolymer. In some embodiments, the copolymer is selected from the group consisting of a random copolymer, block copolymer, and gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, bimodal, or combination thereof. In some embodiments, the first monomer is $CO_2$; and the at least one other monomer is an epoxide.

Bimetallic Catalyst Complex of Formula (13), Formula (14), Formula (13-A). Formula (14-A), Formula (13-B), Formula (14-B).

In various embodiments, the present invention provides a bimetallic catalyst complex having a structure selected from Formula (13) and Formula (14):

Formula (13)

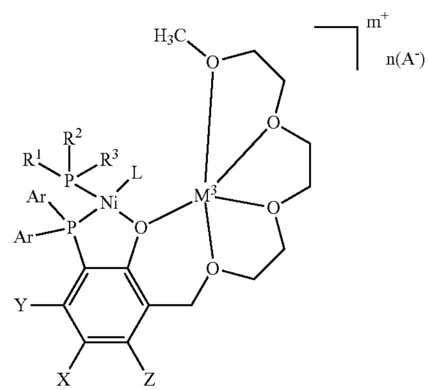

, and

Formula (14)

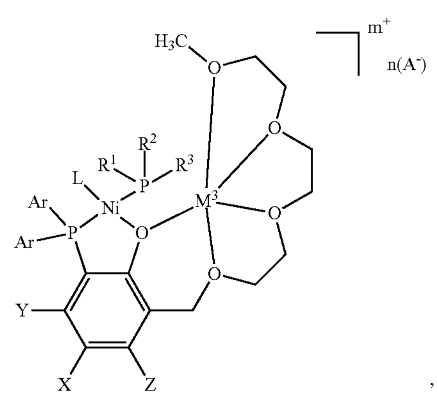

, wherein in Formula (13) and Formula (14):

m is 2, 3, 4, or 5;

n is 1, 2, 3, 4, or 5;

Ar is 2,6-dimethoxyphenyl;

L is an optionally substituted phenyl group;

$M^3$ is a 2+ cation, 3+ cation, 4+ cation, or 5+ cation;

$A^-$ is a weakly coordinating anion;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure of Formula (13):

Formula (13)

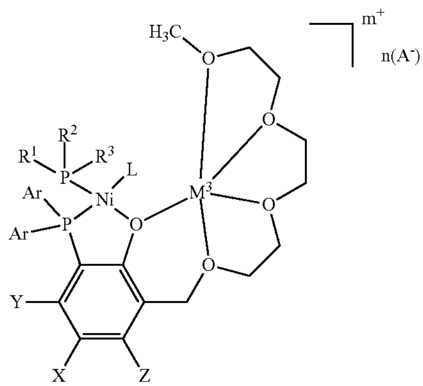

wherein, m is 2, 3, 4, or 5;

n is 1, 2, 3, 4, or 5;

Ar is 2,6-dimethoxyphenyl;

L is an optionally substituted phenyl group;

$M^3$ is a 2+ cation, 3+ cation, 4+ cation, or 5+ cation;

$A^-$ is a weakly coordinating anion;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure of Formula (14):

Formula (14)

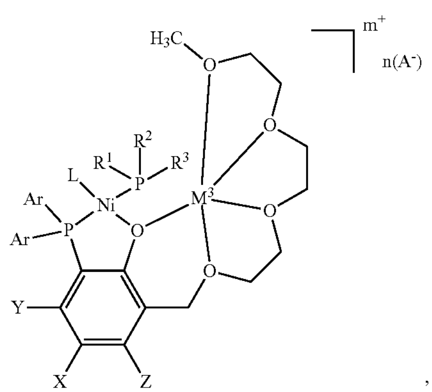

wherein, m is 2, 3, 4, or 5;

n is 1, 2, 3, 4, or 5;

Ar is 2,6-dimethoxyphenyl;

L is an optionally substituted phenyl group;

$M^3$ is a 2+ cation, 3+ cation, 4+ cation, or 5+ cation;

$A^-$ is a weakly coordinating anion;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure selected from Formula (13-A) and Formula (14-A):

Formula (13-A)

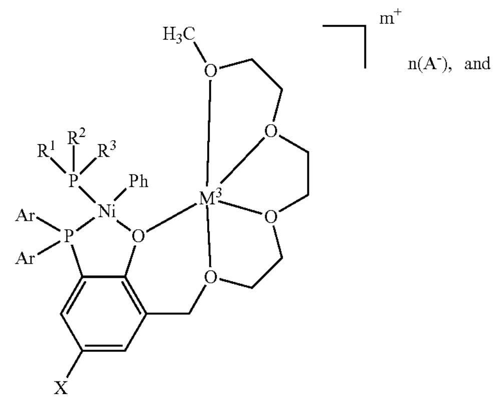

Formula (14-A)

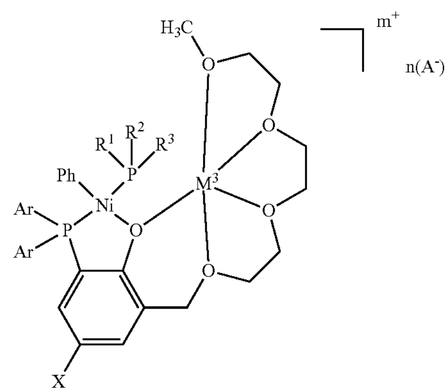

wherein Formula (13-A) and Formula (14-A):

m is 2, 3, 4, or 5;

n is 1, 2, 3, 4, or 5;

Ar is 2,6-dimethoxyphenyl;

Ph is a phenyl group;

$M^3$ is a 2+ cation, 3+ cation, 4+ cation, or 5+ cation;

K is a weakly coordinating anion;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure of Formula (13-A):

Formula (13-A)

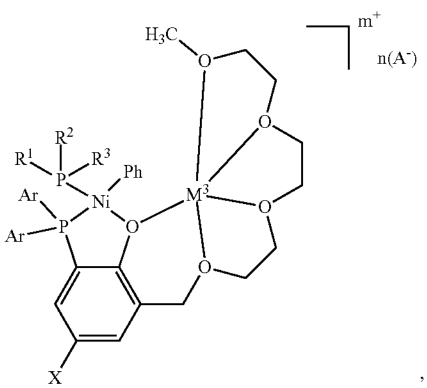

wherein, m is 2, 3, 4, or 5;

n is 1, 2, 3, 4, or 5;

Ar is 2,6-dimethoxyphenyl;

Ph is a phenyl group;

$M^3$ is a 2+ cation, 3+ cation, 4+ cation, or 5+ cation;

$A^-$ is a weakly coordinating anion;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure of Formula (14-A):

Formula (14-A)

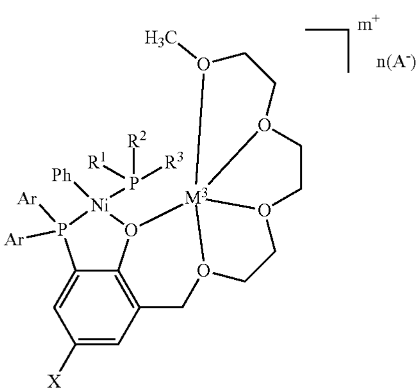

wherein, m is 2, 3, 4, or 5;

n is 1, 2, 3, 4, or 5;

Ar is 2,6-dimethoxyphenyl;

Ph is a phenyl group;

$M^3$ is a 2+ cation, 3+ cation, 4+ cation, or 5+ cation;

$A^-$ is a weakly coordinating anion;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

In various embodiments, the present invention provides a bimetallic catalyst complex having a structure selected from Formula (13-B) and Formula (14-B):

Formula (13-B)

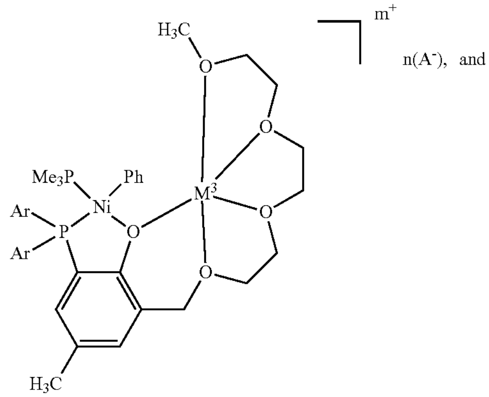

Formula (14-B)

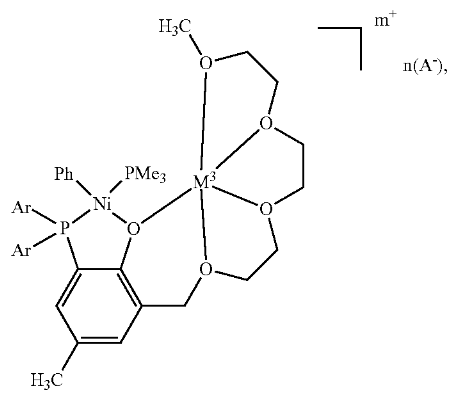

wherein Formula (13-B) and Formula (14-B):

m is 2, 3, 4, or 5;

n is 1, 2, 3, 4, or 5;

Ar is 2,6-dimethoxyphenyl;

Ph is a phenyl group;

$M^3$ is a 2+ cation, 3+ cation, 4+ cation, or 5+ cation;

$A^-$ is $[(3,5\text{-}(CF_3)_2C_6H_3)_4B]^-$; and $PMe_3$ is trimethylphosphine.

In various embodiments, the present invention provides a bimetallic catalyst complex having a structure of Formula (13-B) is:

Formula (13-B)

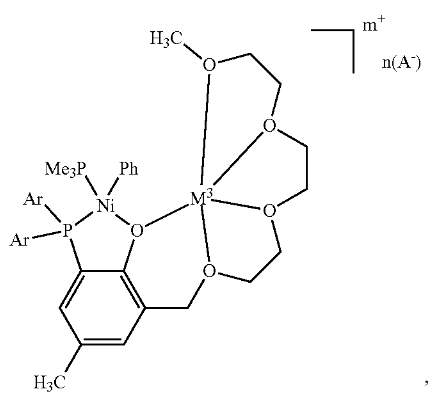

wherein, m is 2, 3, 4, or 5;

n is 1, 2, 3, 4, or 5;

Ar is 2,6-dimethoxyphenyl;

Ph is a phenyl group;

$M^3$ is a 2+ cation, 3+ cation, 4+ cation, or 5+ cation;

$A^-$ is $[(3,5\text{-}(CF_3)_2C_6H_3)_4B]^-$; and $PMe_3$ is trimethylphosphine.

In various embodiments, the present invention provides a bimetallic catalyst complex having a structure of Formula (14-B):

Formula (14-B)

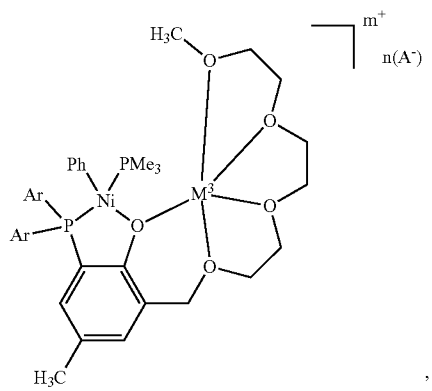

, wherein, m is 2, 3, 4, or 5;

n is 1, 2, 3, 4, or 5;

Ar is 2,6-dimethoxyphenyl;

Ph is a phenyl group;

$M^3$ is a 2+ cation, 3+ cation, 4+ cation, or 5+ cation;

$A^-$ is $[(3,5\text{-}(CF_3)_2C_6H_3)_4B]^-$; and $PMe_3$ is trimethylphosphine.

In some embodiments, the bimetallic catalyst complex of Formula (13-A) is a bimetallic catalyst complex of Formula (13). In some embodiments, the bimetallic catalyst complex of Formula (13-B) is a bimetallic catalyst complex of Formula (13). In some embodiments, the bimetallic catalyst complex of Formula (14-A) is a bimetallic catalyst complex of Formula (14). In some embodiments, the bimetallic catalyst complex of Formula (14-B) is a bimetallic catalyst complex of Formula (14).

In some embodiments, in the bimetallic catalyst complex of Formula (13) and Formula (14), m is 2, 3, 4, or 5; n is 2, 3, 4, or 5; Ar is 2,6-dimethoxyphenyl; L is a phenyl group; $M^3$ is a 2+ cation, 3+ cation, 4+ cation, or 5+ cation; $A^-$ is $[(3,5\text{-}(CF_3)_2C_6H_3)_4B]^-$; X is methyl; Y is hydrogen; Z is hydrogen; and $R^1$, $R^2$, and R; are each methyl.

In some embodiments, $A^-$ is a weakly coordinating anion. In some embodiments, the weakly coordinating anion is selected from the group consisting of tetrakis(3,5-bis(trifluoromethyl)phenylborate, tetrakis(pentafluorophenyl)borate, tetraphenylborate, trifluoromethylsulfonate, hexafluorophosphate, hexafluoroantimonate, and tetrafluoroborate. In some embodiments, tetrakis(3,5-bis(trifluoromethyl)phenylborate is represented as $[(3,5\text{-}(CF_3)_2C_6H_3)_4B]^-$. In some embodiments, tetrakis(3,5-bis(trifluoromethyl)phenylborate is represented as $BAr^F{}_4{}^-$.

In some embodiments, the electron donating group is selected from the group consisting of: alkoxy, amino, hydroxy, and alkyl. In some embodiments, the electron donating group is selected from the group consisting of: alkoxy, phenoxy, amino, alkylamino, dialkylamino, hydroxy, alkyl, and cycloalkyl. In some embodiments, alkyl is selected from the group consisting of: —$CH_3$, —$CH_2CH_3$, —$CH_2CH_2CH_3$, and —$CH(CH_3)_2$. In some embodiments, the electron withdrawing group is selected from the group consisting of: $NO_2$, —CN, —C(O)-alkyl, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2R$, —$PO_3H$, —$PO_3R$, —$CF_3$, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2$alkyl, —$PO_3H$, —$PO_3$alkyl, —$CF_3$, and halo.

In some embodiments, the phenyl group is

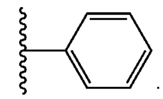 [SMILES: *c1ccccc1]

.

In some embodiments, $M^3$ is a 2+ cation. In some embodiments, $M^3$ is a 3+ cation. In some embodiments, $M^3$ is a 4+ cation. In some embodiments, $M^3$ is a 5+ cation. In some embodiments, $M^3$ is a 2+ cation. In some embodiments, $M^3$ is a 3+ cation. In some embodiments, $M^3$ is a 4+ cation. In some embodiments, $M^3$ is a 5+ cation. In some embodiments, the 2+ cation is $Mg^{2+}$, $Ca^{2+}$, $Sr^{2+}$, $Ba^{2+}$, $Fe^{2+}$, $Co^{2+}$, $Ni^{2+}$, $Cu^{2+}$, $Zn^{2+}$, $Ru^{2+}$, $Pd^{2+}$, $Os^{2+}$, or $Pt^{2+}$. In some embodiments, the 3+ cation is $Sc^{3+}$, $Mn^{3+}$, $Fe^{3+}$, $Co^{3+}$, $Ga^{3+}$, $Y^{3+}$, $Os^{3+}$, $Rh^{3+}$, $Ir^{3+}$, or $La^{3+}$. In some embodiments, the 4+ cation is $Ti^{4+}$, $Zr^{4+}$, $Hf^{4+}$, or $Ce^{4+}$. In some embodiments, the 5+ cation is $V^{5+}$, $Mn^{5+}$, $Nb^{5+}$, or $Ta^{5+}$.

In some embodiments, L is an optionally substituted phenyl group. In some embodiments, the optionally substituted phenyl group is selected from the group consisting of phenyl, 2-methoxyphenyl, 4-methoxyphenyl, 2-acetylphenyl, or 2-(N-acetylamino)phenyl). In some embodiments, L is a phenyl group.

In some embodiments, $R^1$, $R^2$, and $R^3$ are each independently selected from optionally substituted aryl, optionally substituted alkyl, and optionally substituted cycloalkyl. In some embodiments, optionally substituted aryl is selected from the group consisting of phenyl, pentafluorophenyl, 2-methoxyphenyl, 2-methylphenyl, and 4-trifluoromethylphenyl. In some embodiments, optionally substituted alkyl is selected from the group consisting of methyl, ethyl, propyl, isopropyl, or tert-butyl. In some embodiments, optionally substituted cycloalkyl is cyclohexyl or adamantyl.

Methods for Catalyzing Homopolymerization of an Optionally Substituted Olefin

In various embodiments, the present invention provides a method for catalyzing homopolymerization of an optionally substituted olefin, comprising: combining or contacting an optionally substituted olefin with a bimetallic catalyst complex of Formula (13), Formula (14), Formula (13-A), Formula (14-A), Formula (13-B), or Formula (14-B), or combinations thereof, whereby the optionally substituted olefin undergoes homopolymerization.

In some embodiments, the step of combining or contacting the optionally substituted olefin with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for catalyzing homopolymerization of an optionally substituted olefin further comprises combining or contacting at least one activator with the bimetallic catalyst complex and the optionally substituted olefin.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for catalyzing homopolymerization of an optionally substituted olefin as provided herein. In various embodiments, the present invention provides a homopolymer formed by the method for catalyzing homopolymerization of an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the polymer is a homopolymer. In some embodiments, the homopolymer is monomodal or bimodal. In some embodiments, the homopolymer is monomodal. In some embodiments, the homopolymer is bimodal. In some embodiments, the homopolymer is monomodal, or bimodal, or combination thereof.

Method for Polymerizing an Optionally Substituted Olefin

In various embodiments, the present invention provides a method for polymerizing an optionally substituted olefin, the method comprising contacting an optionally substituted olefin with a bimetallic catalyst complex of Formula (13), Formula (14), Formula (13-A), Formula (14-A), Formula (13-B), or Formula (14-B), or combinations thereof, and at least one activator under conditions effective to polymerize the optionally substituted olefin.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum In some embodiments, the step of contacting the optionally substituted olefin with the bimetallic catalyst complex and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from tetrahydrofuran, diethyl ether, dichloromethane, chloroform, N,N-dimethylformamide, dimethylsulfoxide, ethyl acetate, acetone, and water, and any combinations thereof.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for polymerizing an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof.

Methods for Catalyzing Copolymerization of a First Olefin and at Least One Other Olefin In various embodiments, the present invention provides a method for catalyzing copolymerization of a first olefin and at least one other olefin, comprising: combining or contacting a first olefin and at least one other olefin with a bimetallic catalyst complex of Formula (13), Formula (14), Formula (13-A), Formula (14-A), Formula (13-B), or Formula (14-B), or combinations thereof, whereby the first olefin and the at least one other olefin undergoes copolymerization, and wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the step of combining or contacting the first olefin and the at least one other olefin with the bimetallic catalyst complex is performed in the presence of at least one solvent.

In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the first olefin is selected from the group consisting of ethylene, propene, and styrene. In some embodiments the at least one other olefin is selected from the group consisting of 1-hexene, 1-octene, allyl benzene, acrylamide, acrylic acid, acrylic ester, vinyl halide, vinyl alcohol, and allyl alcohol.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for catalyzing copolymerization of a first olefin and at least one other olefin further comprises combining or contacting at least one activator with the bimetallic catalyst complex, the first olefin, and the at least one other olefin. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first olefin is ethylene.

In various embodiments, the present invention provides a polymer formed by a method for catalyzing copolymerization of a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Methods for Copolymerizing a First Olefin and at Least One Other Olefin

In various embodiments, the present invention provides a method for copolymerizing a first olefin and at least one other olefin, the method comprising contacting the first olefin and the at least one other olefin with a bimetallic catalyst complex of Formula (13), Formula (14), Formula (13-A), Formula (14-A), Formula (13-B), or Formula (14-B), or combinations thereof, and at least one activator under conditions effective to copolymerize the first olefin and the at least one other olefin, wherein the first olefin and the at least one other olefin are different from one another.

In some embodiments, the first olefin and the at least one other olefin are different from one another. In some embodiments, the at least one other olefin is at least one second olefin. In some embodiments, the first olefin and the at least one second olefin are different from one another.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the first olefin and the at least one other olefin with the bimetallic catalyst complex and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the first olefin is ethylene.

In various embodiments, the present invention provides a polymer formed by a method for copolymerizing a first olefin and at least one other olefin as provided herein. In various embodiments, the present invention provides a polymer formed by the method for copolymerizing a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Methods for Making a Compound

In various embodiments, the present invention provides a method for making a compound, the method comprising contacting a reactant with a bimetallic catalyst complex of Formula (13), Formula (14), Formula (13-A), Formula (14-A), Formula (13-B), or Formula (14-B), or combinations thereof under conditions effective to make the compound.

In some embodiments the reactant is methylaluminoxane, trialkylaluminium, alkyllithium, alkyl magnesium halide, or dialklylzinc.

In some embodiments, the step of contacting the reactant with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method of making a compound further comprises contacting at least one activator with the bimetallic catalyst complex and the reactant. In some embodiments, the at least one activator is $Ni(COD)_2$. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method.

Method for Making a Compound

In various embodiments, the present invention provides a method for making a compound, the method comprising contacting a first reactant and at least one other reactant with a bimetallic catalyst complex of Formula (13), Formula (14), Formula (13-A), Formula (14-A), Formula (13-B), or Formula (14-B), or combinations thereof under conditions effective to make the compound.

In some embodiments, the step of contacting the first reactant and the at least one other reactant with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for making a compound further comprises contacting at least one activator with the bimetallic catalyst complex, the first reactant, and the at least one other reactant. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method. In some embodiments, the first reactant and the at least one other reactant are different from one another.

Method of Making a Polymer

In various embodiments, the present invention provides a method of making a polymer, comprising contacting a monomer with a bimetallic catalyst complex of Formula (13), Formula (14), Formula (13-A), Formula (14-A), Formula (13-B), or Formula (14-B), or combinations thereof.

In some embodiments, the monomer is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the step of contacting the monomer with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the further comprising contacting at least one activator with the bimetallic catalyst complex and the monomer.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the monomer is an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the monomer is an optionally substituted terminal olefin or an optionally substituted internal olefin. In some embodiments, the monomer is selected from the group consisting of ethylene, an optionally substituted terminal olefin, and an optionally substituted internal olefin. In some embodiments, the monomer is ethylene.

In various embodiments, the present invention provides a polymer made by a method of making a polymer as provided herein. In some embodiments, the polymer is bimodal or monomodal. In some embodiments, the polymer is bimodal. In some embodiments, the polymer is monomodal. In some embodiments, the polymer is monomodal, or bimodal, or combination thereof.

Methods of Making a Copolymer

In various embodiments, the present invention provides a method of making a copolymer, comprising contacting a first monomer and at least one other monomer with a bimetallic catalyst complex of Formula (13), Formula (14), Formula (13-A), Formula (14-A), Formula (13-B), or Formula (14-B), or combinations thereof, wherein the first monomer and the at least one other monomer are different from one another.

In some embodiments, the first monomer and the at least one other monomer are different from one another. In some embodiments, the at least one other monomer is at least one second monomer. In some embodiments, the first monomer and the at least one second monomer are different from one another.

In some embodiments, the step of contacting the first monomer and the at least one other monomer with the bimetallic catalyst complex is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method of making a copolymer further comprises contacting at least one activator with the bimetallic catalyst complex, the first monomer, and the at least one other monomer. In some embodiments, the first monomer is ethylene, propene, 1-butene, 1-hexene, 1-octene, styrene, or allyl bezene. In some embodiments, the at least one other monomer is acrylamide, acrylic acid, acrylic ester, vinyl halide, vinyl alcohol, or allyl alcohol.

In some embodiments, the at least one activator is Ni(COD)z. In some embodiments, the at least one activator is selected from the group consisting of $Ni(COD)_2$, triarylborane, methylaluminoxane, and trialkylaluminum.

In some embodiments, the first monomer and the at least one other monomer are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first monomer and the at least one other monomer are each independently an optionally substituted terminal olefin or an optionally substituted internal olefin. In some embodiments, the first monomer and the at least one other monomer are each independently ethylene, an optionally substituted terminal olefin, or an optionally substituted internal olefin. In some embodiments, the optionally substituted terminal olefin is selected from the group consisting of propene, butene, 1-hexene, 1-heptene, I-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first monomer is ethylene.

In various embodiments, the present invention provides a polymer formed by the method for catalyzing copolymerization of a first monomer and at least one other monomer. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In various embodiments, the present invention provides a copolymer made by a method of making a copolymer as provided herein. In various embodiments, the present invention provides a polymer made by a method of making a copolymer as provided herein. In some embodiments, the polymer is a copolymer. In some embodiments, the copolymer is selected from the group consisting of a random copolymer, block copolymer, and gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is bimodal. In some embodiments, the copolymer is monomodal. In some embodiments, the copolymer is monomodal, or bimodal, or combination thereof. In some embodiments, the first monomer is $CO_2$; and the at least one other monomer is an epoxide.

Catalyst Composition Comprising at Least Four Bimetallic Catalyst Complexes: a Bimetallic Catalyst Complex of Formula (15), a Bimetallic Catalyst Complex of Formula (16), a Bimetallic catalyst complex of Formula (17), and a Bimetallic Catalyst Complex of Formula (18).

In various embodiments, the present invention provides a catalyst composition, comprising at least four bimetallic catalyst complexes, wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18): wherein the bimetallic catalyst complex of Formula (15) has the structure:

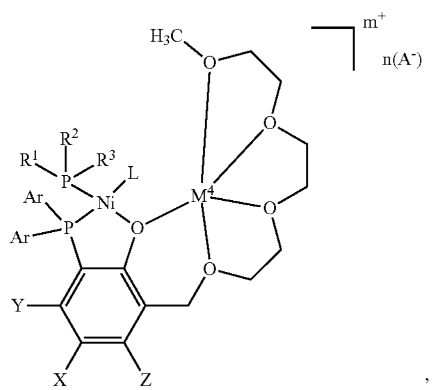

, wherein the bimetallic catalyst complex of Formula (16) has the structure;

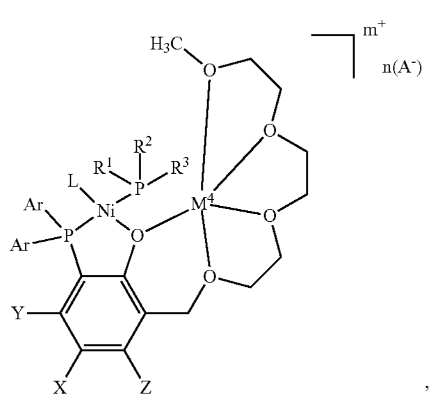

, wherein the bimetallic catalyst complex of Formula (17) has the structure:

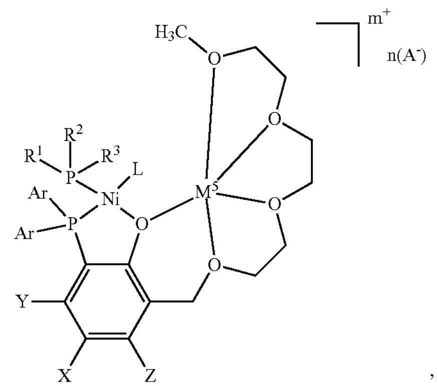

, wherein the bimetallic catalyst complex of Formula (18) has the structure:

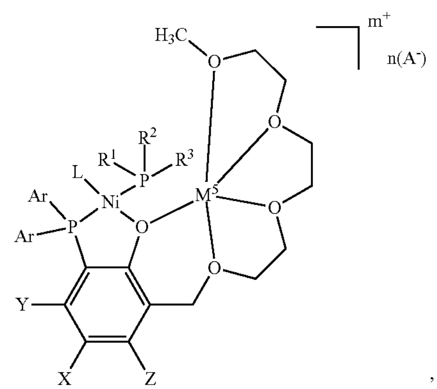

, wherein in Formula (15), Formula (16), Formula (17) and Formula (18);

m is 2, 3, 4, or 5;

n is 1, 2, 3, 4, or 5;

Ar is 2,6-dimethoxyphenyl;

L is an optionally substituted phenyl group;

$M^4$ is a 2+ cation, 3+ cation, 4+ cation, or 5+ cation;

$M^5$ is a 2+ cation, 3+ cation, 4+ cation, or 5+ cation;

$A^-$ is a weakly coordinating anion;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl;

wherein m is the same in the bimetallic catalyst complex of Formula (15), Formula (16), Formula (17), and Formula (18);

wherein n is the same in the bimetallic catalyst complex of Formula (15), Formula (16), Formula (17), and Formula (18);

wherein $A^-$ is the same in the bimetallic catalyst complex of Formula (15), Formula (16), Formula (17), and Formula (18);

wherein Ar is the same in the bimetallic catalyst complex of Formula (15), Formula (16), Formula (17), and Formula (18);

wherein L is the same in the bimetallic catalyst complex of Formula (15), Formula (16), Formula (17), and Formula (18);

wherein X is the same in the bimetallic catalyst complex of Formula (15), Formula (16), Formula (17), and Formula (18);

wherein Y is the same in the bimetallic catalyst complex of Formula (15), Formula (16), Formula (17), and Formula (18);

wherein Z is the same in the bimetallic catalyst complex of Formula (15), Formula (16), Formula (17), and Formula (18);

wherein $R^1$ is the same in the bimetallic catalyst complex of Formula (15), Formula (16), Formula (17), and Formula (18);

wherein $R^2$ is the same in the bimetallic catalyst complex of Formula (15), Formula (16), Formula (17), and Formula (18);

wherein $R^3$ is the same in the bimetallic catalyst complex of Formula (15), Formula (16), Formula (17), and Formula (18);

wherein $M^4$ is the same in the bimetallic catalyst complex of Formula (15) and Formula (16);

wherein $M^5$ is the same in the bimetallic catalyst complex of Formula (17) and Formula (18);

and wherein $M^4$ and $M^5$ are different from one another.

In various embodiments, the present invention provides a catalyst composition, comprising at least four bimetallic catalyst complexes, wherein the at least four bimetallic catalyst complexes are selected from: a bimetallic catalyst complex of Formula (15-A), a bimetallic catalyst complex of Formula (16-A), a bimetallic catalyst complex of Formula (17-A), and a bimetallic catalyst complex of Formula (18-A): wherein the bimetallic catalyst complex of Formula (15-A) has the structure:

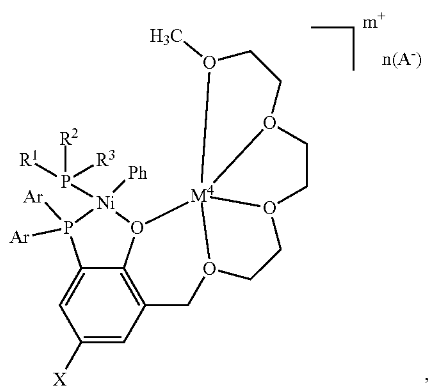

, wherein the bimetallic catalyst complex of Formula (16-A) has the structure:

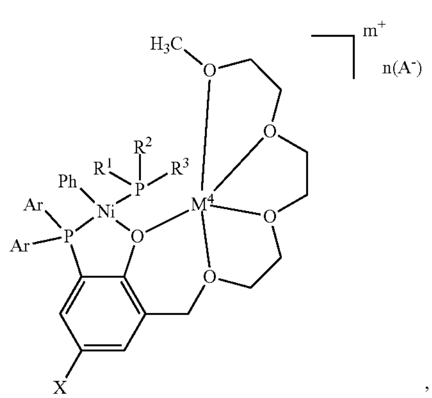

, wherein the bimetallic catalyst complex of Formula (17-A) has the structure:

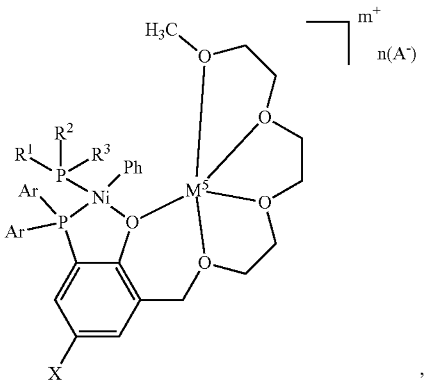

, wherein the bimetallic catalyst complex of Formula (18-A) has the structure:

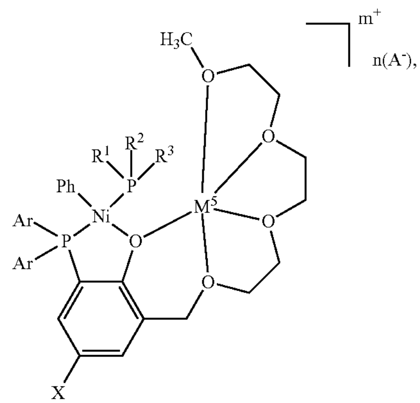

wherein in Formula (15-A), Formula (16-A), Formula (17-A) and Formula (18-A):

m is 2, 3, 4, or 5;

n is 1, 2, 3, 4, or 5;

Ar is 2,6-dimethoxyphenyl;

Ph is a phenyl group;

$M^4$ is a 2+ cation, 3+ cation, 4+ cation, or 5+ cation;

$M^5$ is a 2+ cation, 3+ cation, 4+ cation, or 5+ cation;

$A^-$ is a weakly coordinating anion;

X is hydrogen, an electron donating group, or an electron withdrawing group; and $R^1$, $R^2$, and $R^3$ are each independently selected from optionally substituted aryl, optionally substituted alkyl, and optionally substituted cycloalkyl;

wherein m is the same in the bimetallic catalyst complex of Formula (15-A), Formula (16-A), Formula (17-A), and Formula (18-A);

wherein n is the same in the bimetallic catalyst complex of Formula (15-A), Formula (16-A), Formula (17-A), and Formula (18-A);

wherein $A^-$ is the same in the bimetallic catalyst complex of Formula (15-A), Formula (16-A), Formula (17-A), and Formula (18-A);

wherein Ar is the same in the bimetallic catalyst complex of Formula (15-A), Formula (16-A), Formula (17-A), and Formula (18-A);

wherein Ph is the same in the bimetallic catalyst complex of Formula (15-A), Formula (16-A), Formula (17-A), and Formula (18-A);

wherein X is the same in the bimetallic catalyst complex of Formula (15-A), Formula (16-A), Formula (17-A), and Formula (18-A);

wherein $R^1$ is the same in the bimetallic catalyst complex of Formula (15-A), Formula (16-A), Formula (17-A), and Formula (18-A);

wherein $R^2$ is the same in the bimetallic catalyst complex of Formula (15-A), Formula (16-A), Formula (17-A), and Formula (18-A);

wherein $R^3$ is the same in the bimetallic catalyst complex of Formula (15-A), Formula (16-A), Formula (17-A), and Formula (18-A);

wherein $M^4$ is the same in the bimetallic catalyst complex of Formula (15-A) and Formula (16-A);

wherein M is the same in the bimetallic catalyst complex of Formula (17-A) and Formula (18-A);

and wherein $M^4$ and $M^5$ are different from one another.

In various embodiments, the present invention provides a catalyst composition, comprising at least four bimetallic catalyst complexes, wherein the at least four bimetallic catalyst complexes are selected from: a bimetallic catalyst complex of Formula (15-B), a bimetallic catalyst complex of Formula (16-B), a bimetallic catalyst complex of Formula (17-B), and a bimetallic catalyst complex of Formula (18-B); wherein the bimetallic catalyst complex of Formula (15-B) has the structure:

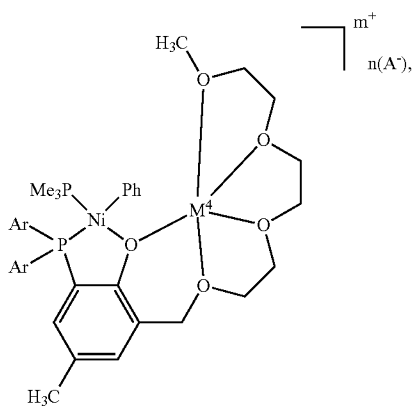

wherein the bimetallic catalyst complex of Formula (16-B) has the structure:

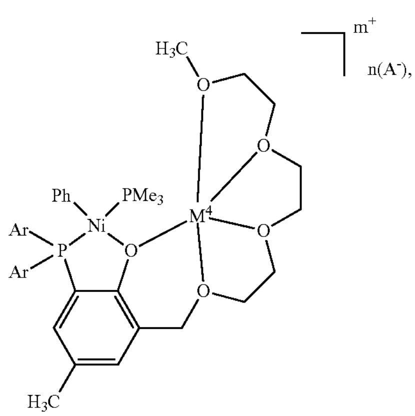

wherein the bimetallic catalyst complex of Formula (17-B) has the structure:

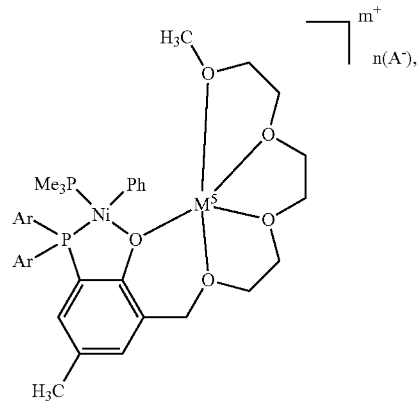

wherein the bimetallic catalyst complex of Formula (18-B) has the structure:

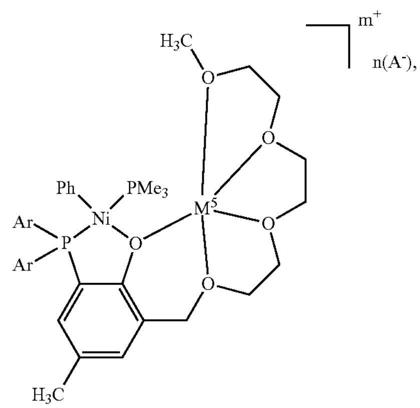

wherein in Formula (15-B), Formula (16-B), Formula (17-B) and Formula (18-B);

m is 2, 3, 4, or 5;

n is 1, 2, 3, 4, or 5;

Ar is 2,6-dimethoxyphenyl;

Ph is a phenyl group;

$M^4$ is a 2+ cation, 3+ cation, 4+ cation, or 5+ cation;

$M^5$ is a 2+ cation, 3+ cation, 4+ cation, or 5+ cation;

$A^-$ is $[(3,5\text{-}(CF_3)_2C_6H_3)_4B]^-$; and $PMe_3$ is trimethylphosphine;

wherein m is the same in the bimetallic catalyst complex of Formula (15-B), Formula (16-B), Formula (17-B), and Formula (18-B);

wherein n is the same in the bimetallic catalyst complex of Formula (15-B), Formula (16-B), Formula (17-B), and Formula (18-B);

wherein $A^-$ is the same in the bimetallic catalyst complex of Formula (15-B), Formula (16-B), Formula (17-B), and Formula (18-B);

wherein Ar is the same in the bimetallic catalyst complex of Formula (15-B), Formula (16-B), Formula (17-B), and Formula (18-B);

wherein Ph is the same in the bimetallic catalyst complex of Formula (15-B), Formula (16-B), Formula (17-B), and Formula (18-B);

wherein $PMe_3$ is the same in the bimetallic catalyst complex of Formula (15-B), Formula (16-B), Formula (17-B), and Formula (18-B);

wherein $M^4$ is the same in the bimetallic catalyst complex of Formula (15-B) and Formula (16-B);

wherein $M^5$ is the same in the bimetallic catalyst complex of Formula (17-B) and Formula (18-B);

and wherein $M^4$ and $M^5$ are different from one another.

In some embodiments, the bimetallic catalyst complex of Formula (15-A) is a bimetallic catalyst complex of Formula (15). In some embodiments, the bimetallic catalyst complex of Formula (15-B) is a bimetallic catalyst complex of Formula (15). In some embodiments, the bimetallic catalyst complex of Formula (16-A) is a bimetallic catalyst complex of Formula (16). In some embodiments, the bimetallic catalyst complex of Formula (16-B) is a bimetallic catalyst complex of Formula (16). In some embodiments, the bimetallic catalyst complex of Formula (17-A) is a bimetallic catalyst complex of Formula (17). In some embodiments, the bimetallic catalyst complex of Formula (17-B) is a bimetallic catalyst complex of Formula (17). In some embodiments, the bimetallic catalyst complex of Formula (18-A) is a bimetallic catalyst complex of Formula (18). In some embodiments, the bimetallic catalyst complex of Formula (18-B) is a bimetallic catalyst complex of Formula (18).

In some embodiments, in Formula (15), Formula (16), Formula (17) and Formula (18): m is 2, 3, 4, or 5; n is 2, 3, 4, or 5; Ar is 2,6-dimethoxyphenyl; L is a phenyl group; $M^4$ is a 2+ cation, 3+ cation, 4+ cation, or 5+ cation; $M^5$ is a 2+ cation, 3+ cation, 4+ cation, or 5+ cation; $A^-$ is $[(3,5\text{-}(CF_3)_2C_6H_3)_4B]^-$; X is methyl; Y is hydrogen; Z is hydrogen; and $R^1$, $R^2$, and $R^3$ are each methyl, wherein m is the same in the bimetallic catalyst complex of Formula (15), Formula (16), Formula (17), and Formula (18); wherein n is the same in the bimetallic catalyst complex of Formula (15), Formula (16), Formula (17), and Formula (18): wherein $A^-$ is the same in the bimetallic catalyst complex of Formula (15), Formula (16), Formula (17), and Formula (18); wherein Ar is the same in the bimetallic catalyst complex of Formula (15), Formula (16), Formula (17), and Formula (18); wherein L is the same in the bimetallic catalyst complex of Formula (15), Formula (16), Formula (17), and Formula (18); wherein X is the same in the bimetallic catalyst complex of Formula (15), Formula (16), Formula (17), and Formula (18); wherein Y is the same in the bimetallic catalyst complex of Formula (15), Formula (16), Formula (17), and Formula (18); wherein Z is the same in the bimetallic catalyst complex of Formula (15), Formula (16), Formula (17), and Formula (18); wherein $R^1$ is the same in the bimetallic catalyst complex of Formula (15), Formula (16), Formula (17), and Formula (18); wherein $R^2$ is the same in the bimetallic catalyst complex of Formula (15), Formula (16), Formula (17), and Formula (18), wherein $R^3$ is the same in the bimetallic catalyst complex of Formula (15), Formula (16), Formula (17), and Formula (18); wherein $M^4$ is the same in the bimetallic catalyst complex of Formula (15) and Formula (16); wherein $M^5$ is the same in the bimetallic catalyst complex of Formula (17) and Formula (18); and wherein $M^4$ and M are different from one another.

In some embodiments, $A^-$ is a weakly coordinating anion. In some embodiments, the weakly coordinating anion is selected from the group consisting of tetrakis(3,5-bis(trifluoromethyl)phenylborate, tetrakis(pentafluorophenyl)borate, tetraphenylborate, trifluoromethylsulfonate, hexafluorophosphate, hexafluoroantimonate, and tetrafluoroborate. In some embodiments, tetrakis(3,5-bis(trifluoromethyl)phenylborate is represented as $[(3,5\text{-}(CF_3)_2C_6H_3)_4B]^-$. In some embodiments, tetrakis(3,5-bis(trifluoromethyl)phenylborate is represented as $BAr^F{}_4{}^-$.

In some embodiments, the electron donating group is selected from the group consisting of: alkoxy, amino, hydroxy, and alkyl. In some embodiments, the electron donating group is selected from the group consisting of: alkoxy, phenoxy, amino, alkylamino, dialkylamino, hydroxy, alkyl, and cycloalkyl.

In some embodiments, alkyl is selected from the group consisting of: —$CH_3$, —$CH_2CH_3$, —$CH_2CH_2CH_3$, and —$CH(CH_3)_2$.

In some embodiments, the electron withdrawing group is selected from the group consisting of: $NO_2$, —CN, —C(O)-alkyl, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2R$, —$PO_3H$, —$PO_3R$, —$CF_3$, and halo. In some embodiments, the electron withdrawing group is selected from the group consisting of: $NO_2$, —CN, —C(O)-alkyl, C(O)Oalkyl, C(O)Nalkyl, —$SO_3H$, —$SO_2$alkyl, —$PO_3H$, —$PO_3$alkyl, —$CF_3$, and halo.

In some embodiments, the phenyl group is

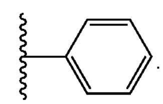

In some embodiments, L is an optionally substituted phenyl group. In some embodiments, the optionally substituted phenyl group is selected from the group consisting of phenyl, 2-methoxyphenyl, 4-methoxyphenyl, 2-acetylphenyl, or 2-(N-acetylamino)phenyl). In some embodiments, L is a phenyl group.

In some embodiments, $R^1$, $R^2$, and $R^3$ are each independently selected from optionally substituted aryl, optionally substituted alkyl, and optionally substituted cycloalkyl. In some embodiments, optionally substituted aryl is selected from the group consisting of phenyl, pentafluorophenyl, 2-methoxyphenyl, 2-methylphenyl, and 4-trifluoromethylphenyl. In some embodiments, optionally substituted alkyl is selected from the group consisting of methyl, ethyl, propyl, isopropyl, or tert-butyl. In some embodiments, optionally substituted cycloalkyl is cyclohexyl or adamantyl.

In some embodiments, m is 2, 3, 4, or 5. In some embodiments, m is 2. In some embodiments, m is 3. In some embodiments, m is 4. In some embodiments, m is 5.

In some embodiments, n is 2, 3, 4, or 5. In some embodiments, n is 2. In some embodiments, n is 3. In some embodiments, n is 4. In some embodiments, n is 5.

In some embodiments, $M^4$ is a 2+ cation. In some embodiments, $M^4$ is a 3+ cation. In some embodiments, $M^4$ is a 4+ cation. In some embodiments, $M^4$ is a 5+ cation. In some embodiments, $M^5$ is a 2+ cation. In some embodiments, M is a 3+ cation. In some embodiments, $M^5$ is a 4+ cation. In some embodiments, $M^5$ is a 5+ cation. In some embodiments, the 2+ cation is $Mg^{2+}$, $Ca^{2+}$, $Sr^{2+}$, $Ba^{2+}$, $Fe^{2+}$, $Co^{2+}$, $Ni^{2+}$, $Cu^{2+}$, $Zn^{2+}$, $Ru^{2+}$, $Pd^{2+}$, $Os^{2+}$, or $Pt^{2+}$. In some embodiments, the 3+ cation is $Sc^{3+}$, $Mn^{3+}$, $Fe^{3+}$, $Co^{3+}$, $Ga^{3+}$, $Y^{3+}$, $Os^{3+}$, $Rh^{3+}$, $Ir^{3+}$, or $La^{3+}$. In some embodiments, the 4+ cation is $Ti^{4+}$, $Zr^{4+}$, $Hf^{4+}$, or $Ce^{4+}$. In some embodiments, the 5+ cation is $V^{5+}$, $Mn^{5+}$, $Nb^{5+}$, or $Ta^{5+}$.

Method for Catalyzing Homopolymerization of an Optionally Substituted Olefin

In various embodiments, the present invention provides a method for catalyzing homopolymerization of an optionally substituted olefin, comprising: combining or contacting an optionally substituted olefin with a catalyst composition, whereby the optionally substituted olefin undergoes homopolymerization, and wherein the catalyst composition comprises at least four bimetallic catalyst complexes, wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18).

In various embodiments, the present invention provides a method for catalyzing homopolymerization of an optionally substituted olefin, comprising: combining or contacting an optionally substituted olefin with a catalyst composition, whereby the optionally substituted olefin undergoes homopolymerization, and wherein the catalyst composition comprises at least four bimetallic catalyst complexes, wherein the at least four bimetallic catalyst complexes are selected from: a bimetallic catalyst complex of Formula (15A), a bimetallic catalyst complex of Formula (16A), a bimetallic catalyst complex of Formula (17A), and a bimetallic catalyst complex of Formula (18A).

In various embodiments, the present invention provides a method for catalyzing homopolymerization of an optionally substituted olefin, comprising: combining or contacting an optionally substituted olefin with a catalyst composition, whereby the optionally substituted olefin undergoes homopolymerization, and wherein the catalyst composition comprises at least four bimetallic catalyst complexes, wherein the at least four bimetallic catalyst complexes are selected from: a bimetallic catalyst complex of Formula (15B), a bimetallic catalyst complex of Formula (16B), a bimetallic catalyst complex of Formula (17B), and a bimetallic catalyst complex of Formula (18B).

In some embodiments, the step of combining or contacting the optionally substituted olefin with the catalyst is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for catalyzing homopolymerization of an optionally substituted olefin further comprises combining or contacting at least one activator with the catalyst and the optionally substituted olefin.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for catalyzing homopolymerization of an optionally substituted olefin as provided herein. In various embodiments, the present invention provides a homopolymer formed by the method for catalyzing homopolymerization of an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the polymer is a homopolymer. In some embodiments, the homopolymer is monomodal or bimodal. In some embodiments, the homopolymer is monomodal. In some embodiments, the homopolymer is bimodal. In some embodiments, the homopolymer is monomodal, or bimodal, or combination thereof.

Methods for Polymerizing an Optionally Substituted Olefin

In various embodiments, the present invention provides a method for polymerizing an optionally substituted olefin, the method comprising contacting an optionally substituted olefin with a catalyst composition and at least one activator under conditions effective to polymerize the optionally substituted olefin, wherein the catalyst composition comprises at least four bimetallic catalyst complexes, wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18).

In various embodiments, the present invention provides a method for polymerizing an optionally substituted olefin, the method comprising contacting an optionally substituted olefin with a catalyst composition and at least one activator under conditions effective to polymerize the optionally substituted olefin, wherein the catalyst composition comprises at least four bimetallic catalyst complexes, wherein the at least four bimetallic catalyst complexes are selected from: a bimetallic catalyst complex of Formula (15A), a bimetallic catalyst complex of Formula (16A), a bimetallic catalyst complex of Formula (17A), and a bimetallic catalyst complex of Formula (18A).

In various embodiments, the present invention provides a method for polymerizing an optionally substituted olefin, the method comprising contacting an optionally substituted olefin with a catalyst composition and at least one activator under conditions effective to polymerize the optionally substituted olefin, wherein the catalyst composition comprises at least four bimetallic catalyst complexes, wherein the at least four bimetallic catalyst complexes are selected from: a bimetallic catalyst complex of Formula (15B), a bimetallic catalyst complex of Formula (16B), a bimetallic catalyst complex of Formula (17B), and a bimetallic catalyst complex of Formula (18B).

In some embodiments, the at least one activator is $Ni(COD)_2$ and triarylborane. In some embodiments, the at least one activator is selected from the group consisting of $Ni(COD)_2$, triarylborane, methylaluminoxane, and trialkylaluminum.

In some embodiments, the step of contacting the optionally substituted olefin with the catalyst composition and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from tetrahydrofuran, diethyl ether, dichloromethane, chloroform, N,N-dimethylformamide, dimethylsulfoxide, ethyl acetate, acetone, and water, and any combinations thereof.

In some embodiments, the optionally substituted olefin is an optionally substituted terminal olefin or an optionally substituted internal olefin. In some embodiments, the optionally substituted olefin is selected from the group consisting of ethylene, an optionally substituted terminal olefin, and an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the optionally substituted olefin is ethylene. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In various embodiments, the present invention provides a polymer formed by a method for polymerizing an optionally substituted olefin as provided herein. In some embodiments, the polymer is monomodal or bimodal. In some embodiments, the polymer is monomodal. In some embodiments, the polymer is bimodal. In some embodiments, the polymer is monomodal, or bimodal, or combination thereof.

Method for Catalyzing Copolymerization of a First Olefin and at Least One Other Olefin In various embodiments, the present invention provides a method for catalyzing copolymerization of a first olefin and at least one other olefin, comprising: combining or contacting a first olefin and at least one other olefin with a catalyst composition, whereby the first olefin and the at least one other olefin undergoes copolymerization, and wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18).

In various embodiments, the present invention provides a method for catalyzing copolymerization of a first olefin and at least one other olefin, comprising: combining or contacting a first olefin and at least one other olefin with a catalyst composition, whereby the first olefin and the at least one other olefin undergoes copolymerization, and wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (15A), a bimetallic catalyst complex of Formula (16A), a bimetallic catalyst complex of Formula (17A), and a bimetallic catalyst complex of Formula (18A).

In various embodiments, the present invention provides a method for catalyzing copolymerization of a first olefin and at least one other olefin, comprising: combining or contacting a first olefin and at least one other olefin with a catalyst composition, whereby the first olefin and the at least one other olefin undergoes copolymerization, and wherein the first olefin and the at least one other olefin are different from one another, and wherein the catalyst composition comprises at least four bimetallic catalyst complexes, wherein the at least four bimetallic catalyst complexes are selected from: a bimetallic catalyst complex of Formula (15B), a bimetallic catalyst complex of Formula (16B), a bimetallic catalyst complex of Formula (17B), and a bimetallic catalyst complex of Formula (18B).

In some embodiments, the first olefin and the at least one other olefin are different from one another. In some embodiments, the at least one other olefin is at least one second olefin. In some embodiments, the first olefin and the at least one second olefin are different from one another.

In some embodiments, the step of combining or contacting the first olefin and the at least one other olefin with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the first olefin is selected from the group consisting of ethylene, propene, and styrene. In some embodiments the at least one other olefin is selected from the group consisting of 1-hexene, I-octene, allyl benzene, acrylamide, acrylic acid, acrylic ester, vinyl halide, vinyl alcohol, and allyl alcohol.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N- dimethylformamide, dimethylsulfoxide, ethyl acetate, acetone, and water, and any combinations thereof.

In some embodiments, the method for catalyzing copolymerization of a first olefin and at least one other olefin further comprises combining or contacting at least one activator with the catalyst composition, the first olefin, and the at least one other olefin.

In some embodiments, the at least one activator is $Ni(COD)_2$ and triarylborane. In some embodiments, the at least one activator is selected from the group consisting of $Ni(COD)_2$, triarylborane, methylaluminoxane, and trialkylaluminum.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first olefin is ethylene.

In various embodiments, the present invention provides a polymer formed by a method for catalyzing copolymerization of a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method for Copolymerizing a First Olefin and at Least One Other Olefin

In various embodiments, the present invention provides a method for copolymerizing a first olefin and at least one other olefin, the method comprising contacting the first olefin and the at least one other olefin with a catalyst composition, and at least one activator under conditions effective to copolymerize the first olefin and the at least one other olefin, wherein the first olefin and the at least one other olefin are different from one another, and wherein the catalyst composition comprises at least four bimetallic catalyst complexes, and wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18).

In various embodiments, the present invention provides a method for copolymerizing a first olefin and at least one other olefin, the method comprising contacting the first olefin and the at least one other olefin with a catalyst composition, and at least one activator under conditions effective to copolymerize the first olefin and the at least one other olefin, wherein the first olefin and the at least one other olefin are different from one another, and wherein the catalyst composition comprises at least four bimetallic catalyst complexes, and wherein the at least four bimetallic catalyst complexes are selected from: a bimetallic catalyst complex of Formula (15A), a bimetallic catalyst complex of Formula (16A), a bimetallic catalyst complex of Formula (17A), and a bimetallic catalyst complex of Formula (18A).

In various embodiments, the present invention provides a method for copolymerizing a first olefin and at least one other olefin, the method comprising contacting the first olefin and the at least one other olefin with a catalyst composition, and at least one activator under conditions effective to copolymerize the first olefin and the at least one other olefin, wherein the first olefin and the at least one other olefin are different from one another, and wherein the catalyst composition comprises at least four bimetallic catalyst complexes, and wherein the at least four bimetallic catalyst complexes are selected from: a bimetallic catalyst complex of Formula (15B), a bimetallic catalyst complex of Formula (16B), a bimetallic catalyst complex of Formula (17B), and a bimetallic catalyst complex of Formula (18B).

In some embodiments, the first olefin and the at least one other olefin are different from one another. In some embodiments, the at least one other olefin is at least one second olefin. In some embodiments, the first olefin and the at least one second olefin are different from one another.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the step of contacting the first olefin and the at least one other olefin with the catalyst composition and the at least one activator is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the first olefin and the at least one other olefin are each independently an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first olefin and the at least one other olefin are each independently an optionally substituted terminal olefin or an optionally substituted internal olefin. In some embodiments, the first olefin and the at least one other olefin are each independently ethylene, an optionally substituted terminal olefin, or an optionally substituted internal olefin. In some embodiments, the first olefin is ethylene.

In various embodiments, the present invention provides a polymer formed by a method for copolymerizing a first olefin and at least one other olefin as provided herein. In various embodiments, the present invention provides a polymer formed by the method for copolymerizing a first olefin and at least one other olefin as provided herein. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof.

Method of Making a Compound

In various embodiments, the present invention provides a method for making a compound, the method comprising contacting a reactant with a catalyst composition under conditions effective to make the compound, wherein the catalyst composition comprises at least four bimetallic catalyst complexes, and wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18).

In various embodiments, the present invention provides a method for making a compound, the method comprising contacting a reactant with a catalyst composition under conditions effective to make the compound, wherein the catalyst composition comprises at least four bimetallic catalyst complexes, and wherein the at least four bimetallic catalyst complexes are selected from: a bimetallic catalyst complex of Formula (15A), a bimetallic catalyst complex of Formula (16A), a bimetallic catalyst complex of Formula (17A), and a bimetallic catalyst complex of Formula (18A).

In various embodiments, the present invention provides a method for making a compound, the method comprising contacting a reactant with a catalyst composition under conditions effective to make the compound, wherein the catalyst composition comprises at least four bimetallic catalyst complexes, and wherein the at least four bimetallic catalyst complexes are selected from: a bimetallic catalyst complex of Formula (15B), a bimetallic catalyst complex of Formula (16B), a bimetallic catalyst complex of Formula (17B), and a bimetallic catalyst complex of Formula (18B).

In some embodiments the reactant is methylaluminoxane, trialkylaluminium, alkyllithium, alkyl magnesium halide, or dialklylzinc.

In some embodiments, the step of contacting the reactant with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylforamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylforamide, dimethylsulfoxide, ethyl acetate, acetone, and water, and any combinations thereof.

In some embodiments, the method for making a compound further comprises contacting at least one activator with the catalyst composition and the reactant. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method for making a compound is a cascade method.

Methods for Making a Compound

In various embodiments, the present invention provides a method for making a compound, the method comprising contacting a first reactant and at least one other reactant with a catalyst composition under conditions effective to make the compound, wherein the catalyst composition comprises at least four bimetallic catalyst complexes, and wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18).

In various embodiments, the present invention provides a method for making a compound, the method comprising contacting a first reactant and at least one other reactant with a catalyst composition under conditions effective to make the compound, wherein the catalyst composition comprises at least four bimetallic catalyst complexes, and wherein the at least four bimetallic catalyst complexes are selected from: a bimetallic catalyst complex of Formula (15A), a bimetallic catalyst complex of Formula (16A), a bimetallic catalyst complex of Formula (17A), and a bimetallic catalyst complex of Formula (18A).

In various embodiments, the present invention provides a method for making a compound, the method comprising contacting a first reactant and at least one other reactant with a catalyst composition under conditions effective to make the compound, wherein the catalyst composition comprises at least four bimetallic catalyst complexes, and wherein the at least four bimetallic catalyst complexes are selected from: a bimetallic catalyst complex of Formula (15B), a bimetallic catalyst complex of Formula (16B), a bimetallic catalyst complex of Formula (17B), and a bimetallic catalyst complex of Formula (18B).

In some embodiments, the step of contacting the first reactant and the at least one other reactant with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method for making a compound further comprises contacting at least one activator with the catalyst composition, the first reactant, and the at least one other reactant.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the compound is a small molecule. In some embodiments, the method of making a compound is a cascade method. In some embodiments, the first reactant and the at least one other reactant are different from one another.

Method of Making a Polymer

In various embodiments, the present invention provides a method of making a polymer, comprising contacting a monomer with the catalyst composition, wherein the catalyst composition comprises at least four bimetallic catalyst complexes, and wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18).

In various embodiments, the present invention provides a method of making a polymer, comprising contacting a monomer with the catalyst composition, wherein the catalyst composition comprises at least four bimetallic catalyst complexes, and wherein the at least four bimetallic catalyst complexes are selected from: a bimetallic catalyst complex of Formula (15A), a bimetallic catalyst complex of Formula (16A), a bimetallic catalyst complex of Formula (17A), and a bimetallic catalyst complex of Formula (18A).

In various embodiments, the present invention provides a method of making a polymer, comprising contacting a monomer with the catalyst composition, wherein the catalyst composition comprises at least four bimetallic catalyst complexes, and wherein the at least four bimetallic catalyst complexes are selected from: a bimetallic catalyst complex of Formula (15B), a bimetallic catalyst complex of Formula (16B), a bimetallic catalyst complex of Formula (17B), and a bimetallic catalyst complex of Formula (18B).

In some embodiments, the monomer is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the step of contacting the monomer with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof. In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method of making a polymer further comprising contacting at least one activator with the catalyst composition and the monomer. In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the monomer is an optionally substituted olefin. In some embodiments, the optionally substituted olefin is selected from the group consisting of ethylene, propene, butene, 1-hexene, 1-heptene, 1-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene. In some embodiments, the monomer is an optionally substituted terminal olefin or an optionally substituted internal olefin. In some embodiments, the monomer is selected from the group consisting of ethylene, an optionally substituted terminal olefin, and an optionally substituted internal olefin. In some embodiments, the monomer is ethylene.

In various embodiments, the present invention provides a polymer made by a method of making a polymer as provided herein. In some embodiments, the polymer is bimodal or monomodal. In some embodiments, the polymer is monomodal. In some embodiments, the polymer is bimodal. In some embodiments, the polymer is monomodal, or bimodal, or combination thereof.

Method of Making a Copolymer

In various embodiments, the present invention provides a method of making a copolymer, comprising contacting a first monomer and at least one other monomer with a catalyst composition, wherein the first monomer and the at least one other monomer are different from one another, wherein the catalyst composition comprises at least four bimetallic catalyst complexes, and wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18).

In various embodiments, the present invention provides a method of making a copolymer, comprising contacting a first monomer and at least one other monomer with a catalyst composition, wherein the first monomer and the at least one other monomer are different from one another, wherein the catalyst composition comprises at least four bimetallic catalyst complexes, and wherein the at least four bimetallic catalyst complexes are selected from: a bimetallic catalyst complex of Formula (15A), a bimetallic catalyst complex of Formula (16A), a bimetallic catalyst complex of Formula (17A), and a bimetallic catalyst complex of Formula (18A).

In various embodiments, the present invention provides a method of making a copolymer, comprising contacting a first monomer and at least one other monomer with a catalyst composition, wherein the first monomer and the at least one other monomer are different from one another, wherein the catalyst composition comprises at least four bimetallic catalyst complexes, and wherein the at least four bimetallic catalyst complexes are selected from: a bimetallic catalyst complex of Formula (15B), a bimetallic catalyst complex of Formula (16B), a bimetallic catalyst complex of Formula (17B), and a bimetallic catalyst complex of Formula (18B).

In some embodiments, the first monomer and the at least one other monomer are different from one another. In some embodiments, the at least one other monomer is at least one second monomer. In some embodiments, the first monomer and the at least one second monomer are different from one another.

In some embodiments, the step of contacting the first monomer and the at least one other monomer with the catalyst composition is performed in the presence of at least one solvent. In some embodiments, the at least one solvent is selected from the group consisting of toluene, benzene, xylene, hexanes, heptane, octane, decane, tetrahydrofuran, diethyl ether, dichloromethane, chloroform, N,N-dimethylformamide, dimethylsulfoxide, ethyl acetate, acetone, and water, and any combinations thereof.

In some embodiments, the at least one solvent is a non-polar solvent, a polar solvent, or combination thereof. In some embodiments, the at least one solvent is at least one non-polar solvent, at least one polar solvent, or combination thereof. In some embodiments, the non-polar solvent is selected from the group consisting of toluene, benzene, xylene, hexanes, heptane, octane, and decane, and any combinations thereof. In some embodiments, the polar solvent is selected from the group consisting of tetrahydrofuran, diethyl ether, dichloromethane, chloroform, N,N-dimethylformamide, dimethylsulfoxide, ethyl acetate, acetone, and water, and any combinations thereof.

In some embodiments, the method of making a copolymer further comprises contacting at least one activator with the catalyst composition, the first monomer, and the at least one other monomer. In some embodiments, the first monomer is ethylene, propene, 1-butene, 1-hexene, 1-octene, styrene, or allyl bezene. In some embodiments, the at least one other monomer is acrylamide, acrylic acid, acrylic ester, vinyl halide, vinyl alcohol, or allyl alcohol.

In some embodiments, the at least one activator is $Ni(COD)_2$ or triarylborane. In some embodiments, the at least one activator is selected from the group consisting of $Ni(COD)_2$, triarylborane, methylaluminoxane, and trialkylaluminum.

In some embodiments, the first monomer and the at least one other monomer are each independently an optionally substituted olefin. In some embodiments, the optionally substituted olefin is selected from the group consisting of ethylene, propene, butene, 1-hexene, 1-heptene, I-octene, styrene, acrylamide, acrylic acid, acrylic ester, vinyl halide, vinyl alcohol, allyl alcohol, allylbenzene, 2-hexene, 3-hexene, 2-heptene, 3-heptene, 2-octene, 3-octene, and 4-octene.

In some embodiments, the first monomer and the at least one other monomer are each independently an optionally substituted terminal olefin or an optionally substituted internal olefin. In some embodiments, the first monomer and the at least one other monomer are each independently ethylene, an optionally substituted terminal olefin, or an optionally substituted internal olefin. In some embodiments, the optionally substituted terminal olefin is selected from the group consisting of propene, butene, 1-hexene, 1-heptene, 1-octene, styrene, acrylamide, acrylic acid, acrylic ester, vinyl halide, vinyl alcohol, allyl alcohol, and allylbenzene. In some embodiments, the optionally substituted internal olefin is selected from the group consisting of 2-hexene, 3-hexene, 2-heptene, 3-heptene, 2-octene, 3-octene, and 4-octene. In some embodiments, the first monomer is ethylene.

In various embodiments, the present invention provides a polymer formed by the method for catalyzing copolymerization of a first monomer and at least one other monomer. In some embodiments, the polymer is a copolymer. In some embodiments, the copolymer is selected from the group consisting of a random copolymer, block copolymer, and gradient copolymer. In some embodiments, the copolymer is a random copolymer. In some embodiments, the copolymer is a block copolymer. In some embodiments, the copolymer is a gradient copolymer.

In various embodiments, the present invention provides a copolymer made by a method of making a copolymer as provided herein. In various embodiments, the present invention provides a polymer made by a method of making a copolymer as provided herein. In some embodiments, the polymer is a copolymer. In some embodiments, the copolymer is selected from the group consisting of a random copolymer, block copolymer, and gradient copolymer. In some embodiments, the polymer is monomodal or bimodal. In some embodiments, the polymer is monomodal. In some embodiments, the polymer is bimodal. In some embodiments, the polymer is monomodal, or bimodal, or combination thereof. In some embodiments, the copolymer is monomodal or bimodal. In some embodiments, the copolymer is monomodal. In some embodiments, the copolymer is bimodal. In some embodiments, the copolymer is monomodal, or bimodal, or combination thereof. In some embodiments, the first monomer is $CO_2$; and the at least one other monomer is an epoxide.

In some embodiments, the optionally substituted olefin is a polar olefin.

Some embodiments of the present invention can be defined as any of the following numbered paragraphs:

1. A catalyst having a structure selected from:

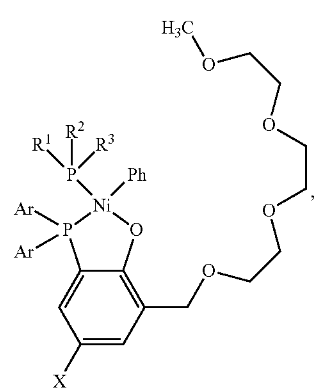

, and

-continued

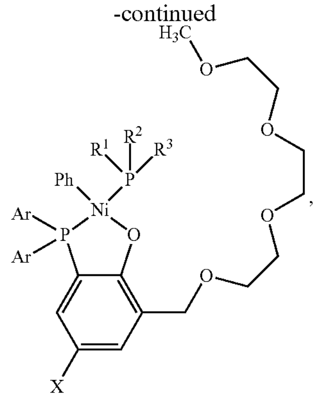

wherein, Ar is 2,6-dimethoxyphenyl; Ph is a phenyl group; X is an electron donating group, or an electron withdrawing group; and $R^1$, $R^2$, and $R^3$ are each independently selected from optionally substituted aryl, optionally substituted alkyl, and optionally substituted cycloalkyl.

2. The catalyst of claim 1, wherein the catalyst is:

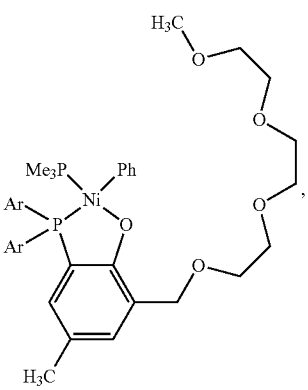

wherein, Ar is 2,6-dimethoxyphenyl; Ph is a phenyl group; and $PMe_3$ is trimethylphosphine.

3. The catalyst of claim 1, wherein the catalyst is:

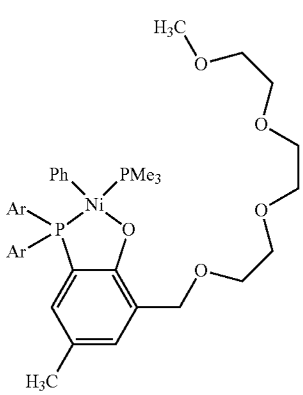

wherein, Ar is 2,6-dimethoxyphenyl; Ph is a phenyl group; and $PMe_3$ is trimethylphosphine.

4. A method for catalyzing homopolymerization of ethylene, comprising: combining ethylene with the catalyst of any one of claims 1-3, whereby the ethylene undergoes homopolymerization.

5. The method of claim 4, wherein the step of combining ethylene with the catalyst is performed in the presence of at least one solvent.

6. The method of claim 5, wherein the at least one solvent is a non-polar solvent, a polar solvent, or combination thereof.

7. A polymer formed by the method of any one of claims 4-6.

8. The polymer of claim 7, wherein the polymer is monomodal or bimodal.

9. A method for catalyzing copolymerization of ethylene and at least one other olefin, comprising: combining ethylene and the at least one other olefin with the catalyst of any one of claims 1-3, whereby the ethylene and the at least one other olefin undergo copolymerization, and wherein the at least one other olefin is optionally substituted.

10. The method of claim 9, wherein the step of combining ethylene and the at least one other olefin with the catalyst is performed in the presence of at least one solvent.

11. The method of claim 10, wherein the at least one solvent is a non-polar solvent, a polar solvent, or combination thereof.

12. A copolymer formed by the method of any one of claims 9-11.

13. The copolymer of claim 12, wherein the copolymer is monomodal or bimodal.

14. A heterobimetallic catalyst having a structure selected from:

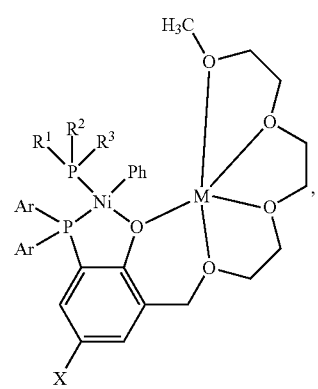

and

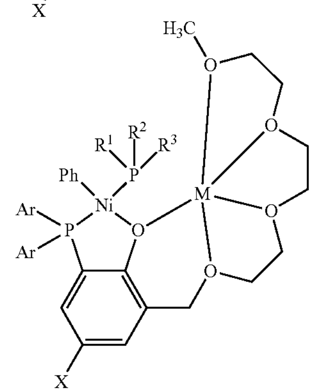

wherein, Ar is 2,6-dimethoxyphenyl; Ph is a phenyl group; M is Li, Na, K, or Cs; X is an electron donating group, or an electron withdrawing group; and $R^1$, $R^2$, and R; are each independently selected from optionally substituted aryl, optionally substituted alkyl, and optionally substituted cycloalkyl.

15. The heterobimetallic catalyst of claim 14, wherein the heterobimetallic catalyst is:

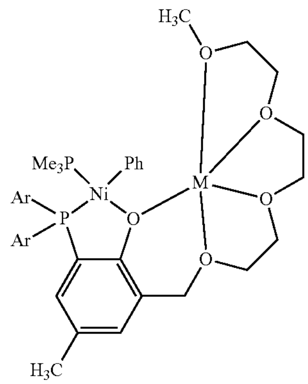

wherein, Ar is 2,6-dimethoxyphenyl; Ph is a phenyl group; M is Li, Na, K, or Cs; and $PMe_3$ is trimethylphosphine.

16. The heterobimetallic catalyst of claim 14, wherein the heterobimetallic catalyst is:

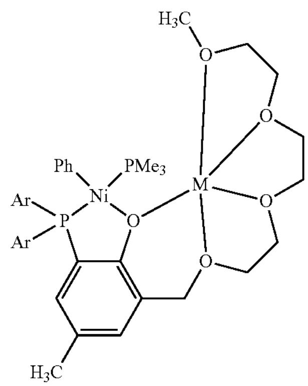

wherein, Ar is 2,6-dimethoxyphenyl; Ph is a phenyl group; M is Li, Na, K, or Cs; and $PMe_3$ is trimethylphosphine.

17. A method for catalyzing homopolymerization of ethylene, comprising: combining ethylene with the heterobimetallic catalyst of any one of claims 14-16, whereby the ethylene undergoes homopolymerization.

18. The method of claim 17, wherein the step of combining ethylene with the heterobimetallic catalyst is performed in the presence of at least one solvent.

19. The method of claim 18, wherein the at least one solvent is a non-polar solvent, a polar solvent, or combination thereof.

20. A polymer formed by the method of any one of claims 17-19.

21. The polymer of claim 20, wherein the polymer is monomodal or bimodal.

22. A method for catalyzing copolymerization of ethylene and at least one other olefin, comprising: combining ethylene and the at least one other olefin with the heterobimetallic catalyst of any one of claims 14-16, whereby the ethylene and the at least one other olefin undergo copolymerization, and wherein the at least one other olefin is optionally substituted.

23. The method of claim 22, wherein the step of combining ethylene and the at least one other olefin with the heterobimetallic catalyst is performed in the presence of at least one solvent.

24. The method of claim 23, wherein the at least one solvent is a non-polar solvent, a polar solvent, or combination thereof.

25. A polymer formed by the method of any one of claims 22-24.

26. The polymer of claim 25, wherein the polymer is monomodal or bimodal.

27. A bimetallic complex selected from Formula Ia and Formula Ib:

Formula Ia

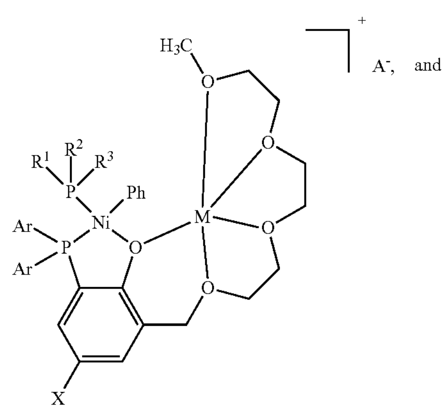

Formula Ib

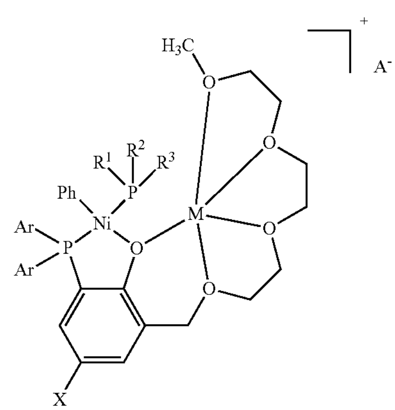

wherein, Ar is 2,6-dimethoxyphenyl; Ph is a phenyl group; M is Li, Na, K, or Cs; $A^-$ is a weakly coordinating anion; X is an electron donating group, or an electron withdrawing group; and $R^1$, $R^2$, and $R^3$ are each independently selected from optionally substituted aryl, optionally substituted alkyl, and optionally substituted cycloalkyl.

28. The bimetallic complex of claim 27, wherein the bimetallic complex of Formula Ia is:

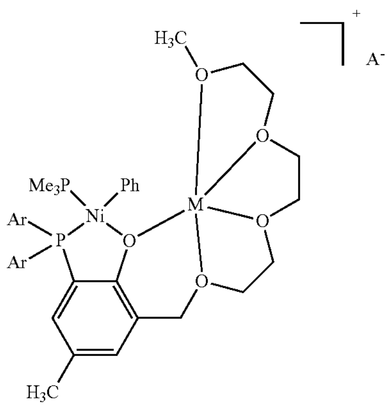

wherein, Ar is 2,6-dimethoxyphenyl; Ph is a phenyl group; M is Li, Na, K, or Cs; $A^-$ is $[(3,5\text{-}(CF_3)_2C_6H_3)_4B]^-$; and $PMe_3$ is trimethylphosphine.

29. The bimetallic complex of claim 27, wherein the bimetallic complex of Formula Ib is:

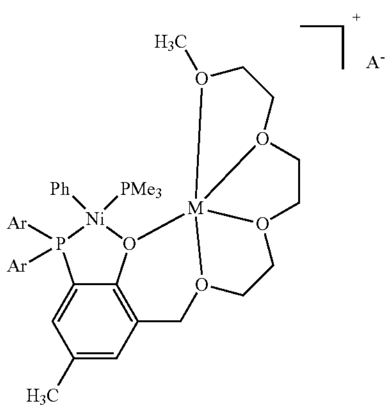

wherein, Ar is 2,6-dimethoxyphenyl; Ph is a phenyl group; M is Li, Na, K, or Cs; $A^-$ is $[(3,5\text{-}(CF_3)_2C_6H_3)_4B]^-$; and $PMe_3$ is trimethylphosphine.

30. A method for catalyzing homopolymerization of ethylene, comprising: combining ethylene with the bimetallic complex of any one of claims 27-29, whereby the ethylene undergoes homopolymerization.

31. The method of claim 30, wherein the step of combining ethylene with the bimetallic complex is performed in the presence of at least one solvent.

32. The method of claim 31, wherein the at least one solvent is a non-polar solvent, a polar solvent, or combination thereof.

33. A polymer formed by the method of any one of claims 30-32.

34. The polymer of claim 33, wherein the polymer is monomodal or bimodal.

35. A method for catalyzing copolymerization of ethylene and at least one other olefin, comprising: combining ethylene and the at least one other olefin with the bimetallic complex of any one of claims 27-29, whereby the ethylene and the at least one other olefin undergo copolymerization, and wherein the at least one other olefin is optionally substituted.

36. The method of claim 35, wherein the step of combining ethylene and the at least one other olefin with the bimetallic complex is performed in the presence of at least one solvent.

37. The method of claim 36, wherein the at least one solvent is a non-polar solvent, a polar solvent, or combination thereof.

38. A polymer formed by the method of any one of claims 35-37.

39. The polymer of claim 38, wherein the polymer is monomodal or bimodal.

Some embodiments of the present invention can be defined as any of the following numbered paragraphs.

1. A catalyst having a structure selected from Formula (1) and Formula (2):

Formula (1)

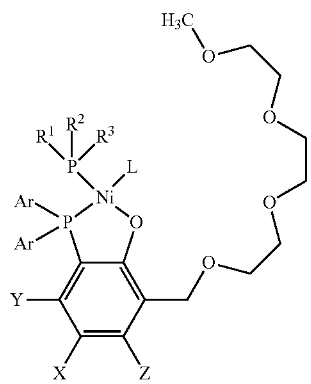

, and

Formula (2)

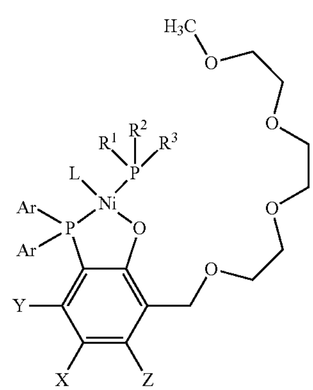

, wherein in Formula (1) and Formula (2): Ar is 2,6-dimethoxyphenyl; L is an optionally substituted phenyl group; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

2. A catalyst having a structure of Formula (1):

Formula (1)

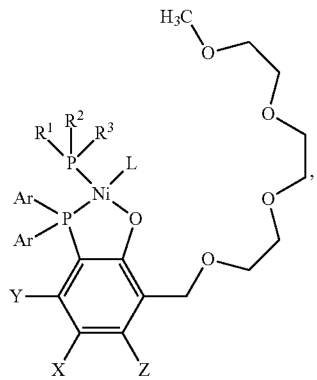

wherein, Ar is 2,6-dimethoxyphenyl; L is an optionally substituted phenyl group; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

3. A catalyst having a structure of Formula (2):

Formula (2)

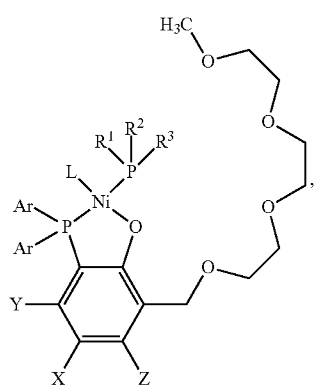

wherein, Ar is 2,6-dimethoxyphenyl; L is an optionally substituted phenyl group; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

4. A catalyst having a structure selected from Formula (1-A) and Formula (2-A):

Formula (1-A)

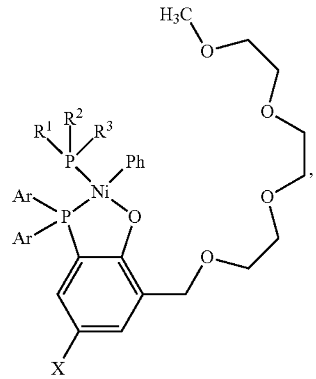

, and

Formula (2-A)

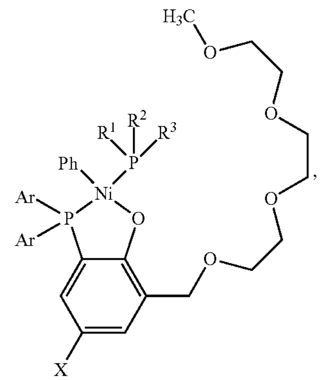

wherein in Formula (1-A) and Formula (2-A): Ar is 2,6-dimethoxyphenyl; Ph is a phenyl group; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

5. A catalyst having a structure of Formula (1-A):

Formula (1-A)

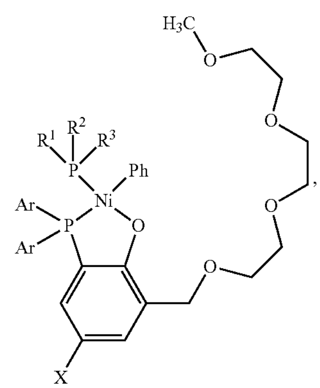

wherein, Ar is 2,6-dimethoxyphenyl; Ph is a phenyl group; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

6. A catalyst having a structure of Formula (2-A):

Formula (2-A)

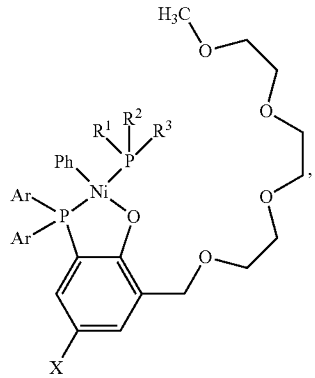

wherein, Ar is 2,6-dimethoxyphenyl; Ph is a phenyl group; X is hydrogen, an electron donating group, or an electron withdrawing group; and $R^1$, $R^2$, and R; are each independently selected from optionally substituted aryl, optionally substituted alkyl, and optionally substituted cycloalkyl.

7. A catalyst having a structure selected from Formula (1-B) and Formula (2-B):

Formula (1-B)

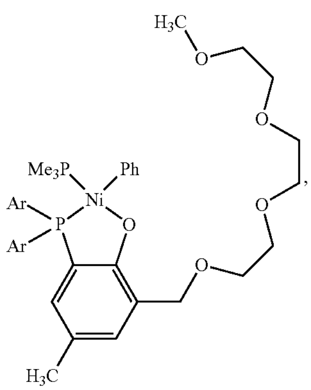

, and

Formula (2-B)

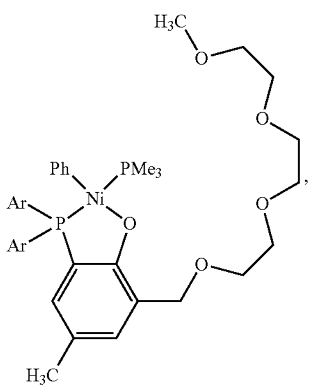

wherein in Formula (1-B) and Formula (2-B): Ar is 2,6-dimethoxyphenyl; Ph is a phenyl group; and $PMe_3$ is trimethylphosphine.

8. A catalyst having a structure of Formula (1-B):

Formula (1-B)

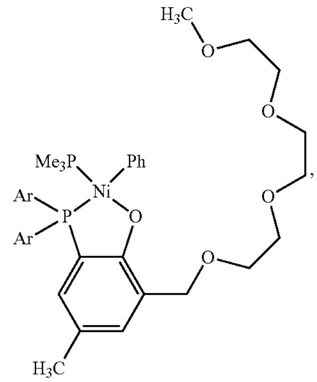

wherein, Ar is 2,6-dimethoxyphenyl; Ph is a phenyl group; and $PMe_3$ is trimethylphosphine.

9. A catalyst having a structure of Formula (2-B):

Formula (2-B)

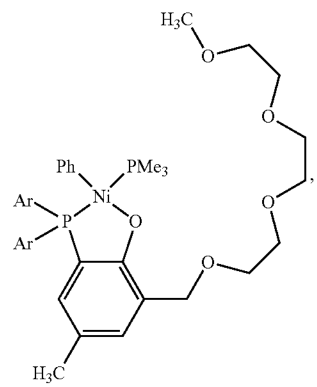

wherein, Ar is 2,6-dimethoxyphenyl; Ph is a phenyl group; and $PMe_3$ is trimethylphosphine.

10. The catalyst of any one of paragraphs 1-6, wherein the electron donating group is selected from the group consisting of: alkoxy, amino, hydroxy, and alkyl.

11. The catalyst of paragraph 10, wherein alkyl is selected from the group consisting of: —$CH_3$, —$CH_2CH_3$, —$CH_2CH_2CH_3$, and —$CH(CH_3)_2$.

12. The catalyst of any one of paragraphs 1-6, wherein the electron withdrawing group is selected from the group consisting of: $NO_2$, —CN, —C(O)-alkyl, and halo.

13. The catalyst of any one of paragraphs 1-12, wherein the phenyl group is

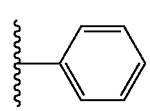 [SMILES: *c1ccccc1]

14. A method for catalyzing homopolymerization of an optionally substituted olefin, comprising: combining or contacting an optionally substituted olefin with the catalyst of any one of paragraphs 1-13, whereby the optionally substituted olefin undergoes homopolymerization.

15. The method of paragraph 14, wherein the step of combining or contacting the optionally substituted olefin with the catalyst is performed in the presence of at least one solvent.
16. The method of paragraph 15, wherein the at least one solvent is a non-polar solvent, a polar solvent, or combination thereof.
17. The method of any one of paragraphs 14-16, further comprising combining or contacting at least one activator with the catalyst and the optionally substituted olefin.
18. The method of paragraph 17, wherein the at least one activator is $Ni(COD)_2$ or triarylborane.
19. The method of any one of paragraphs 14-18, wherein the optionally substituted olefin is an optionally substituted terminal olefin or an optionally substituted internal olefin.
20. The method of any one of paragraphs 14-18, wherein the optionally substituted olefin is ethylene.
21. A polymer formed by the method of any one of paragraphs 14-20.
22. The polymer of paragraph 21, wherein the polymer is monomodal or bimodal.
23. A method for polymerizing an optionally substituted olefin, the method comprising contacting an optionally substituted olefin with the catalyst of any one of paragraphs 1-13 and at least one activator under conditions effective to polymerize the optionally substituted olefin.
24. The method of paragraph 23, wherein the at least one activator is $Ni(COD)_2$ or triarylborane.
25. The method of paragraph 23 or 24, wherein the step of contacting the optionally substituted olefin with the catalyst and the at least one activator is performed in the presence of at least one solvent.
26. The method of paragraph 25, wherein the at least one solvent is a non-polar solvent, a polar solvent, or combination thereof.
27. The method of any one of paragraphs 23-26, wherein the optionally substituted olefin is an optionally substituted terminal olefin or an optionally substituted internal olefin.
28. The method of any one of paragraphs 23-26, wherein the optionally substituted olefin is ethylene.
29. A polymer formed by the method of any one of paragraphs 23-28.
30. The polymer of paragraph 29, wherein the polymer is monomodal or bimodal.
31. A method for catalyzing copolymerization of a first olefin and at least one other olefin, comprising: combining or contacting a first olefin and at least one other olefin with the catalyst of any one of paragraphs 1-13, whereby the first olefin and the at least one other olefin undergoes copolymerization, and wherein the first olefin and the at least one other olefin are different from one another.
32. The method of paragraph 31, wherein the step of combining or contacting the first olefin and the at least one other olefin with the catalyst is performed in the presence of at least one solvent.
33. The method of paragraph 32, wherein the at least one solvent is a non-polar solvent, a polar solvent, or combination thereof.
34. The method of any one of paragraphs 31-33, further comprising combining or contacting at least one activator with the catalyst, the first olefin, and the at least one other olefin.
35. The method of paragraph 34, wherein the at least one activator is $Ni(COD)_2$ or triarylborane.
36. The method of any one of paragraphs 31-35, wherein the first olefin and the at least one other olefin are each independently an optionally substituted olefin.
37. The method of any one of paragraphs 31-35, wherein the first olefin and the at least one other olefin are each independently an optionally substituted terminal olefin or an optionally substituted internal olefin.
38. The method of any one of paragraphs 31-37, wherein the first olefin is ethylene.
39. A polymer formed by the method of any one of paragraphs 31-38.
40. The polymer of paragraph 39, wherein the polymer is monomodal or bimodal.
41. A method for copolymerizing a first olefin and at least one other olefin, the method comprising contacting the first olefin and the at least one other olefin with the catalyst of any one of paragraphs 1-13 and at least one activator under conditions effective to copolymerize the first olefin and the at least one other olefin, wherein the first olefin and the at least one other olefin are different from one another.
42. The method of paragraph 41, wherein the at least one activator is $Ni(COD)_2$ or triarylborane.
43. The method of paragraph 41 or 42, wherein the step of contacting the first olefin and the at least one other olefin with the catalyst and the at least one activator is performed in the presence of at least one solvent.
44. The method of paragraph 43, wherein the at least one solvent is a non-polar solvent, a polar solvent, or combination thereof.
45. The method of any one of paragraphs 41-44, wherein the first olefin and the at least one other olefin are each independently an optionally substituted olefin.
46. The method of any one of paragraphs 41-44, wherein the first olefin and the at least one other olefin are each independently an optionally substituted terminal olefin or an optionally substituted internal olefin.
47. The method of any one of paragraphs 41-46, wherein the first olefin is ethylene.
48. A polymer formed by the method of any one of paragraphs 41-47.
49. The polymer of paragraph 48, wherein the polymer is monomodal or bimodal.
50. A method for making a compound, the method comprising contacting a reactant with a catalyst of any one of paragraphs 1-13 under conditions effective to make the compound.
51. The method of paragraph 50, wherein the step of contacting the reactant with the catalyst is performed in the presence of at least one solvent.
52. The method of paragraph 51, wherein the at least one solvent is a non-polar solvent, a polar solvent, or combination thereof.
53. The method of any one of paragraphs 50-52, further comprising contacting at least one activator with the catalyst and the reactant.
54. The method of paragraph 53, wherein the at least one activator is $Ni(COD)_2$ or triarylborane.
55. The method of any one of paragraphs 50-54, wherein the compound is a small molecule.
56. The method of any one of paragraphs 50-55, wherein the method is a cascade method.
57. A method for making a compound, the method comprising contacting a first reactant and at least one other reactant with a catalyst of any one of paragraphs 1-13 under conditions effective to make the compound.

58. The method of paragraph 57, wherein the step of contacting the first reactant and the at least one other reactant with the catalyst is performed in the presence of at least one solvent.

59. The method of paragraph 58, wherein the at least one solvent is a non-polar solvent, a polar solvent, or combination thereof.

60. The method of any one of paragraphs 57-59, further comprising contacting at least one activator with the catalyst, the first reactant, and the at least one other reactant.

61. The method of paragraph 60, wherein the at least one activator is $Ni(COD)_2$ or triarylborane.

62. The method of any one of paragraphs 57-61, wherein the compound is a small molecule.

63. The method of any one of paragraphs 57-62, wherein the method is a cascade method.

64. The method of any one of paragraphs 57-63, wherein the first reactant and the at least one other reactant are different from one another.

65. A method of making a polymer, comprising contacting a monomer with the catalyst of any one of paragraphs 1-13.

66. The method of paragraph 65, wherein the step of contacting the monomer with the catalyst is performed in the presence of at least one solvent.

67. The method of paragraph 66, wherein the at least one solvent is a non-polar solvent, a polar solvent, or combination thereof.

68. The method of any one of paragraphs 65-67, further comprising contacting at least one activator with the catalyst and the monomer.

69. The method of paragraph 68, wherein the at least one activator is $Ni(COD)_2$ or triarylborane.

70. The method of any one of paragraphs 65-69, wherein the monomer is an optionally substituted olefin.

71. The method of any one of paragraphs 65-69, wherein the monomer is an optionally substituted terminal olefin or an optionally substituted internal olefin.

72. The method of any one of paragraphs 65-71, wherein the monomer is ethylene.

73. The method of any one of paragraphs 65-72, wherein the polymer is bimodal or monomodal.

74. A polymer made by the method of any one of paragraphs 65-72.

75. The polymer of paragraph 74, wherein the polymer is bimodal or monomodal.

76. A method of making a copolymer, comprising contacting a first monomer and at least one other monomer with a catalyst of any one of paragraphs 1-13, wherein the first monomer and the at least one other monomer are different from one another.

77. The method of paragraph 76, wherein the step of contacting the first monomer and the at least one other monomer with the catalyst is performed in the presence of at least one solvent.

78. The method of paragraph 77, wherein the at least one solvent is a non-polar solvent, a polar solvent, or combination thereof.

79. The method of any one of paragraphs 76-78, further comprising contacting at least one activator with the catalyst, the first monomer, and the at least one other monomer.

80. The method of paragraph 79, wherein the at least one activator is $Ni(COD)_2$ or triarylborane.

82. The method of any one of paragraphs 76-80, wherein the first monomer and the at least one other monomer are each independently an optionally substituted olefin.

83. The method of any one of paragraphs 76-80, wherein the first monomer and the at least one other monomer are each independently an optionally substituted terminal olefin or an optionally substituted internal olefin.

84. The method of any one of paragraphs 76-83, wherein the first monomer is ethylene.

85. The method of any one of paragraphs of 76-84, wherein the copolymer is bimodal or monomodal.

86. A copolymer made by the method of any one of paragraphs 76-84.

87. The copolymer of paragraph 86, wherein the copolymer is monomodal or bimodal.

88. The method of any one of paragraphs 76-80, wherein the first monomer is $CO_2$; and the at least one other monomer is an epoxide.

89. A heterobimetallic catalyst having a structure selected from Formula (3) and Formula (4):

Formula (3)

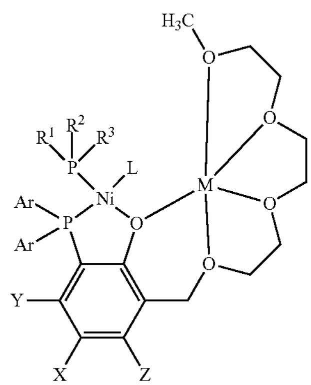

, and

Formula (4)

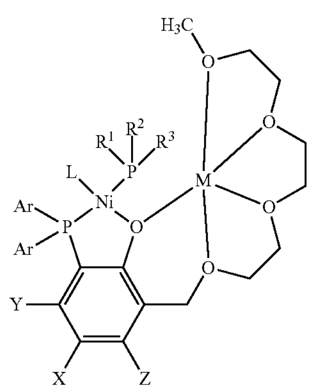

, wherein in Formula (3) and Formula (4): Ar is 2,6-dimethoxyphenyl; L is an optionally substituted phenyl group; M is Li, Na, K, or Cs; X, Y, and Z are each independently selected from hydrogen, an electron donating group, and an electron withdrawing group; and $R^1$, $R^2$, and R; are each independently selected from optionally substituted aryl, optionally substituted alkyl, and optionally substituted cycloalkyl.

90. A heterobimetallic catalyst having a structure of Formula (3):

Formula (3)

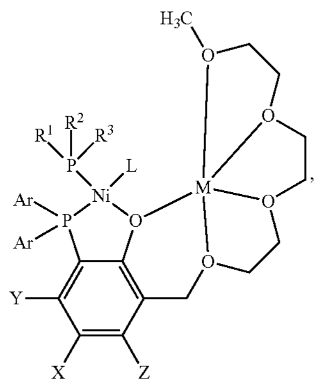

wherein, Ar is 2,6-dimethoxyphenyl; L is an optionally substituted phenyl group; M is Li, Na, K, or Cs; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

91. A heterobimetallic catalyst having a structure of Formula (4):

Formula (4)

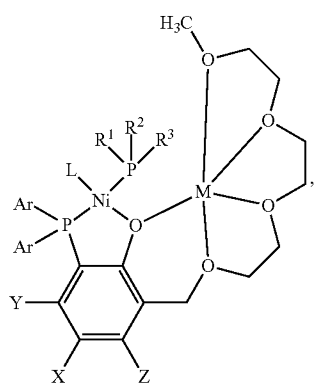

wherein, Ar is 2,6-dimethoxyphenyl; L is an optionally substituted phenyl group; M is Li, Na, K, or Cs; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

92. A heterobimetallic catalyst having a structure selected from Formula (3-A) and Formula (4-A):

Formula (3-A)

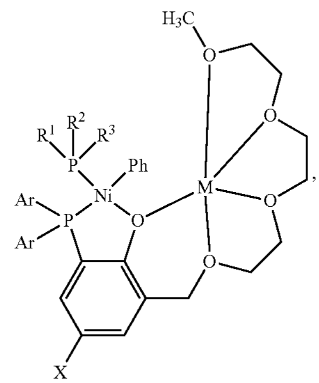

, and

Formula (4-A)

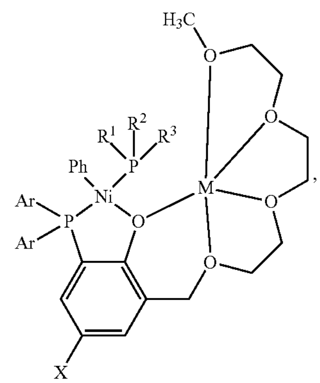

wherein in Formula (3-A) and Formula (4-A): Ar is 2,6-dimethoxyphenyl; Ph is a phenyl group; M is Li, Na, K, or Cs; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

93. A heterobimetallic catalyst having a structure of Formula (3-A):

Formula (3-A)

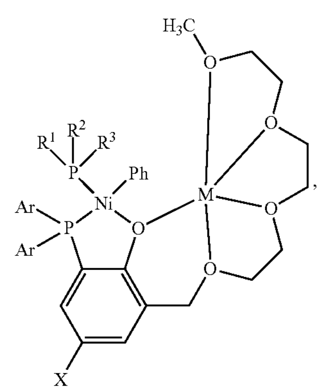

wherein, Ar is 2,6-dimethoxyphenyl; Ph is a phenyl group; M is Li, Na, K, or Cs; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

94. A heterobimetallic catalyst having a structure of Formula (4-A):

Formula (4-A)

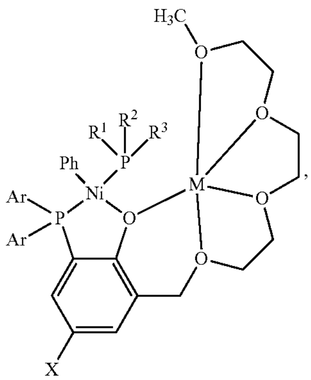

wherein, Ar is 2,6-dimethoxyphenyl; Ph is a phenyl group; M is Li, Na, K, or Cs; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

95. A heterobimetallic catalyst having a structure selected from Formula (3-B) and Formula (4-B):

Formula (3-B)

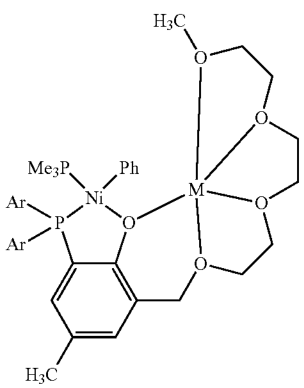

and

Formula (4-B)

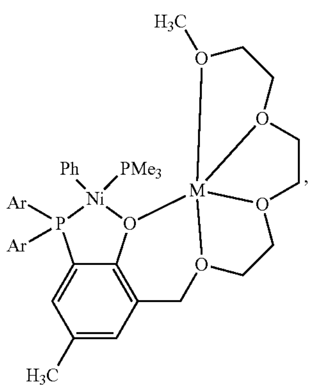

wherein in Formula (3-B) and Formula (4-B): Ar is 2,6-dimethoxyphenyl; Ph is a phenyl group; M is Li, Na, K, or Cs; and $PMe_3$ is trimethylphosphine.

96. A heterobimetallic catalyst having a structure of Formula (3-B):

Formula (3-B)

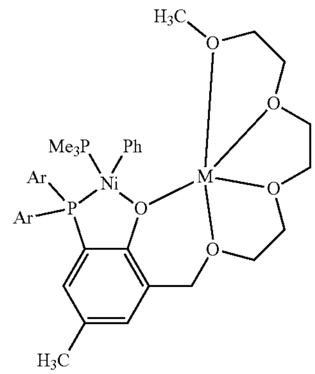

wherein, Ar is 2,6-dimethoxyphenyl; Ph is a phenyl group; M is Li, Na, K, or Cs; and $PMe_3$ is trimethylphosphine.

97. A heterobimetallic catalyst having a structure of Formula (4-B):

Formula (4-B)

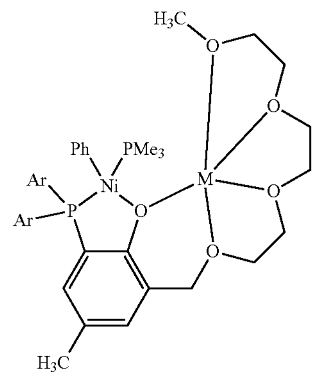

wherein, Ar is 2,6-dimethoxyphenyl; Ph is a phenyl group; M is Li, Na, K, or Cs; and $PMe_3$ is trimethylphosphine.

98. The catalyst of any one of paragraphs 89-94, wherein the electron donating group is selected from the group consisting of: alkoxy, amino, hydroxy, and alkyl.

99. The catalyst of paragraph 98, wherein alkyl is selected from the group consisting of: —$CH_3$, —$CH_2CH_3$, —$CH_2CH_2CH_3$, and —$CH(CH_3)_2$.

100. The catalyst of any one of paragraphs 89-94, wherein the electron withdrawing group is selected from the group consisting of: $NO_2$, —CN, —C(O)-alkyl, and halo.

101. The catalyst of any one of paragraphs 89-100, wherein the phenyl group is

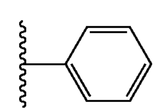

102. A method for catalyzing homopolymerization of an optionally substituted olefin, comprising: combining or contacting an optionally substituted olefin with the heterobimetallic catalyst of any one of paragraphs 89-101, whereby the optionally substituted olefin undergoes homopolymerization.

103. The method of paragraph 102, wherein the step of combining or contacting the optionally substituted olefin with the heterobimetallic catalyst is performed in the presence of at least one solvent.

104. The method of paragraph 103, wherein the at least one solvent is a non-polar solvent, a polar solvent, or combination thereof.

105. The method of any one of paragraphs 102-104, further comprising combining or contacting at least one activator with the heterobimetallic catalyst and the optionally substituted olefin.

106. The method of paragraph 105, wherein the at least one activator is $Ni(COD)_2$ or triarylborane.

107. The method of any one of paragraphs 102-106, wherein the optionally substituted olefin is an optionally substituted terminal olefin or an optionally substituted internal olefin.

108. The method of any one of paragraphs 102-106, wherein the optionally substituted olefin is ethylene.

109. A polymer formed by the method of any one of paragraphs 102-108.

110. The polymer of paragraph 109, wherein the polymer is monomodal or bimodal.

111. A method for polymerizing an optionally substituted olefin, the method comprising contacting an optionally substituted olefin with the heterobimetallic catalyst of any one of paragraphs 89-101 and at least one activator under conditions effective to polymerize the optionally substituted olefin.

112. The method of paragraph 111, wherein the at least one activator is $Ni(COD)_2$ or triarylborane.

113. The method of paragraph 111 or 112, wherein the step of contacting the optionally substituted olefin with the heterobimetallic catalyst and the at least one activator is performed in the presence of at least one solvent.

114. The method of paragraph 113, wherein the at least one solvent is a non-polar solvent, a polar solvent, or combination thereof.

115. The method of any one of paragraphs 111-114, wherein the optionally substituted olefin is an optionally substituted terminal olefin or an optionally substituted internal olefin.

116. The method of any one of paragraphs 111-114, wherein the optionally substituted olefin is ethylene.

117. A polymer formed by the method of any one of paragraphs 111-116.

118. The polymer of paragraph 117, wherein the polymer is monomodal or bimodal

119. A method for catalyzing copolymerization of a first olefin and at least one other olefin, comprising: combining or contacting a first olefin and at least one other olefin with the heterobimetallic catalyst of any one of paragraphs 89-101, whereby the first olefin and the at least one other olefin undergoes copolymerization, and wherein the first olefin and the at least one other olefin are different from one another.

120. The method of paragraph 119, wherein the step of combining or contacting the first olefin and the at least one other olefin with the heterobimetallic catalyst is performed in the presence of at least one solvent.

121. The method of paragraph 120, wherein the at least one solvent is a non-polar solvent, a polar solvent, or combination thereof.

122. The method of any one of paragraphs 119-121, further comprising combining or contacting at least one activator with the heterobimetallic catalyst, the first olefin, and the at least one other olefin.

123. The method of paragraph 122, wherein the at least one activator is $Ni(COD)_2$ or triarylborane.

124. The method of any one of paragraphs 119-123, wherein the first olefin and the at least one other olefin are each independently an optionally substituted olefin.

125. The method of any one of paragraphs 119-123, wherein the first olefin and the at least one other olefin are each independently an optionally substituted terminal olefin or an optionally substituted internal olefin.

126. The method of any one of paragraphs 119-125, wherein the first olefin is ethylene.

127. A polymer formed by the method of any one of paragraphs 119-126.

128. The polymer of paragraph 127, wherein the polymer is monomodal or bimodal.

129. A method for copolymerizing a first olefin and at least one other olefin, the method comprising contacting the first olefin and the at least one other olefin with the heterobimetallic catalyst of any one of paragraphs 89-101 and at least one activator under conditions effective to copolymerize the first olefin and the at least one other olefin, wherein the first olefin and the at least one other olefin are different from one another.

130. The method of paragraph 129, wherein the at least one activator is $Ni(COD)_2$.

131. The method of paragraph 129 or 130, wherein the step of contacting the first olefin and the at least one other olefin with the heterobimetallic catalyst and the at least one activator is performed in the presence of at least one solvent.

132. The method of paragraph 131, wherein the at least one solvent is a non-polar solvent, a polar solvent, or combination thereof.

133. The method of any one of paragraphs 129-132, wherein the first olefin and the at least one other olefin are each independently an optionally substituted olefin.

134. The method of any one of paragraphs 129-132, wherein the first olefin and the at least one other olefin are each independently an optionally substituted terminal olefin or an optionally substituted internal olefin.

135. The method of any one of paragraphs 129-134, wherein the first olefin is ethylene.

136. A polymer formed by the method of any one of paragraphs 129-135.

137. The polymer of paragraph 136, wherein the polymer is monomodal or bimodal.

138. A method for making a compound, the method comprising contacting a reactant with a heterobimetallic catalyst of any one of paragraphs 89-101 under conditions effective to make the compound.

139. The method of paragraph 138, wherein the step of contacting the reactant with the heterobimetallic catalyst is performed in the presence of at least one solvent.

140. The method of paragraph 139, wherein the at least one solvent is a non-polar solvent, a polar solvent, or combination thereof.

141. The method of any one of paragraphs 138-140, further comprising contacting at least one activator with the heterobimetallic catalyst and the reactant.

142. The method of paragraph 141, wherein the at least one activator is $Ni(COD)_2$.

143. The method of any one of paragraphs 138-142, wherein the compound is a small molecule.

144. The method of any one of paragraphs 138-143, wherein the method is a cascade method.

145. A method for making a compound, the method comprising contacting a first reactant and at least one other reactant with a heterobimetallic catalyst of any one of paragraphs 89-101 under conditions effective to make the compound.

146. The method of paragraph 145, wherein the step of contacting the first reactant and the at least one other reactant with the heterobimetallic catalyst is performed in the presence of at least one solvent.

147. The method of paragraph 146, wherein the at least one solvent is a non-polar solvent, a polar solvent, or combination thereof.

148. The method of any one of paragraphs 145-147, further comprising contacting at least one activator with the catalyst, the first reactant, and the at least one other reactant.

149. The method of paragraph 148, wherein the at least one activator is $Ni(COD)_2$.

150. The method of any one of paragraphs 145-149, wherein the compound is a small molecule.

151. The method of any one of paragraphs 145-150, wherein the method is a cascade method.

152. The method of any one of paragraphs 145-151, wherein the first reactant and the at least one other reactant are different from one another.

153. A method of making a polymer, comprising contacting a monomer with the heterobimetallic catalyst of any one of paragraphs 89-101.

154. The method of paragraph 153, wherein the step of contacting the monomer with the heterobimetallic catalyst is performed in the presence of at least one solvent.

155. The method of paragraph 154, wherein the at least one solvent is a non-polar solvent, a polar solvent, or combination thereof.

156. The method of any one of paragraphs 153-155, further comprising contacting at least one activator with the heterobimetallic catalyst and the monomer.

157. The method of paragraph 156, wherein the at least one activator is $Ni(COD)_2$.

158. The method of any one of paragraphs 153-157, wherein the monomer is an optionally substituted olefin.

159. The method of any one of paragraphs 153-158, wherein the monomer is an optionally substituted terminal olefin or an optionally substituted internal olefin.

160. The method of any one of paragraphs 153-159, wherein the monomer is ethylene.

161. The method of any one of paragraphs 153-160, wherein the polymer is bimodal or monomodal.

162. A polymer made by the method of any one of paragraphs 153-160.

163. The polymer of paragraph 162, wherein the polymer is bimodal or monomodal.

164. A method of making a copolymer, comprising contacting a first monomer and at least one other monomer with a heterobimetallic catalyst of any one of paragraphs 89-101, wherein the first monomer and the at least one other monomer are different from one another.

165. The method of paragraph 164, wherein the step of contacting the first monomer and the at least one other monomer with the heterobimetallic catalyst is performed in the presence of at least one solvent.

166. The method of paragraph 165, wherein the at least one solvent is a non-polar solvent, a polar solvent, or combination thereof.

167. The method of any one of paragraphs 164-166, further comprising contacting at least one activator with the heterobimetallic catalyst, the first monomer, and the at least one other monomer.

168. The method of paragraph 167, wherein the at least one activator is $Ni(COD)_2$.

169. The method of any one of paragraphs 164-168, wherein the first monomer and the at least one other monomer are each independently an optionally substituted olefin.

170. The method of any one of paragraphs 164-168 wherein the first monomer and the at least one other monomer are each independently an optionally substituted terminal olefin or an optionally substituted internal olefin.

171. The method of any one of paragraphs 164-170, wherein the first monomer is ethylene.

172. The method of any one of paragraphs of 164-171, wherein the copolymer is bimodal or monomodal.

173. A copolymer made by the method of any one of paragraphs 164-172.

174. The copolymer of paragraph 173, wherein the copolymer is monomodal or bimodal.

175. The method of any one of paragraphs 164-168, wherein the first monomer is $CO_2$; and the at least one other monomer is an epoxide.

176. A bimetallic catalyst complex having a structure selected from Formula (5) and Formula (6):

Formula (5)

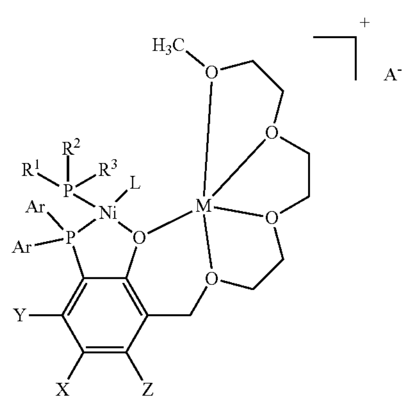

, and

Formula (6)

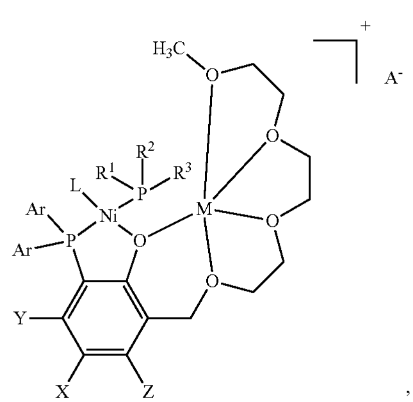

, wherein in Formula (5) and Formula (6): Ar is 2,6-dimethoxyphenyl; L is an optionally substituted phenyl group; M is Li, Na, K, or Cs; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

177. A bimetallic catalyst complex having a structure of Formula (5):

Formula (5)

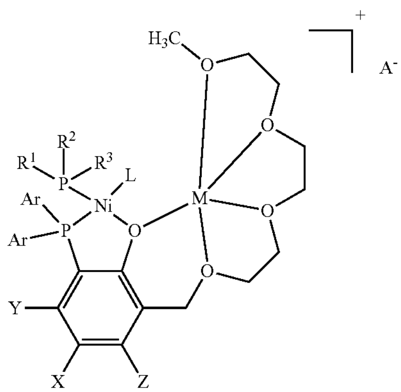

wherein, Ar is 2,6-dimethoxyphenyl; L is an optionally substituted phenyl group; M is Li, Na, K, or Cs: $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

178. A bimetallic catalyst complex having a structure of Formula (6):

Formula (6)

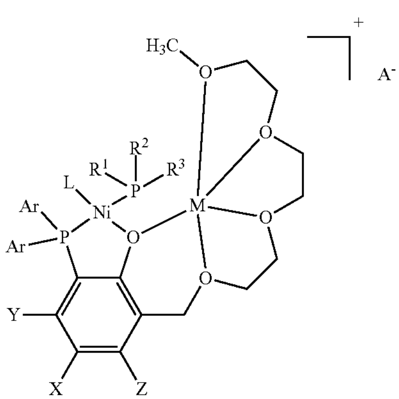

, wherein, Ar is 2,6-dimethoxyphenyl; L is an optionally substituted phenyl group; M is Li, Na, K, or Cs; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

179. A bimetallic catalyst complex having a structure selected from Formula (5-A) and Formula (6-A):

Formula (5-A)

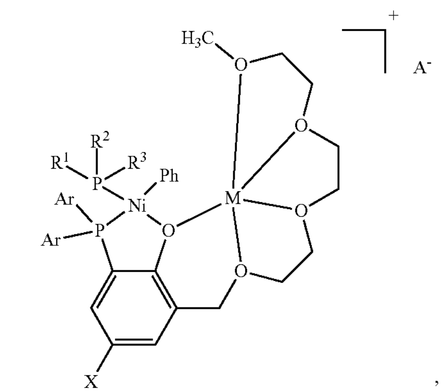

, and

Formula (6-A)

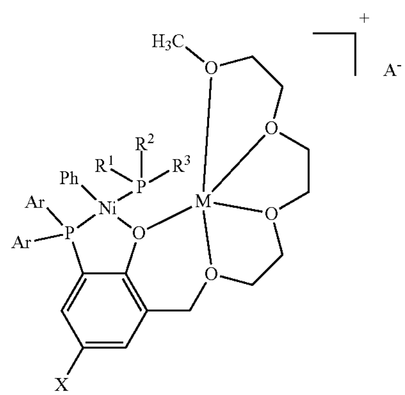

wherein Formula (5-A) and Formula (6-A): Ar is 2,6-dimethoxyphenyl; Ph is a phenyl group, M is Li, Na, K, or Cs; $A^-$ is a weakly coordinating anion; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

180. A bimetallic catalyst complex having a structure of Formula (5-A):

Formula (5-A)

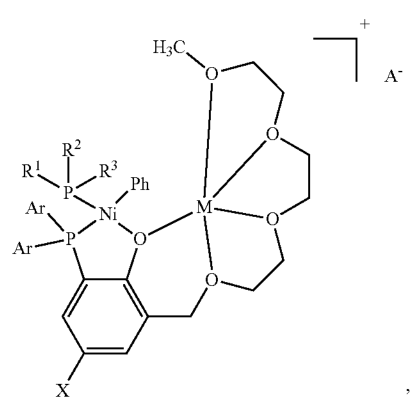

, wherein, Ar is 2,6-dimethoxyphenyl; Ph is a phenyl group; M is Li, Na, K, or Cs; $A^-$ is a weakly coordinating anion; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

181. A bimetallic catalyst complex having a structure of Formula (6-A):

Formula (6-A)

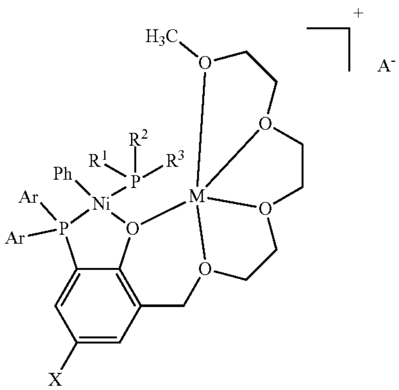

wherein, Ar is 2,6-dimethoxyphenyl; Ph is a phenyl group; M is Li, Na, K, or Cs; $A^-$ is a weakly coordinating anion; X is hydrogen, an electron donating group, or an electron withdrawing group; and $R^1$, $R^2$, and R; are each independently selected from optionally substituted aryl, optionally substituted alkyl, and optionally substituted cycloalkyl.

182. A bimetallic catalyst complex having a structure selected from Formula (5-B) and Formula (6-B).

Formula (5-B)

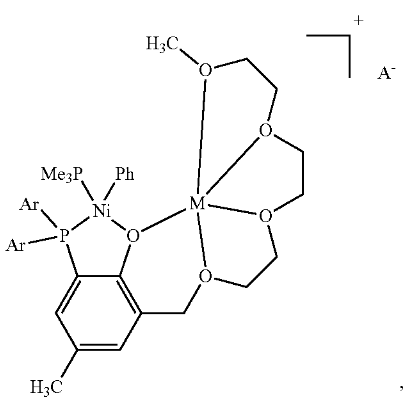

, and

Formula (6-B)

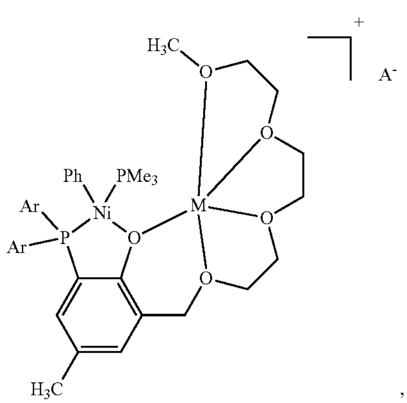

, wherein Formula (5-B) and Formula (6-B): Ar is 2,6-dimethoxyphenyl; Ph is a phenyl group, M is Li, Na, K, or Cs; $A^-$ is $[(3,5\text{-}(CF_3)_2C_6H_3)_4B]^-$; and $PMe_3$ is trimethylphosphine.

183. A bimetallic catalyst complex having a structure of Formula (5-B) is:

Formula (5-B)

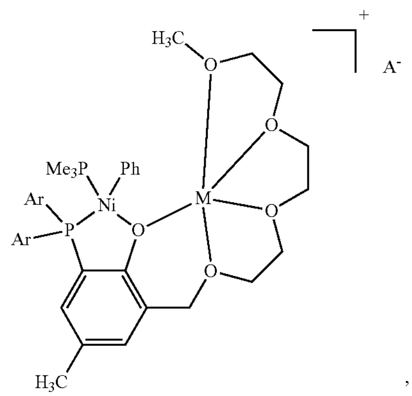

, wherein, Ar is 2,6-dimethoxyphenyl; Ph is a phenyl group; M is Li, Na, K, or Cs; $A^-$ is $[(3,5\text{-}(CF_3)_2C_6H_3)_4B]^-$; and $PMe_3$ is trimethylphosphine.

184. A bimetallic catalyst complex having a structure of Formula (6-B):

Formula (6-B)

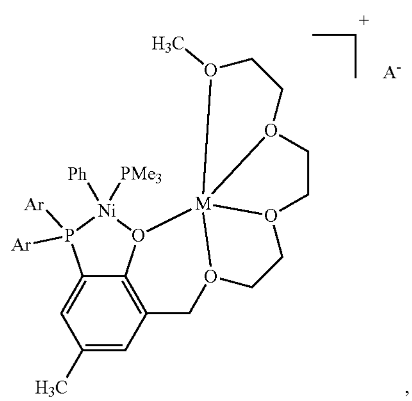

, wherein, Ar is 2,6-dimethoxyphenyl; Ph is a phenyl group; M is Li, Na, K, or Cs; $A^-$ is $[(3,5\text{-}(CF_3)_2C_6H_3)_4B]^-$; and $PMe_3$ is trimethylphosphine.

185. The catalyst of any one of paragraphs 176-181, wherein the electron donating group is selected from the group consisting of: alkoxy, amino, hydroxy, and alkyl.

186. The catalyst of paragraph 185, wherein alkyl is selected from the group consisting of: —$CH_3$, —$CH_2CH_3$, —$CH_2CH_2CH_3$, and —$CH(CH_3)_2$.

187. The catalyst of any one of paragraphs 176-181, wherein the electron withdrawing group is selected from the group consisting of: $NO_2$, —CN, —C(O)-alkyl, and halo.

188. The catalyst of any one of paragraphs 176-187, wherein the phenyl group is

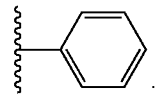

189. A method for catalyzing homopolymerization of an optionally substituted olefin, comprising: combining or contacting an optionally substituted olefin with the bimetallic catalyst complex of any one of paragraphs 176-188, whereby the optionally substituted olefin undergoes homopolymerization.
190. The method of paragraph 189, wherein the step of combining or contacting the optionally substituted olefin with the bimetallic catalyst complex is performed in the presence of at least one solvent.
191. The method of paragraph 190, wherein the at least one solvent is a non-polar solvent, a polar solvent, or combination thereof.
192. The method of any one of paragraphs 189-191, further comprising combining or contacting at least one activator with the bimetallic catalyst complex and the optionally substituted olefin.
193. The method of paragraph 192, wherein the at least one activator is $Ni(COD)_2$.
194. The method of any one of paragraphs 189-193, wherein the optionally substituted olefin is an optionally substituted terminal olefin or an optionally substituted internal olefin.
195. The method of any one of paragraphs 189-193, wherein the optionally substituted olefin is ethylene.
196. A polymer formed by the method of any one of paragraphs 189-195.
197. The polymer of paragraph 196, wherein the polymer is monomodal or bimodal.
198. A method for polymerizing an optionally substituted olefin, the method comprising contacting an optionally substituted olefin with the bimetallic catalyst complex of any one of paragraphs 176-188 and at least one activator under conditions effective to polymerize the optionally substituted olefin.
199. The method of paragraph 198, wherein the at least one activator is $Ni(COD)_2$.
200. The method of paragraph 198 or 199, wherein the step of contacting the optionally substituted olefin with the bimetallic catalyst complex and the at least one activator is performed in the presence of at least one solvent.
201. The method of paragraph 200, wherein the at least one solvent is a non-polar solvent, a polar solvent, or combination thereof.
202. The method of any one of paragraphs 198-201, wherein the optionally substituted olefin is an optionally substituted terminal olefin or an optionally substituted internal olefin.
203. The method of any one of paragraphs 198-202, wherein the optionally substituted olefin is ethylene.
204. A polymer formed by the method of any one of paragraphs 198-203.
205. The polymer of paragraph 204, wherein the polymer is monomodal or bimodal.
206. A method for catalyzing copolymerization of a first olefin and at least one other olefin, comprising: combining or contacting a first olefin and at least one other olefin with the bimetallic catalyst complex of any one of paragraphs 176-188, whereby the first olefin and the at least one other olefin undergoes copolymerization, and wherein the first olefin and the at least one other olefin are different from one another.
207. The method of paragraph 206, wherein the step of combining or contacting the first olefin and the at least one other olefin with the bimetallic catalyst complex is performed in the presence of at least one solvent.
208. The method of paragraph 207, wherein the at least one solvent is a non-polar solvent, a polar solvent, or combination thereof.
209. The method of any one of paragraphs 206-208, further comprising combining or contacting at least one activator with the bimetallic catalyst complex, the first olefin, and the at least one other olefin.
210. The method of paragraph 209, wherein the at least one activator is $Ni(COD)_2$.
211. The method of any one of paragraphs 206-210 wherein the first olefin and the at least one other olefin are each independently an optionally substituted olefin.
212. The method of any one of paragraphs 206-210, wherein the first olefin and the at least one other olefin are each independently an optionally substituted terminal olefin or an optionally substituted internal olefin.
213. The method of any one of paragraphs 206-212, wherein the first olefin is ethylene.
214. A polymer formed by the method of any one of paragraphs 206-213.
215. The polymer of paragraph 214, wherein the polymer is monomodal or bimodal.
216. A method for copolymerizing a first olefin and at least one other olefin, the method comprising contacting the first olefin and the at least one other olefin with the bimetallic catalyst complex of any one of paragraphs 176-188 and at least one activator under conditions effective to copolymerize the first olefin and the at least one other olefin, wherein the first olefin and the at least one other olefin are different from one another.
217. The method of paragraph 216, wherein the at least one activator is $Ni(COD)_2$.
218. The method of paragraph 216 or 217, wherein the step of contacting the first olefin and the at least one other olefin with the bimetallic catalyst complex and the at least one activator is performed in the presence of at least one solvent.
219. The method of paragraph 218, wherein the at least one solvent is a non-polar solvent, a polar solvent, or combination thereof.
220. The method of any one of paragraphs 216-219, wherein the first olefin and the at least one other olefin are each independently an optionally substituted olefin.
221. The method of any one of paragraphs 216-219, wherein the first olefin and the at least one other olefin are each independently an optionally substituted terminal olefin or an optionally substituted internal olefin.
222. The method of any one of paragraphs 216-221, wherein the first olefin is ethylene.
223. A polymer formed by the method of any one of paragraphs 216-222.
224. The polymer of paragraph 223, wherein the polymer is monomodal or bimodal.
225. A method for making a compound, the method comprising contacting a reactant with a bimetallic catalyst complex of any one of paragraphs 176-188 under conditions effective to make the compound.

226. The method of paragraph 225, wherein the step of contacting the reactant with the bimetallic catalyst complex is performed in the presence of at least one solvent.
227. The method of paragraph 226, wherein the at least one solvent is a non-polar solvent, a polar solvent, or combination thereof.
228. The method of any one of paragraphs 225-227, further comprising contacting at least one activator with the bimetallic catalyst complex and the reactant.
229. The method of paragraph 228, wherein the at least one activator is $Ni(COD)_2$.
230. The method of any one of paragraphs 225-229, wherein the compound is a small molecule.
231. The method of any one of paragraphs 225-230, wherein the method is a cascade method.
232. A method for making a compound, the method comprising contacting a first reactant and at least one other reactant with a bimetallic catalyst complex of any one of paragraphs 176-188 under conditions effective to make the compound.
233. The method of paragraph 232, wherein the step of contacting the first reactant and the at least one other reactant with the bimetallic catalyst complex is performed in the presence of at least one solvent.
234. The method of paragraph 233, wherein the at least one solvent is a non-polar solvent, a polar solvent, or combination thereof.
235. The method of any one of paragraphs 232-234, further comprising contacting at least one activator with the bimetallic catalyst complex, the first reactant, and the at least one other reactant.
236. The method of paragraph 235, wherein the at least one activator is $Ni(COD)_2$.
237. The method of any one of paragraphs 232-236, wherein the compound is a small molecule.
238. The method of any one of paragraphs 232-237, wherein the method is a cascade method.
239. The method of any one of paragraphs 232-238, wherein the first reactant and the at least one other reactant are different from one another.
240. A method of making a polymer, comprising contacting a monomer with the bimetallic catalyst complex of any one of paragraphs 176-188.
241. The method of paragraph 240, wherein the step of contacting the monomer with the bimetallic catalyst complex is performed in the presence of at least one solvent.
242. The method of paragraph 241, wherein the at least one solvent is a non-polar solvent, a polar solvent, or combination thereof.
243. The method of any one of paragraphs 240-242, further comprising contacting at least one activator with the bimetallic catalyst complex and the monomer.
244. The method of paragraph 243, wherein the at least one activator is $Ni(COD)_2$.
245. The method of any one of paragraphs 240-244, wherein the monomer is an optionally substituted olefin.
246. The method of any one of paragraphs 240-244, wherein the monomer is an optionally substituted terminal olefin or an optionally substituted internal olefin.
247. The method of any one of paragraphs 240-246, wherein the monomer is ethylene.
248. The method of any one of paragraphs 240-247, wherein the polymer is bimodal or monomodal.
249. A polymer made by the method of any one of paragraphs 240-248
250. The polymer of paragraph 249, wherein the polymer is bimodal or monomodal.
251. A method of making a copolymer, comprising contacting a first monomer and at least one other monomer with a bimetallic catalyst complex of any one of paragraphs 176-188, wherein the first monomer and the at least one other monomer are different from one another.
252. The method of paragraph 251, wherein the step of contacting the first monomer and the at least one other monomer with the bimetallic catalyst complex is performed in the presence of at least one solvent.
253. The method of paragraph 252, wherein the at least one solvent is a non-polar solvent, a polar solvent, or combination thereof.
254. The method of any one of paragraphs 251-253, further comprising contacting at least one activator with the bimetallic catalyst complex, the first monomer, and the at least one other monomer.
255. The method of paragraph 254, wherein the at least one activator is Ni(COD)z.
256. The method of any one of paragraphs 251-255, wherein the first monomer and the at least one other monomer are each independently an optionally substituted olefin.
257. The method of any one of paragraphs 251-255, wherein the first monomer and the at least one other monomer are each independently an optionally substituted terminal olefin or an optionally substituted internal olefin.
258. The method of any one of paragraphs 251-257, wherein the first monomer is ethylene.
259. The method of any one of paragraphs of 251-258, wherein the copolymer is bimodal or monomodal.
260. A copolymer made by the method of any one of paragraphs 251-258.
261. The copolymer of paragraph 260, wherein the copolymer is monomodal or bimodal.
262. The method of any one of paragraphs 251-255, wherein the first monomer is $CO_2$; and the at least one other monomer is an epoxide.
263. A catalyst composition, comprising at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10): wherein the bimetallic catalyst complex of Formula (7) has the structure:

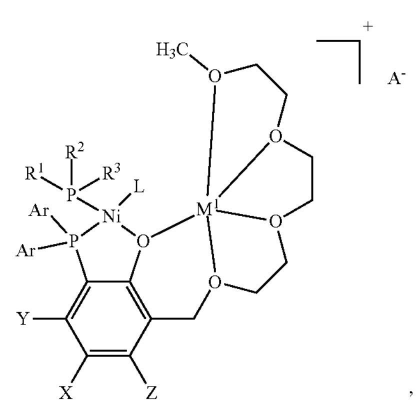

, wherein the bimetallic catalyst complex of Formula (8) has the structure:

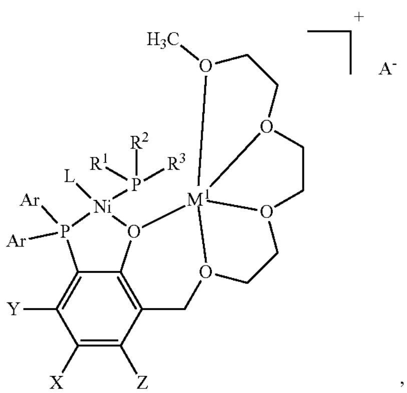

wherein the bimetallic catalyst complex of Formula (9) has the structure:

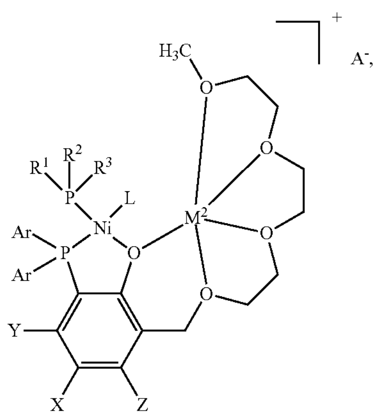

wherein the bimetallic catalyst complex of Formula (10) has the structure:

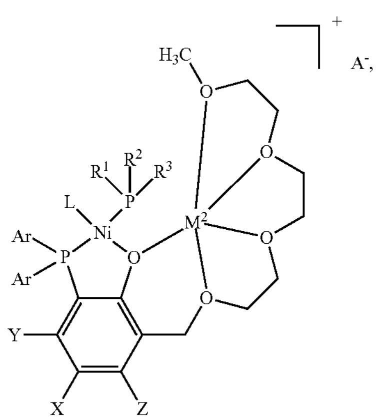

wherein in Formula (7), Formula (8), Formula (9) and Formula (10): Ar is 2,6-dimethoxyphenyl; L is an optionally substituted phenyl group; $M^1$ is Li, Na, K, or Cs; $M^2$ is Li, Na, K, or Cs; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl; wherein $A^-$ is the same in the bimetallic catalyst complex of Formula (7), Formula (8), Formula (9), and Formula (10); wherein Ar is the same in the bimetallic catalyst complex of Formula (7), Formula (8), Formula (9), and Formula (10); wherein L is the same in the bimetallic catalyst complex of Formula (7), Formula (8), Formula (9), and Formula (10); wherein X is the same in the bimetallic catalyst complex of Formula (7), Formula (8), Formula (9), and Formula (10); wherein Y is the same in the bimetallic catalyst complex of Formula (7), Formula (8), Formula (9), and Formula (10); wherein Z is the same in the bimetallic catalyst complex of Formula (7), Formula (8), Formula (9), and Formula (10); wherein $R^1$ is the same in the bimetallic catalyst complex of Formula (7), Formula (8), Formula (9), and Formula (10); wherein $R^2$ is the same in the bimetallic catalyst complex of Formula (7), Formula (8), Formula (9), and Formula (10); wherein $R^3$ is the same in the bimetallic catalyst complex of Formula (7), Formula (8), Formula (9), and Formula (10); wherein $M^1$ is the same in the bimetallic catalyst complex of Formula (7) and Formula (8); wherein $M^2$ is the same in the bimetallic catalyst complex of Formula (9) and Formula (10); and wherein $M^1$ and $M^2$ are different from one another.

264. A catalyst composition, comprising at least four bimetallic catalyst complexes, wherein the at least four bimetallic catalyst complexes are selected from: a bimetallic catalyst complex of Formula (7-A), a bimetallic catalyst complex of Formula (8-A), a bimetallic catalyst complex of Formula (9-A), and a bimetallic catalyst complex of Formula (10-A): wherein the bimetallic catalyst complex of Formula (7-A) has the structure:

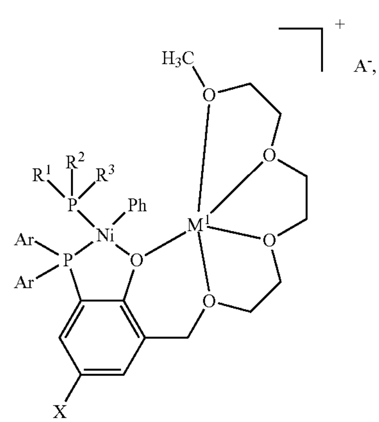

wherein the bimetallic catalyst complex of Formula (8-A) has the structure:

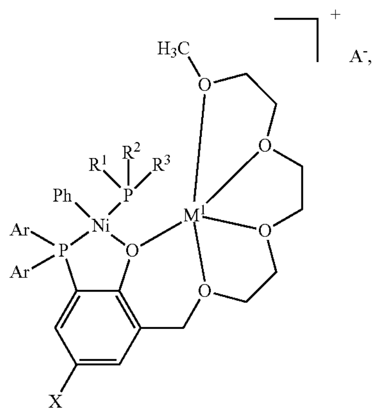

wherein the bimetallic catalyst complex of Formula (9-A) has the structure:

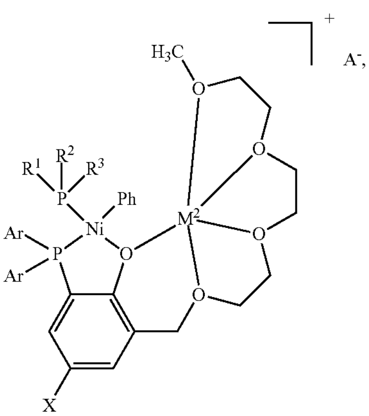

wherein the bimetallic catalyst complex of Formula (10-A) has the structure:

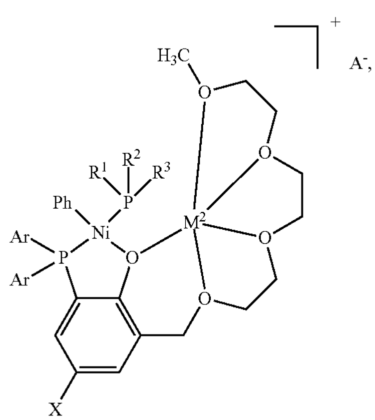

wherein in Formula (7-A), Formula (8-A), Formula (9-A) and Formula (10-A): Ar is 2,6-dimethoxyphenyl; Ph is a phenyl group; $M^1$ is Li, Na, K, or Cs; $M^2$ is Li, Na, K, or Cs; $A^-$ is a weakly coordinating anion; X is hydrogen, an electron donating group, or an electron withdrawing group; and $R^1$, $R^2$, and $R^3$ are each independently selected from optionally substituted aryl, optionally substituted alkyl, and optionally substituted cycloalkyl; wherein $A^-$ is the same in the bimetallic catalyst complex of Formula (7-A), Formula (8-A), Formula (9-A), and Formula (10-A); wherein Ar is the same in the bimetallic catalyst complex of Formula (7-A), Formula (8-A), Formula (9-A), and Formula (10-A); wherein Ph is the same in the bimetallic catalyst complex of Formula (7-A), Formula (8-A), Formula (9-A), and Formula (10-A); wherein X is the same in the bimetallic catalyst complex of Formula (7-A), Formula (8-A), Formula (9-A), and Formula (10-A); wherein $R^1$ is the same in the bimetallic catalyst complex of Formula (7-A), Formula (8-A), Formula (9-A), and Formula (10-A); wherein $R^2$ is the same in the bimetallic catalyst complex of Formula (7-A), Formula (8-A), Formula (9-A), and Formula (10-A); wherein $R^3$ is the same in the bimetallic catalyst complex of Formula (7-A), Formula (8-A), Formula (9-A), and Formula (10-A); wherein $M^1$ is the same in the bimetallic catalyst complex of Formula (7-A) and Formula (8-A); wherein $M^2$ is the same in the bimetallic catalyst complex of Formula (9-A) and Formula (10-A); and wherein $M^1$ and $M^2$ are different from one another.

265. A catalyst composition, comprising at least four bimetallic catalyst complexes, wherein the at least four bimetallic catalyst complexes are selected from: a bimetallic catalyst complex of Formula (7-B), a bimetallic catalyst complex of Formula (8-B), a bimetallic catalyst complex of Formula (9-B), and a bimetallic catalyst complex of Formula (10-B): wherein the bimetallic catalyst complex of Formula (7-B) has the structure:

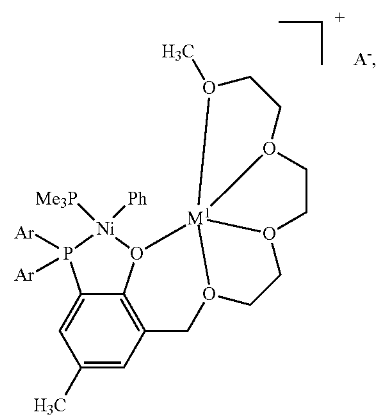

wherein the bimetallic catalyst complex of Formula (8-B) has the structure:

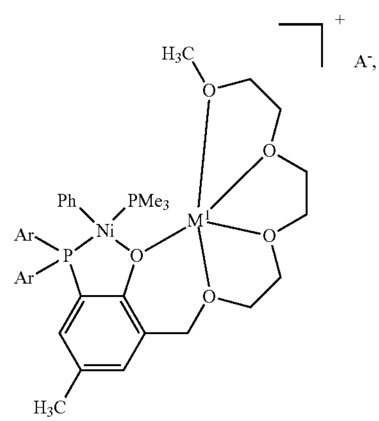

wherein the bimetallic catalyst complex of Formula (9-B) has the structure:

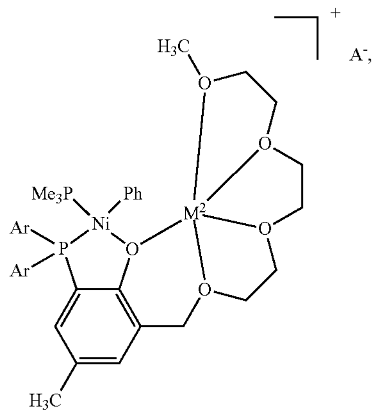

wherein the bimetallic catalyst complex of Formula (10-B) has the structure:

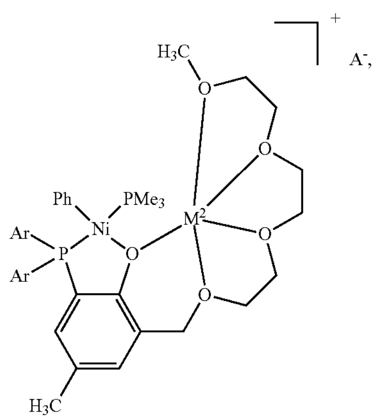

wherein in Formula (7-B), Formula (8-B), Formula (9-B) and Formula (10-B): Ar is 2,6-dimethoxyphenyl; Ph is a phenyl group; $M^1$ is Li, Na, K, or Cs; $M^2$ is Li, Na, K, or Cs; $A^-$ is $[(3,5\text{-}(CF_3)_2C_6H_3)_4B]^-$; and $PMe_3$ is trimethylphosphine; wherein $A^-$ is the same in the bimetallic catalyst complex of Formula (7-B), Formula (8-B), Formula (9-B), and Formula (10-B); wherein Ar is the same in the bimetallic catalyst complex of Formula (7-B), Formula (8-B), Formula (9-B), and Formula (10-B); wherein Ph is the same in the bimetallic catalyst complex of Formula (7-B), Formula (8-B), Formula (9-B), and Formula (10-B); wherein $PMe_3$ is the same in the bimetallic catalyst complex of Formula (7-B), Formula (8-B), Formula (9-B), and Formula (10-B); wherein $M^1$ is the same in the bimetallic catalyst complex of Formula (7-B) and Formula (8-B); wherein $M^2$ is the same in the bimetallic catalyst complex of Formula (9-B) and Formula (10-B); and wherein $M^1$ and $M^2$ are different from one another.

266. The catalyst composition of paragraph 263 or 264, wherein the electron donating group is selected from the group consisting of: alkoxy, amino, hydroxy, and alkyl.

267. The catalyst composition of paragraph 266, wherein alkyl is selected from the group consisting of: —$CH_3$, —$CH_2CH_3$, —$CH_2CH_2CH_3$, and —$CH(CH_3)_2$.

268. The catalyst composition of paragraph 263 or 264, wherein the electron withdrawing group is selected from the group consisting of: $NO_2$, —CN, —C(O)-alkyl, and halo.

269. The catalyst composition of any one of paragraphs 263-265, wherein the phenyl group is

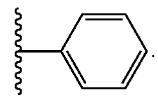 [SMILES: *c1ccccc1]

270. A method for catalyzing homopolymerization of an optionally substituted olefin, comprising: combining or contacting an optionally substituted olefin with the catalyst composition of any one of paragraphs 263-269, whereby the optionally substituted olefin undergoes homopolymerization.

271. The method of paragraph 270, wherein the step of combining or contacting the optionally substituted olefin with the catalyst is performed in the presence of at least one solvent.

272. The method of paragraph 271, wherein the at least one solvent is a non-polar solvent, a polar solvent, or combination thereof.

273. The method of any one of paragraphs 270-272 further comprising combining or contacting at least one activator with the catalyst and the optionally substituted olefin.

274. The method of paragraph 273, wherein the at least one activator is $Ni(COD)_2$.

275. The method of any one of paragraphs 270-274 wherein the optionally substituted olefin is an optionally substituted terminal olefin or an optionally substituted internal olefin.

276. The method of any one of paragraphs 270-275, wherein the optionally substituted olefin is ethylene.

277. A polymer formed by the method of any one of paragraphs 270-276.

278. The polymer of paragraph 277, wherein the polymer is monomodal or bimodal.

279. A method for polymerizing an optionally substituted olefin, the method comprising contacting an optionally substituted olefin with the catalyst composition of any one of paragraphs 263-269 and at least one activator under conditions effective to polymerize the optionally substituted olefin.

280. The method of paragraph 279, wherein the at least one activator is $Ni(COD)_2$.

281. The method of paragraph 279 or 280, wherein the step of contacting the optionally substituted olefin with the catalyst composition and the at least one activator is performed in the presence of at least one solvent.

282. The method of paragraph 281, wherein the at least one solvent is a non-polar solvent, a polar solvent, or combination thereof.

283. The method of any one of paragraphs 279-282, wherein the optionally substituted olefin is an optionally substituted terminal olefin or an optionally substituted internal olefin.

284. The method of any one of paragraphs 279-283, wherein the optionally substituted olefin is ethylene.

285. A polymer formed by the method of any one of paragraphs 279-284.

286. The polymer of paragraph 285, wherein the polymer is monomodal or bimodal.

287. A method for catalyzing copolymerization of a first olefin and at least one other olefin, comprising: combining or contacting a first olefin and at least one other olefin with the catalyst composition of any one of paragraphs 263-269, whereby the first olefin and the at least one other olefin undergoes copolymerization, and wherein the first olefin and the at least one other olefin are different from one another.
288. The method of paragraph 287, wherein the step of combining or contacting the first olefin and the at least one other olefin with the catalyst composition is performed in the presence of at least one solvent.
289. The method of paragraph 288, wherein the at least one solvent is a non-polar solvent, a polar solvent, or combination thereof.
290. The method of any one of paragraphs 287-289, further comprising combining or contacting at least one activator with the catalyst composition, the first olefin, and the at least one other olefin.
291. The method of paragraph 290, wherein the at least one activator is $Ni(COD)_2$.
292. The method of any one of paragraphs 287-291, wherein the first olefin and the at least one other olefin are each independently an optionally substituted olefin.
293. The method of any one of paragraphs 287-291, wherein the first olefin and the at least one other olefin are each independently an optionally substituted terminal olefin or an optionally substituted internal olefin.
294. The method of any one of paragraphs 287-293, wherein the first olefin is ethylene.
295. A polymer formed by the method of any one of paragraphs 287-294.
296. The polymer of paragraph 295, wherein the polymer is monomodal or bimodal.
297. A method for copolymerizing a first olefin and at least one other olefin, the method comprising contacting the first olefin and the at least one other olefin with the catalyst composition of any one of paragraphs 263-269 and at least one activator under conditions effective to copolymerize the first olefin and the at least one other olefin, wherein the first olefin and the at least one other olefin are different from one another.
298. The method of paragraph 297, wherein the at least one activator is $Ni(COD)_2$.
299. The method of paragraph 297 or 298, wherein the step of contacting the first olefin and the at least one other olefin with the catalyst composition and the at least one activator is performed in the presence of at least one solvent.
300. The method of paragraph 299, wherein the at least one solvent is a non-polar solvent, a polar solvent, or combination thereof.
301. The method of any one of paragraphs 297-300, wherein the first olefin and the at least one other olefin are each independently an optionally substituted olefin.
302. The method of any one of paragraphs 297-300, wherein the first olefin and the at least one other olefin are each independently an optionally substituted terminal olefin or an optionally substituted internal olefin.
303. The method of any one of paragraphs 297-302, wherein the first olefin is ethylene.
304. A polymer formed by the method of any one of paragraphs 297-303.
305. The polymer of paragraph 304, wherein the polymer is monomodal or bimodal.
306. A method for making a compound, the method comprising contacting a reactant with a catalyst composition of any one of paragraphs 263-269 under conditions effective to make the compound.
307. The method of paragraph 306, wherein the step of contacting the reactant with the catalyst composition is performed in the presence of at least one solvent.
308. The method of paragraph 307, wherein the at least one solvent is a non-polar solvent, a polar solvent, or combination thereof.
309. The method of any one of paragraphs 306-308, further comprising contacting at least one activator with the catalyst composition and the reactant.
310. The method of paragraph 309, wherein the at least one activator is $Ni(COD)_2$.
311. The method of any one of paragraphs 306-310, wherein the compound is a small molecule.
312. The method of any one of paragraphs 311, wherein the method is a cascade method.
313. A method for making a compound, the method comprising contacting a first reactant and at least one other reactant with a catalyst composition of any one of paragraphs 263-269 under conditions effective to make the compound.
314. The method of paragraph 313, wherein the step of contacting the first reactant and the at least one other reactant with the catalyst composition is performed in the presence of at least one solvent.
315. The method of paragraph 314, wherein the at least one solvent is a non-polar solvent, a polar solvent, or combination thereof.
316. The method of any one of paragraphs 313-315, further comprising contacting at least one activator with the catalyst composition, the first reactant, and the at least one other reactant.
317. The method of paragraph 316, wherein the at least one activator is $Ni(COD)_2$.
318. The method of any one of paragraphs 313-317, wherein the compound is a small molecule.
319. The method of any one of paragraphs 313-318, wherein the method is a cascade method.
320. The method of any one of paragraphs 313-319, wherein the first reactant and the at least one other reactant are different from one another.
321. A method of making a polymer, comprising contacting a monomer with the catalyst composition of any one of paragraphs 263-269.
322. The method of paragraph 321, wherein the step of contacting the monomer with the catalyst composition is performed in the presence of at least one solvent.
323. The method of paragraph 322, wherein the at least one solvent is a non-polar solvent, a polar solvent, or combination thereof.
324. The method of any one of paragraphs 321-323, further comprising contacting at least one activator with the catalyst composition and the monomer.
325. The method of paragraph 324, wherein the at least one activator is $Ni(COD)_2$.
326. The method of any one of paragraphs 321-325, wherein the monomer is an optionally substituted olefin.
327. The method of any one of paragraphs 321-325, wherein the monomer is an optionally substituted terminal olefin or an optionally substituted internal olefin.
328. The method of any one of paragraphs 321-327, wherein the monomer is ethylene.
329. The method of any one of paragraphs 321-328, wherein the polymer is bimodal or monomodal.

330. A polymer made by the method of any one of paragraphs 321-328.

331. The polymer of paragraph 330, wherein the polymer is bimodal or monomodal.

332. A method of making a copolymer, comprising contacting a first monomer and at least one other monomer with a catalyst composition of any one of paragraphs 263-269, wherein the first monomer and the at least one other monomer are different from one another.

334. The method of paragraph 332, wherein the step of contacting the first monomer and the at least one other monomer with the catalyst composition is performed in the presence of at least one solvent.

335. The method of paragraph 334, wherein the at least one solvent is a non-polar solvent, a polar solvent, or combination thereof.

336. The method of any one of paragraphs 332-335, further comprising contacting at least one activator with the catalyst composition, the first monomer, and the at least one other monomer.

337. The method of paragraph 336, wherein the at least one activator is $Ni(COD)_2$.

338. The method of any one of paragraphs 332-337, wherein the first monomer and the at least one other monomer are each independently an optionally substituted olefin.

339. The method of any one of paragraphs 332-337, wherein the first monomer and the at least one other monomer are each independently an optionally substituted terminal olefin or an optionally substituted internal olefin.

340. The method of any one of paragraphs 332-339, wherein the first monomer is ethylene.

341. The method of any one of paragraphs of 332-340, wherein the copolymer is bimodal or monomodal.

342. A copolymer made by the method of any one of paragraphs 332-341.

343. The copolymer of paragraph 342, wherein the copolymer is monomodal or bimodal.

344. The method of any one of paragraphs 332-337, wherein the first monomer is $CO_2$; and the at least one other monomer is an epoxide.

345. A heterobimetallic catalyst having a structure selected from Formula (11) and Formula (12).

Formula (11)

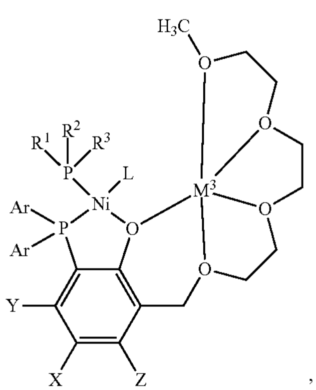

, and

-continued

Formula (12)

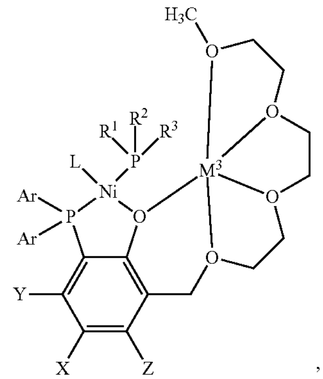

wherein in Formula (11) and Formula (12): Ar is 2,6-dimethoxyphenyl; L is an optionally substituted phenyl group; $M^3$ is a 2+ cation, 3+ cation, 4+ cation, or 5+ cation; X, Y, and Z are each independently selected from hydrogen, an electron donating group, and an electron withdrawing group; and R, $R^2$, and $R^3$ are each independently selected from optionally substituted aryl, optionally substituted alkyl, and optionally substituted cycloalkyl.

346. A heterobimetallic catalyst having a structure of Formula (11):

Formula (11)

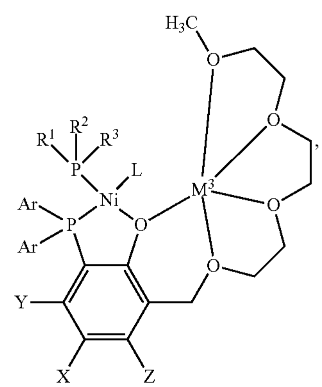

wherein, Ar is 2,6-dimethoxyphenyl; L is an optionally substituted phenyl group; $M^3$ is a 2+ cation, 3+ cation, 4+ cation, or 5+ cation; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

347. A heterobimetallic catalyst having a structure of Formula (12);

Formula (12)

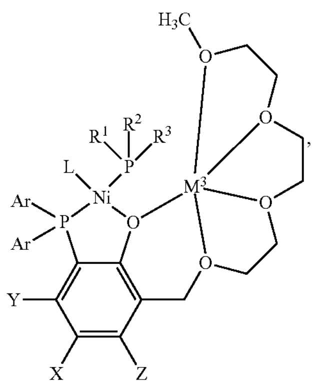

wherein, Ar is 2,6-dimethoxyphenyl; L is an optionally substituted phenyl group; $M^3$ is a 2+ cation, 3+ cation, 4+ cation, or 5+ cation; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

348. A heterobimetallic catalyst having a structure selected from Formula (11-A) and Formula (12-A):

Formula (11-A)

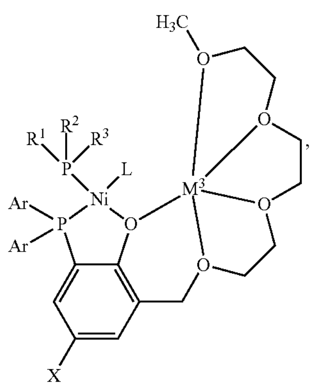

and

Formula (12-A)

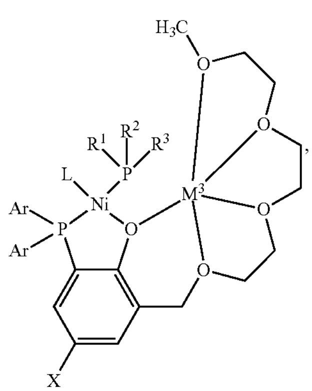

wherein in Formula (11-A) and Formula (12-A): Ar is 2,6-dimethoxyphenyl; Ph is a phenyl group; $M^3$ is a 2+ cation, 3+ cation, 4+ cation, or 5+ cation; X is hydrogen, an electron donating group, or an electron withdrawing group, and $R^1$, $R^2$, and $R^3$ are each independently selected from optionally substituted aryl, optionally substituted alkyl, and optionally substituted cycloalkyl.

349. A heterobimetallic catalyst having a structure of Formula (11-A):

Formula (11-A)

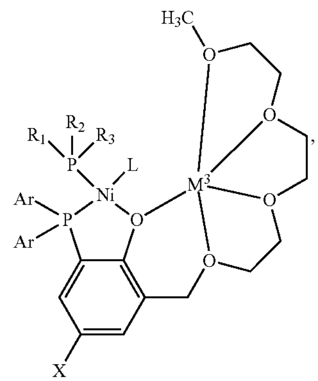

wherein, Ar is 2,6-dimethoxyphenyl; Ph is a phenyl group; $M^3$ is a 2+ cation, 3+ cation, 4+ cation, or 5+ cation; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

350. A heterobimetallic catalyst having a structure of Formula (12-A):

Formula (12-A)

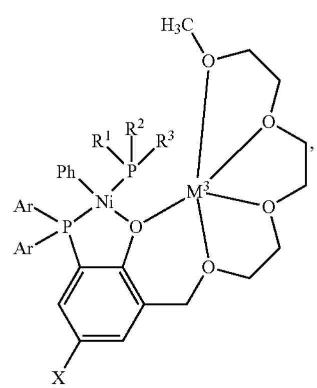

wherein, Ar is 2,6-dimethoxyphenyl; Ph is a phenyl group; $M^3$ is a 2+ cation, 3+ cation, 4+ cation, or 5+ cation; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

351. A heterobimetallic catalyst having a structure selected from Formula (11-B) and Formula (12-B):

Formula (11-B)

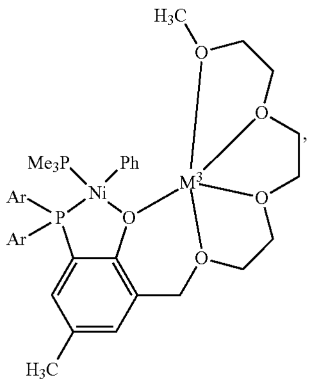

and

Formula (12-B)

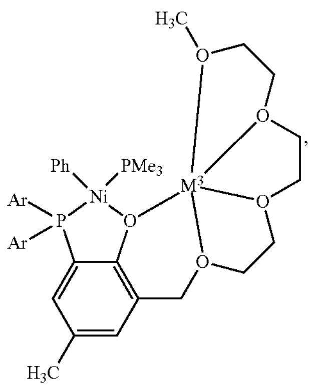

wherein in Formula (11-B) and Formula (12-B); Ar is 2,6-dimethoxyphenyl; Ph is a phenyl group; $M^3$ is a 2+ cation, 3+ cation, 4+ cation, or 5+ cation; and $PMe_3$ is trimethylphosphine.

352. A heterobimetallic catalyst having a structure of Formula (11-B):

Formula (11-B)

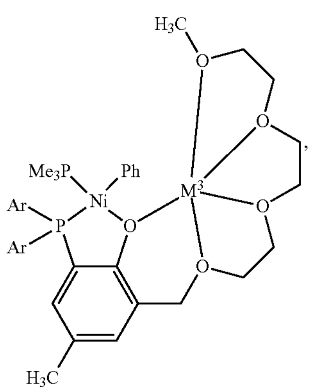

wherein, Ar is 2,6-dimethoxyphenyl; Ph is a phenyl group; $M^3$ is a 2+ cation, 3+ cation, 4+ cation, or 5+ cation; and $PMe_3$ is trimethylphosphine.

353. A heterobimetallic catalyst having a structure of Formula (12-B):

Formula (12-B)

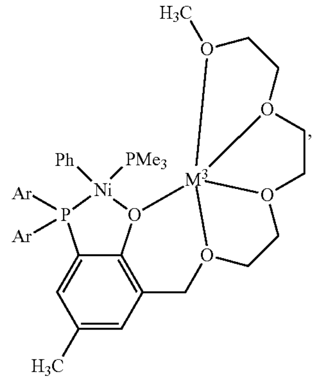

wherein, Ar is 2,6-dimethoxyphenyl; Ph is a phenyl group; $M^3$ is a 2+ cation, 3+ cation, 4+ cation, or 5+ cation; and $PMe_3$ is trimethylphosphine.

354. The catalyst of any one of paragraphs 345-350, wherein the electron donating group is selected from the group consisting of: alkoxy, amino, hydroxy, and alkyl.

355. The catalyst of paragraph 354, wherein alkyl is selected from the group consisting of: —$CH_3$, —$CH_2CH_3$, —$CH_2CH_2CH_3$, and —$CH(CH_3)_2$.

356. The catalyst of any one of paragraphs 345-350, wherein the electron withdrawing group is selected from the group consisting of: $NO_2$, —CN, —C(O)-alkyl, and halo.

357. The catalyst of any one of paragraphs 345-353, wherein the phenyl group is

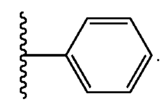

358. A method for catalyzing homopolymerization of an optionally substituted olefin, comprising: combining or contacting an optionally substituted olefin with the heterobimetallic catalyst of any one of paragraphs 345-353, whereby the optionally substituted olefin undergoes homopolymerization.

359. The method of paragraph 358, wherein the step of combining or contacting the optionally substituted olefin with the heterobimetallic catalyst is performed in the presence of at least one solvent.

360. The method of paragraph 359, wherein the at least one solvent is a non-polar solvent, a polar solvent, or combination thereof.

361. The method of any one of paragraphs 358-360, further comprising combining or contacting at least one activator with the heterobimetallic catalyst and the optionally substituted olefin.

362. The method of paragraph 361, wherein the at least one activator is $Ni(COD)_2$.

363. The method of any one of paragraphs 358-362, wherein the optionally substituted olefin is an optionally substituted terminal olefin or an optionally substituted internal olefin.

364. The method of any one of paragraphs 358-363, wherein the optionally substituted olefin is ethylene.

365. A polymer formed by the method of any one of paragraphs 358-364.
366. The polymer of paragraph 365, wherein the polymer is monomodal or bimodal
367. A method for polymerizing an optionally substituted olefin, the method comprising contacting an optionally substituted olefin with the heterobimetallic catalyst of any one of paragraphs 345-353 and at least one activator under conditions effective to polymerize the optionally substituted olefin.
368. The method of paragraph 367, wherein the at least one activator is $Ni(COD)_2$.
369. The method of paragraph 367 or 368, wherein the step of contacting the optionally substituted olefin with the heterobimetallic catalyst and the at least one activator is performed in the presence of at least one solvent.
370. The method of paragraph 369, wherein the at least one solvent is a non-polar solvent, a polar solvent, or combination thereof.
371. The method of any one of paragraphs 367-370, wherein the optionally substituted olefin is an optionally substituted terminal olefin or an optionally substituted internal olefin.
372. The method of any one of paragraphs 367-371, wherein the optionally substituted olefin is ethylene.
373. A polymer formed by the method of any one of paragraphs 367-372.
374. The polymer of paragraph 373, wherein the polymer is monomodal or bimodal.
375. A method for catalyzing copolymerization of a first olefin and at least one other olefin, comprising: combining or contacting a first olefin and at least one other olefin with the heterobimetallic catalyst of any one of paragraphs 345-353, whereby the first olefin and the at least one other olefin undergoes copolymerization, and wherein the first olefin and the at least one other olefin are different from one another.
376. The method of paragraph 375, wherein the step of combining or contacting the first olefin and the at least one other olefin with the heterobimetallic catalyst is performed in the presence of at least one solvent.
377. The method of paragraph 376, wherein the at least one solvent is a non-polar solvent, a polar solvent, or combination thereof.
378. The method of any one of paragraphs 375-377, further comprising combining or contacting at least one activator with the heterobimetallic catalyst, the first olefin, and the at least one other olefin.
379. The method of paragraph 378, wherein the at least one activator is $Ni(COD)_2$.
380. The method of any one of paragraphs 375-379, wherein the first olefin and the at least one other olefin are each independently an optionally substituted olefin.
381. The method of any one of paragraphs 375-379, wherein the first olefin and the at least one other olefin are each independently an optionally substituted terminal olefin or an optionally substituted internal olefin.
382. The method of any one of paragraphs 375-381, wherein the first olefin is ethylene.
383. A polymer formed by the method of any one of paragraphs 375-382.
384. The polymer of paragraph 383, wherein the polymer is monomodal or bimodal.
385. A method for copolymerizing a first olefin and at least one other olefin, the method comprising contacting the first olefin and the at least one other olefin with the heterobimetallic catalyst of any one of paragraphs 345-353 and at least one activator under conditions effective to copolymerize the first olefin and the at least one other olefin, wherein the first olefin and the at least one other olefin are different from one another.
386. The method of paragraph 385, wherein the at least one activator is $Ni(COD)_2$.
387. The method of paragraph 385 or 386, wherein the step of contacting the first olefin and the at least one other olefin with the heterobimetallic catalyst and the at least one activator is performed in the presence of at least one solvent.
388. The method of paragraph 387, wherein the at least one solvent is a non-polar solvent, a polar solvent, or combination thereof.
389. The method of any one of paragraphs 385-388, wherein the first olefin and the at least one other olefin are each independently an optionally substituted olefin.
390. The method of any one of paragraphs 385-388, wherein the first olefin and the at least one other olefin are each independently an optionally substituted terminal olefin or an optionally substituted internal olefin.
391. The method of any one of paragraphs 385-390, wherein the first olefin is ethylene.
392. A polymer formed by the method of any one of paragraphs 385-391.
393. The polymer of paragraph 392, wherein the polymer is monomodal or bimodal.
394. A method for making a compound, the method comprising contacting a reactant with a heterobimetallic catalyst of any one of paragraphs 345-353 under conditions effective to make the compound.
395. The method of paragraph 394, wherein the step of contacting the reactant with the heterobimetallic catalyst is performed in the presence of at least one solvent.
396. The method of paragraph 395, wherein the at least one solvent is a non-polar solvent, a polar solvent, or combination thereof.
397. The method of any one of paragraphs 394-396, further comprising contacting at least one activator with the heterobimetallic catalyst and the reactant.
398. The method of paragraph 397, wherein the at least one activator is $Ni(COD)_2$.
399. The method of any one of paragraphs 394-398, wherein the compound is a small molecule.
400. The method of any one of paragraphs 394-399, wherein the method is a cascade method.
401. A method for making a compound, the method comprising contacting a first reactant and at least one other reactant with a heterobimetallic catalyst of any one of paragraphs 345-353 under conditions effective to make the compound.
402. The method of paragraph 401, wherein the step of contacting the first reactant and the at least one other reactant with the heterobimetallic catalyst is performed in the presence of at least one solvent.
403. The method of paragraph 402, wherein the at least one solvent is a non-polar solvent, a polar solvent, or combination thereof.
404. The method of any one of paragraphs 401-403, further comprising contacting at least one activator with the catalyst, the first reactant, and the at least one other reactant.
405. The method of paragraph 404, wherein the at least one activator is $Ni(COD)_2$.
406. The method of any one of paragraphs 401-405, wherein the compound is a small molecule.

407. The method of any one of paragraphs 401-406, wherein the method is a cascade method.

408. The method of any one of paragraphs 401-407, wherein the first reactant and the at least one other reactant are different from one another.

409. A method of making a polymer, comprising contacting a monomer with the heterobimetallic catalyst of any one of paragraphs 345-353.

410. The method of paragraph 409, wherein the step of contacting the monomer with the heterobimetallic catalyst is performed in the presence of at least one solvent.

411. The method of paragraph 410, wherein the at least one solvent is a non-polar solvent, a polar solvent, or combination thereof.

412. The method of any one of paragraphs 409-411, further comprising contacting at least one activator with the heterobimetallic catalyst and the monomer.

413. The method of paragraph 412, wherein the at least one activator is $Ni(COD)_2$.

414. The method of any one of paragraphs 409-413, wherein the monomer is an optionally substituted olefin.

415. The method of any one of paragraphs 409-414, wherein the monomer is an optionally substituted terminal olefin or an optionally substituted internal olefin.

416. The method of any one of paragraphs 409-415, wherein the monomer is ethylene.

417. The method of any one of paragraphs 409-416, wherein the polymer is bimodal or monomodal.

418. A polymer made by the method of any one of paragraphs 409-417.

419. The polymer of paragraph 418, wherein the polymer is bimodal or monomodal.

420. A method of making a copolymer, comprising contacting a first monomer and at least one other monomer with a heterobimetallic catalyst of any one of paragraphs 345-353, wherein the first monomer and the at least one other monomer are different from one another.

421. The method of paragraph 420, wherein the step of contacting the first monomer and the at least one other monomer with the heterobimetallic catalyst is performed in the presence of at least one solvent.

422. The method of paragraph 421, wherein the at least one solvent is a non-polar solvent, a polar solvent, or combination thereof.

423. The method of any one of paragraphs 420-422, further comprising contacting at least one activator with the heterobimetallic catalyst, the first monomer, and the at least one other monomer.

424. The method of paragraph 423, wherein the at least one activator is $Ni(COD)_2$.

425. The method of any one of paragraphs 420-424, wherein the first monomer and the at least one other monomer are each independently an optionally substituted olefin.

426. The method of any one of paragraphs 420-424 wherein the first monomer and the at least one other monomer are each independently an optionally substituted terminal olefin or an optionally substituted internal olefin.

427. The method of any one of paragraphs 420-426, wherein the first monomer is ethylene.

428. The method of any one of paragraphs of 420-427, wherein the copolymer is bimodal or monomodal.

429. A copolymer made by the method of any one of paragraphs 420-428.

430. The copolymer of paragraph 429, wherein the copolymer is monomodal or bimodal.

431. The method of any one of paragraphs 420-424, wherein the first monomer is $CO_2$; and the at least one other monomer is an epoxide.

432. A bimetallic catalyst complex having a structure selected from Formula (13) and Formula (14):

Formula (13)

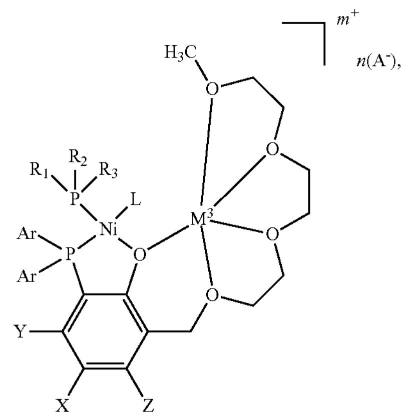

and

Formula (14)

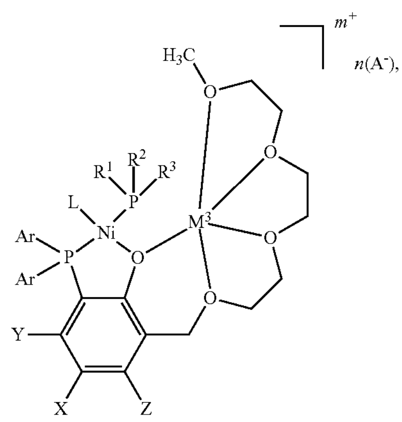

wherein in Formula (13) and Formula (14): m is 2, 3, 4, or 5; n is 1, 2, 3, 4, or 5; Ar is 2,6-dimethoxyphenyl; L is an optionally substituted phenyl group; $M^3$ is a 2+ cation, 3+ cation, 4+ cation, or 5+ cation; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

433. A bimetallic catalyst complex having a structure of Formula (13):

Formula (13)

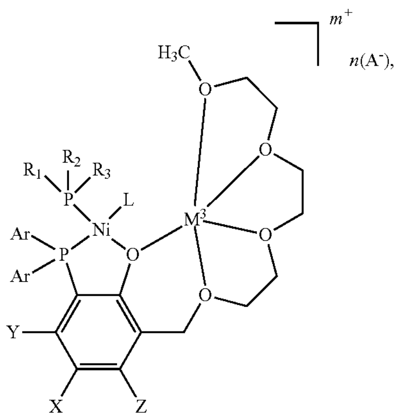

wherein, m is 2, 3, 4, or 5; n is 1, 2, 3, 4, or 5; Ar is 2,6-dimethoxyphenyl; L is an optionally substituted phenyl group; $M^3$ is a 2+ cation, 3+ cation, 4+ cation, or 5+ cation; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl.

434. A bimetallic catalyst complex having a structure of Formula (14):

Formula (14)

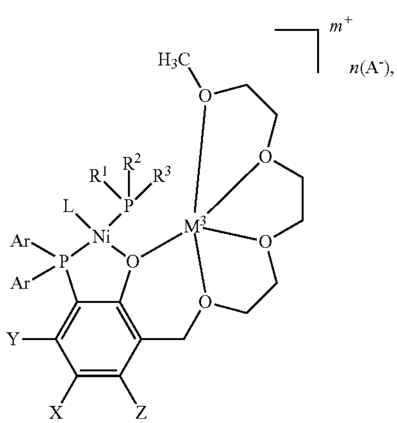

wherein, m is 2, 3, 4, or 5; n is 1, 2, 3, 4, or 5; Ar is 2,6-dimethoxyphenyl; L is an optionally substituted phenyl group; $M^3$ is a 2+ cation, 3+ cation, 4+ cation, or 5+ cation; $A^-$ is a weakly coordinating anion; X, Y, and Z are each independently selected from hydrogen, an electron donating group, and an electron withdrawing group; and $R^1$, $R^2$, and R; are each independently selected from optionally substituted aryl, optionally substituted alkyl, and optionally substituted cycloalkyl.

435. A bimetallic catalyst complex having a structure selected from Formula (13-A) and Formula (14-A):

Formula (13-A)

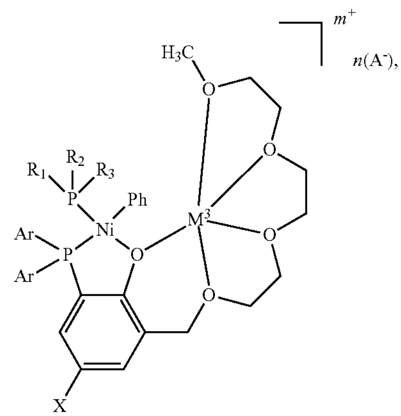

and

Formula (14-A)

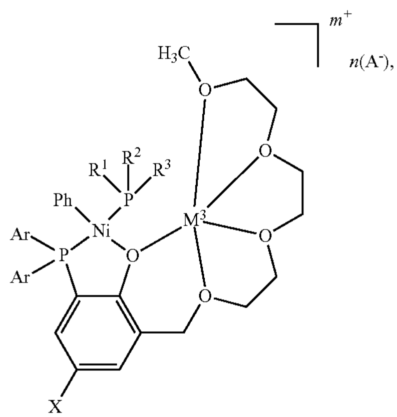

wherein Formula (13-A) and Formula (14-A): m is 2, 3, 4, or 5; n is 1, 2, 3, 4, or 5; Ar is 2,6-dimethoxyphenyl; Ph is a phenyl group; $M^3$ is a 2+ cation, 3+ cation, 4+ cation, or 5+ cation; $A^-$ is a weakly coordinating anion; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

436. A bimetallic catalyst complex having a structure of Formula (13-A):

Formula (13-A)

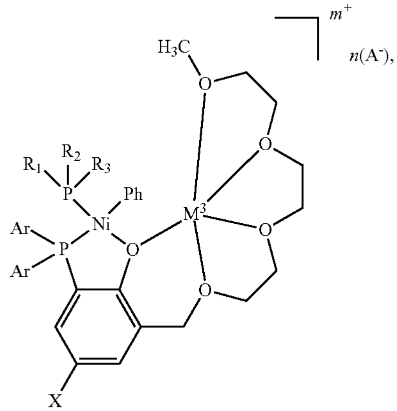

wherein, m is 2, 3, 4, or 5; n is 1, 2, 3, 4, or 5; Ar is 2,6-dimethoxyphenyl; Ph is a phenyl group; $M^3$ is a 2+ cation, 3+ cation, 4+ cation, or 5+ cation; $A^-$ is a weakly coordinating anion; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

437. A bimetallic catalyst complex having a structure of Formula (14-A):

Formula (14-A)

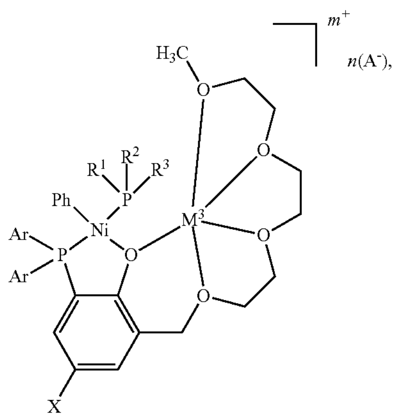

wherein, m is 2, 3, 4, or 5: n is 1, 2, 3, 4, or 5: Ar is 2,6-dimethoxyphenyl; Ph is a phenyl group; $M^3$ is a 2+ cation, 3+ cation, 4+ cation, or 5+ cation; $A^-$ is a weakly coordinating anion; X is hydrogen, an electron donating group, or an electron withdrawing group; and $R^1$, $R^2$, and $R^3$ are each independently selected from optionally substituted aryl, optionally substituted alkyl, and optionally substituted cycloalkyl.

438. A bimetallic catalyst complex having a structure selected from Formula (13-B) and Formula (14-B):

Formula (13-B)

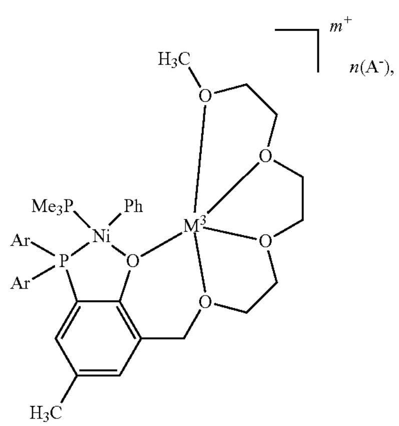

and

-continued

Formula (14-B)

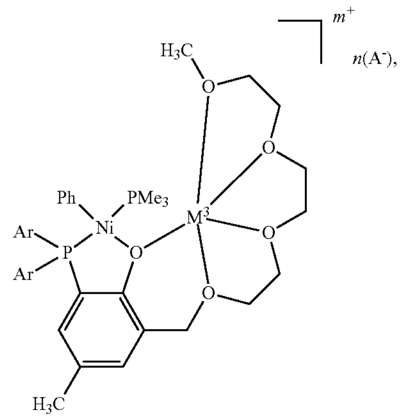

wherein Formula (13-B) and Formula (14-B): m is 2, 3, 4, or 5; n is 1, 2, 3, 4, or 5; Ar is 2,6-dimethoxyphenyl; Ph is a phenyl group; $M^3$ is a 2+ cation, 3+ cation, 4+ cation, or 5+ cation; $A^-$ is $[(3,5\text{-}(CF_3)_2C_6H_3)_4B]^-$; and $PMe_3$ is trimethylphosphine.

439. A bimetallic catalyst complex having a structure of Formula (13-B) is:

Formula (13-B)

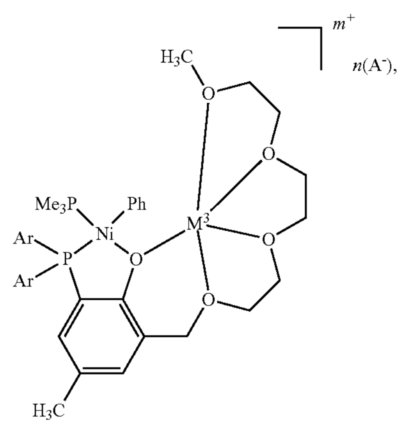

wherein, m is 2, 3, 4, or 5; n is 1, 2, 3, 4, or 5; Ar is 2,6-dimethoxyphenyl; Ph is a phenyl group; $M^3$ is a 2+ cation, 3+ cation, 4+ cation, or 5+ cation; $A^-$ is $[(3,5\text{-}(CF_3)_2C_6H_3)_4B]^-$; and $PMe_3$ is trimethylphosphine.

440. A bimetallic catalyst complex having a structure of Formula (14-B):

Formula (14-B)

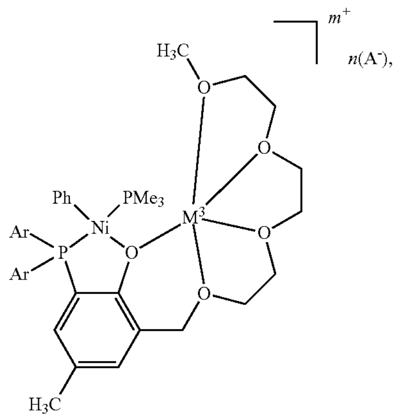

wherein, m is 2, 3, 4, or 5, n is 1, 2, 3, 4, or 5, Ar is 2,6-dimethoxyphenyl; Ph is a phenyl group; $M^3$ is a 2+ cation, 3+ cation, 4+ cation, or 5+ cation; $A^-$ is $[(3,5\text{-}(CF_3)_2C_6H_3)_4B]^-$; and $PMe_3$ is trimethylphosphine.

441. The catalyst of any one of paragraphs 432-437, wherein the electron donating group is selected from the group consisting of: alkoxy, amino, hydroxy, and alkyl.

442. The catalyst of paragraph 441, wherein alkyl is selected from the group consisting of: $—CH_3$, $—CH_2CH_3$, $—CH_2CH_2CH_3$, and $—CH(CH_3)_2$.

443. The catalyst of any one of paragraphs 432-437, wherein the electron withdrawing group is selected from the group consisting of: $NO_2$, —CN, —C(O)-alkyl, and halo.

444. The catalyst of any one of paragraphs 432-443, wherein the phenyl group is

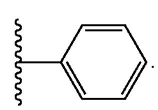

445. A method for catalyzing homopolymerization of an optionally substituted olefin, comprising: combining or contacting an optionally substituted olefin with the bimetallic catalyst complex of any one of paragraphs 432-444, whereby the optionally substituted olefin undergoes homopolymerization.

446. The method of paragraph 445, wherein the step of combining or contacting the optionally substituted olefin with the bimetallic catalyst complex is performed in the presence of at least one solvent.

447. The method of paragraph 446, wherein the at least one solvent is a non-polar solvent, a polar solvent, or combination thereof.

448. The method of any one of paragraphs 445-447, further comprising combining or contacting at least one activator with the bimetallic catalyst complex and the optionally substituted olefin.

449. The method of paragraph 448, wherein the at least one activator is $Ni(COD)_2$.

450. The method of any one of paragraphs 445-449, wherein the optionally substituted olefin is an optionally substituted terminal olefin or an optionally substituted internal olefin.

451. The method of any one of paragraphs 445-450, wherein the optionally substituted olefin is ethylene.

452. A polymer formed by the method of any one of paragraphs 445-451.

453. The polymer of paragraph 452, wherein the polymer is monomodal or bimodal.

454. A method for polymerizing an optionally substituted olefin, the method comprising contacting an optionally substituted olefin with the bimetallic catalyst complex of any one of paragraphs 432-444 and at least one activator under conditions effective to polymerize the optionally substituted olefin.

455. The method of paragraph 454, wherein the at least one activator is $Ni(COD)_2$.

456. The method of paragraph 454 or 455, wherein the step of contacting the optionally substituted olefin with the bimetallic catalyst complex and the at least one activator is performed in the presence of at least one solvent.

457. The method of paragraph 456, wherein the at least one solvent is a non-polar solvent, a polar solvent, or combination thereof.

458. The method of any one of paragraphs 454-457, wherein the optionally substituted olefin is an optionally substituted terminal olefin or an optionally substituted internal olefin.

459. The method of any one of paragraphs 454-458, wherein the optionally substituted olefin is ethylene.

460. A polymer formed by the method of any one of paragraphs 454-459.

461. The polymer of paragraph 460, wherein the polymer is monomodal or bimodal.

462. A method for catalyzing copolymerization of a first olefin and at least one other olefin, comprising: combining or contacting a first olefin and at least one other olefin with the bimetallic catalyst complex of any one of paragraphs 432-444, whereby the first olefin and the at least one other olefin undergoes copolymerization, and wherein the first olefin and the at least one other olefin are different from one another.

463. The method of paragraph 462, wherein the step of combining or contacting the first olefin and the at least one other olefin with the bimetallic catalyst complex is performed in the presence of at least one solvent.

464. The method of paragraph 463, wherein the at least one solvent is a non-polar solvent, a polar solvent, or combination thereof.

465. The method of any one of paragraphs 462-464, further comprising combining or contacting at least one activator with the bimetallic catalyst complex, the first olefin, and the at least one other olefin.

466. The method of paragraph 465, wherein the at least one activator is Ni(COD)z.

467. The method of any one of paragraphs 462-466, wherein the first olefin and the at least one other olefin are each independently an optionally substituted olefin.

468. The method of any one of paragraphs 462-466, wherein the first olefin and the at least one other olefin are each independently an optionally substituted terminal olefin or an optionally substituted internal olefin.

469. The method of any one of paragraphs 462-468, wherein the first olefin is ethylene.

470. A polymer formed by the method of any one of paragraphs 462-469.

471. The polymer of paragraph 470, wherein the polymer is monomodal or bimodal.

472. A method for copolymerizing a first olefin and at least one other olefin, the method comprising contacting the first olefin and the at least one other olefin with the bimetallic catalyst complex of any one of paragraphs 432-444, and at least one activator under conditions effective to copolymerize the first olefin and the at least one other olefin, wherein the first olefin and the at least one other olefin are different from one another.
473. The method of paragraph 472, wherein the at least one activator is Ni(COD)z.
474. The method of paragraph 472 or 473, wherein the step of contacting the first olefin and the at least one other olefin with the bimetallic catalyst complex and the at least one activator is performed in the presence of at least one solvent.
475. The method of paragraph 474, wherein the at least one solvent is a non-polar solvent, a polar solvent, or combination thereof.
476. The method of any one of paragraphs 472-475, wherein the first olefin and the at least one other olefin are each independently an optionally substituted olefin.
477. The method of any one of paragraphs 472-475, wherein the first olefin and the at least one other olefin are each independently an optionally substituted terminal olefin or an optionally substituted internal olefin.
478. The method of any one of paragraphs 472-477, wherein the first olefin is ethylene.
479. A polymer formed by the method of any one of paragraphs 472-478.
480. The polymer of paragraph 479, wherein the polymer is monomodal or bimodal.
481. A method for making a compound, the method comprising contacting a reactant with a bimetallic catalyst complex of any one of paragraphs 432-444 under conditions effective to make the compound.
482. The method of paragraph 481, wherein the step of contacting the reactant with the bimetallic catalyst complex is performed in the presence of at least one solvent.
483. The method of paragraph 482, wherein the at least one solvent is a non-polar solvent, a polar solvent, or combination thereof.
484. The method of any one of paragraphs 481-483, further comprising contacting at least one activator with the bimetallic catalyst complex and the reactant.
485. The method of paragraph 484, wherein the at least one activator is $Ni(COD)_2$.
486. The method of any one of paragraphs 481-485, wherein the compound is a small molecule.
487. The method of any one of paragraphs 481-486, wherein the method is a cascade method.
488. A method for making a compound, the method comprising contacting a first reactant and at least one other reactant with a bimetallic catalyst complex of any one of paragraphs 432-444 under conditions effective to make the compound.
489. The method of paragraph 488, wherein the step of contacting the first reactant and the at least one other reactant with the bimetallic catalyst complex is performed in the presence of at least one solvent.
490. The method of paragraph 489, wherein the at least one solvent is a non-polar solvent, a polar solvent, or combination thereof.
491. The method of any one of paragraphs 488-490, further comprising contacting at least one activator with the bimetallic catalyst complex, the first reactant, and the at least one other reactant.
492. The method of paragraph 491, wherein the at least one activator is $Ni(COD)_2$.
493. The method of any one of paragraphs 488-492, wherein the compound is a small molecule.
494. The method of any one of paragraphs 488-493, wherein the method is a cascade method.
495. The method of any one of paragraphs 488-494, wherein the first reactant and the at least one other reactant are different from one another.
496. A method of making a polymer, comprising contacting a monomer with the bimetallic catalyst complex of any one of paragraphs 432-444.
497. The method of paragraph 496, wherein the step of contacting the monomer with the bimetallic catalyst complex is performed in the presence of at least one solvent.
498. The method of paragraph 497, wherein the at least one solvent is a non-polar solvent, a polar solvent, or combination thereof.
499. The method of any one of paragraphs 496-498, further comprising contacting at least one activator with the bimetallic catalyst complex and the monomer.
500. The method of paragraph 499, wherein the at least one activator is $Ni(COD)_2$.
501. The method of any one of paragraphs 496-500, wherein the monomer is an optionally substituted olefin.
502. The method of any one of paragraphs 496-500, wherein the monomer is an optionally substituted terminal olefin or an optionally substituted internal olefin.
503. The method of any one of paragraphs 496-502, wherein the monomer is ethylene.
504. The method of any one of paragraphs 496-503, wherein the polymer is bimodal or monomodal.
505. A polymer made by the method of any one of paragraphs 496-503.
506. The polymer of paragraph 505, wherein the polymer is bimodal or monomodal.
507. A method of making a copolymer, comprising contacting a first monomer and at least one other monomer with a bimetallic catalyst complex of any one of paragraphs 432-444, wherein the first monomer and the at least one other monomer are different from one another.
508. The method of paragraph 507, wherein the step of contacting the first monomer and the at least one other monomer with the bimetallic catalyst complex is performed in the presence of at least one solvent.
509. The method of paragraph 508, wherein the at least one solvent is a non-polar solvent, a polar solvent, or combination thereof.
510. The method of any one of paragraphs 507-509, further comprising contacting at least one activator with the bimetallic catalyst complex, the first monomer, and the at least one other monomer.
511. The method of paragraph 510, wherein the at least one activator is $Ni(COD)_2$.
512. The method of any one of paragraphs 507-511, wherein the first monomer and the at least one other monomer are each independently an optionally substituted olefin.
513. The method of any one of paragraphs 507-511, wherein the first monomer and the at least one other monomer are each independently an optionally substituted terminal olefin or an optionally substituted internal olefin.

514. The method of any one of paragraphs 507-513, wherein the first monomer is ethylene.

515. The method of any one of paragraphs of 507-514, wherein the copolymer is bimodal or monomodal.

516. A copolymer made by the method of any one of paragraphs 507-514

517. The copolymer of paragraph 516, wherein the copolymer is monomodal or bimodal.

518. The method of any one of paragraphs 507-511, wherein the first monomer is $CO_2$; and the at least one other monomer is an epoxide.

519. A catalyst composition, comprising at least four bimetallic catalyst complexes, wherein the at least four bimetallic catalyst complexes are selected from: a bimetallic catalyst complex of Formula (15), a bimetallic catalyst complex of Formula (16), a bimetallic catalyst complex of Formula (17), and a bimetallic catalyst complex of Formula (18): wherein the bimetallic catalyst complex of Formula (15) has the structure:

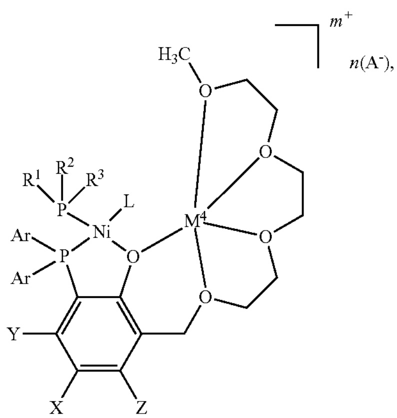

wherein the bimetallic catalyst complex of Formula (16) has the structure;

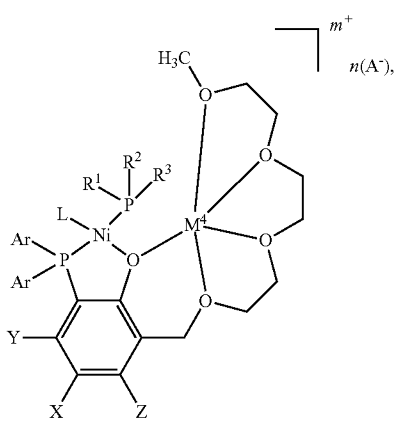

wherein the bimetallic catalyst complex of Formula (17) has the structure:

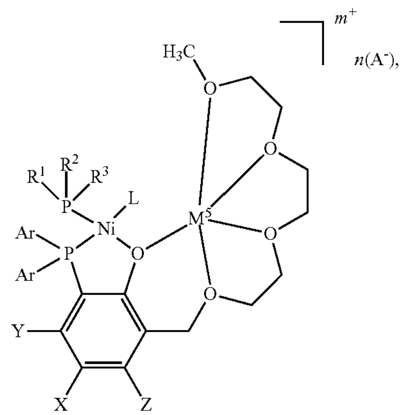

wherein the bimetallic catalyst complex of Formula (18) has the structure:

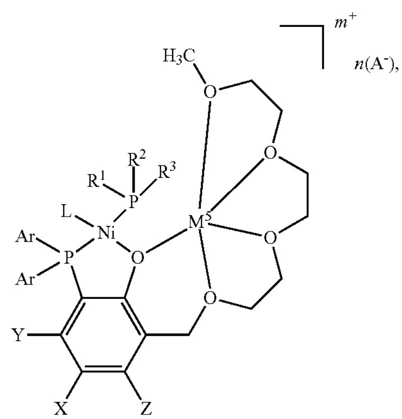

wherein in Formula (15), Formula (16), Formula (17) and Formula (18): m is 2, 3, 4, or 5; n is 1, 2, 3, 4, or 5; Ar is 2,6-dimethoxyphenyl; L is an optionally substituted phenyl group; $M^4$ is a 2+ cation, 3+ cation, 4+ cation, or 5+ cation; $M^5$ is a 2+ cation, 3+ cation, 4+ cation, or 5+ cation; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl; wherein m is the same in the bimetallic catalyst complex of Formula (15), Formula (16), Formula (17), and Formula (18); wherein n is the same in the bimetallic catalyst complex of Formula (15), Formula (16), Formula (17), and Formula (18); wherein $A^-$ is the same in the bimetallic catalyst complex of Formula (15), Formula (16), Formula (17), and Formula (18); wherein Ar is the same in the bimetallic catalyst complex of Formula (15), Formula (16), Formula (17), and Formula (18); wherein L is the same in the bimetallic catalyst complex of Formula (15), Formula (16), Formula (17), and Formula (18); wherein X is the same in the bimetallic catalyst complex of Formula (15), Formula (16), Formula (17), and Formula (18); wherein Y is the same in the bimetallic catalyst complex of Formula (15), Formula (16), Formula (17), and Formula (18); wherein Z is the same in the bimetallic catalyst complex of Formula (15), Formula (16), Formula (17), and Formula (18); wherein $R^1$ is the same in the bimetallic catalyst complex of Formula (15), Formula (16), Formula (17), and Formula (18); wherein $R^2$ is the same in the bimetallic catalyst complex of Formula (15), Formula (16), Formula (17), and Formula (18); wherein $R^3$ is the same in the bimetallic catalyst complex of Formula (15), Formula (16), Formula (17), and Formula (18); wherein $M^4$ is the same in the bimetallic catalyst complex of Formula (15) and Formula (16); wherein $M^5$ is the same in the bimetallic catalyst complex of Formula (17) and Formula (18); and wherein $M^4$ and Mare different from one another.

520. A catalyst composition, comprising at least four bimetallic catalyst complexes, wherein the at least four bimetallic catalyst complexes are selected from: a bimetallic catalyst complex of Formula (15-A), a bimetallic catalyst complex of Formula (16-A), a bimetallic catalyst complex of Formula (17-A), and a bimetallic catalyst complex of Formula (18-A): wherein the bimetallic catalyst complex of Formula (15-A) has the structure:

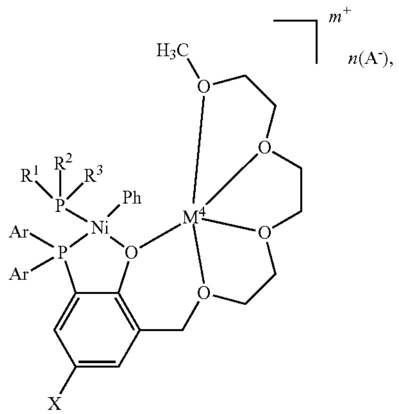

wherein the bimetallic catalyst complex of Formula (16-A) has the structure:

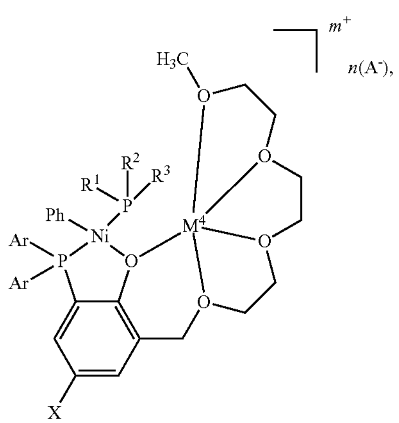

wherein the bimetallic catalyst complex of Formula (17-A) has the structure:

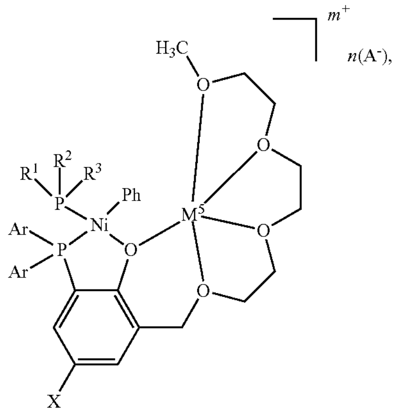

wherein the bimetallic catalyst complex of Formula (18-A) has the structure:

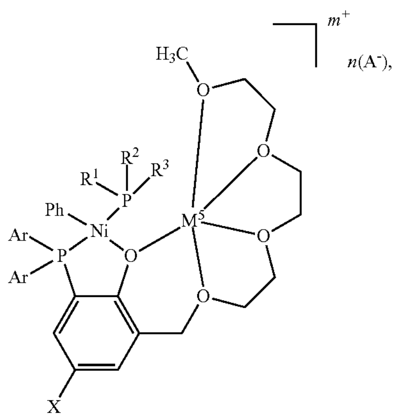

wherein in Formula (15-A), Formula (16-A), Formula (17-A) and Formula (18-A): m is 2, 3, 4, or 5; n is 1, 2, 3, 4, or 5; Ar is 2,6-dimethoxyphenyl; Ph is a phenyl group; $M^4$ is a 2+ cation, 3+ cation, 4+ cation, or 5+ cation; $M^5$ is a 2+ cation, 3+ cation, 4+ cation, or 5+ cation; $A^-$ is a weakly coordinating anion; X is hydrogen, an electron donating group, or an electron withdrawing group; and $R^1$, $R^2$, and $R^3$ are each independently selected from optionally substituted aryl, optionally substituted alkyl, and optionally substituted cycloalkyl; wherein m is the same in the bimetallic catalyst complex of Formula (15-A), Formula (16-A), Formula (17-A), and Formula (18-A); wherein n is the same in the bimetallic catalyst complex of Formula (15-A), Formula (16-A), Formula (17-A), and Formula (18-A); wherein $A^-$ is the same in the bimetallic catalyst complex of Formula (15-A), Formula (16-A), Formula (17-A), and Formula (18-A); wherein Ar is the same in the bimetallic catalyst complex of Formula (15-A), Formula (16-A), Formula (17-A), and Formula (18-A); wherein Ph is the same in the bimetallic catalyst complex of Formula (15-A), Formula (16-A), Formula (17-A), and Formula (18-A); wherein X is the same in the bimetallic catalyst complex of Formula (15-A), Formula (16-A), Formula (17-A), and Formula (18-A); wherein $R^1$ is the same in the bimetallic catalyst complex of Formula (15-A), Formula (16-A), Formula (17-A), and Formula (18-A); wherein $R^2$ is the same in the bimetallic catalyst complex of Formula (15-A), Formula (16-A), Formula (17-A), and Formula (18-A); wherein $R^3$ is the same in the bimetallic catalyst complex of Formula (15-A), Formula (16-A), Formula (17-A), and Formula (18-A); wherein $M^4$ is the same in the bimetallic catalyst complex of Formula (15-A) and Formula (16-A); wherein $M^5$ is the same in the bimetallic catalyst complex of Formula (17-A) and Formula (18-A); and wherein $M^4$ and $M^5$ are different from one another.

521. A catalyst composition, comprising at least four bimetallic catalyst complexes, wherein the at least four bimetallic catalyst complexes are selected from: a bimetallic catalyst complex of Formula (15-B), a bimetallic catalyst complex of Formula (16-B), a bimetallic catalyst complex of Formula (17-B), and a bimetallic catalyst complex of Formula (18-B): wherein the bimetallic catalyst complex of Formula (15-B) has the structure:

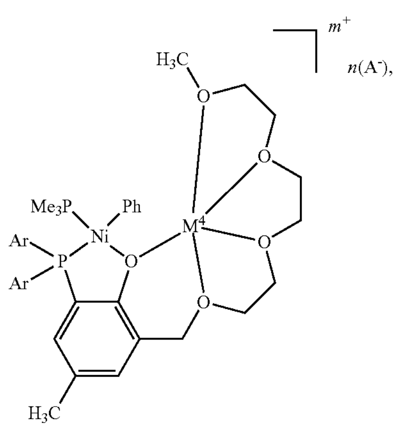

wherein the bimetallic catalyst complex of Formula (16-B) has the structure:

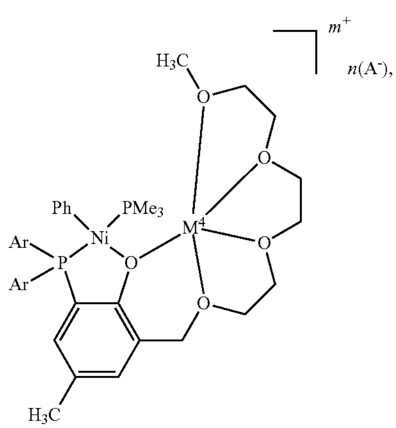

wherein the bimetallic catalyst complex of Formula (17-B) has the structure:

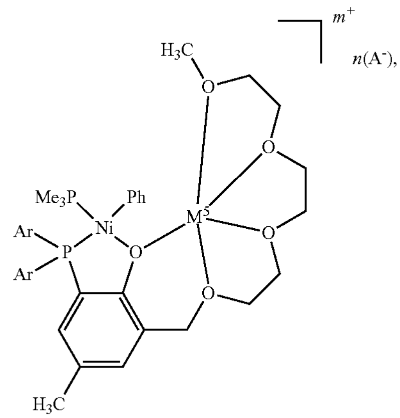

wherein the bimetallic catalyst complex of Formula (18-B) has the structure:

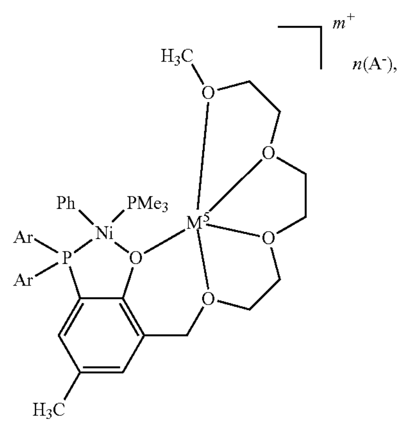

wherein in Formula (15-B), Formula (16-B), Formula (17-B) and Formula (18-B): m is 2, 3, 4, or 5; n is 1, 2, 3, 4, or 5; Ar is 2,6-dimethoxyphenyl; Ph is a phenyl group; $M^4$ is a 2+ cation, 3+ cation, 4+ cation, or 5+ cation; $M^5$ is a 2+ cation, 3+ cation, 4+ cation, or 5+ cation; $A^-$ is $[(3,5\text{-}(CF_3)_2C_6H_3)_4B]^-$; and $PMe_3$ is trimethylphosphine; wherein m is the same in the bimetallic catalyst complex of Formula (15-B), Formula (16-B), Formula (17-B), and Formula (18-B); wherein n is the same in the bimetallic catalyst complex of Formula (15-B), Formula (16-B), Formula (17-B), and Formula (18-B); wherein $A^-$ is the same in the bimetallic catalyst complex of Formula (15-B), Formula (16-B), Formula (17-B), and Formula (18-B); wherein Ar is the same in the bimetallic catalyst complex of Formula (15-B), Formula (16-B), Formula (17-B), and Formula (18-B); wherein Ph is the same in the bimetallic catalyst complex of Formula (15-B), Formula (16-B), Formula (17-B), and Formula (18-B); wherein $PMe_3$ is the same in the bimetallic catalyst complex of Formula (15-B), Formula (16-B), Formula (17-B), and Formula (18-B); wherein $M^4$ is the same in the bimetallic catalyst complex of Formula (15-B) and Formula (16-B); wherein $M^5$ is the same in the bimetallic catalyst complex of Formula (17-B) and Formula (18-B); and wherein $M^4$ and $M^5$ are different from one another.

522. The catalyst composition of paragraph 519 or 520, wherein the electron donating group is selected from the group consisting of: alkoxy, amino, hydroxy, and alkyl.
523. The catalyst composition of paragraph 266, wherein alkyl is selected from the group consisting of: —$CH_3$, —$CH_2CH_3$, —$CH_2CH_2CH_3$, and —$CH(CH_3)_2$.
524. The catalyst composition of paragraph 263 or 264, wherein the electron withdrawing group is selected from the group consisting of: $NO_2$, —CN, —C(O)-alkyl, and halo.
525. The catalyst composition of any one of paragraphs 263-265, wherein the phenyl group is

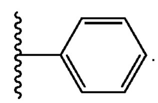 [SMILES: *c1ccccc1]

526. A method for catalyzing homopolymerization of an optionally substituted olefin, comprising: combining or contacting an optionally substituted olefin with the catalyst composition of any one of paragraphs 519-525, whereby the optionally substituted olefin undergoes homopolymerization.
527. The method of paragraph 526, wherein the step of combining or contacting the optionally substituted olefin with the catalyst is performed in the presence of at least one solvent.
528. The method of paragraph 527, wherein the at least one solvent is a non-polar solvent, a polar solvent, or combination thereof.
529. The method of any one of paragraphs 526-528 further comprising combining or contacting at least one activator with the catalyst and the optionally substituted olefin.
530. The method of paragraph 529, wherein the at least one activator is $Ni(COD)_2$.
531. The method of any one of paragraphs 526-530 wherein the optionally substituted olefin is an optionally substituted terminal olefin or an optionally substituted internal olefin.
532. The method of any one of paragraphs 526-531, wherein the optionally substituted olefin is ethylene.
533. A polymer formed by the method of any one of paragraphs 526-532.
534. The polymer of paragraph 533, wherein the polymer is monomodal or bimodal.
535. A method for polymerizing an optionally substituted olefin, the method comprising contacting an optionally substituted olefin with the catalyst composition of any one of paragraphs 519-525 and at least one activator under conditions effective to polymerize the optionally substituted olefin.
536. The method of paragraph 535, wherein the at least one activator is $Ni(COD)_2$.
537. The method of paragraph 535 or 536, wherein the step of contacting the optionally substituted olefin with the catalyst composition and the at least one activator is performed in the presence of at least one solvent.
538. The method of paragraph 537, wherein the at least one solvent is a non-polar solvent, a polar solvent, or combination thereof.
539. The method of any one of paragraphs 535-538, wherein the optionally substituted olefin is an optionally substituted terminal olefin or an optionally substituted internal olefin.
540. The method of any one of paragraphs 535-539, wherein the optionally substituted olefin is ethylene.
541. A polymer formed by the method of any one of paragraphs 535-540.
542. The polymer of paragraph 541, wherein the polymer is monomodal or bimodal.
543. A method for catalyzing copolymerization of a first olefin and at least one other olefin, comprising: combining or contacting a first olefin and at least one other olefin with the catalyst composition of any one of paragraphs 519-525, whereby the first olefin and the at least one other olefin undergoes copolymerization, and wherein the first olefin and the at least one other olefin are different from one another.
544. The method of paragraph 543, wherein the step of combining or contacting the first olefin and the at least one other olefin with the catalyst composition is performed in the presence of at least one solvent.
545. The method of paragraph 544, wherein the at least one solvent is a non-polar solvent, a polar solvent, or combination thereof.
546. The method of any one of paragraphs 543-545, further comprising combining or contacting at least one activator with the catalyst composition, the first olefin, and the at least one other olefin.
547. The method of paragraph 546, wherein the at least one activator is $Ni(COD)_2$.
548. The method of any one of paragraphs 543-547, wherein the first olefin and the at least one other olefin are each independently an optionally substituted olefin.
549. The method of any one of paragraphs 543-547, wherein the first olefin and the at least one other olefin are each independently an optionally substituted terminal olefin or an optionally substituted internal olefin.
550. The method of any one of paragraphs 543-549, wherein the first olefin is ethylene.
551. A polymer formed by the method of any one of paragraphs 543-550.
552. The polymer of paragraph 551, wherein the polymer is monomodal or bimodal.
553. A method for copolymerizing a first olefin and at least one other olefin, the method comprising contacting the first olefin and the at least one other olefin with the catalyst composition of any one of paragraphs 519-525, and at least one activator under conditions effective to copolymerize the first olefin and the at least one other olefin, wherein the first olefin and the at least one other olefin are different from one another.
554. The method of paragraph 553, wherein the at least one activator is Ni(COD)z.
555. The method of paragraph 553 or 554, wherein the step of contacting the first olefin and the at least one other olefin with the catalyst composition and the at least one activator is performed in the presence of at least one solvent.
556. The method of paragraph 555, wherein the at least one solvent is a non-polar solvent, a polar solvent, or combination thereof.
557. The method of any one of paragraphs 553-556, wherein the first olefin and the at least one other olefin are each independently an optionally substituted olefin.
558. The method of any one of paragraphs 553-556, wherein the first olefin and the at least one other olefin are each independently an optionally substituted terminal olefin or an optionally substituted internal olefin.
559. The method of any one of paragraphs 553-558, wherein the first olefin is ethylene.

560. A polymer formed by the method of any one of paragraphs 553-559.
561. The polymer of paragraph 560, wherein the polymer is monomodal or bimodal.
562. A method for making a compound, the method comprising contacting a reactant with a catalyst composition of any one of paragraphs 519-525 under conditions effective to make the compound.
563. The method of paragraph 562, wherein the step of contacting the reactant with the catalyst composition is performed in the presence of at least one solvent.
564. The method of paragraph 563, wherein the at least one solvent is a non-polar solvent, a polar solvent, or combination thereof.
565. The method of any one of paragraphs 562-564, further comprising contacting at least one activator with the catalyst composition and the reactant.
566. The method of paragraph 565, wherein the at least one activator is $Ni(COD)_2$.
567. The method of any one of paragraphs 562-566, wherein the compound is a small molecule.
568. The method of any one of paragraphs 562-567, wherein the method is a cascade method.
569. A method for making a compound, the method comprising contacting a first reactant and at least one other reactant with a catalyst composition of any one of paragraphs 519-525 under conditions effective to make the compound.
570. The method of paragraph 569, wherein the step of contacting the first reactant and the at least one other reactant with the catalyst composition is performed in the presence of at least one solvent.
571. The method of paragraph 570, wherein the at least one solvent is a non-polar solvent, a polar solvent, or combination thereof.
572. The method of any one of paragraphs 569-571, further comprising contacting at least one activator with the catalyst composition, the first reactant, and the at least one other reactant.
573. The method of paragraph 572, wherein the at least one activator is $Ni(COD)_2$.
574. The method of any one of paragraphs 569-573, wherein the compound is a small molecule.
575. The method of any one of paragraphs 569-574, wherein the method is a cascade method.
576. The method of any one of paragraphs 569-576, wherein the first reactant and the at least one other reactant are different from one another.
577. A method of making a polymer, comprising contacting a monomer with the catalyst composition of any one of paragraphs 519-525.
578. The method of paragraph 577, wherein the step of contacting the monomer with the catalyst composition is performed in the presence of at least one solvent.
579. The method of paragraph 578, wherein the at least one solvent is a non-polar solvent, a polar solvent, or combination thereof.
580. The method of any one of paragraphs 577-579, further comprising contacting at least one activator with the catalyst composition and the monomer.
581. The method of paragraph 580, wherein the at least one activator is $Ni(COD)_2$.
582. The method of any one of paragraphs 577-581, wherein the monomer is an optionally substituted olefin.
583. The method of any one of paragraphs 577-581, wherein the monomer is an optionally substituted terminal olefin or an optionally substituted internal olefin.
584. The method of any one of paragraphs 577-583, wherein the monomer is ethylene.
585. The method of any one of paragraphs 577-584, wherein the polymer is bimodal or monomodal.
586. A polymer made by the method of any one of paragraphs 577-585.
587. The polymer of paragraph 586, wherein the polymer is bimodal or monomodal.
588. A method of making a copolymer, comprising contacting a first monomer and at least one other monomer with a catalyst composition of any one of paragraphs 519-525, wherein the first monomer and the at least one other monomer are different from one another.
589. The method of paragraph 588, wherein the step of contacting the first monomer and the at least one other monomer with the catalyst composition is performed in the presence of at least one solvent.
590. The method of paragraph 589, wherein the at least one solvent is a non-polar solvent, a polar solvent, or combination thereof.
591. The method of any one of paragraphs 588-590, further comprising contacting at least one activator with the catalyst composition, the first monomer, and the at least one other monomer.
592. The method of paragraph 591, wherein the at least one activator is $Ni(COD)_2$.
593. The method of any one of paragraphs 588-592, wherein the first monomer and the at least one other monomer are each independently an optionally substituted olefin.
594. The method of any one of paragraphs 588-592, wherein the first monomer and the at least one other monomer are each independently an optionally substituted terminal olefin or an optionally substituted internal olefin.
595. The method of any one of paragraphs 588-594, wherein the first monomer is ethylene.
596. The method of any one of paragraphs of 588-595, wherein the copolymer is bimodal or monomodal.
597. A copolymer made by the method of any one of paragraphs 588-595.
598. The copolymer of paragraph 597, wherein the copolymer is monomodal or bimodal.
599. The method of any one of paragraphs 588-598, wherein the first monomer is $CO_2$; and the at least one other monomer is an epoxide.
600. A method in any of the preceding paragraphs in which the optionally substituted olefin is a polar olefin.

Some embodiments of the present invention can be defined as any of the following numbered paragraphs.

1. A catalyst composition, comprising at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10): wherein the bimetallic catalyst complex of Formula (7) has the structure:

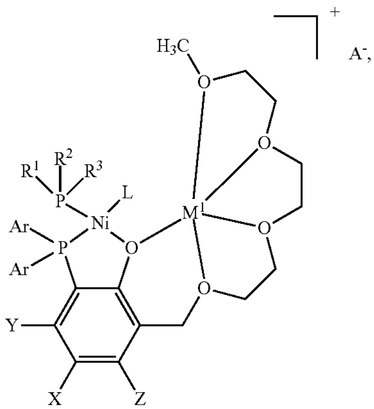

wherein the bimetallic catalyst complex of Formula (8) has the structure:

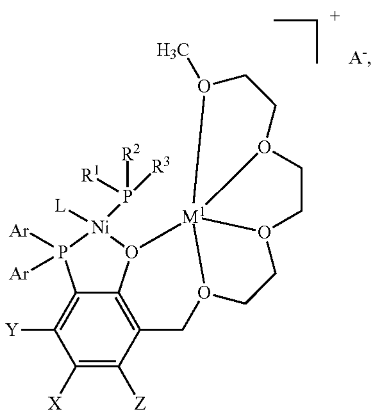

wherein the bimetallic catalyst complex of Formula (9) has the structure:

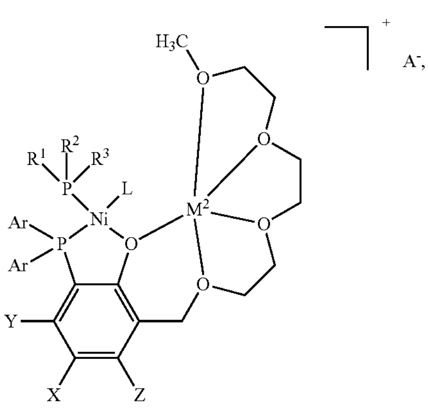

wherein the bimetallic catalyst complex of Formula (10) has the structure:

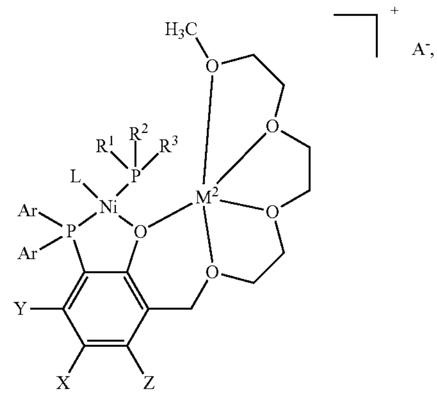

wherein in Formula (7), Formula (8), Formula (9) and Formula (10): Ar is 2,6-dimethoxyphenyl; L is an optionally substituted phenyl group; $M^1$ is Li, Na, K, or Cs; $M^2$ is Li, Na, K, or Cs; $A^-$ is a weakly coordinating anion; X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl; wherein $A^-$ is the same in the bimetallic catalyst complex of Formula (7), Formula (8), Formula (9), and Formula (10); wherein Ar is the same in the bimetallic catalyst complex of Formula (7), Formula (8), Formula (9), and Formula (10); wherein L is the same in the bimetallic catalyst complex of Formula (7), Formula (8), Formula (9), and Formula (10); wherein X is the same in the bimetallic catalyst complex of Formula (7), Formula (8), Formula (9), and Formula (10); wherein Y is the same in the bimetallic catalyst complex of Formula (7), Formula (8), Formula (9), and Formula (10); wherein Z is the same in the bimetallic catalyst complex of Formula (7), Formula (8), Formula (9), and Formula (10); wherein $R^1$ is the same in the bimetallic catalyst complex of Formula (7), Formula (8), Formula (9), and Formula (10); wherein $R^2$ is the same in the bimetallic catalyst complex of Formula (7), Formula (8), Formula (9), and Formula (10); wherein $R^3$ is the same in the bimetallic catalyst complex of Formula (7), Formula (8), Formula (9), and Formula (10); wherein $M^1$ is the same in the bimetallic catalyst complex of Formula (7) and Formula (8); wherein $M^2$ is the same in the bimetallic catalyst complex of Formula (9) and Formula (10); and wherein $M^1$ and $M^2$ are different from one another.

2. The catalyst composition of paragraph 1, wherein the electron donating group is selected from the group consisting of: alkoxy, phenoxy, amino, alkylamino, dialkylamino, hydroxy, alkyl, and cycloalkyl; and the the electron withdrawing group is selected from the group consisting of: $NO_2$, —CN, —C(O)-alkyl, C(O)Oalkyl, C(O)Nalkyl, —$SO_3H$, —$SO_2$alkyl, —$PO_3H$, —$PO_3$alkyl, —$CF_3$, and halo.

3. The catalyst composition of paragraph 1, wherein in Formula (7), Formula (8), Formula (9) and Formula (10): Ar is 2,6-dimethoxyphenyl; L is a phenyl group; $M^1$ is Li, Na, K, or Cs; $M^2$ is Li, Na, K, or Cs; $A^-$ is $[(3,5\text{-}(CF_3)_2C_6H_3)_4B]^-$; X is methyl; Y is hydrogen; Z is hydrogen; and $R^1$, $R^2$, and $R^3$ are each methyl: wherein $A^-$ is the same in the bimetallic catalyst complex of Formula (7), Formula (8), Formula (9), and Formula (10); wherein Ar is the same in the bimetallic catalyst complex of Formula (7), Formula (8), Formula (9), and Formula (10); wherein L is the same in the bimetallic catalyst complex of Formula (7), Formula (8), Formula (9), and Formula (10); wherein X is the same in the bimetallic catalyst complex of Formula (7), Formula (8), Formula (9), and Formula (10): wherein Y is the same in the bimetallic catalyst complex of Formula (7), Formula (8), Formula (9), and Formula (10); wherein Z is the same in the bimetallic catalyst complex of Formula (7), Formula (8), Formula (9), and Formula (10); wherein $R^1$ is the same in the bimetallic catalyst complex of Formula (7), Formula (8), Formula (9), and Formula (10); wherein $R^2$ is the same in the bimetallic catalyst complex of Formula (7), Formula (8), Formula (9), and Formula (10): wherein $R^3$ is the same in the bimetallic catalyst complex of Formula (7), Formula (8), Formula (9), and Formula (10); wherein $M^1$ is the same in the bimetallic catalyst complex of Formula (7) and Formula (8); wherein $M^2$ is the same in the bimetallic catalyst complex of Formula (9) and Formula (10); and wherein $M^1$ and $M^2$ are different from one another.

4. A method for catalyzing homopolymerization of an optionally substituted olefin, comprising: contacting an optionally substituted olefin with the catalyst composition of paragraph 1, whereby the optionally substituted olefin undergoes homopolymerization.
5. The method of paragraph 4, wherein the step of contacting the optionally substituted olefin with the catalyst composition is performed in the presence of at least one solvent.
6. The method of paragraph 5, wherein the at least one solvent is a non-polar solvent, a polar solvent, or combination thereof.
7. The method of paragraph 4, further comprising contacting at least one activator with the catalyst composition and the optionally substituted olefin.
8. The method of paragraph 7, wherein the at least one activator is selected from the group consisting of $Ni(COD)_2$, triarylborane, methylaluminoxane, and trialkylaluminum.
9. The method of paragraph 4, wherein the optionally substituted olefin is an optionally substituted terminal olefin or an optionally substituted internal olefin.
10. The method of paragraph 4, wherein the optionally substituted olefin is ethylene.
11. A polymer formed by the method of paragraph 4.
12. The polymer of paragraph 11, wherein the polymer is monomodal or bimodal.
13. A method for catalyzing copolymerization of a first optionally substituted olefin and at least one other optionally substituted olefin, comprising: contacting a first optionally substituted olefin and at least one other optionally substituted olefin with the catalyst composition of paragraph 1, whereby the first optionally substituted olefin and the at least one other optionally substituted olefin undergoes copolymerization, and wherein the first optionally substituted olefin and the at least one other optionally substituted olefin are different from one another.
14. The method of paragraph 13, wherein the step of contacting the first optionally substituted olefin and the at least one other optionally substituted olefin with the catalyst composition is performed in the presence of at least one solvent.
15. The method of paragraph 14, wherein the at least one solvent is a non-polar solvent, a polar solvent, or combination thereof.
16. The method of paragraph 13, further comprising contacting at least one activator with the catalyst composition, the first optionally substituted olefin, and the at least one other optionally substituted olefin.
17. The method of paragraph 16, wherein the at least one activator is selected from the group consisting of $Ni(COD)_2$, triarylborane, methylaluminoxane, and trialkylaluminum.
18. The method of paragraph 13, wherein the first optionally substituted olefin and the at least one other optionally substituted olefin are each independently an optionally substituted terminal olefin or an optionally substituted internal olefin.
19. A copolymer formed by the method of paragraph 13.
20. The copolymer of paragraph 19, wherein the copolymer is monomodal or bimodal.

EXAMPLES

The invention is further illustrated by the following examples which are intended to be purely exemplary of the invention, and which should not be construed as limiting the invention in any way. The following examples are illustrative only, and are not intended to limit, in any manner, any of the aspects described herein. The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

General Procedures

Commercial reagents were used as received. All air- and water-sensitive manipulations were performed using standard Schlenk techniques or under a nitrogen atmosphere using a drybox. Anhydrous solvents were obtained from an Innovative Technology solvent drying system saturated with argon. High-purity polymer grade ethylene was obtained from Matheson TriGas without further purification. The $LiBAr^F_4$, $NaBAr^F_4$, $KBAr^F_4$ and $CsBAr^F_4$ salts were prepared according to literature procedures (Brookhart, M.; Grant, B.; Volpe, A. F., Jr., $[(3,5\text{-}(CF_3)_2C_6H_3)_4B]$—$[H(OEt_2)_2]^+$: A Convenient Reagent for Generation and Stabilization of Cationic, Highly Electrophilic Organometallic Complexes. *Organometallics* 1992, 11 (11), 3920-3922) (Carreras, L.; Rovira, L.; Vaquero, M.; Mon, I.; Martin, E.; Benet-Buchholz, J.; Vidal-Ferran, A., Syntheses, characterisation and solid-state study of alkali and ammonium BArF salts. *RSC Adv.* 2017, 7(52), 32833-32841).

NMR spectra were acquired using JEOL spectrometers (ECA-400, -500, and -600) and referenced using residual solvent peaks. All $^{13}C$ NMR spectra were proton decoupled. $^{31}P$ NMR spectra were referenced to phosphoric acid. $^1H$ NMR spectroscopic characterization of polymers: each NMR sample contained ~20 mg of polymer in 0.5 mL of 1,1,2,2-tetrachloroethane-$d_2$ (TCE-$d_2$) and was recorded using a 500 MHz spectrometer with standard acquisition parameters at 120° C.

Gel permeation chromatography (GPC) data were obtained using a Malvern high temperature GPC instrument equipped with refractive index, viscometer, and light scattering detectors at 150° C. with 1,2,4-trichlorobenzene (stabilized with 125 ppm BHT) as the mobile phase. A calibration curve was established using polystyrene standards in triple detection mode. All molecular weights reported are based on the triple detection method.

Synthesis and Characterization

Example 1. Preparation of Compound 2

Compound 2

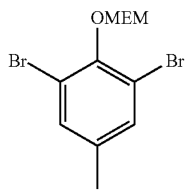

This compound was synthesized using a procedure modified from a literature report (Tran, T. V.; Nguyen, Y. H.; Do, L. H., Development of Highly Productive Nickel-Sodium Phenoxyphosphine Ethylene Polymerization Catalysts and their Reaction Temperature Profiles. *Polym. Chem.* 2019, 10 (27), 3718-3721). Solid 2,6-dibromo-4-methylphenol (13.3 g, 50 mmol, 1.0 equiv.) was dissolved in 300 mL of dry THF in a 500 mL round bottom flask under nitrogen and cooled to 0° C. Small aliquots of NaH (60%, 4 g, 100 mmol, 2.0 equiv.) were added and the mixture was stirred at room temperature for 2 h. The reagent 2-methoxyethoxymethyl chloride (MEMCl) was added and the resulting mixture was stirred for 2 d. The reaction was quenched by the slow addition of cold $H_2O$ and the products were extracted into $Et_2O$ (3×250 mL). The organic layers were combined, washed with $H_2O$ (3×150 mL), dried over $Na_2SO_4$, filtered, and evaporated to dryness. The crude material was purified by silica gel column chromatography (4:1 hexane:ethyl acetate) to afford a light yellow oil (15.2 g, 42.9 mmol, 86%). Its $^1$H and $^{13}$C NMR spectra were consistent with those reported in the literature. (Tran, T. V.; Nguyen, Y. H.; Do, L. H., Development of Highly Productive Nickel-Sodium Phenoxyphosphine Ethylene Polymerization Catalysts and their Reaction Temperature Profiles. *Polym. Chem.* 2019, 10 (27), 3718-3721).

Example 2. Preparation of Compound 3

Compound 3

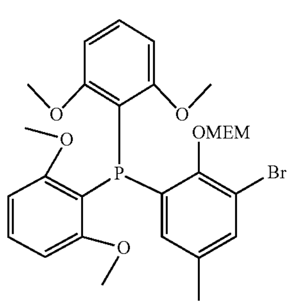

To a solution of 2 (7.08 g, 20 mmol, 1.0 equiv.) in 70 mL of dry THF in a Schlenk flask under nitrogen at −78° C., nBuLi (1.6 M in hexanes, 12.8 mL, 20.5 mmol, 1.02 equiv.) was added dropwise using a syringe pump. The reaction mixture was then stirred at −78° C. for 40 min. A solution containing 8 (6.13 g, 18 mmol, 0.9 equiv.) in 50 mL of dry THF was cannula transferred into the reaction mixture and stirred for another 40 min at −78° C. The mixture was then slowly warmed to RT and stirred overnight for 12 h. The reaction was quenched by the slow addition of $H_2O$ and the products were extracted into $Et_2O$ (3×75 mL). The organic layers were combined, washed with $H_2O$ (2×50 mL), dried over $Na_2SO_4$, filtered, and evaporated to dryness. The crude material was purified by silica gel column chromatography (1:1 hexane:ethyl acetate) to afford a colorless oil (6.78 g, 11.7 mmol, 65%). $^1$H NMR ($CDCl_3$, 400 MHz) δ 7.21 (b, 3H), 6.72 (b, 1H), 6.48 (b, 4H), 5.24 (s, 2H), 3.84 (b, 2H), 3.49 (b, 12H), 3.33 (s, 3H), 2.13 (b, 2H), 1.58 (b, 2H). $^{13}$C NMR ($CDCl_3$, 101 MHz) δ 162.7 (d, J=9.1 Hz), 152.7 (d, J=21.2 Hz), 136.0 (d, J=17.2 Hz), 134.0, 132.5, 132.4, 130.1, 115.8, 113.1, 104.6, 97.2 (d, J=8.1 Hz), 71.9, 69.0, 59.0, 56.0, 20.8. $^{31}$P NMR ($CDCl_3$, 162 MHz) δ −50.0. Mp: 79.8-81.2° C. ESI-MS(+) calc. for $C_{27}H_{32}BrO7_P$ $[M-H]^+$= 579.1142, found 579.1138.

Example 3. Preparation of Compound 4

Compound 4

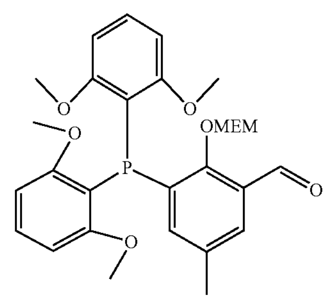

To a solution of 3 (6.78 g, 11.7 mmol, 1.0 equiv.) in 70 mL of dry THF in a Schlenk flask under nitrogen at −78° C., nBuLi (1.6 M in hexanes, 7.7 mL, 12.29 mmol, 1.05 equiv.) was added dropwise using a syringe pump. The reaction mixture was stirred at −78° C. for 40 min. Dry DMF (5 mL, 65 mmol, 5.6 equiv.) was added to the reaction mixture and the flask was stirred for 40 min at −78° C. and then warmed to RT and continued stirring overnight. The reaction was quenched by the slow addition of $H_2O$ and the product was extracted into $Et_2O$ (3×75 mL). The organic layers were combined, washed with $H_2O$ (2×50 mL), dried over $Na_2SO_4$, filtered, and evaporated to dryness to afford a light yellow oil (4.83 g, 9.13 mmol, 78%). This compound was used directly in the next step without further purification.

Example 4. Preparation of Compound 5

Compound 5

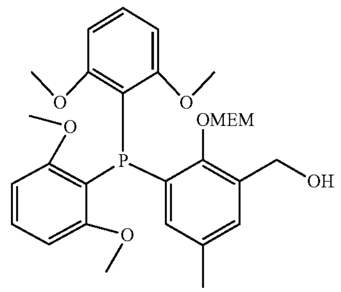

Compound 4 (4.83 g, 9.13 mmol, 1.0 equiv.) was dissolved in 400 mL of MeOH and 80 mL of THF. Small aliquots of $NaBH_4$ (1.04 g, 27.4 mmol, 3 equiv.) were added and the mixture was stirred at RT overnight. The reaction solvent was removed under vacuum and the residue was redissolved in $Et_2O$ (100 mL). The ether layer was washed with $H_2O$ (2×100 mL), dried over $Na_2SO_4$, filtered, and evaporated to dryness. The crude material was purified by silica gel column chromatography (2:3 hexane:ethyl acetate) to afford a white solid (2.52 g, 4.75 mmol, 52%). $^1$H NMR ($CDCl_3$, 500 MHz) δ 7.21 (t, J=8.3 Hz, 2H), 7.01 (b, 1H), 6.83 (b, 1H), 6.47 (dd, J=8.2, 2.8 Hz, 4H), 5.16 (s, 2H), 4.55 (d, J=7.1 Hz, 2H), 3.86-3.80 (m, 2H), 3.72 (t, J=7.1 Hz, 1H), 3.58-3.53 (m, 2H), 3.46 (s, 12H), 3.35 (s, 3H), 2.15 (s, 3H). $^{13}$C NMR ($CDCl_3$, 126 MHz) δ 162.7 (d, J=8.8 Hz), 156.8 (d, J=22.7 Hz), 133.9, 133.1, 132.8, 132.7, 130.6, 130.0, 113.2, 104.5, 99.0 (d, J=13.3 Hz), 71.5, 68.8, 61.3, 59.1, 55.9, 21.0. $^{31}$P NMR ($CDCl_3$, 202 MHz) δ −52.6. Mp: 131.1-132.7° C. ESI-MS(+) calc. for $C_{28}H_{35}O_8P$ $[M-H]^+$ =531.2142, found 531.2142.

Example 5. Preparation of Compound 6

Compound 6

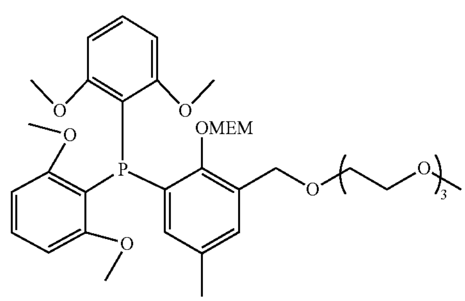

To a solution containing 5 (2.52 g, 4.75 mmol, 1 equiv.) in 100 mL of dry THF in a Schlenk flask under nitrogen at −0° C., small aliquots of NaH (60%, 0.76 g, 19 mmol, 4 equiv.) were added. The reaction mixture was stirred at RT for 1 h. A solution containing compound 9 (4.9 g, 11.4 mmol, 2.0 equiv.) in 50 mL of THF was cannula transferred into the reaction mixture and then stirred at RT for 2 d. The reaction was quenched by the slow addition of cold $H_2O$ and the product was extracted into $Et_2O$ (3×100 mL). The organic layers were combined, washed with $H_2O$ (2×75 mL), dried over $Na_2SO_4$, filtered, and evaporated to dryness. The crude material was purified by silica gel column chromatography (1:4 hexane:ethyl acetate to 97:3 ethyl acetate: methanol) to afford a colorless oil (1.51 g, 2.23 mmol, 47%). This compound was used directly in the next step without further purification.

Example 6. Preparation of Compound 7

Compound 7

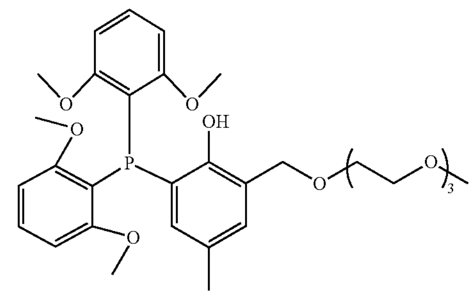

Compound 6 (1.51 g, 2.23 mmol, 1 equiv.) was dissolved in 100 mL of MeOH and then treated with 10 mL of 2 M HCl in $Et_2O$. The reaction mixture was stirred at RT overnight. The solvent was removed under vacuum and the product was dissolved in 200 mL of EtOAc. A 50 mL solution of 1 M $NaHCO_3$ in $H_2O$ was then added. The mixture was stirred at RT for 30 min and the product was extracted into $Et_2O$ (2-100 mL). The organic layers were combined, washed with $H_2O$ (2-100 mL), dried over $Na_2SO_4$, filtered, and evaporated to dryness. The crude material was washed with hexane to afford a white waxy solid (1.12 g, 1.9 mmol, 85%). $^1$H NMR ($CDCl_3$, 400 MHz) δ 7.20 (d, J=8.3 Hz, 2H), 7.17-7.15 (m, 1H), 7.10 (s, 1H), 6.98 (s, 1H), 6.47 (dd, J=8.3, 2.9 Hz, 4H), 4.57 (s, 2H), 3.68-3.59 (m, 10H), 3.52 (s, 14H), 3.36 (s, 3H), 2.18 (s, 3H). BC NMR ($CDCl_3$, 101 MHz) δ 162.0 (d, J=9.1 Hz), 154.9 (d, J=8.1 Hz), 135.1, 134.8, 129.8, 127.4 (d, J=11.1 Hz), 123.1 (d, J=11.1 Hz), 122.5, 113.0, 112.8, 104.3, 77.3, 72.0, 70.7, 70.7, 70.6, 69.6, 59.1, 55.8, 20.7. $^{31}$P NMR ($CDCl_3$, 162 MHz) δ −59.76. Mp: 113.9-115.1° C. ESI-MS(+) calc. for C31H41O9P $[M-H]^+$ =589.2561, found 531.2548.

Example 7. Preparation of Complex Ni2

Complex Ni2

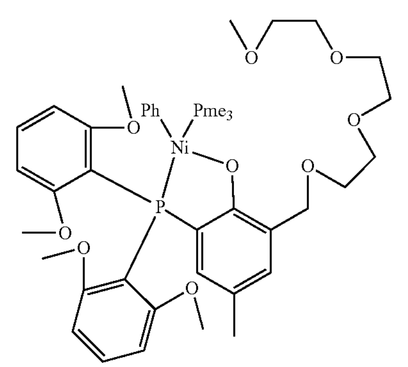

Inside the glovebox, ligand 7 (0.62 g, 1.05 mmol, 1.0 equiv.) was dissolved in 50 mL of dry THF. Small aliquots of NaH (60%, 0.08 g, 2.10 mmol, 2.0 equiv.) were added and the mixture was stirred at RT for 2 h. The mixture was filtered to remove excess NaH and then a solution of $NiPhBr(PMe_3)_2$ (0.3 g, 0.95 mmol, 0.9 equiv.) in 20 mL of benzene was added. The resulting mixture was stirred at RT overnight. The next day, the solution was filtered to remove the precipitate and the filtrate was dried completely under vacuum. The crude material was dissolved in a mixture of 10 mL of pentane and 5 mL of benzene. Another filtration was performed to remove the precipitate and the filtrate was dried once again. Finally, the resulting solid was washed with pentane (3-5 mL) and dried under vacuum to afford a yellow viscous material (0.35 g, 0.43 mmol, 45%). $^1$H NMR ($C_6D_6$, 500 MHz) δ 7.60 (d, J=10.0 Hz, 1H), 7.36 (s, 1H), 7.26 (d, J=10.0 Hz, 2H), 7.03 (t, J=10.0 Hz, 2H), 6.79 (t, J=10.0 Hz, 2H), 6.67 (t, J=5.0 Hz, 1H), 6.21 (dd, J=10.7, 4.3 Hz, 4H), 4.96 (s, 2H), 3.83 (t, J=5.0 Hz, 2H), 3.68 (t, J=5.0 Hz, 2H), 3.59-3.49 (m, 6H), 3.36 (t, J=5.0 Hz, 3H), 3.13 (b, 14H), 2.21 (s, 3H), 0.92 (d, J=15.0 Hz, 9H) ppm. $^{13}$C NMR ($CDCl_3$, 500 MHz) δ 162.03, 161.95, 154.94, 154.86, 135.14, 134.82, 129.81, 127.52, 127.41, 123.20, 123.08, 122.54, 113.00, 112.82, 104.37, 77.36, 72.05, 70.76, 70.72, 70.65, 69.59, 59.18, 55.89, 20.76 ppm. $^{31}$P NMR ($C_6D_6$, 162 MHz) δ −4.27 (d, J=317.5 Hz), −15.54 (d, J=317.5 Hz). Mp (decomp.)=~102° C., note: the phosphine moiety is readily oxidized in air. Anal. Calcd for $C_{40}H_{54}NiO_9P_2$: C, 60.02; H, 6.93. Found: C, 59.50; H, 6.77.

Example 8. Preparation of Compound 8

Compound 8

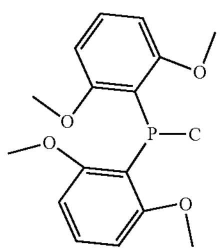

This synthesis was modified from a reported procedure (Shimizu, F.; Xin, S.; Tanna, A.; Goromaru, S.; Matsubara, K. Metal Complexes and Method for Producing α-Olefin/(Meth)Acrylate Copolymer Using the Same. U.S. Pat. No. 8,618,319 B2, 2013). A 200 mL Schlenk flask was charged with magnesium turnings (1.2 g, 50 mmol, 2.5 equiv.) under nitrogen in 50 mL of dry THF. The compound 2-bromo-3-methoxyanisole (8.68 g, 40 mmol, 2.0 equiv.) was added to the reaction mixture and then stirred at RT for 3 h until the solution turned dark gray. The resulting Grignard reagent was slowly cannula transferred over a period of 45 min to a solution containing $PCl_3$ (1.6 mL, 20 mmol, 1.0 equiv.) in 100 mL of dry THF at −78° C. After the addition was complete, the heterogeneous mixture was continued stirring at RT overnight. Finally, the solvent was removed under vacuum and the crude product was used in the next step without further purification.

Example 9. Preparation of Compound 9

Compound 9

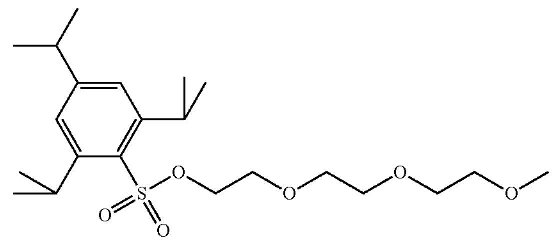

This synthesis was modified from a reported procedure (Tran, T. V.; Nguyen, Y. H.; Do, L. H., Development of Highly Productive Nickel-Sodium Phenoxyphosphine Ethylene Polymerization Catalysts and their Reaction Temperature Profiles. Polymr. Chem. 2019, 10 (27), 3718-3721). Triethylene glycol monomethyl ether (4.93 g, 30 mmol, 1.0 equiv.) was dissolved in 300 mL of dry THF in a 500 mL round bottom flask under nitrogen and cooled to 0° C. Small aliquots of NaH (60%, 2.4 g, 60 mmol, 2 equiv.) were added and the mixture was stirred at RT for 2 h. The reagent 2,4,6-triisopropylbenzenesulfonyl chloride (13.6 g, 45 mmol, 1.5 equiv.) was added and the solution was stirred for 2 d. The reaction was quenched by the slow addition of cold $H_2O$ and the product was extracted into $Et_2O$ (2×250 mL). The organic layers were combined, washed with $H_2O$ (2×200 mL), dried over $Na_2SO_4$, filtered, and evaporated to dryness. The crude material was purified by silica gel column chromatography (5:1 hexane:ethyl acetate to 1:3 hexane:ethyl acetate) to afford a colorless oil (7.9 g, 18.3 mmol, 61%). Its $^1$H and $^{13}$C NMR spectra were consistent with those reported in previous literature. (Tran, T. V.; Nguyen, Y. H.; Do, L. H., Development of Highly Productive Nickel-Sodium Phenoxyphosphine Ethylene Polymerization Catalysts and their Reaction Temperature Profiles. *Polym. Chem.* 2019, 10 (27), 3718-3721).

Example 10. Metal Binding Studies

Job Plot Studies: UV-Vis Absorption Spectroscopy. Stock solutions of Ni2 (500 μM) and $MBAr^F_4$ (500 μM) (M=Li, Na, K and Cs) in $Et_2O$ were prepared in separate volumetric flasks inside the drybox. The stock solutions of Ni2 and $MBAr^F_4$ were combined in different ratios to give 10 different samples, each having a final volume of 3.0 mL. The samples were recorded by UV-vis absorption spectroscopy at RT.

The UV-vis spectral data were analyzed according to the method reported by Hirose (Hirose, K., A Practical Guide for the Determination of Binding Constants. *J. Incl. Phenom. Macrocycl.* 2001, 39 (3), 193-209). In our case, the host (H) is Ni2, the guest (g) is $M^+$, and the complex (C) is Ni2-M. Since the alkali salt has no absorption in the 300-500 nm range, we used this simplified expression to analyze the data. $A_{obs}-\varepsilon_h\cdot[H]_t=(\varepsilon_C-a\cdot\varepsilon_h)\cdot[C]$, where $A_{obs}$=observed absorbance, a=constant, $\varepsilon_h$=molar absorptivity of host Ni2, $\varepsilon_C$=molar absorptivity of Ni2-M, $[H]_t$= starting concentration of host Ni2, and [C]=observed concentration of Ni2-M. Since [C] is proportional to $A_{obs}-\varepsilon_h\cdot[H]_t$, a Job Plot was constructed by plotting $A_{obs}-\varepsilon_h\cdot[H]_t$ vs. $\chi_{Ni}$ (the mole ratio of Ni2=[Ni2]/([Ni2]+[M])).

TABLE 3

Job Plot Data and Calculations for Ni2-Li[a]

| $\chi_{Ni}$ | Volume of H (mL) | Amount of H Added (mol) | Final Conc. of H (M) | $A_h$ (calculated) | $A_{obs}$ (@379 nm) | $A_h$-$A_{obs}$ |
|---|---|---|---|---|---|---|
| 1.0 | 3.000E−03 | 1.500E−06 | 5.000E−04 | 1.733E+00 | 1.733E+00 | 0.000E+00 |
| 0.9 | 2.700E−03 | 1.350E−06 | 4.500E−04 | 1.560E+00 | 1.469E+00 | 9.125E−02 |
| 0.8 | 2.400E−03 | 1.200E−06 | 4.000E−04 | 1.387E+00 | 1.200E+00 | 1.869E−01 |
| 0.7 | 2.100E−03 | 1.050E−06 | 3.500E−04 | 1.213E+00 | 9.267E−01 | 2.866E−01 |
| 0.6 | 1.800E−03 | 9.000E−07 | 3.000E−04 | 1.040E+00 | 6.466E−01 | 3.934E−01 |
| 0.5 | 1.500E−03 | 7.500E−07 | 2.500E−04 | 8.667E−01 | 3.901E−01 | 5.607E−01 |
| 0.4 | 1.200E−03 | 6.000E−07 | 2.000E−04 | 6.933E−01 | 1.326E−01 | 4.765E−01 |
| 0.3 | 9.000E−04 | 4.500E−07 | 1.500E−04 | 5.200E−01 | 9.452E−02 | 4.255E−01 |
| 0.2 | 6.000E−04 | 3.000E−07 | 1.000E−04 | 3.467E−01 | 6.246E−02 | 2.842E−01 |
| 0.1 | 3.000E−04 | 1.500E−07 | 5.000E−05 | 1.733E−01 | 3.313E−02 | 1.402E−01 |
| 0.0 | 0.000E+00 | 0.000E+00 | 0.000E+00 | 0.000E+00 | 4.206E−03 | −4.206E−03 |

[a]The molar absorptivity of H ($\varepsilon_h$) at 379 nm = 3470 $M^{-1}cm^{-1}$. Stock solution of H is 500 μM.

Figure 12:
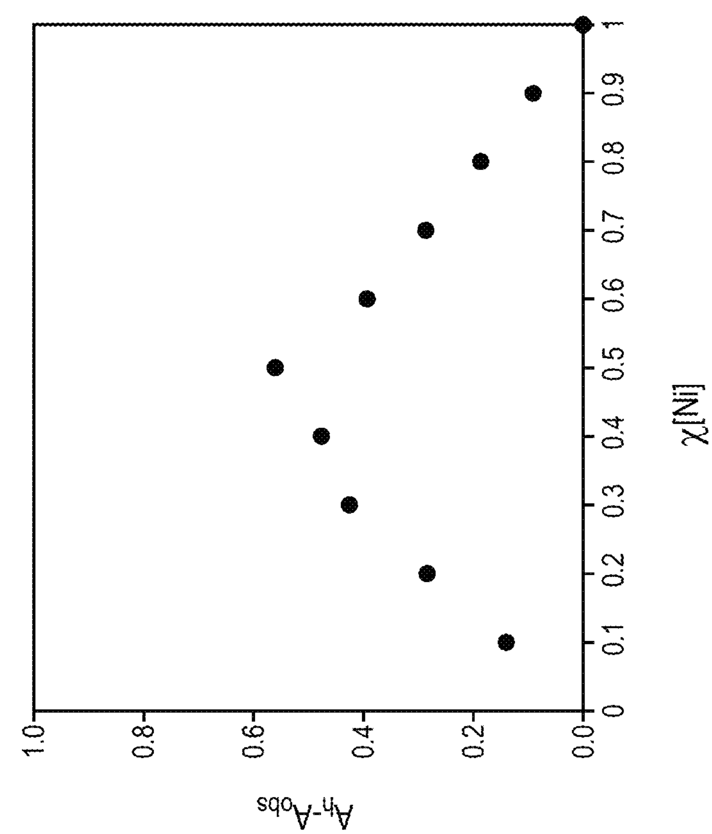
FIG. 12 depicts in accordance with various embodiments of the invention, Job Plot showing the coordination interactions between complex Ni2 and $LiBAr^F_4$. The peak maximum occurs at $\chi_{Ni}$=0.5, which suggests that the optimal nickel:lithium binding stoichiometry is 1:1. They-axis value ($A_{obs}-\varepsilon_h \cdot [H]_t$) is proportional to the concentration of the nickel-lithium complex Ni2-Li. The x-axis is the molar ratio of nickel ($\chi_{Ni}$=[Ni2]/([Ni2]+[$Li^+$])).

FIG. 12. Job Plot showing the coordination interactions between complex Ni2 and $LiBAr^F_4$. The peak maximum occurs at $\chi_{Ni}$=0.5, which suggests that the optimal nickel: lithium binding stoichiometry is 1:1. They-axis value ($A_{obs}-\varepsilon_h\cdot[H]_t$) is proportional to the concentration of the nickel-sodium complex Ni2-Li. The x-axis is the molar ratio of nickel ($\chi_{Ni}$=[Ni2]/([Ni2]+[$Li^+$])).

TABLE 4

Job Plot Data and Calculations Used for Ni2-Na[a]

| $\chi_{Ni}$ | Volume of of H (mL) | Amount of H Added (mol) | Final Conc. of H (M) | $A_h$ (calculated) | $A_{obs}$ (@330 nm) | $A_{obs}$-$A_h$ |
|---|---|---|---|---|---|---|
| 1 | 3.000E−03 | 1.500E−06 | 5.000E−04 | 1.842E+00 | 1.842E+00 | 0.000E+00 |
| 0.9 | 2.700E−03 | 1.350E−06 | 4.500E−04 | 1.658E+00 | 1.493E+00 | 1.650E−01 |
| 0.8 | 2.400E−03 | 1.200E−06 | 4.000E−04 | 1.474E+00 | 1.222E+00 | 2.522E−01 |
| 0.7 | 2.100E−03 | 1.050E−06 | 3.500E−04 | 1.290E+00 | 8.973E−01 | 3.924E−01 |
| 0.6 | 1.800E−03 | 9.000E−07 | 3.000E−04 | 1.105E+00 | 5.726E−01 | 5.328E~01 |
| 0.5 | 1.500E−03 | 7.500E−07 | 2.500E−04 | 9.212E−01 | 2.783E−01 | 6.429E−01 |
| 0.4 | 1.200E−03 | 6.000E−07 | 2.000E−04 | 7.369E−01 | 2.128E−01 | 5.242E−01 |
| 0.3 | 9.000E−04 | 4.500E−07 | 1.500E−04 | 5.527E−01 | 1.669E−01 | 3.858E−01 |
| 0.2 | 6.000E−04 | 3.000E−07 | 1.000E−04 | 3.685E−01 | 1.126E−01 | 2.559E−01 |
| 0.1 | 3.000E−04 | 1.500E−07 | 5.000E−05 | 1.842E−01 | 7.146E−02 | 1.128E−01 |
| 0 | 0.000E+00 | 0.000E+00 | 0.000E+00 | 0.000E+00 | 1.965E−02 | −1.965E−02 |

[a]The molar absorptivity of H ($\varepsilon_h$) at 379 nm = 3680 $M^{-1}cm^{-1}$. Stock solution of His 500 μM.

Figure 13:
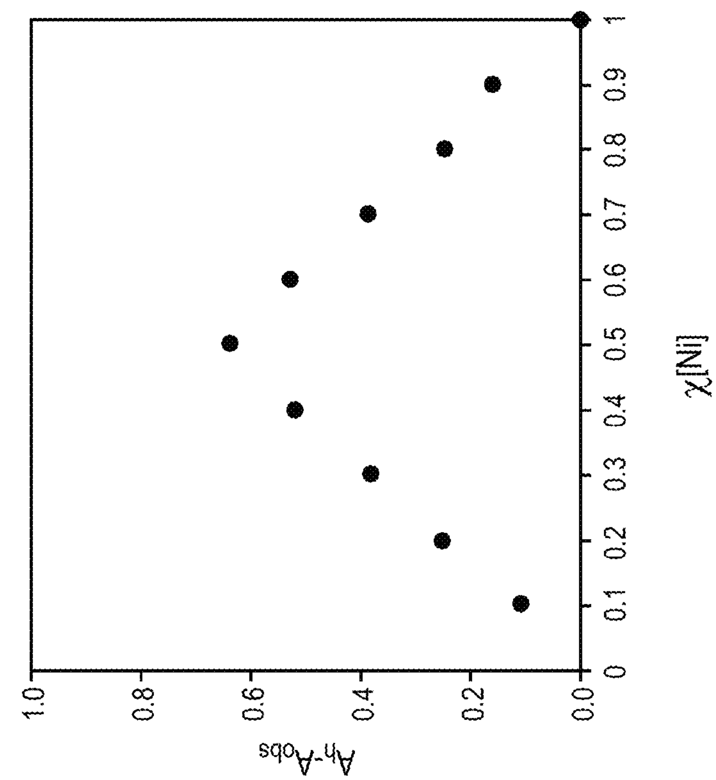
FIG. 13 depicts in accordance with various embodiments of the invention, Job Plot showing the coordination interactions between complex Ni2 and $NaBAr^F_4$. The peak maximum occurs at $\chi_{Ni}$=0.5, which suggests that the optimal nickel:sodium binding stoichiometry is 1:1. They-axis value ($A_{obs}-\varepsilon_h \cdot [H]_t$) is proportional to the concentration of the nickel-sodium complex Ni2-Na. The x-axis is the molar ratio of nickel ($\chi_{Ni}$=[Ni2]/([Ni2]+[$Na^+$])).

FIG. 13. Job Plot showing the coordination interactions between complex Ni2 and $NaBAr^F_4$. The peak maximum occurs at $\chi_{Ni}$=0.5, which suggests that the optimal nickel: sodium binding stoichiometry is 1:1. They-axis value ($A_{obs}-\varepsilon_h\cdot[H]_t$) is proportional to the concentration of the nickel-sodium complex Ni2-Na. The x-axis is the molar ratio of nickel ($\chi_{Ni}$=[Ni2]/([Ni2]+[$Na^+$])).

TABLE 5

Job Plot Data and Calculations Used for Ni2-K[a]

| $\chi_{Ni}$ | Volume of of H (mL) | Amount of H Added (mol) | Final Conc. of H (M) | $A_h$ (calculated) | $A_{obs}$ (@330 nm) | $A_{obs}$-$A_h$ |
|---|---|---|---|---|---|---|
| 1 | 3.000E−03 | 1.500E−06 | 5.000E−04 | 1.680E+00 | 1.680E+00 | 0.000E+00 |
| 0.9 | 2.700E−03 | 1.350E−06 | 4.500E−04 | 1.510E+00 | 1.384E+00 | 1.280E−01 |
| 0.8 | 2.400E−03 | 1.200E−06 | 4.000E−04 | 1.340E+00 | 1.121E+00 | 2.230E−01 |
| 0.7 | 2.100E−03 | 1.050E−06 | 3.500E−04 | 1.180E+00 | 8.467E−01 | 3.290E−01 |
| 0.6 | 1.800E−03 | 9.000E−07 | 3.000E−04 | 1.010E+00 | 5.668E−01 | 4.410E−01 |
| 0.5 | 1.500E−03 | 7.500E−07 | 2.500E−04 | 8.400E−01 | 3.145E−01 | 5.250E−01 |
| 0.4 | 1.200E−03 | 6.000E−07 | 2.000E−04 | 6.720E−01 | 2.332E−01 | 4.390E−01 |

TABLE 5-continued

Job Plot Data and Calculations Used for Ni2-K[a]

| $\chi_{Ni}$ | Volume of of H (mL) | Amount of H Added (mol) | Final Conc. of H (M) | $A_h$ (calculated) | $A_{obs}$ (@330 nm) | $A_{obs}$-$A_h$ |
|---|---|---|---|---|---|---|
| 0.3 | 9.000E−04 | 4.500E−07 | 1.500E−04 | 5.040E−01 | 1.534E−01 | 3.510E−01 |
| 0.2 | 6.000E−04 | 3.000E−07 | 1.000E−04 | 3.360E−01 | 9.725E−02 | 2.390E−01 |
| 0.1 | 3.000E−04 | 1.500E−07 | 5.000E−05 | 1.680E−01 | 7.084E−02 | 9.720E−02 |
| 0 | 0.000E+00 | 0.000E+00 | 0.000E+00 | 0.000E+00 | 9.125E−04 | −9.130E−04 |

aThe molar absorptivity of H ($\varepsilon_h$) at 379 nm = 3360 $M^{-1}cm^{-1}$. Stock solution of H is 500 μM.

Figure 14:
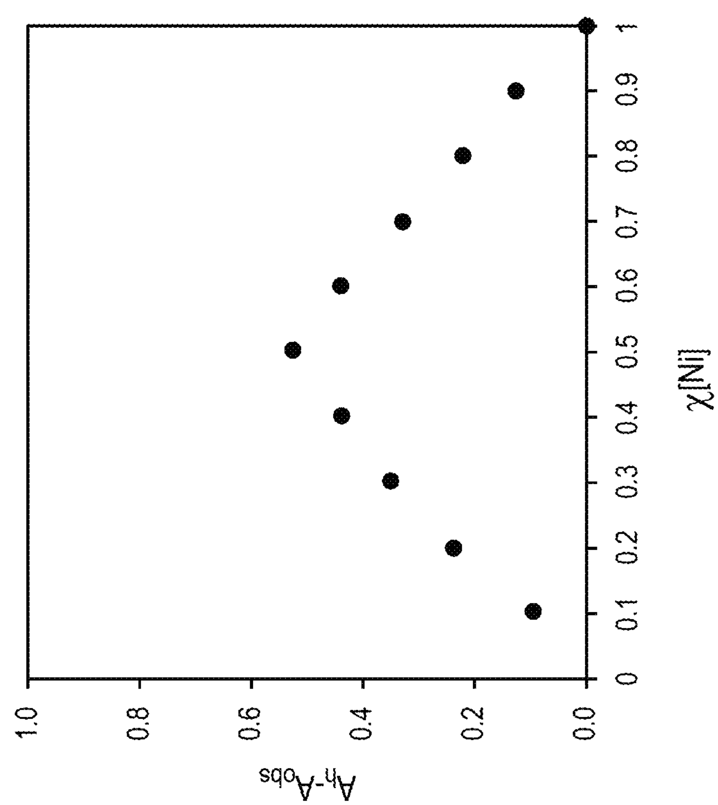
FIG. 14 depicts in accordance with various embodiments of the invention, Job Plot showing the coordination interactions between complex Ni2 and $KBAr^F_4$. The peak maximum occurs at $\chi_{Ni}$=0.5, which suggests that the optimal nickel:potassium binding stoichiometry is 1:1. The y-axis value ($A_{obs}-\varepsilon_h \cdot [H]_t$) is proportional to the concentration of the nickel-potassium complex Ni2-K. The x-axis is the molar ratio of nickel ($\chi_{Ni}$=[Ni2]/([Ni2]+[$K^+$])).

FIG. 14. Job Plot showing the coordination interactions between complex Ni2 and $KBAr^F{}_4$. The peak maximum occurs at $\chi_{Ni}$=0.5, which suggests that the optimal nickel: potassium binding stoichiometry is 1:1. They-axis value ($A_{obs}-\varepsilon_n\cdot[H]_t$) is proportional to the concentration of the nickel-potassium complex Ni2-K. The x-axis is the molar ratio of nickel ($\chi_{Ni}$=[Ni2]/([Ni2]+[$K^+$])).

TABLE 6

Job Plot Data and Calculations Used for Ni2-Cs[a]

| $\chi_{Ni}$ | Volume of H (mL) | Amount of H Added (mol) | Final Conc. of H (M) | $A_h$ (calculated) | $A_{obs}$ (@330 nm) | $A_{obs}$-$A_h$ |
|---|---|---|---|---|---|---|
| 1 | 3.000E−03 | 1.500E−06 | 5.000E−04 | 1.649E+00 | 1.649E+00 | 0.000E+00 |
| 0.9 | 2.700E−03 | 1.350E−06 | 4.500E−04 | 1.485E+00 | 1.466E+00 | 1.885E−02 |
| 0.8 | 2.400E−03 | 1.200E−06 | 4.000E−04 | 1.320E+00 | 1.231E+00 | 8.835E−02 |
| 0.7 | 2.100E−03 | 1.050E−06 | 3.500E−04 | 1.155E+00 | 1.007E+00 | 1.480E−01 |
| 0.6 | 1.800E−03 | 9,000E−07 | 3.000E−04 | 9.897E−01 | 7.914E−01 | 1.983E−01 |
| 0.5 | 1.500E−03 | 7.500E−07 | 2.500E−04 | 8.247E−01 | 6.064E−01 | 2.183E−01 |
| 0.4 | 1.200E−03 | 6.000E−07 | 2.000E−04 | 6.598E−01 | 4.728E−01 | 1.870E−01 |
| 0.3 | 9.000E−04 | 4.500E−07 | 1.500E−04 | 4.948E−01 | 3.575E−01 | 1.374E−01 |
| 0.2 | 6.000E−04 | 3.000E−07 | 1.000E−04 | 3.299E−01 | 2.236E−01 | 1.063E−01 |
| 0.1 | 3.000E−04 | 1.500E−07 | 5.000E−05 | 1.649E−01 | 1.284E−01 | 3.653E−02 |
| 0 | 0.000E+00 | 0.000E+00 | 0.000E+00 | 0.000E+00 | 5.027E−03 | −5.027E−03 |

[a]The molar absorptivity of H ($\varepsilon_h$) at 379 nm = 3300 $M^{-1}cm^{-1}$. Stock solution of H is 500 μM.

Figure 15:
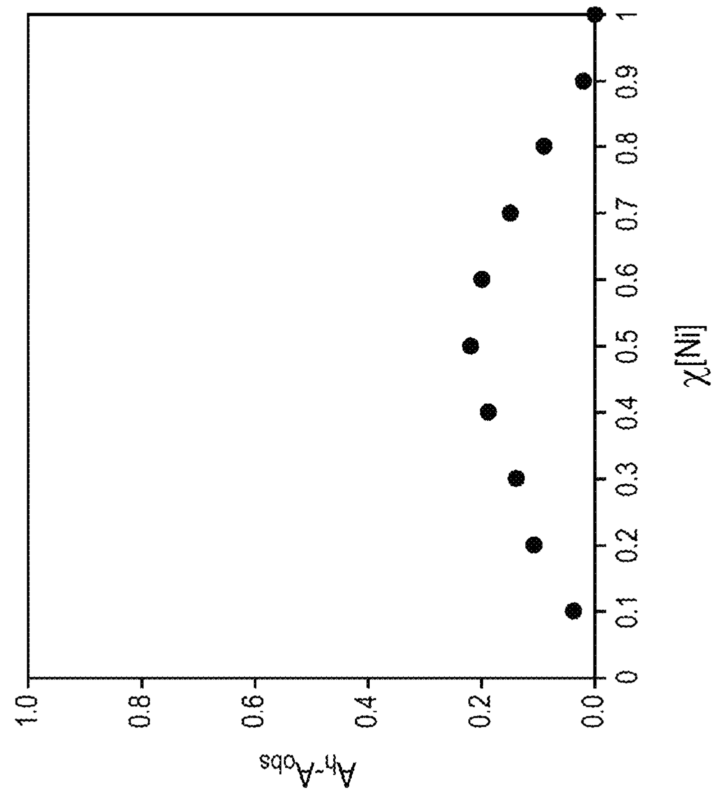
FIG. 15 depicts in accordance with various embodiments of the invention, Job Plot showing the coordination interactions between complex Ni2 and $CsBAr^F_4$. The peak maximum occurs at $\chi_{Ni}$=0.5, which suggests that the optimal nickel:cesium binding stoichiometry is 1:1. They-axis value ($A_{obs}-\varepsilon_h\cdot[H]_t$) is proportional to the concentration of the nickel-cesium complex Ni2-Cs. The x-axis is the molar ratio of nickel ($\chi_{Ni}$=[Ni2]/([Ni2]+[$Cs^+$])).

FIG. 15. Job Plot showing the coordination interactions between complex Ni2 and $CsBAr^F{}_4$. The peak maximum occurs at $\chi_{Ni}$=0.5, which suggests that the optimal nickel: cesium binding stoichiometry is 1:1. They-axis value ($A_{obs}-\varepsilon_h\cdot[H]_t$) is proportional to the concentration of the nickel-cesium complex Ni2-Cs. The x-axis is the molar ratio of nickel ($\chi_{Ni}$=[Ni2]/([Ni2]+[$Cs^+$])).

TABLE 7

Comparison of the $^{31}$P NMR Chemical Shifts for the Nickel Complexes[a]

| Complex | trans-Ni Species ($^{31}$P NMR, ppm) | cis-Ni Species ($^{31}$P NMR, ppm) |
|---|---|---|
| Ni1 | 13.34 (d, J = 325.6 Hz)<br>−12.05 (d, J = 335.3 Hz) | — |
| Ni1-Li | 7.95 (broad d, J = 328.0 Hz)<br>−18.28 (d, J = 345 Hz) | 5.49 (d, J = 31.6 Hz)<br>−8.62 (d, J = 31.6 Hz) |
| Ni1-Na | 10.34 (broad d, J = 318.3 Hz)<br>−16.56 (d, J = 318.3 Hz) | 10.46 (d, J = 36.4 Hz)<br>−8.82 (d, J = 36.4 Hz) |
| Ni1-K | 10.53 (broad d, J = 306.2 Hz)<br>−16.17 (d, J = 315.9 Hz) | 10.70 (d, J = 36.4 Hz)<br>−8.41 (d, J = 34.0 Hz) |
| Ni1-Cs | 12.06 (d, J = 330.5 Hz)<br>−13.18 (d, J = 315.9 Hz) | 10.96 (d, J = 38.9 Hz)<br>−9.42 (d, J = 34.0 Hz) |
| Ni2 | −3.48 (d, J = 314.6 Hz)<br>−14.02 (d, J = 317.0 Hz) | — |
| Ni2-Li | −11.42 (d, J = 318.3 Hz)<br>−19.86 (d, J = 318.3 Hz) | −9.49 (d, J = 34.0 Hz)<br>−16.16 (d, J = 36.4 Hz) |

TABLE 7-continued

Comparison of the $^{31}$P NMR Chemical Shifts for the Nickel Complexes[a]

| Complex | trans-Ni Species ($^{31}$P NMR, ppm) | cis-Ni Species ($^{31}$P NMR, ppm) |
|---|---|---|
| Ni2-Na | −5.53 (d, J = 315.9 Hz)<br>−16.92 (d, J = 313.5Hz) | −8.18 (broad s) |
| Ni2-K | −5.32 (d, J = 313.5 Hz)<br>−17.07 (d, J = 315.9 Hz) | −8.06 (s)<br>−8.21 (s) |
| Ni2-Cs | −4.58 (d, J = 318.3 Hz)<br>−16.46 (d, J = 318.3 Hz) | −6.76 (d, J = 36.4 Hz)<br>−8.72 (d, J = 36.4 Hz) |

[a]NMR spectra (243 MHz) were acquired in toluene-$d_8$/$Et_2O$-$d_{10}$ (4:1) at RT.

TABLE 8

Comparison of the trans and cis Distribution of Nickel Complexes in Solution[a]

| Complex | trans-Ni Species (%) | cis-Ni Species (%) | $K_{cis/trans}$ |
|---|---|---|---|
| Ni1 | 100 | 0 | — |
| Ni1-Li | 90 | 10 | 0.1 |
| Ni1-Na | 10 | 90 | 9.0 |
| Ni1-K | 12 | 88 | 7.3 |
| Ni1-Cs | 67 | 33 | 0.5 |

TABLE 8-continued

Comparison of the trans and cis Distribution of Nickel Complexes in Solution[a]

| Complex | trans-Ni Species (%) | cis-Ni Species (%) | $K_{cis/trans}$ |
|---|---|---|---|
| Ni2 | 100 | 0 | — |
| Ni2-Li | 15 | 85 | 5.7 |
| Ni2-Na | 46 | 54 | 1.2 |
| Ni2-K | 39 | 61 | 1.6 |
| Ni2-Cs | 87 | 13 | 0.1 |

[a]Percentages of cis and trans species were calculated from integration of the complex's $^{31}P$ NMR spectra in toluene-$d_8$/$Et_2O$-$d_{10}$ (4:1) at RT.

Example 11. Metal Titration: UV-vis Absorption Spectroscopy

Stock solutions of Ni2 and $CsBAr^F_4$ were prepared inside an inert nitrogen-filled glovebox. A 500 μM stock solution of Ni2 were obtained by dissolving 25 μmol of Ni2 in 50 mL of $Et_2O$/toluene (1:1). A 10 mL aliquot of this 500 μM solution was diluted to 50 mL using a volumetric flask to give a final concentration of 100 μM. The 3.0 mM stock solution of $CsBAr^F_4$ was obtained by dissolving 30 μmol of $CsBAr^F_4$ in 10 mL of $Et_2O$/toluene (1:1) using a volumetric flask. A 3.0 mL solution of Ni2 was transferred to a 1 cm quartz cuvette and then sealed with a septum screw cap. A 100 μL airtight syringe was loaded with the 3.0 mM solution of $MBAr^F_4$. The cuvette was placed inside a UV-vis spectrophotometer and the spectrum of the Ni2 solution was recorded. Aliquots containing 0.25 equiv. of $CsBAr^F_4$ (25 μL), relative to the nickel complex, were added and the solution was allowed to reach equilibrium before the spectra were measured (about 10-20 min). The titration experiments were stopped after the addition of up to 2.0 equiv. of $MBAr^F_4$.

Figure 16:
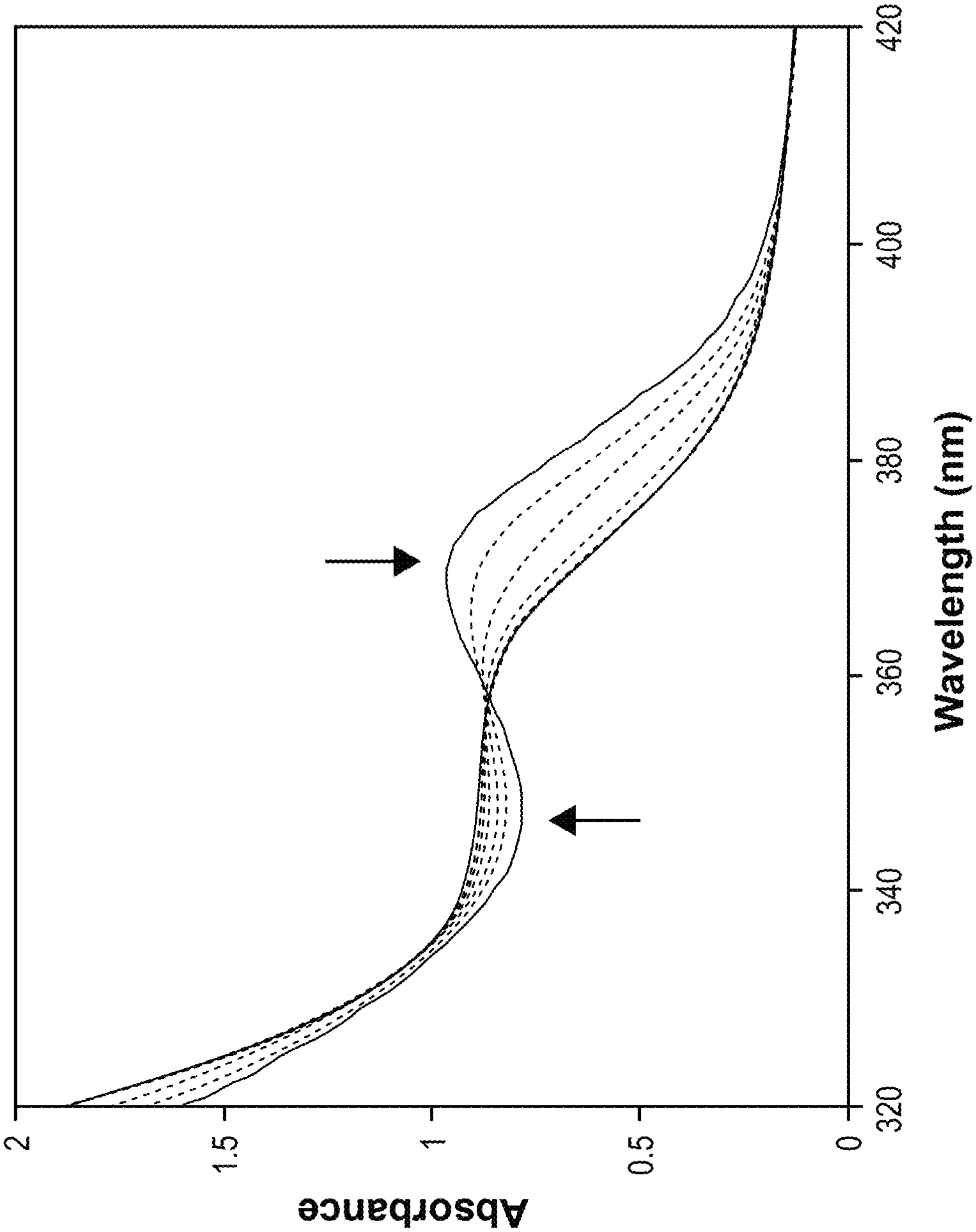
FIG. 16 depicts in accordance with various embodiments of the invention, UV-vis absorbance spectra of complex Ni2 (100 μM in 1:1 $Et_2O$/Toluene) after the addition of up to 2.0 equiv. of $CsBAr^F_4$. The starting trace of Ni2 is shown in black and the final trace (+2.0 equiv. of $Cs^+$ relative to Ni) is shown in red.

FIG. 16. UV-vis absorbance spectra of complex Ni2 (100 μM in 1:1 $Et_2O$/Toluene) after the addition of up to 2.0 equiv. of $CsBAr^F_4$. The starting trace of Ni2 is shown in black and the final trace (+2.0 equiv. of $Cs^+$ relative to Ni) is shown in red.

Example 12. Metal Exchange Studies: NMR Spectroscopy

Stock solutions of Ni2 and $CsBAr^F_4$ were prepared inside an inert nitrogen-filled glovebox. Solid Ni2 (10 mg, 12.5 μmol) was dissolved in 2 mL of $Et_2O$ inside a 20 mL scintillation vial. A solution containing $CsBAr^F_4$ (if any, stock solution in $Et_2O$) was added and the mixture was stirred until it became clear. The resulting solution was dried under vacuum for at least 3 h to completely remove the $Et_2O$ solvent and then dissolved in 0.6 deuterated NMR solvent for NMR characterization.

For the experiments using toluene-$d_8$/hexane-$d_{14}$, after drying for 3 h, 5 mL of pentane was added and the vial was well shaken and dried again for another 3 h prior to measuring the sample by NMR spectroscopy.

Figure 17:
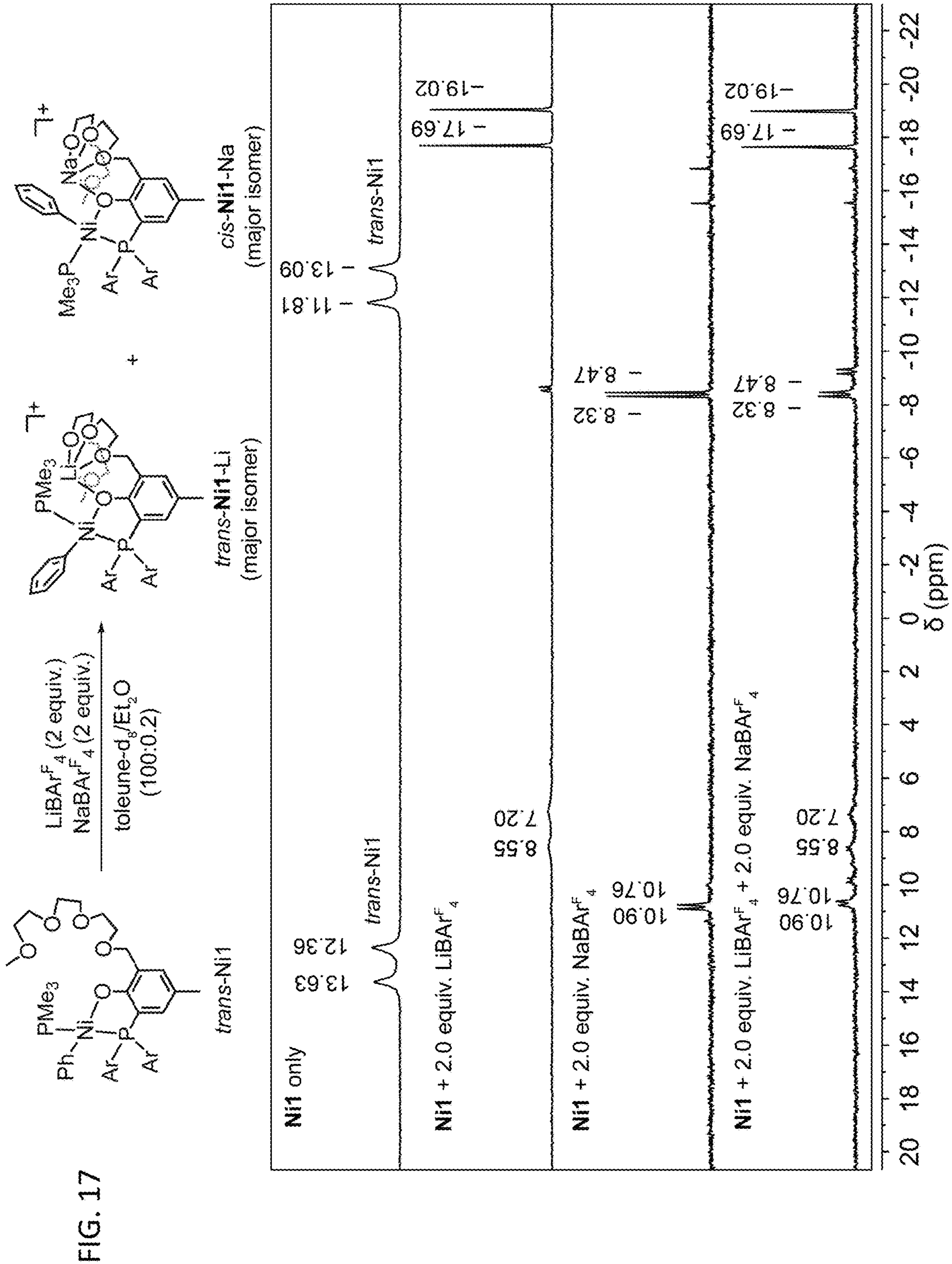
FIG. 17 depicts in accordance with various embodiments of the invention, $^{31}$P NMR spectra (202 MHz) of complex Ni1 only, Ni1 with $LiBAr_F^4$, Ni1 with $NaBAr_F^4$, or Ni1 with $LiBAr_F^4$/$NaBAr_F^4$ in toluene-dg/$Et_2O$ (100:0.2). The presence of both trans-Ni1-Li and cis-Ni1-Na species observed in spectrum of Ni1 with $LiBAr_F^4$/$NaBAr_F^4$ indicate that the cations are not exchanging under these conditions. Furthermore, no mononuclear Ni1 was detected in this sample.

FIG. 17. $^{31}P$ NMR spectra (202 MHz) of complex Ni1 only, Ni1 with $LiBAr_F^4$, Ni1 with $NaBAr_F^4$, or Ni1 with $LiBAr_F^4$/$NaBAr_F^4$ in toluene-$d_8$/$Et_2O$ (100:0.2). The presence of both trans-Ni1-Li and cis-Ni1-Na species observed in spectrum of Ni1 with $LiBAr_F^4$/$NaBAr_F^4$ indicate that the cations are not exchanging under these conditions. Furthermore, no mononuclear Ni1 was detected in this sample.

Figure 18:
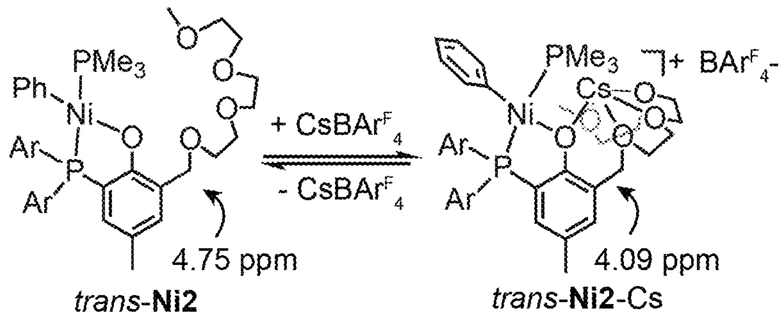
FIG. 18 depicts in accordance with various embodiments of the invention, $^1$H NMR spectra (600 MHz) of complex Ni2 (20.8 mM) before and after the addition of various equivalence of $CsBAr^F_4$ in toluene-$d_R$:$Et_2O$-do (98:2) at 60° C. The benzylic hydrogen peak at 4.75 ppm shifts upfield upon the introduction of $Cs^+$. The presence of only one species in different nickel:cesium ratios suggests that cation exchange is fast on the $^{31}$P NMR timescale under these conditions. The relative amounts of cesium salt present in each sample were calculated based on the peak integration values for the benzylic vs. $BAr^F_4{}^-$ hydrogen atoms.
Figure 18:
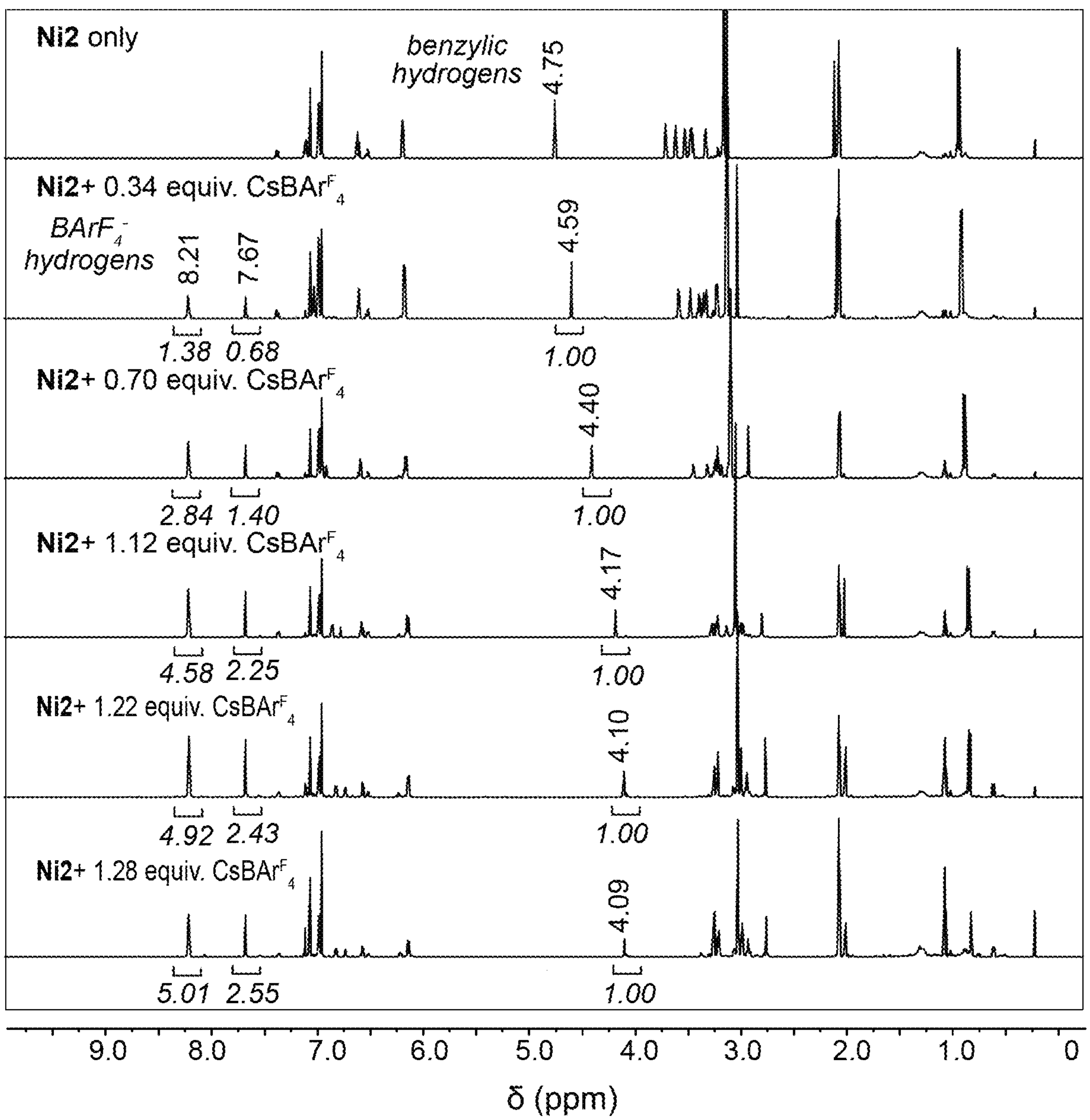

FIG. 18. $^1H$ NMR spectra (600 MHz) of complex Ni2 (20.8 mM) before and after the addition of various equivalence of $CsBAr^F_4$ in toluene-$d_8$:$Et_2O$-$d_{10}$ (98:2) at 60° C. The benzylic hydrogen peak at 4.75 ppm shifts upfield upon the introduction of $Cs^+$. The presence of only one species in different nickel:cesium ratios suggests that cation exchange is fast on the $^{31}P$ NMR timescale under these conditions. The relative amounts of cesium salt present in each sample were calculated based on the peak integration values for the benzylic vs. $BAr^F_4{}^-$ hydrogen atoms.

Figure 19:
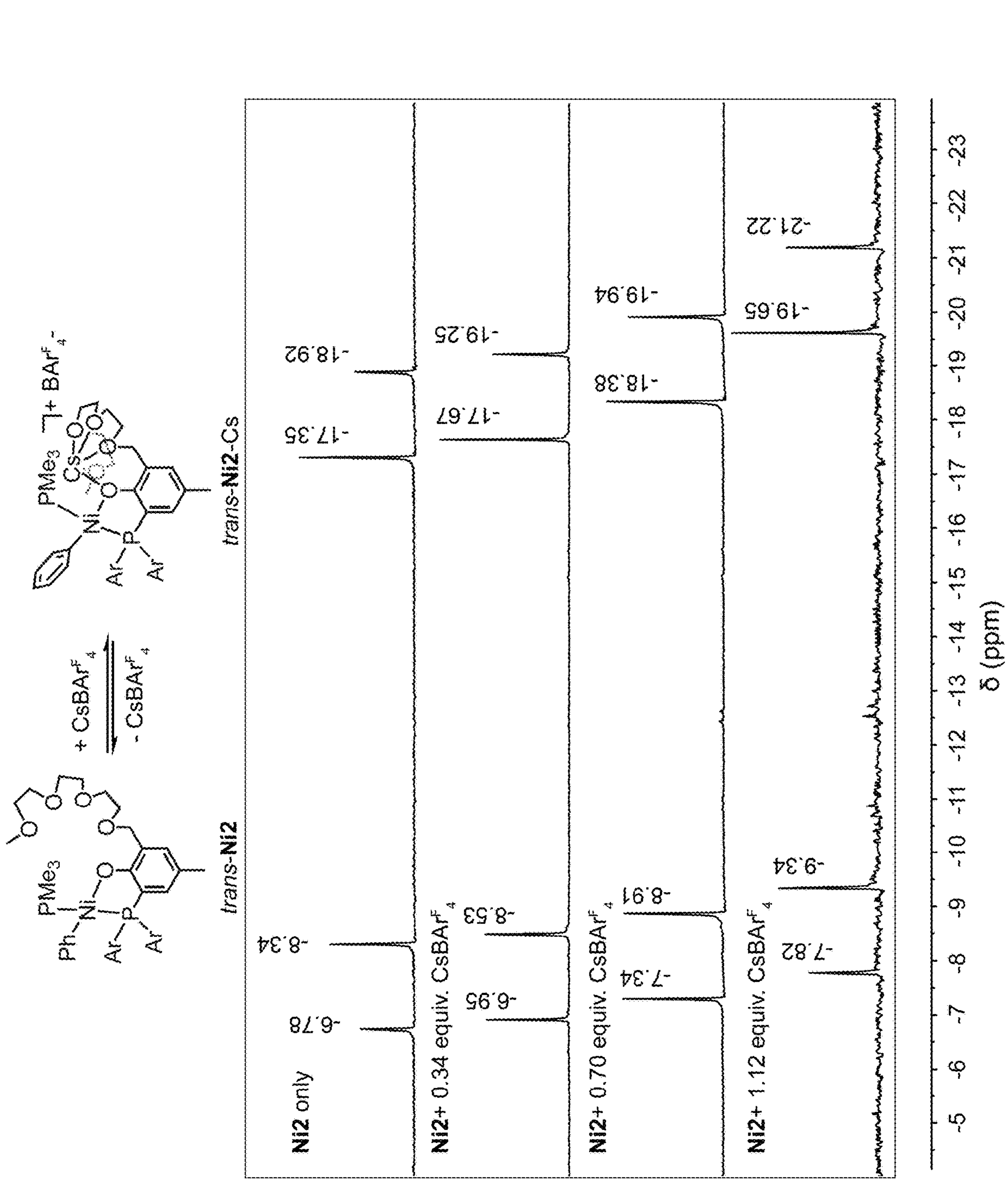
FIG. 19 depicts in accordance with various embodiments of the invention, $^{31}$P NMR spectra (202 MHz) of complex Ni2 (80 mM) before and after the addition of various equivalence of $CsBAr^F_4$ in toluene-$d_8$:$Et_2O$ (98:2) at 60° C. The relative amounts of cesium salt present in each sample were calculated based on the peak integration values for the benzylic vs. $BAr^F_4{}^-$ hydrogen atoms in FIG. 17. These results suggest that the polymerizations performed in Table 14 are under dynamic switching conditions.

FIG. 19. $^{31}P$ NMR spectra (202 MHz) of complex Ni2 (80 mM) before and after the addition of various equivalence of $CsBAr^F_4$ in toluene-$d_8$:$Et_2O$ (98:2) at 60° C. The relative amounts of cesium salt present in each sample were calculated based on the peak integration values for the benzylic vs. $BAr^F_4{}^-$ hydrogen atoms in FIG. 17. These results suggest that the polymerizations performed in Table 14 are under dynamic switching conditions.

FIG. 20. $^1H$ NMR spectra (400 MHz) of complex Ni2 (9.0 mM) before and after the addition of various equivalence of $CsBAr^F_4$ in toluene-$d_8$:hexane-$d_{14}$ (1:3) at RT. The relative amounts of cesium salt present in each sample were calculated based on the peak integration values for the benzylic vs. $BAr^F_4{}^-$ hydrogen atoms, not on the amount of salt added in the experiment. Spectrum with Ni2+0.32 equiv. $Cs^+$ shows two different sets of aromatic C—H peaks corresponding to the $BArF_4^-$ anion.

FIG. 21. $^1H$ NMR spectra (400 MHz) showing the PEG region of complex Ni2 (9.0 mM) before and after the addition of various equivalence of $CsBAr^F_4$ in toluene-$d_8$:hexane-$d_{14}$ (1:3) at RT. The full spectra are shown in FIG. 20. The relative amounts of cesium salt present in each sample were calculated based on the peak integration values for the benzylic vs. $BAr^F_4{}^-$ hydrogen atoms, not on the amount of salt added in the experiment.

Example 13. BindFit Analysis of NMR Data

The $^1H$ NMR titration data for Ni2+$CsBAr^F_4$ (FIG. 18) were analyzed using the Program BindFit (suprmolcular.org) (Thordarson, P., Determining association constants from titration experiments in supramolecular chemistry. *Chem. Soc. Rev.* 2011, 40 (3), 1305-1323), (Brynn Hibbert, D.; Thordarson, P., The death of the Job plot, transparency, open science and online tools, uncertainty estimation methods and other developments in supramolecular chemistry data analysis. Chem. Commun. 2016, 52 (87), 12792-12805). A plot of $[Cs^+]_0/[Ni2]_0$ (where $[Cs^+]_0$ and $[Ni2]_0$ are the total equiv. of cesium salt and nickel complex added, respectively) vs. the chemical shift of the benzyl hydrogen signal in Ni2 was generated. A 1:1 binding model was used to fit the data using the L-BFGS-B method. Different initial guests for $K_a$ were attempted and the fit that gave the smallest error was deemed the best fit.

FIG. 22. Plot of the titration data in FIG. 18 for the binding of $Cs^+$ to Ni2 in toluene-$d_8$:$Et_2O$-$d_{10}$ (98:2) at RT. The data were fit using BindFit to a 1:1 binding model to yield $K_a$=199±139 $M^4$ (data points are shown as black dots and the fit is shown as a black curve). Without being bound by theory, the large error in the calculated $K_a$ is most likely due to the lack of data points in the saturated region of the curve, which was not possible to obtain because $CsBAr^F$ has low solubility of in the solvent mixture.

FIG. 23A-FIG. 23D. Topographic steric maps of (FIG. 23A) Ni2-Li, (FIG. 23B) Ni2-Na, (FIG. 23C) Ni2-K, and (FIG. 23D) Ni2-Cs complexes calculated from their X-ray structures using SambVca 2.1. Only the phenoxyphosphine ligands were considered in the calculation of % $V_{bur}$. The nickel atom was set as the center of the coordination sphere, the nickel square plane defined the xz-plane, and the z-axis bisects the P(1)-Ni(1)-O(1) angle.

TABLE 9

Summary of the % $V_{bur}$ of Various Nickel Complexes[a]

| Complex | % $V_{bur}$ |
|---|---|
| Ni1 | — |
| Ni1-Li | 53.3 |
| Ni1-Na | 50.7 |
| Ni1-K | 57.3 |
| Ni1-Cs | 62.5 |
| Ni2 | — |
| Ni2-Li | 50.6 |
| Ni2-Na | 51.3 |
| Ni2-K | 53.7 |
| Ni2-Cs | 66.2 |

[a]The crystallographic data for the Ni1-M complexes were reported previously (Tran, T. V.; Nguyen, Y. H.; Do, L. H., Development of Highly Productive Nickel-Sodium Phenoxyphosphine Ethylene Polymerization Catalysts and their Reaction Temperature Profiles. *Polym. Chem.* 2019, 10 (27), 3718-3721), (Tran, T. V.; Karas, L. J.; Wu, J. I.; Do, L. H., Elucidating Secondary Metal Cation Effects on Nickel Olefin Polymerization Catalysts. *ACS Catal.* 2020, 10 (18), 10760-10772).

TABLE 10

Comparison of the Cis and Trans Isomer Distribution[a]

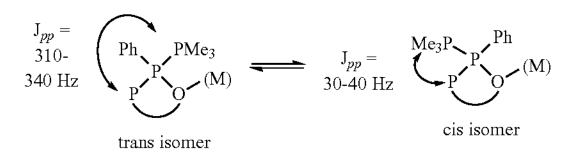

| Complex | trans (%) | cis (%) | $K_{cis/trans}$ |
|---|---|---|---|
| Ni1 | 100 | 0 | |
| Ni1—Li | 90 | 10 | 0.1 |
| Ni1—Na | 10 | 90 | 9.0 |
| Ni1—K | 12 | 88 | 7.3 |
| Nil—Cs | 67 | 33 | 0.5 |
| Ni2 | 100 | 0 | — |
| Ni2—Li | 15 | 85 | 5.7 |
| Ni2—Na | 46 | 54 | 1.2 |
| Ni2—K | 39 | 61 | 1.6 |
| Ni2—Cs | 87 | 13 | 0.1 |

[a]Relative distribution determined from quantification of their $^{31}P$ NMR spectra in toluene-$d_8$/$Et_2O$ (4:1).

Example 14. Polymerization Studies

General Procedure for Ethylene Polymerization.

Inside the drybox, the nickel complex (Ni1 or Ni2) and $MBAr^F_4$ (if any) were dissolved in a mixture of 8 mL of toluene and 2 mL of $Et_2O$ (if any) in a 20 mL vial and stirred for 10 min. Solid $Ni(COD)_2$ (8-10 equiv. relative to nickel) was added and stirred for 5 min until a clear solution was obtained. The mixture was loaded into a 10 mL syringe equipped with an 8-inch stainless steel needle. The loaded syringe was sealed by sticking the needle tip into a rubber septum and brought outside of the drybox. To prepare the polymerization reactor, 90 mL of dry toluene was placed in an empty autoclave. The autoclave was pressurized with ethylene to 80 psi, stirred for 5 min, and then the reactor pressure was reduced to 5 psi. This process was repeated 3 times to remove trace amounts of oxygen inside the reaction vessel. The reactor was then heated to the desired temperature and the catalyst solution was injected into the autoclave through a side arm. The autoclave was sealed and purged with ethylene at 40 psi (no stirring) three times. Finally, the reactor pressure was increased to the desired pressure, and the contents were stirred vigorously. To stop the polymerization, the autoclave was vented and cooled in an ice bath. A solution of MeOH (700 mL) was added to precipitate the polymer. The polymer was collected by vacuum filtration, rinsed with MeOH, and dried under vacuum at 80° C. overnight. The reported yields are average values obtained from duplicate or triplicate runs.

To obtain consistent polymer yields from run to run, the amount of catalyst used in each run must be kept as consistent as possible. To minimize errors due to weighing inconsistencies, we used a batch catalyst preparation method. First, we weighed out 50 μmol of the catalyst and then dissolved it into 50 mL of toluene. This solution was divided equally into 10 vials so that each vial contained 5 μmol of catalyst. Next, we combined each 5 μmol of catalyst with 20 mL of toluene and partitioned this 25 mL mixture into 10 vials so that each vial contained 0.5 μmol of catalyst. Finally, each vial was dried completely under vacuum and stored in a refrigerator inside the drybox until ready for use.

For all polymerization reactions, the reaction temperature was controlled by manual cooling of the reactor with an air stream when the reactor increases more than 5° C. above the starting temperature.

To clean the Parr reactor, the vessel was washed with hot toluene (80° C.) to remove the polymer sample from the previous run and rinsed with acetone before drying under vacuum for at least 1 h to remove trace amounts of water.

Example 15. Procedure for Ethylene Polymerization Under Non-Switching Conditions Using Complex Ni1 (FIG. 7A): Inside the drybox, 0.1 μmol of the Ni1 complex (stock solution in toluene) was dissolved in 5 mL of toluene in a 20 mL vial. A 0.2 mL stock solution containing $MBAr^F_4$ in $Et_2O$ (if any) was added, followed by the addition of 0.8 μmol of solid $Ni[COD]_2$. The resulting mixture was stirred for 10 min until a clear solution was obtained and then loaded into a 10-mL syringe equipped with an 8-inch stainless steel needle. To prepare the polymerization reactor, 95 mL of dry toluene was placed in an empty autoclave. The autoclave was pressurized with ethylene to 80 psi, stirred for 5 min, and then the reactor pressure was reduced to 5 psi. This process was repeated 3 times to remove trace amounts of oxygen inside the reaction vessel. The polymerization process was continued using the general polymerization procedure described above.

Using Complex Ni2 (FIG. 7B): Inside the drybox, 4 μmol of the Ni2 complex (stock solution in $Et_2O$) was dissolved in 2 mL of $Et_2O$ in a 20 mL vial. A 2 mL stock solution containing $CsBAr^F_4$ in $Et_2O$ (if any) was added and the mixture was stirred for 10 min. The mixture was then dried vacuum for at least 3 h to completely remove the $Et_2O$ solvent. Solid $Ni[COD]_2$ (8 μmol) was added to the catalyst mixture, followed by addition of 5 mL of toluene and stirred until a clear solution was obtained. The mixture was loaded into a 10-mL syringe equipped with an 8-inch stainless steel needle. To prepare the polymerization reactor, 7.5 mL of dry toluene and 37.5 mL of dry hexane was placed in an empty autoclave. The autoclave was pressurized with ethylene to 80 psi, stirred for 5 min, and then the reactor pressure was reduced to 5 psi. This process was repeated 3 times to remove trace amounts of oxygen inside the reaction vessel. The polymerization process was continued using the general polymerization procedure described above.

Analysis of Bimodal Polymers: The GPC traces of bimodal polymers were analyzed further using the program OriginPro 2022. The peaks were fit using the "multiple peak fit" algorithm and the integration values of each peak were compared.

Example 16. Procedure for Ethylene Polymerization Under Dynamic Switching Conditions Using Ni2/$CsBAr^{F}_4$ (FIG. 8A): Inside the drybox, 4 μmol of the Ni2 complex (stock solution in $Et_2O$) was dissolved in 2 mL of $Et_2O$ in a 20 mL vial. A 2 mL stock solution containing $CsBAr^{F}_4$ in $Et_2O$ (if any) was added and the mixture was stirred for 10 min. The mixture was dried under strong vacuum for at least 3 h to completely remove the $Et_2O$. Solid $Ni[COD]_2$ (8 μmol) was added to the catalyst mixture, followed by addition of 4 mL of toluene and 1 mL of $Et_2O$ and stirred until a clear solution was obtained. The mixture was loaded into a 10-mL syringe equipped with an 8-inch stainless steel needle. To prepare the polymerization reactor, 45 mL of dry toluene was placed in an empty autoclave. The autoclave was pressurized with ethylene to 80 psi, stirred for 5 min, and then the reactor pressure was reduced to 5 psi. This process was repeated 3 times to remove trace amounts of oxygen inside the reaction vessel. The polymerization process was continued using the general polymerization procedure described above.

Using Ni2/$CsBAr^{F}_4$/$LiBAr^{F}_4$ (FIG. 8B): Inside the drybox, 1 μmol of the Ni2 complex (stock solution in $Et_2O$) was dissolved in 2 mL of $Et_2O$ in a 20 mL vial. A 2 mL stock solution of $CsBAr^{F}_4$ and $LiBAr^{F}_4$ in $Et_2O$ (if any) was added and the mixture was stirred for 10 min. The mixture was dried under strong vacuum for at least 3 h to completely remove the $Et_2O$. Solid $Ni[COD]_2$ (8 μmol) was added to the resulting catalyst mixture, followed by addition of 3 mL of toluene and 2 mL of $Et_2O$ and stirred until a clear solution was obtained. The mixture was loaded into a 10-mL syringe equipped with an 8-inch stainless steel needle. To prepare the polymerization reactor, 95 mL of dry toluene was placed in an empty autoclave. The autoclave was pressurized with ethylene to 80 psi, stirred for 5 min, and then the reactor pressure was reduced to 5 psi. This process was repeated 3 times to remove trace amounts of oxygen inside the reaction vessel. The polymerization process was continued using the general polymerization procedure described above.

Example 17. Calculating Moles of Nickel Complexes in Non-Switching Polymerization Studies We calculated the amounts of Ni1-Li and Ni1-Na species present in each reaction in Table 12 by taking into consideration the reaction yield, catalyst activity, and ratio of polymer fractions ($A_{15.8}/A_{18.2}$). The equations used for our calculations are provided below. Our results showed that the ratio of Ni1-Li:Ni1-Na calculated were different than that of $LiBAr^{F}_4$:$NaBAr^{F}_4$ added, which reflects differences in the solubility of the alkali salts, the binding affinity of Ni1 for $Li^+$ vs. $Na^+$, and the activity of Ni1-Li vs. Ni1-Na.

The $A_{15.8}/A_{18.2}$ term is equal to the ratio of the polymer yields from Ni1-Li and Ni1-Na, which can be determined from their activities:

$$\frac{A_{15.8}}{A_{18.2}} = \frac{(42800\ \text{kg/mol}\cdot\text{h})(x)}{(16600\ \text{kg/mol}\cdot\text{h})(y)} = \frac{2.58\ (x)}{(y)},\quad \text{where}\quad \begin{aligned} x &= \text{moles of Ni1-Li} \\ y &= \text{moles of Ni1-Na} \end{aligned}$$

$$y = \frac{2.58\ (x)}{\left(\frac{A_{15.8}}{A_{18.2}}\right)}$$

The polymer yield is equal to the activities of Ni1-Li and Ni1-Na and the reaction time:

$$PE\ \text{yield} = (42800\ \text{kg/mol}\cdot\text{h})(0.5\ \text{h})(x) + (16600\ \text{kg/mol}\cdot\text{h})(0.5\ \text{h})(y)$$

$$PE\ yield = (21400\ \text{kg/mol})(x) + \frac{(8300\ \text{kg/mol})(2.58)(x)}{\left(\frac{A_{15.8}}{A_{18.2}}\right)} * \text{substitute with } y \text{ term above}$$

$$x = \frac{PE\ \text{yield}}{(21400\ \text{kg/mol}) + \frac{(8300\ \text{kg/mol})(2.58)}{\left(\frac{A_{15.8}}{A_{18.2}}\right)}}$$

Figure 24:
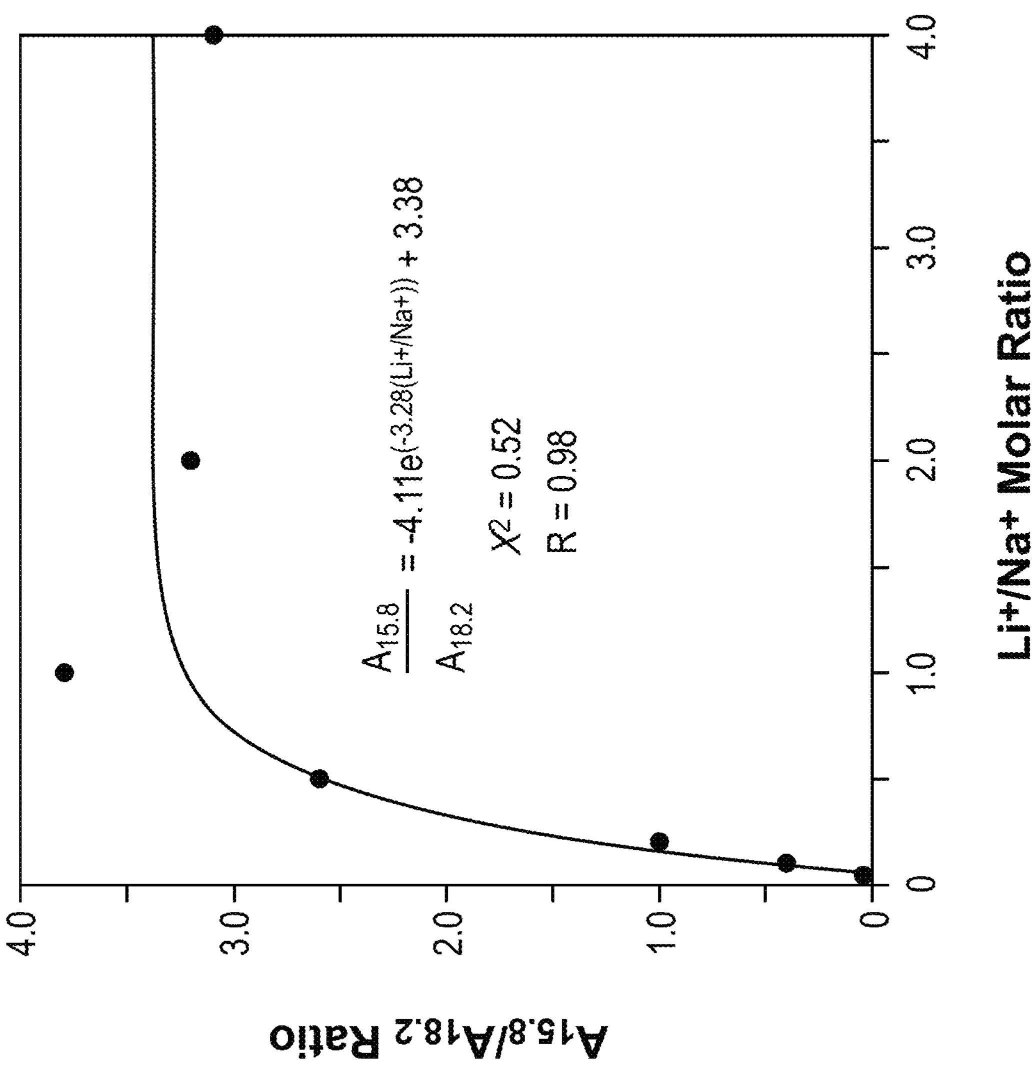
FIG. 24 depicts in accordance with various embodiments of the invention, Plot of $Li^+$/$Na^+$ molar ratio vs. $A_{15.8}$/$A_{18.2}$ obtained from ethylene polymerization studies of Ni1 with $LiBAr^F_4$ and $NaBAr^F_4$ salts (see Table 12). The data (black dots) were fit to an exponential function to give an empirical relationship between $Li^+$/$Na^+$ molar ratio and $A_{15.8}$/$A_{18.2}$. The data points obtained from $Li^+$/$Na^+$>1.0 have large experimental error because the amount of the PE produced at 18.2 mL retention volume was very small so its quantification from the GPC trace is not accurate.

FIG. 24. Plot of $Li^+/Na^+$ molar ratio vs. $A_{15.8}/A_{18.2}$ Obtained from ethylene polymerization studies of Ni1 with $LiBAr^{F}_4$ and $NaBAr^{F}_4$ salts (see Table 12). The data (black dots) were fit to an exponential function to give an empirical relationship between $Li^+/Na^+$ molar ratio and $A_{15.8}/A_{15.7}$. The data points obtained from Li+/$Na^+$>1.0 have large experimental error because the amount of the PE produced at 18.2 mL retention volume was very small so its quantification from the GPC trace is not accurate.

FIG. 25A-FIG. 25D. Proposed process for both non-switching (FIG. 25A, FIG. 25C) and dynamic switching (FIG. 25B, FIG. 251-3) modalities in olefin polymerization by non-living cation-tunable nickel complexes. It is possible that species with nuclearity greater than 2 could form but are not considered in FIG. 25A-FIG. 25D. The squiggly lines represent polymer segments produced by different catalyst forms. Here, both "blocks" comprise entirely of ethylene. However, without being bound by theory, it may be possible to use this strategy to produce block copolymers when starting with more than one type of monomer.

TABLE 11

Ethylene Polymerization Using Ni1 and Ni1-M[a]

| Entry | Cat. | Salt | Temp. (° C.) | Polymer Yield (g) | Activity (kg/mol · h) | $M_n$[b] (×$10^3$) | Đ[b] | Branches[e] (/1000 C) | $V_{growth}$[f] | $V_{term}$[g] | $V_{growth}/V_{term}$ |
|---|---|---|---|---|---|---|---|---|---|---|---|
| 1 | Ni1 | none | 30 | trace | 0 | — | — | — | — | — | — |
| 2[d] | Ni1 | $Li^+$ | 30 | 3.53 | 35000 | 40.1 | 1.3 | 12 | 1260714 | 880.3 | 1432 |
| 3 | Ni1 | $Na^+$ | 30 | 9.07 | 18000 | 1.72 | 1.4 | 27 | 647857 | 10546.5 | 61 |

TABLE 11-continued

Ethylene Polymerization Using Ni1 and Ni1-M[a]

| Entry | Cat. | Salt | Temp. (° C.) | Polymer Yield (g) | Activity (kg/mol · h) | $M_n$[b] ($\times 10^3$) | Đ[b] | Branches[e] (/1000 C) | $V_{growth}$[f] | $V_{term}$[g] | $V_{growth}/V_{term}$ |
|---|---|---|---|---|---|---|---|---|---|---|---|
| 4 | Ni1 | $K^+$ | 30 | 1.46 | 2900 | 4.53 | 1.6 | 25 | 104286 | 644.6 | 162 |
| 5 | Ni1 | $Cs^+$ | 30 | 0.18 | 360 | 33.93 | 1.5 | 9 | 12857 | 10.6 | 1212 |

[a]Data previously reported (Tran, T. V.; Karas, L. J.; Wu, J. L; Do, L. H., Elucidating Secondary Metal Cation Effects on Nickel Olefin Polymerization Catalysts. *ACS Catal.* 2020, 10 (18), 10760-10772). Polymerization conditions: Ni1 catalyst (0.5 μmol), $MBAr^F_4$ (1 μmol, if any), $Ni(COD)_2$ (4 μmol), ethylene (450 psi), 100 mL toluene, 1 h. Temperature was controlled by manual external cooling when necessary to ensure the reaction temperature does not exceed greater than 5° C. from the starting temperature.
[b]The total number of branches per 1000 carbons was determined by 1H NMR spectroscopy.
[c]Determined by GPC in trichlorobenzene at 140° C.
[d]NiI (0.1 μmol), $LiBAr^F_4$ (0.2 μmol), $Ni(COD)_2$ (0.8 μmol).
[e]The total number of branches per 1000 carbons was determined by $^1H$ NMR spectroscopy.
[f]Unit: mol $C_2H_4$/mol Ni · h.
[g]Unit: mol PE/mol Ni · h.

TABLE 12

Ethylene Polymerization Using Ni2 and Ni2-M at Different Temperatures[a]

| Entry | Cat. | Salt | Temp. (° C.) | Polymer Yield (g) | Activity (kg/mol · h) | $M_n$[b] ($\times 10^3$) | Đ[b] | Branches[e] (/1000 C) | $v_{growth}$[f] | $v_{term}$[g] | $v_{growth}/v_{term}$ |
|---|---|---|---|---|---|---|---|---|---|---|---|
| 1 | Ni2 | none | 30 | 0.279 | 279 | 270.7 | 2.0 | 4 | 9964 | 1.0 | 9668 |
| 2 | Ni2 | $Li^+$ | 30 | 2.94 | 2940 | 684.9 | 1.5 | 3 | 105000 | 4.3 | 24461 |
| 3 | Ni2 | $Na^+$ | 30 | 2.43 | 2400 | 1234 | 1.3 | 2 | 86786 | 2.0 | 44071 |
| 4 | Ni2 | $K^+$ | 30 | 1.88 | 1880 | 948.5 | 1.4 | 1 | 67143 | 2.0 | 33875 |
| 5 | Ni2 | $Cs^+$ | 30 | 1.26 | 1260 | 1415 | 1.6 | 12 | 45000 | 0.9 | 50536 |
| 6[c] | Ni2 | none | 60 | 0.105 | 525 | 115.5 | 2.2 | — | 18750 | 4.5 | 4125 |
| 7[c] | Ni2 | $Li^+$ | 60 | 6.2 | 31000 | 181.6 | 1.6 | — | 1107143 | 170.7 | 6486 |
| 8[c] | Ni2 | $Na^+$ | 60 | 1.13 | 5650 | 198.7 | 1.6 | — | 201786 | 28.4 | 7096 |
| 9[c] | Ni2 | $K^+$ | 60 | 1.7 | 8500 | 196.4 | 1.6 | — | 303571 | 43.3 | 7014 |
| 10[c] | Ni2 | $Cs^+$ | 60 | 0.64 | 3200 | 707.9 | 1.4 | — | 114286 | 4.5 | 25282 |
| 11[c] | Ni2 | none | 90 | 4.6 | 23000 | 40.6 | 2.0 | — | 821429 | 566.5 | 1450 |
| 12[c] | Ni2 | $Li^+$ | 90 | 9.9 | 49500 | 15.2 | 2.6 | — | 1767857 | 3256.6 | 543 |
| 13[c] | Ni2 | $Na^+$ | 90 | 11.7 | 58500 | 30.7 | 1.8 | — | 2089286 | 1905.5 | 1096 |
| 14[c] | Ni2 | $K^+$ | 90 | 3.7 | 18500 | 49.8 | 1.6 | — | 660714 | 371.5 | 1779 |
| 15[c] | Ni2 | $Cs^+$ | 90 | 4.7 | 23500 | 117.3 | 1.7 | — | 839286 | 200.3 | 4189 |
| 16[d] | Ni2 | $Cs^+$ | 90 | 3.3 | 33000 | 185.2 | 1.5 | — | 1178571 | 178.2 | 6614 |

[a]Polymerization conditions: catalyst (1.0 μmol), $MBAr^F_4$ (5.0 μmol, if any), $Ni(COD)_2$ (10 μmol), ethylene (450 psi), 98 mL toluene/2 mL $Et_2O$, 1 h. Temperature was controlled by manual external cooling when necessary to ensure that the reaction temperature does not exceed greater than 5° C. from the starting temperature.
[b]Determined by GPC in trichlorobenzene at 160° C.
[c]Ni2 (0.2 μmol), $MBAr^F_4$ (1 μmol, if any), $Ni(COD)_2$ (1.6 μmol), temperature quickly increased to 114° C. after addition of catalyst mixture.
[d]Ni2 (0.1 μmol), $MBAr^F_4$ (0.5 μmol), $Ni(COD)_2$ (1 μmol).
[e]The total number of branches per 1000 carbons was determined by $^1H$ NMR spectroscopy in TCE-$d_2$ at 120° C.
[f]Unit: mol $C_2H_4$/mol Ni · h.
[g]Unit: mol PE/mol Ni · h.

TABLE 13

Ethylene Polymerization Using Ni1 with Various $Li^+/Na^+$ Ratios Under Non-Switching Conditions (30° C.)[a]

| Entry | Cat. | $Li^+$ Added (equiv.) | $Na^+$ Added (equiv.) | Polymer Yield (g) | Activity (kg/mol · h) | $M_n$[b] ($\times 10^3$) | Branches[c] (/1000 C) | Đ[b] | $A_{15.8}/A_{18.2}$[d] | Ni1-Li Calc. ($\times 10^8$ mol) | Ni1-Na Calc. ($\times 10^8$ mol) |
|---|---|---|---|---|---|---|---|---|---|---|---|
| 1 | Ni1 | — | 2 | 0.83 | 16600 | 1.54 | 27 | 1.7 | — | — | — |
| 2 | Ni1 | 2 | 40 | 0.85 | 17000 | 2.19 | 25 | 3.9 | 0.04 | 0.07 | 4.94 |
| 3 | Ni1 | 2 | 20 | 0.91 | 18200 | 2.99 | 17 | 4.9 | 0.4 | 0.58 | 4.04 |
| 4 | Ni1 | 2 | 10 | 1.14 | 22800 | 4.62 | 15 | 5.1 | 1.0 | 1.25 | 3.63 |
| 5 | Ni1 | 2 | 4 | 1.26 | 25200 | 10.29 | 10 | 3.6 | 2.6 | 2.05 | 2.29 |
| 6 | Ni1 | 2 | 2 | 1.33 | 26600 | 14.02 | 9 | 2.6 | 3.8 | 2.40 | 1.83 |

TABLE 13-continued

Ethylene Polymerization Using Ni1 with Various $Li^+$/$Na^+$ Ratios Under Non-Switching Conditions (30° C.)[a]

| Entry | Cat. | $Li^+$ Added (equiv.) | $Na^+$ Added (equiv.) | Polymer Yield (g) | Activity (kg/mol · h) | $M_n$[b] ($\times10^3$) | Branches[c] (/1000 C) | Đ[b] | $A_{15.8}$/$A_{18.2}$[d] | Ni1-Li Calc. ($\times10^8$ mol) | Ni1-Na Calc. ($\times10^8$ mol) |
|---|---|---|---|---|---|---|---|---|---|---|---|
| 7 | Ni1 | 2 | 1 | 1.65 | 33000 | 18.89 | 8 | 2.3 | 3.2 | 2.85 | 2.58 |
| 8 | Ni1 | 2 | 0.5 | 1.95 | 39000 | 21.17 | 7 | 2.0 | 3.1 | 3.34 | 3.13 |
| 9 | Ni1 | 2 | — | 2.14 | 42800 | 31.13 | 11 | 1.7 | — | — | — |

[a]Polymerization conditions: Ni1 (0.1 μmol), $MBAr^F_4$ (varied), $Ni(COD)_2$ (0.8 μmol), ethylene (450 psi), 100 mL toluene/0.2 mL $Et_2O$, 30° C., 0.5 h. Temperature was controlled by manual external cooling when necessary to ensure that the reaction temperature does not exceed greater than 5° C. from the starting temperature.
[b]Determined by GPC in trichlorobenzene at 160° C.
[c]The total number of branches per 1000 carbons was determined by $^1H$ NMR spectroscopy in TCE-$d_2$ at 120° C.
[d]The GPC peaks at~15.8 (corresponding to polymer from Ni1-Li) and 18.2 min (corresponding to polymer from Ni1-Na) were fit to two different Gaussian functions. The integrated areas $A_{15.8}$ and $A_{18.2}$ correspond to the peaks at 15.8 and 18.2 min, respectively.

TABLE 14

Ethylene Polymerization Using Ni2 with $Cs^+$ Under Non-Switching Conditions (30° C.)[a]

| Entry | Cat. | $CsBAr^F_4$ (equiv.) | Polymer Yield (g) | Activity (kg/mol · h) | $M_n$[b] ($\times10^3$) | Đ[b] | Modality | $A_{13.4}$/$A_{15.5}$ |
|---|---|---|---|---|---|---|---|---|
| 1 | Ni2 | 0 | 0.21 | 52 | 203 | 2.4 | monomodal | — |
| 2 | Ni2 | 0.25 | 0.95 | 238 | 93 | 3.5 | bimodal | 0.4 |
| 3 | Ni2 | 0.50 | 0.07 | 18 | 84 | 3.0 | slightly bimodal | 0.1 |
| 4 | Ni2 | 1.00 | 0.33 | 82 | 916 | 1.5 | monomodal | — |

[a]Polymerization conditions: Ni2 (4 μmol), $CsBAr^F_4$ (varied), $Ni(COD)_2$ (32 μmol), ethylene (450 psi), 12.5 mL toluene/37.5 mL hexane, 30° C., 1 h. Temperature was controlled by manual external cooling when necessary to ensure that the reaction temperature does not exceed greater than 5° C. from the starting temperature.
[b]Determined by GPC in trichlorobenzene at 160° C.

TABLE 15

Ethylene Polymerization Using Ni2 with $Cs^+$ Under Dynamic Switching Conditions (30° C.)[a]

| Entry | Cat. | $CsBAr^F_4$ (equiv.) | Polymer Yield (g) | Activity (kg/mol ·h) | $M_n$[b] ($\times10^3$) | Đ[b] | Branches[c] (/1000 C) |
|---|---|---|---|---|---|---|---|
| 1 | Ni2 | 0 | 0.7 | 175 | 484 | 1.6 | 4 |
| 2 | Ni2 | 0.25 | 0.37 | 93 | 305 | 1.9 | — |
| 3 | Ni2 | 0.50 | 0.46 | 115 | 695 | 1.6 | 3 |
| 4 | Ni2 | 1.00 | 0.96 | 240 | 945 | 1.4 | 12 |

[a]Polymerization conditions: catalyst (4 μmol), $Ni(COD)_2$ (8 μmol), ethylene (450 psi), 98 mL toluene/2 mL $Et_2O$, 30° C., 1 h. Temperature was controlled by manual external cooling when necessary to ensure that the reaction temperature does not exceed greater than 5° C. from the starting temperature.
[b]Determined by GPC in trichlorobenzene at 160° C.
[c]The total number of branches per 1000 carbons was determined by $^1H$ NMR spectroscopy in TCE-$d_2$ at 120° C.

TABLE 16

Ethylene Polymerization Using Ni2 with $Cs^+$ Under Dynamic Switching Conditions (60° C.)[a]

| Entry | Cat. | $CsBAr^F_4$ (equiv.) | Polymer Yield (g) | Activity (kg/mol · h) | $M_n$[b] ($\times10^3$) | Đ[b] |
|---|---|---|---|---|---|---|
| 1 | Ni2 | 0 | 0.105 | 525 | 116 | 2.2 |
| 2 | Ni2 | 0.25 | 0.11 | 550 | 168 | 1.4 |
| 3 | Ni2 | 0.50 | 0.18 | 900 | 278 | 1.4 |
| 4 | Ni2 | 0.75 | 0.2 | 1000 | 318 | 1.4 |
| 5 | Ni2 | 1.00 | 0.26 | 1300 | 462 | 1.3 |

TABLE 16-continued

Ethylene Polymerization Using Ni2 with $Cs^+$ Under Dynamic Switching Conditions (60° C.)[a]

| Entry | Cat. | $CsBAr^F_4$ (equiv.) | Polymer Yield (g) | Activity (kg/mol · h) | $M_n$[b] ($\times10^3$) | Đ[b] |
|---|---|---|---|---|---|---|
| 6 | Ni2 | 2.00 | 0.31 | 1550 | 586 | 1.4 |
| 7 | Ni2 | 5.00 | 0.64 | 3200 | 708 | 1.4 |

[a]Polymerization conditions: catalyst (0.2 μmol), $Ni(COD)_2$ (1.6 μmol), ethylene (450 psi), 98 mL toluene/2 mL $Et_2O$, 60° C., 1 h. Temperature was controlled by manual external cooling when necessary to ensure that the reaction temperature does not exceed greater than 5° C. from the starting temperature.
[b]Determined by GPC in trichlorobenzene at 160° C.

TABLE 17

Ethylene Polymerization Using Ni2 with $Li^+$/$Cs^+$ Under Dynamic Switching Conditions[a]

| Entry | Cat. | $LiBAr^F_4$ (equiv.) | $CsBAr^F_4$ (equiv.) | Polymer Yield (g) | Activity (kg/mol · h) | $M_n$[b] ($\times10^3$) | Đ[b] |
|---|---|---|---|---|---|---|---|
| 1 | Ni2 | 5 | — | 0.64 | 31000 | 182 | 1.6 |
| 2 | Ni2 | 3.75 | 1.25 | 0.31 | 14620 | 319 | 1.5 |
| 3 | Ni2 | 2.5 | 2.5 | 0.26 | 8560 | 495 | 1.4 |
| 4 | Ni2 | 1.25 | 3.75 | 0.2 | 3420 | 348 | 1.6 |
| 5 | Ni2 | — | 5 | 0.18 | 3200 | 708 | 1.4 |

[a]Polymerization conditions: catalyst (0.2 μmol), $Ni(COD)_2$ (1.6 μmol), ethylene (450 psi), 98 mL toluene/2 mL $Et_2O$, 60° C., 1 h. Temperature was controlled by manual external cooling when necessary to ensure that the reaction temperature does not exceed greater than 5° C. from the starting temperature.
[b]Determined by GPC in trichlorobenzene at 160° C.

TABLE 18

Comparison of Thermally Stable Ethylene Polymerization Catalysts[a]

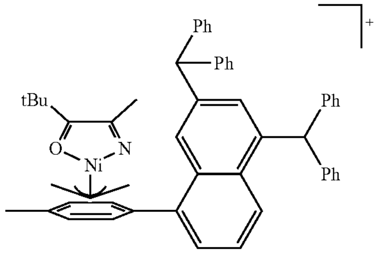

Cat3

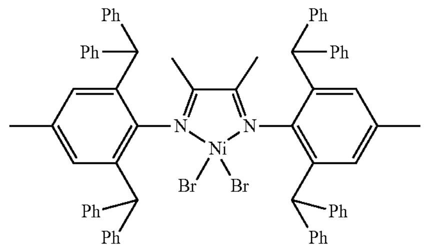

Cat4

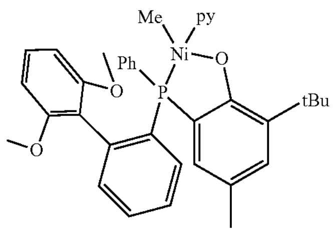

Cat5

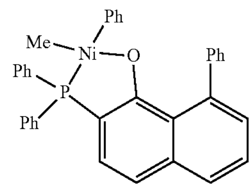

Cat6

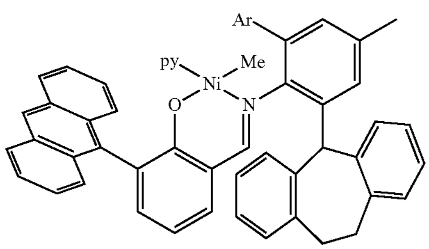

Cat7

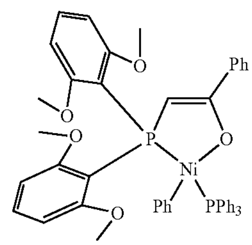

Cat8

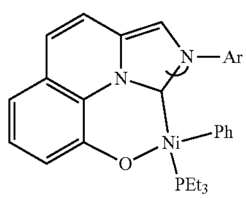

Cat9

| Complex | % $V_{bur}$ | Time (h) | Temp. (° C.) | Yield (g) | Activity (kg/mol · h) | Productivity (kg/mol) | $M_n$ (kg/mol) | D |
|---|---|---|---|---|---|---|---|---|
| Cat3 (1.0 μmol) | —[b] | 1.0 | 80 | 0.60 | 600 | 600 | 1226 | 2.0 |
| Cat4 (1.57 μmol) | 49 | 0.17 | 100 | 0.75 | 2810 | 478 | 422 | 1.2 |
| Cat5 (5.0 μmol ) | 43[c] | 0.33 | 90 | 16.7 | 10020 | 3340 | 9.4 | 2.7 |
| Cat6 (5.0 μmol) | 41 | 0.33 | 90 | 24.7 | 14835 | 4940 | 1.6 | 3.4 |
| Cat7 (5.0 μmol)[c] | 52[c] | 0.25 | 90 | 1.65 | 1320 | 330 | 9.5 | 1.8 |
| Cat8 (0.25 μmol) | 46 | <0.02 | 90 | 0.29 | 57500 | 1160 | 4.1 | 3.1 |
| Cat9 (2.5 μmol) | —[b] | 0.5 | 100 | 0.30 | 240 | 120 | 2.6 | 2.3 |
| Ni1-Cs (0.5 μmol) | 62 | 0.5 | 90 | 5.73 | 23000 | 11460 | 15.7 | 1.4 |
| Ni2-Cs (0.1 μmol) | 66 | 1.0 | 90 | 3.30 | 33000 | 33000 | 185 | 1.5 |

[a]References: Cat3 (Liang, T.; Goudari, S. B.; Chen, C., A Simple and Versatile Nickel Platform for the Generation of Branched High Molecular Weight Polyolefins. *Nat. Commun.* 2020, 11 (1), 372), Cat4 (Rhinehart, J. L.; Brown, L. A.; Long, B. K., A Robust Ni(II) α-Diimine Catalyst for High Temperature Ethylene Polymerization. *J. Am. Chem. Soc.* 2013, 135 (44), 16316-16319), Cat5 (Zhang, Y.; Mu, H.; Pan, L.; Wang, X.; Li, Y., Robust Bulky [P,O] Neutral Nickel Catalysts for Copolymerization of Ethylene with Polar Vinyl Monomers. *ACS Catal.* 2018, 8, 5963-5976), Cat6 (Wang, X. -l.; Zhang, Y. -p.; Wang, F.; Pan, L.; Wang, B.; Li, Y. -s., Robust and Reactive Neutral Nickel Catalysts for Ethylene Polymerization and Copolymerization with a Challenging 1,1-Disubstituted Difunctional Polar Monomer. *ACS Catal.* 2021, 11, 2902-2911), Cat7 (Wang, C.; Kang, X.; Dai, S.; Cui, F.; Li, Y.; Mu, H.; Mecking, S.; Jian, Z., Efficient Suppression of Chain Transfer and Branching via Cs-Type Shielding in a Neutral Nickel(II) Catalyst. *Angewandte Chemie International Edition* 2021, 60 (8), 4018-4022), Cat8 (Xiong, S.; Hong, A.; Bailey, B. C.; Spinney, H. A.; Senecal, T. D.; Bailey, H., Agapie, T., Highly Active and Thermally Robust Nickel Enolate Catalysts for the Synthesis of Ethylene-Acrylate Copolymers. *Angewandte Chemie International Edition* 2022, n/a (n/a), e202206637), Cat9 (Tao, W. -j.; Nakano, R.; Ito, S.; Nozaki, K., Copolymerization of Ethylene and Polar Monomers by Using Ni/IzQO Catalysts. *Angewandte Chemie International Edition* 2016, 55 (8), 2835-2839.), Ni1-Cs (Tran, T. V.; Karas, L. J.; Wu, J. I.; Do, L. H., Elucidating Secondary Metal Cation Effects on Nickel Olefin Polymerization Catalysts. *ACS Catal.* 2020, 10 (18), 10760-10772), Ni2-Cs (the present invention).

[b]X-ray structural data not available for calculating % $V_{bur}$.

[c]Buried volume calculated from related structure.

Figure 26A:
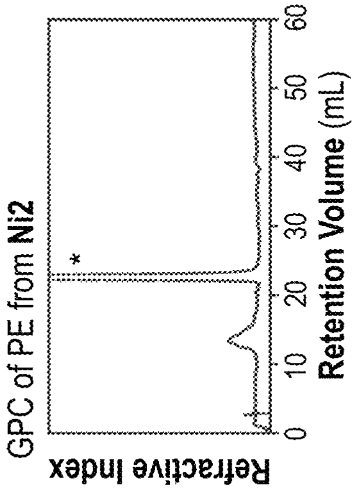
FIG. 26A-FIG. 26E depicts in accordance with various embodiments of the invention, GPC chromatograms of the polyethylene samples obtained from the reactions shown in Table 12, entries 1 (FIG. 26A), 2 (FIG. 26B), 3 (FIG. 26C), 4 (FIG. 26D), and 5 (FIG. 26E). The peak at ~22 mL retention volume marked with an asterisk (*) is derived from a contaminant in the GPC column, not the sample itself.
Figure 26B:
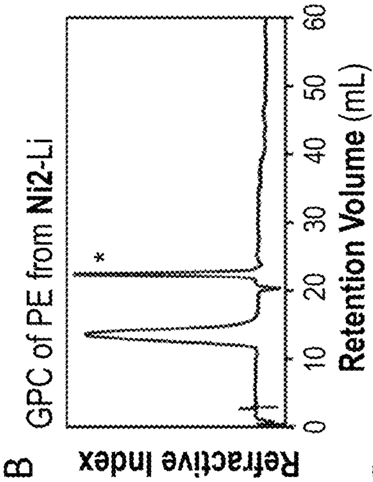
Figure 26C:
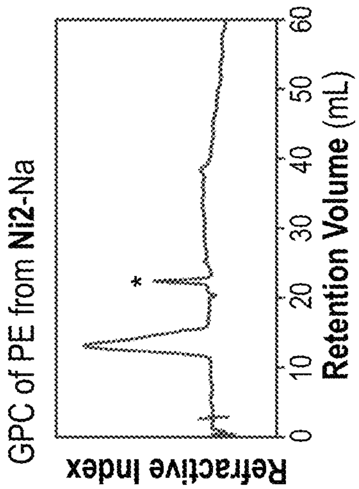
Figure 26D:
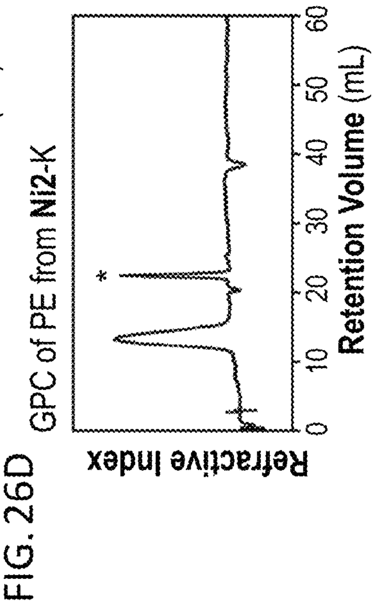
Figure 26E:
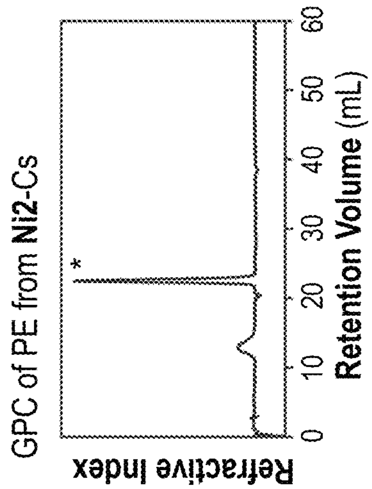
Figure 27A:
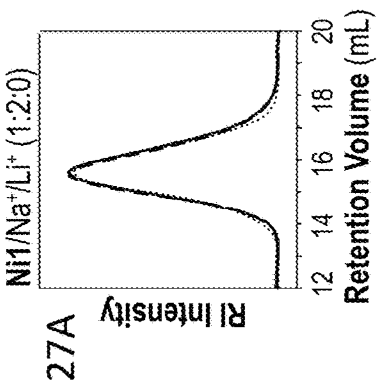
Figure 27B:
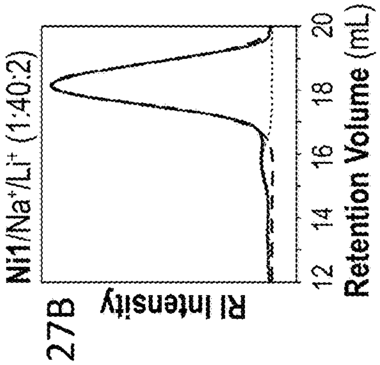
Figure 27C:
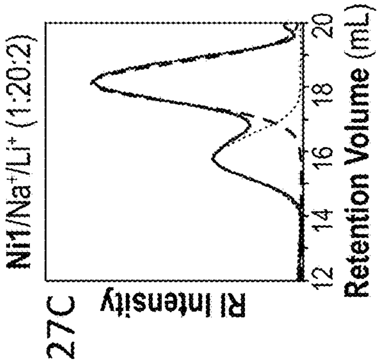
Figure 27D:
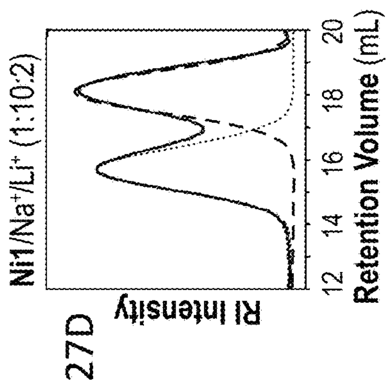
Figure 27E:
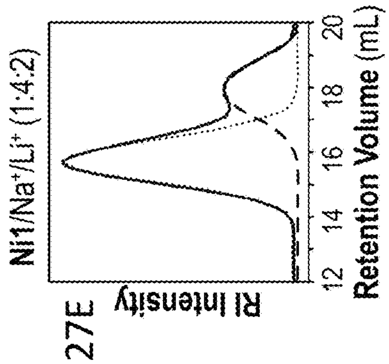
Figure 27F:
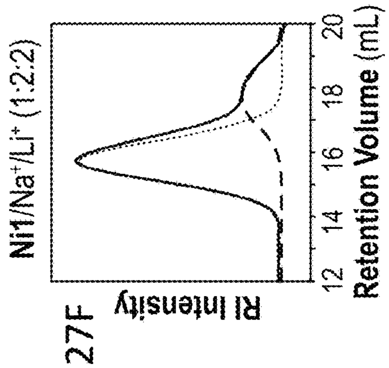
Figure 27G:
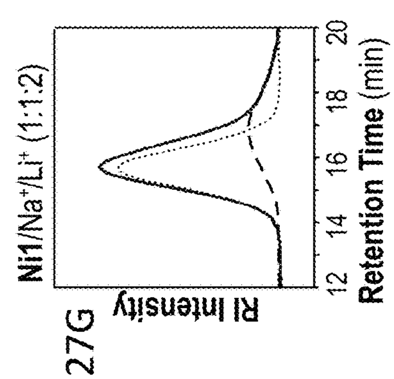
Figure 27H:
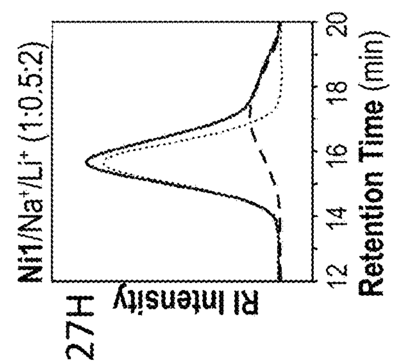
Figure 27I:
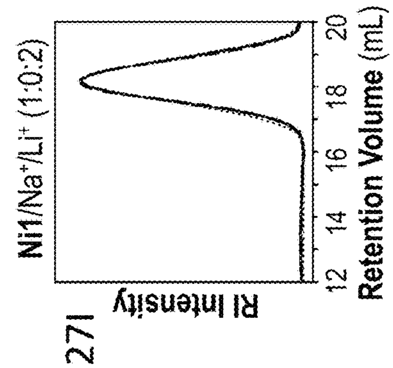

FIG. 26A-FIG. 26E. GPC chromatograms of the polyethylene samples obtained from the reactions shown in Table 12, entries 1 (FIG. 26A), 2 (FIG. 26B), 3 (FIG. 26C), 4 (FIG. 26D), and 5 (FIG. 26E). The peak at ~22 mL retention volume marked with an asterisk (*) is derived from a contaminant in the GPC column, not the sample itself.

FIG. 27A-FIG. 27L GPC chromatograms of the polyethylene obtained in Table 13, in which various Ni1:$Na^+$:$Li^+$ ratios were used. The black traces are the raw data and the Gaussian fits are shown in dashed and dotted traces.

Figure 28:
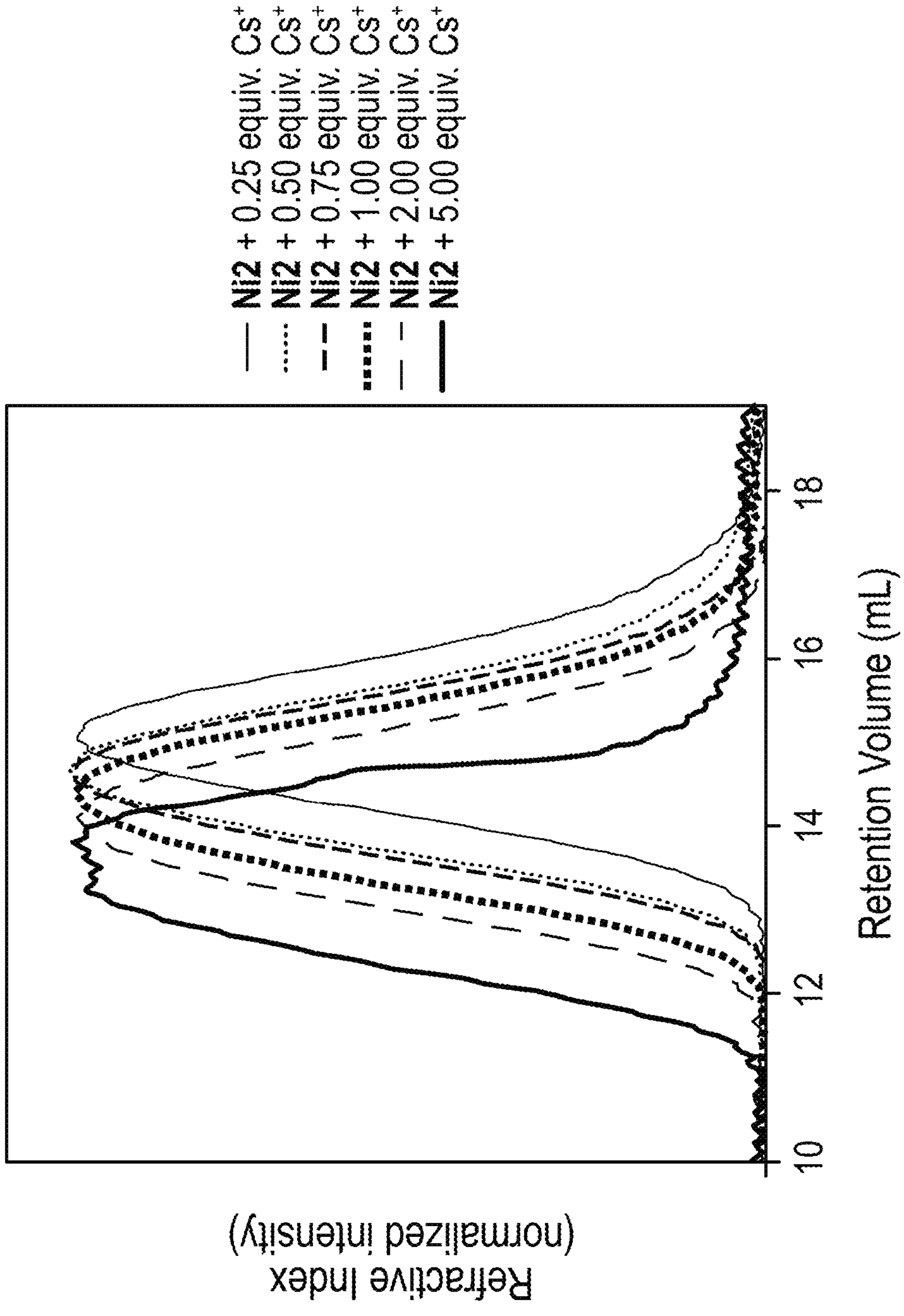
FIG. 28 depicts in accordance with various embodiments of the invention, GPC of monomodal polyethylene obtained in Table 16, entries 2-7 (from the addition of 0.25 to 5.00 equiv. of $CsBAr^F_4$ relative to Ni2). Without being bound by theory, The GPC trace for entry 7 (Ni2+5.00 equiv. $Cs^+$) is not smooth most likely because of either the poor solubility of the polymer in trichlorobenzene at 160° C. or the difficulty of the instrument to detect ultra-high molecular weight polymers.

FIG. 28. GPC of monomodal polyethylene obtained in Table 16, entries 2-7 (from the addition of 0.25 to 5.00 equiv. of $CsBAr^F_4$ relative to Ni2). Without being bound by theory, the GPC trace for entry 7 (Ni2+5.00 equiv. $Cs^+$,) is not smooth most likely because of either the poor solubility of the polymer in trichlorobenzene at 160° C. or the difficulty of the instrument to detect ultra-high molecular weight polymers.

Example 18. X-Ray Data Collection and Refinement

Single crystals suitable for X-ray diffraction studies were picked out of the crystallization vials and mounted onto Mitogen loops using Paratone oil. The crystals were collected at a 6.0 cm detector distance at −150° C. on a Brucker Apex II diffractometer using Mo Kα radiation (λ=0.71073 Å). The structures were solved by direct methods using the program SHELXT and refined by SHELXLE. Hydrogen atoms connected to carbon were placed at idealized positions using standard riding models and refined isotropically. All non-hydrogen atoms were refined anisoptriocally.

Crystals of complex Ni2-Li were grown by layering of pentane into a solution of the nickel complex with $LiBAr^F_4$ in a mixture of toluene and $Et_2O$ at −30° C. The phenyl group (C32-C37) coordinated to nickel was modeled with positional disorder. Six of the CFs groups $BAr^F_4{}^-$ showed rotational disorder. No solvent molecules were found in the crystal lattice Crystals of complex Ni2-Na were grown by layering of pentane into a solution of the nickel complex with $NaBAr^F_4$ in a mixture of benzene and $Et_2O$ at RT. Two of the $CF_3$ groups on the $BAr^F_4{}^-$ showed rotational disorder and were modeled accordingly. A single ordered benzene molecule was found in the crystal lattice and resides on a symmetry axis.

Crystals of complex Ni2-K were grown by layering of pentane into a solution of the nickel complex with $KBAr^F_4$ in a mixture of benzene and $Et_2O$ at RT. Two of the $CF_3$ groups on the $BAr^F_4{}^-$ showed rotational disorder and were modeled accordingly. A single ordered benzene molecule was found in the crystal lattice and resides on a symmetry axis.

Crystals of complex Ni2-Cs were grown by layering of pentane into a solution of the nickel complex with $CsBAr^F_4$ in a mixture of toluene and $Et_2O$ at −30° C. Six of the $CF_3$ groups on the $BAr^F_4{}^-$ showed rotational disorder and were modeled accordingly. No solvent molecules were found in the crystal lattice.

TABLE 19

Crystal Data and Structure Refinement for Ni2-Li and Ni2-Cs

| | Ni2-Li | Ni2-Na · (benzene) | Ni2-K · (benzene) | Ni2-Cs |
|---|---|---|---|---|
| Empirical Formula | $NiLiC_{40}H_{54}O_9P_2$ $(BC_{32}H_{12}F_{24})$ | $NiNaC_{40}H_{54}O_9P_2$ $(BC_{32}H_{12}F_{24})(C_6H_6)$ | $NiKC_{40}H_{54}O_9P_2$ $(BC_{32}H_{12}F_{24})(C_6H_6)$ | $NiCsC_{40}H_{54}O_9P_2$ $(BC_{32}H_{12}F_{24})$ |
| Temperature (° C.) | −150 | −150 | −150 | −150 |
| Wavelength (Å) | 0.71073 | 0.71073 | 0.71073 | 0.71073 |
| Crystal System Space Group | Triclinic, P-1 | Monoclinic, C2/c | Monoclinic, C2/c | Monoclinic, P21/c |
| Unit Cell Dimensions | | | | |
| a (Å) | 12.626(4) | 39.802(17) | 39.569(3) | 19.0606(4) |
| b (Å) | 15.849(5) | 12.877(6) | 12.9171(9) | 20.3960(3) |
| c (Å) | 19.404(6) | 31.238(13) | 31.172(2) | 20.4253(4) |
| α (°) | 82.826(3) | 90 | 90 | 90 |
| β (°) | 80.458(3) | 99.090(5) | 99.248(2) | 100.18(1) |
| γ (°) | 87.287(3) | 90 | 90 | 90 |
| Volume ($Å^3$) | 3798(2) | 15809(12) | 15725.6(18) | 7817.0(3) |
| Z, Calculated Density ($Mg/m^3$) | 2, 1.460 | 12, 1.433 | 12, 1.454 | 4, 1.526 |
| Absorption Coefficient ($mm^{-1}$) | 0.411 | 0.401 | 0.451 | 0.858 |
| F (000) | 1704 | 6964 | 7028 | 3616 |
| Theta Range for Data Collection (°) | 1.072 to 27.546 | 1.036 to 27.376 | 1.043 to 27.504 | 1.085 to 27.504 |
| Limiting Indices | −16 ≤ h ≤ 16<br>−20 ≤ k ≤ 20<br>−25 ≤ l ≤ 25 | −51 ≤ h ≤ 46<br>−12 ≤ k ≤ 16<br>−40 ≤ l ≤ 40 | −51 ≤ h ≤ 51<br>−16 ≤ k ≤ 16<br>−38 ≤ l ≤ 40 | −24 ≤ h ≤ 24<br>−26 ≤ k ≤ 26<br>−26 ≤ l ≤ 26 |
| Reflections Collected/Unique | 62572/17367 [R(int) = 0.0590] | 123627/17907 [R(int) = 0.0334] | 91646/18001 [R(int) 0.0637] | 80622/17914 [R(int) = 0.1403] |
| Data/Restraints/Parameters | 17367/224/989 | 17907/60/939 | 18001/32/936 | 17914/198/986 |
| Goodness of Fit on $F^2$ | 1.032 | 1.020 | 1.035 | 1.005 |
| Final R Indices [I > 2σ(I)] | R1 = 0.0617<br>wR2 = 0.1484 | R1 = 0.0842<br>wR2 = 0.2327 | R1 = 0.0932<br>wR2 = 0.2543 | R1 = 0.0731<br>wR2 = 0.1423 |
| R Indices (All Data)* | R1 = 0.1160<br>wR2 = 0.1779 | R1 = 0.1025<br>wR2 = 0.2514 | R1 = 0.1491<br>wR2 = 0.2941 | R1 = 0.1957<br>wR2 = 0.1911 |

*$R_1 = \Sigma ||F_o| - |F_c||/\Sigma|F_o|$; $wR_2 = [\Sigma[w(F_o^2 - F_c^2)^2]/\Sigma[w(F_o^2)_2]]^{1/2}$; $GOF = [\Sigma[w(F_o^2 - F_c^2)_2]/(n - p)]^{1/2}$, where n is the number of reflections and p is the total number of parameters refined.

TABLE 20

Comparison of Bond Distances and Angles from the Crystallographic Data

| Distance (Å) or Angle (°) | Ni2-Li | Ni2-Na | Ni2-K | Ni2-Cs |
|---|---|---|---|---|
| Ni(1)-P(1) | 2.2471(11) | 2.1859(12) | 2.1802(14) | 2.1795(19) |
| Ni(1)-P(2) | 2.1148(11) | 2.1921(13) | 2.1854(16) | 2.182(2) |

TABLE 20-continued

| Comparison of Bond Distances and Angles from the Crystallographic Data | | | | |
|---|---|---|---|---|
| Distance (Å) or Angle (°) | Ni2-Li | Ni2-Na | Ni2-K | Ni2-Cs |
| Ni(1)-C(X) | 1.947(15) | 1.906(4) | 1.902(5) | 1.898(6) |
| Ni(1)-O(1) | 1.923(2) | 1.935(3) | 1.918(3) | 1.900(4) |
| P(1)-Ni(1)-O(1) | 82.84(7) | 86.59(8) | 86.71(12) | 87.26(14) |

Figure 29:
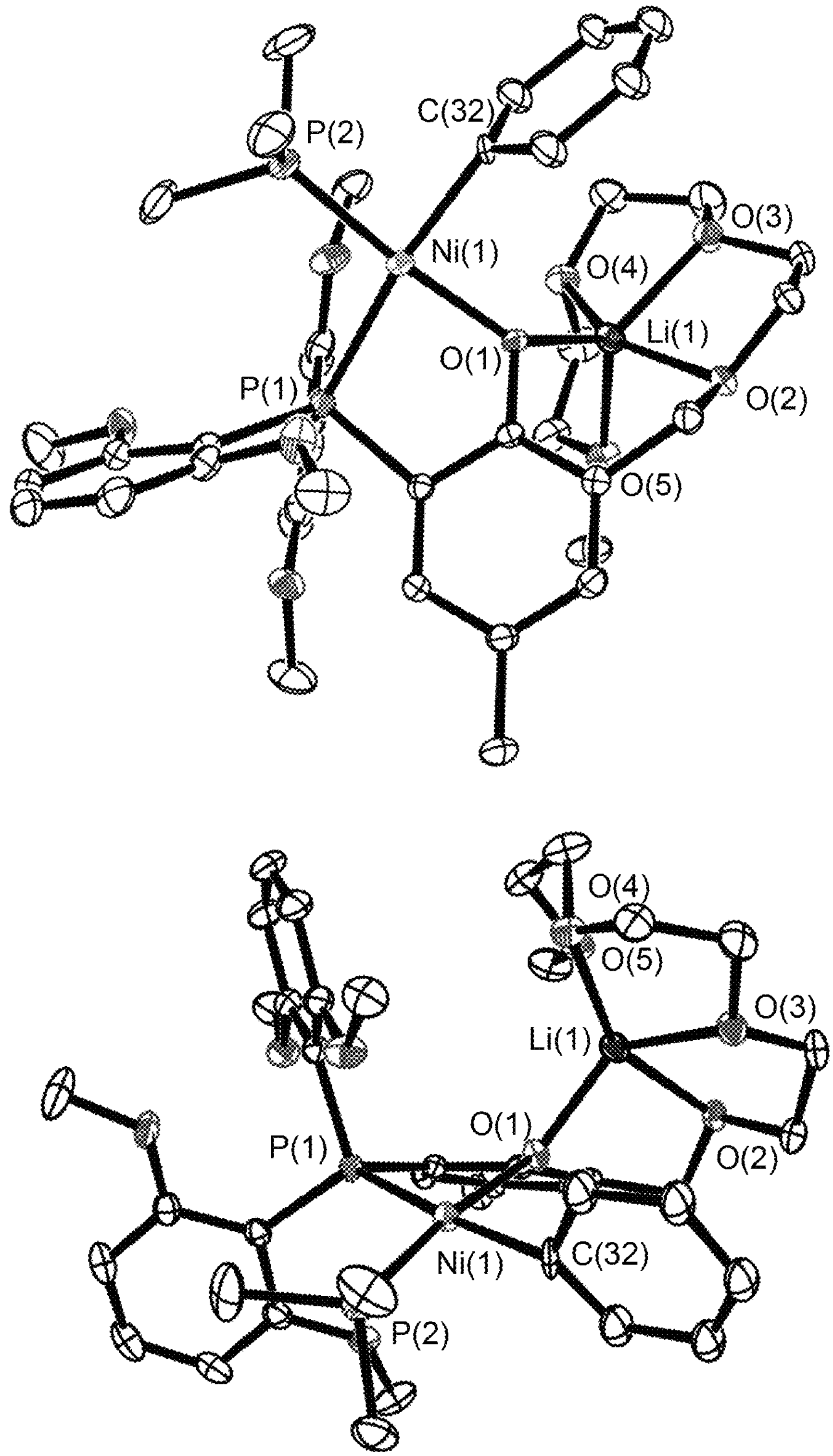
FIG. 29 depicts in accordance with various embodiments of the invention, Crystallographic asymmetric unit showing complex Ni2-Li from two different perspectives (ORTEP view, displacement ellipsoids drawn at 50% probability level). Hydrogen atoms, pentane solvent, and borate anion have been omitted for clarity.

FIG. 29. Crystallographic asymmetric unit showing complex Ni2-Li from two different perspectives (ORTEP view, displacement ellipsoids drawn at 50% probability level). Hydrogen atoms, pentane solvent, and borate anion have been omitted for clarity. Atom colors: green=nickel, orange=phosphorus, purple=lithium, red=oxygen, black=carbon.

Figure 30:
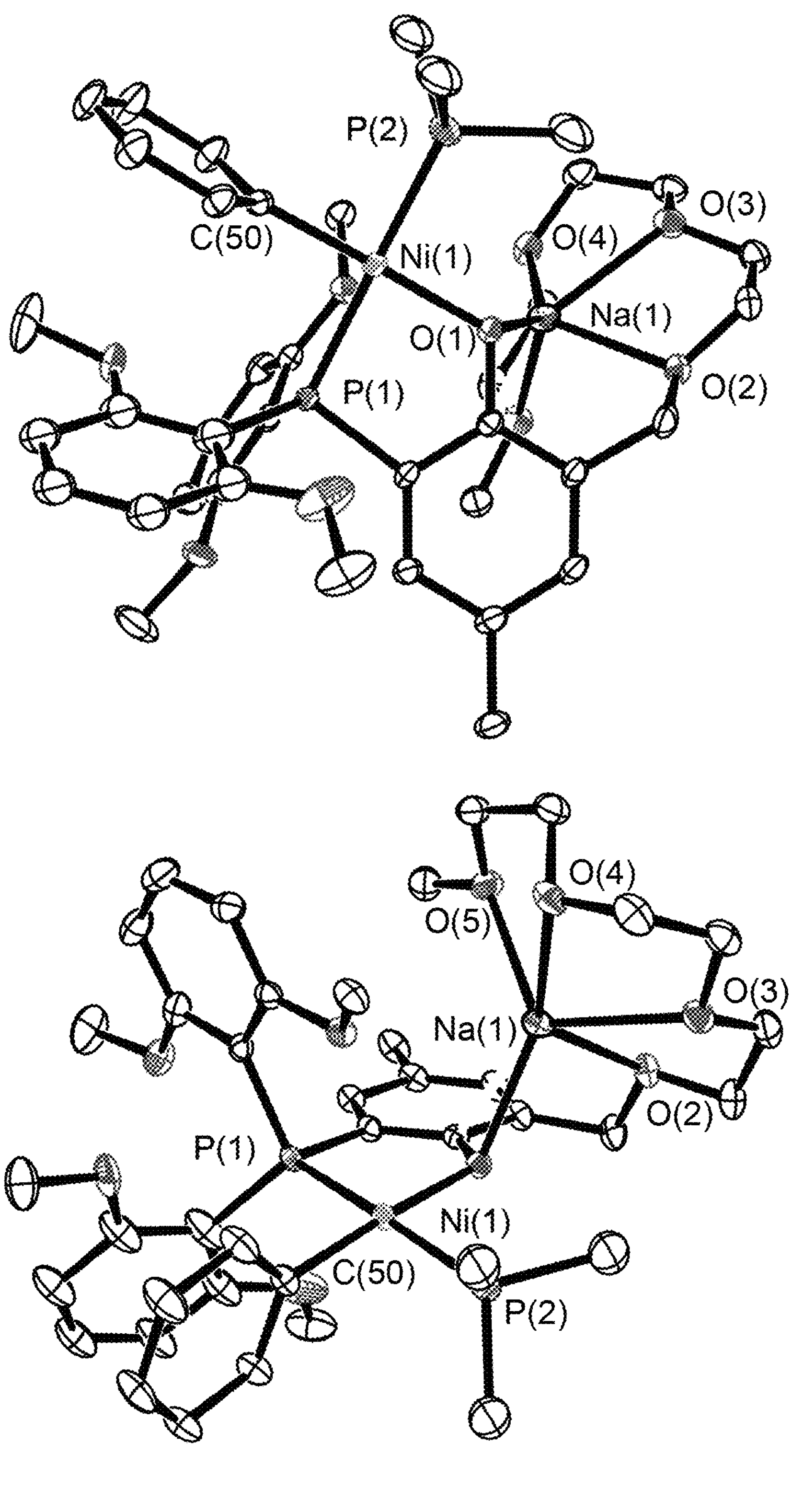
FIG. 30 depicts in accordance with various embodiments of the invention, Crystallographic asymmetric unit showing complex Ni2-Na from two different perspectives (ORTEP view, displacement ellipsoids drawn at 50% probability level). Hydrogen atoms, pentane solvent, and borate anion have been omitted for clarity.

FIG. 30. Crystallographic asymmetric unit showing complex Ni2-Na from two different perspectives (ORTEP view, displacement ellipsoids drawn at 50% probability level). Hydrogen atoms, pentane solvent, and borate anion have been omitted for clarity. Atom colors: green=nickel, orange=phosphorus, pink=sodium, red=oxygen, black=carbon.

Figure 31:
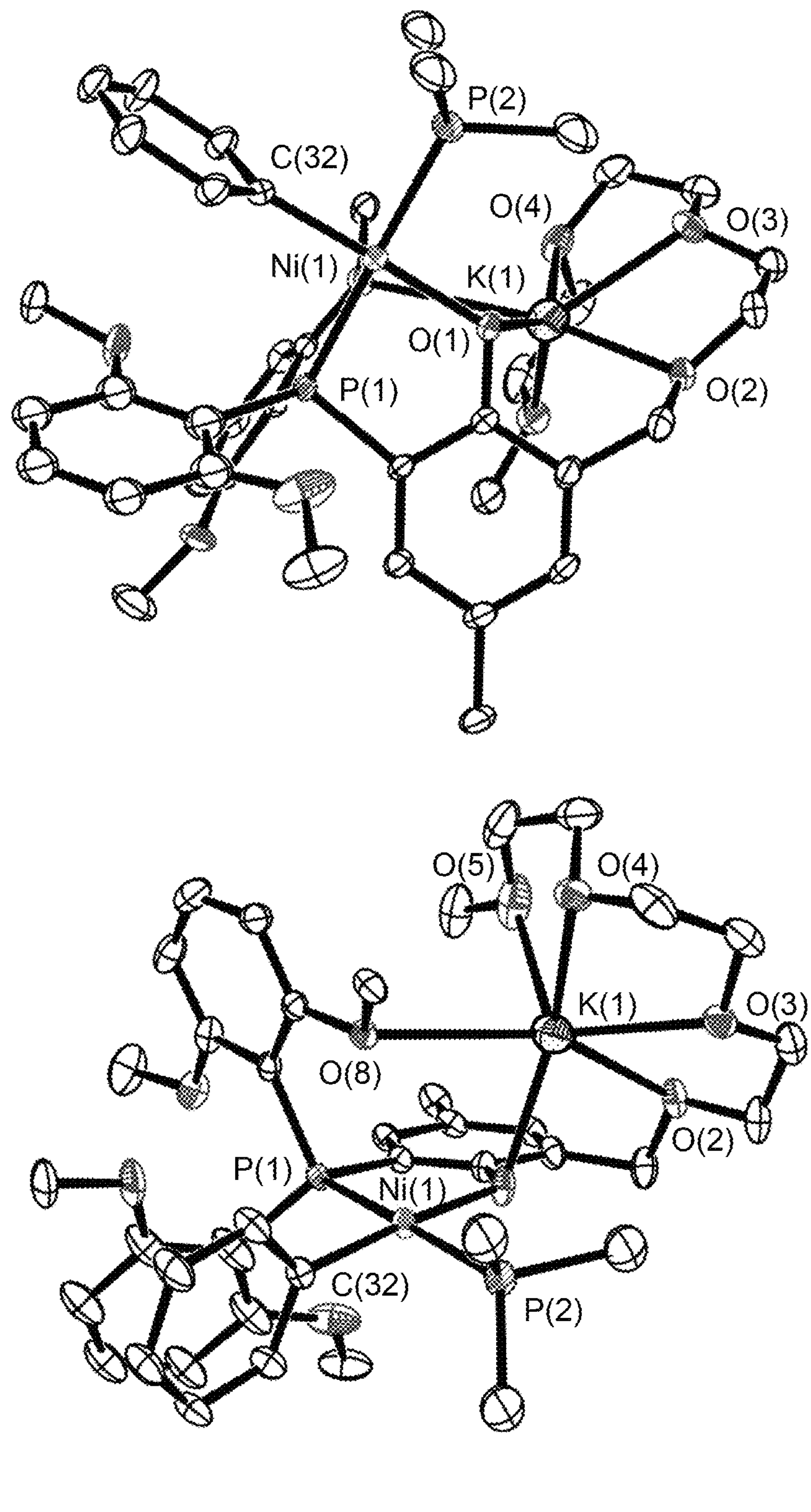
FIG. 31 depicts in accordance with various embodiments of the invention, Crystallographic asymmetric unit showing complex Ni2-K from two different perspectives (ORTEP view, displacement ellipsoids drawn at 50% probability level). Hydrogen atoms, pentane solvent, and borate anion have been omitted for clarity.

FIG. 31. Crystallographic asymmetric unit showing complex Ni2-K from two different perspectives (ORTEP view, displacement ellipsoids drawn at 50% probability level). Hydrogen atoms, pentane solvent, and borate anion have been omitted for clarity. Atom colors: green=nickel, orange=phosphorus, blue=potassium, red=oxygen, black=carbon.

Figure 32:
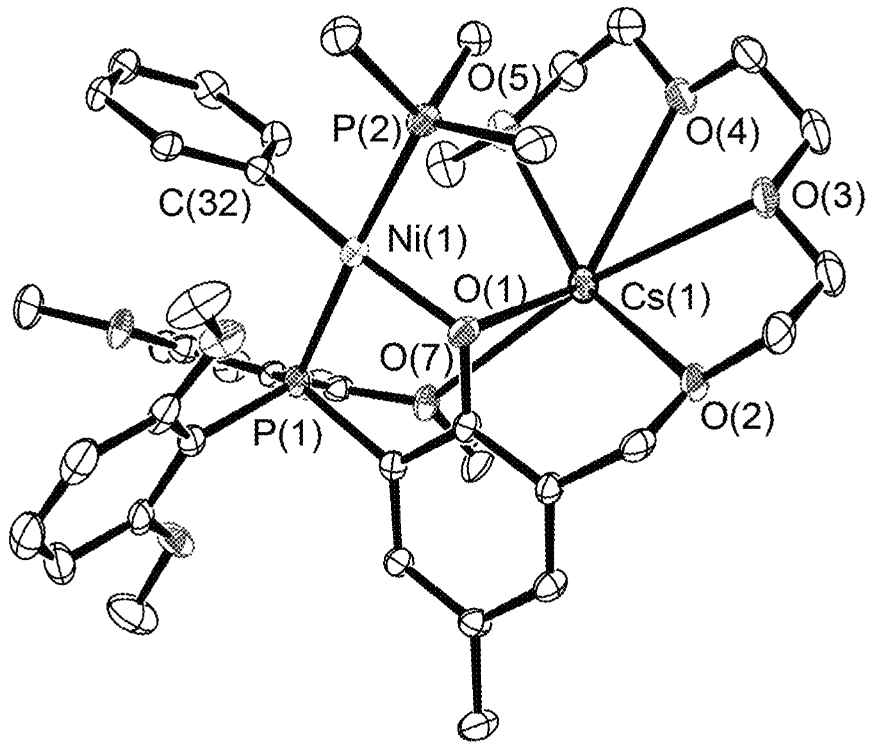
FIG. 32 depicts in accordance with various embodiments of the invention, Crystallographic asymmetric unit showing complex Ni2-Cs from two different perspectives (ORTEP view, displacement ellipsoids drawn at 50% probability level). Hydrogen atoms, pentane solvent, and borate anion have been omitted for clarity.
Figure 32:
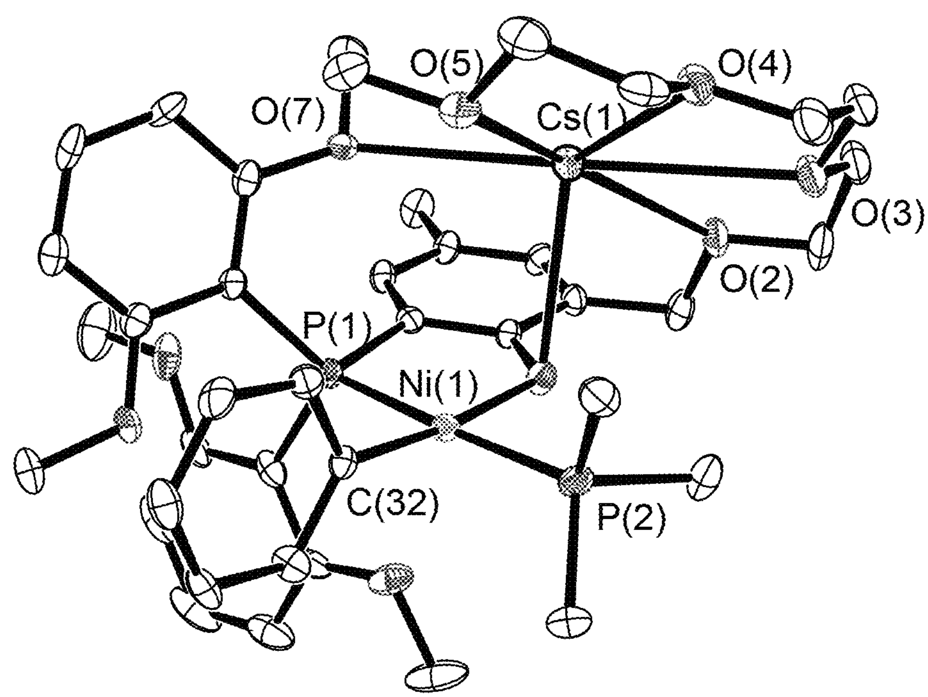

FIG. 32. Crystallographic asymmetric unit showing complex Ni2-Cs from two different perspectives (ORTEP view, displacement ellipsoids drawn at 50% probability level). Hydrogen atoms, pentane solvent, and borate anion have been omitted for clarity. Atom colors: green=nickel, orange=phosphorus, cyan=cesium, red=oxygen, black=carbon.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A catalyst composition, comprising at least four bimetallic catalyst complexes, wherein the at least four bimetallic catalyst complexes are selected from: a bimetallic catalyst complex of Formula (7), a bimetallic catalyst complex of Formula (8), a bimetallic catalyst complex of Formula (9), and a bimetallic catalyst complex of Formula (10):

wherein the bimetallic catalyst complex of Formula (7) has the structure:

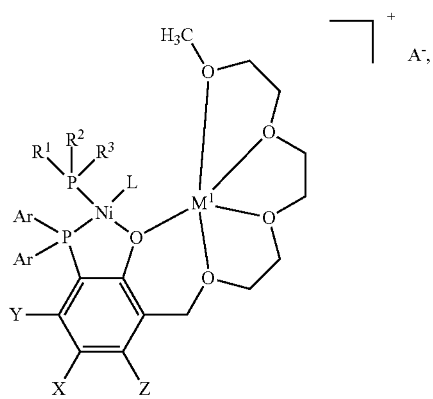

wherein the bimetallic catalyst complex of Formula (8) has the structure:

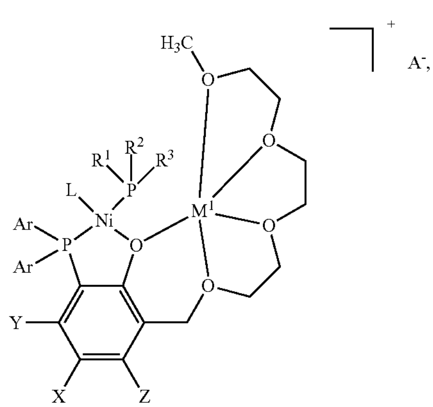

wherein the bimetallic catalyst complex of Formula (9) has the structure:

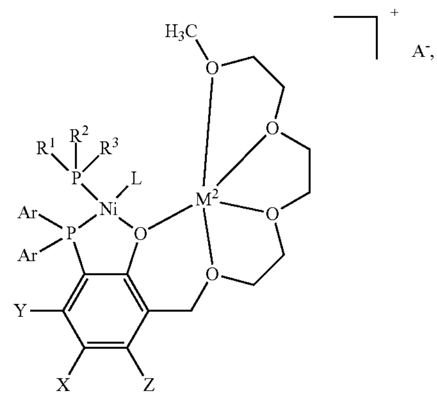

wherein the bimetallic catalyst complex of Formula (10) has the structure:

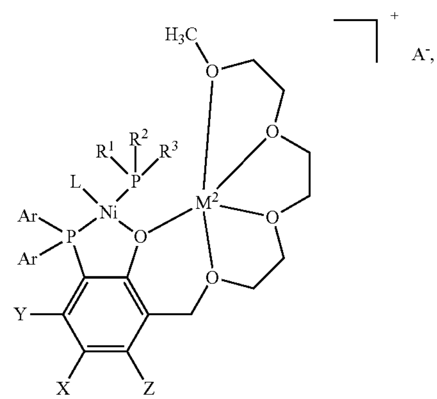

wherein in Formula (7), Formula (8), Formula (9) and Formula (10):

Ar is 2,6-dimethoxyphenyl;

L is an optionally substituted phenyl group;

$M^1$ is Li, Na, K, or Cs;

$M^2$ is Li, Na, K, or Cs;

$A^-$ is a weakly coordinating anion;

X, Y, and Z are each independently selected from hydrogen, an electron donating group, and an electron withdrawing group; and $R^1$, $R^2$, and $R^3$ are each independently selected from optionally substituted aryl, optionally substituted alkyl, and optionally substituted cycloalkyl;

wherein $A^-$ is the same in the bimetallic catalyst complex of Formula (7), Formula (8), Formula (9), and Formula (10);

wherein Ar is the same in the bimetallic catalyst complex of Formula (7), Formula (8), Formula (9), and Formula (10);

wherein L is the same in the bimetallic catalyst complex of Formula (7), Formula (8), Formula (9), and Formula (10);

wherein X is the same in the bimetallic catalyst complex of Formula (7), Formula (8), Formula (9), and Formula (10);

wherein Y is the same in the bimetallic catalyst complex of Formula (7), Formula (8), Formula (9), and Formula (10);

wherein Z is the same in the bimetallic catalyst complex of Formula (7), Formula (8), Formula (9), and Formula (10);

wherein $R^1$ is the same in the bimetallic catalyst complex of Formula (7), Formula (8), Formula (9), and Formula (10);

wherein $R^2$ is the same in the bimetallic catalyst complex of Formula (7), Formula (8), Formula (9), and Formula (10);

wherein $R^3$ is the same in the bimetallic catalyst complex of Formula (7), Formula (8), Formula (9), and Formula (10);

wherein $M^1$ is the same in the bimetallic catalyst complex of Formula (7) and Formula (8);

wherein $M^2$ is the same in the bimetallic catalyst complex of Formula (9) and Formula (10);

and wherein $M^1$ and $M^2$ are different from one another.

2. The catalyst composition of claim 1, wherein the electron donating group is selected from the group consisting of: alkoxy, phenoxy, amino, alkylamino, dialkylamino, hydroxy, alkyl, and cycloalkyl; and the electron withdrawing group is selected from the group consisting of: $NO_2$, —CN, —C(O)-alkyl, C(O)Oalkyl, C(O)Nalkyl, —$SO_3H$, —$SO_2$alkyl, —$PO_3H$, —$PO_3$alkyl, —$CF_3$, and halo.

3. The catalyst composition of claim 1, wherein in Formula (7), Formula (8), Formula (9) and Formula (10):

Ar is 2,6-dimethoxyphenyl;

L is a phenyl group;

$M^1$ is Li, Na, K, or Cs;

$M^2$ is Li, Na, K, or Cs;

$A^-$ is $[(3,5\text{-}(CF_3)_2C_6H_3)_4B]^-$;

X is methyl;

Y is hydrogen;

Z is hydrogen; and $R^1$, $R^2$, and $R^3$ are each methyl;

wherein $A^-$ is the same in the bimetallic catalyst complex of Formula (7), Formula (8), Formula (9), and Formula (10);

wherein Ar is the same in the bimetallic catalyst complex of Formula (7), Formula (8), Formula (9), and Formula (10);

wherein L is the same in the bimetallic catalyst complex of Formula (7), Formula (8), Formula (9), and Formula (10);

wherein X is the same in the bimetallic catalyst complex of Formula (7), Formula (8), Formula (9), and Formula (10);

wherein Y is the same in the bimetallic catalyst complex of Formula (7), Formula (8), Formula (9), and Formula (10);

wherein Z is the same in the bimetallic catalyst complex of Formula (7), Formula (8), Formula (9), and Formula (10);

wherein $R^1$ is the same in the bimetallic catalyst complex of Formula (7), Formula (8), Formula (9), and Formula (10);

wherein $R^2$ is the same in the bimetallic catalyst complex of Formula (7), Formula (8), Formula (9), and Formula (10);

wherein $R^3$ is the same in the bimetallic catalyst complex of Formula (7), Formula (8), Formula (9), and Formula (10);

wherein $M^1$ is the same in the bimetallic catalyst complex of Formula (7) and Formula (8);

wherein $M^2$ is the same in the bimetallic catalyst complex of Formula (9) and Formula (10);

and wherein $M^1$ and $M^2$ are different from one another.

4. A method for catalyzing homopolymerization of an optionally substituted olefin, comprising:

contacting an optionally substituted olefin with the catalyst composition of claim 1, whereby the optionally substituted olefin undergoes homopolymerization.

5. The method of claim 4, wherein the step of contacting the optionally substituted olefin with the catalyst composition is performed in the presence of at least one solvent.

6. The method of claim 5, wherein the at least one solvent is a non-polar solvent, a polar solvent, or combination thereof.

7. The method of claim 4, further comprising contacting at least one activator with the catalyst composition and the optionally substituted olefin.

8. The method of claim 7, wherein the at least one activator is selected from the group consisting of $Ni(COD)_2$, triarylborane, methylaluminoxane, and trialkylaluminum.

9. The method of claim 4, wherein the optionally substituted olefin is an optionally substituted terminal olefin or an optionally substituted internal olefin.

10. The method of claim 4, wherein the optionally substituted olefin is ethylene.

11. A method for catalyzing copolymerization of a first optionally substituted olefin and at least one other optionally substituted olefin, comprising:

contacting a first optionally substituted olefin and at least one other optionally substituted olefin with the catalyst composition of claim 1, whereby the first optionally substituted olefin and the at least one other optionally substituted olefin undergoes copolymerization, and wherein the first optionally substituted olefin and the at least one other optionally substituted olefin are different from one another.

12. The method of claim 11, wherein the step of contacting the first optionally substituted olefin and the at least one other optionally substituted olefin with the catalyst composition is performed in the presence of at least one solvent.

13. The method of claim 12, wherein the at least one solvent is a non-polar solvent, a polar solvent, or combination thereof.

14. The method of claim 11, further comprising contacting at least one activator with the catalyst composition, the first optionally substituted olefin, and the at least one other optionally substituted olefin.

15. The method of claim 14, wherein the at least one activator is selected from the group consisting of $Ni(COD)_2$, triarylborane, methylaluminoxane, and trialkylaluminum.

16. The method of claim 11, wherein the first optionally substituted olefin and the at least one other optionally substituted olefin are each independently an optionally substituted terminal olefin or an optionally substituted internal olefin.

17. A method for catalyzing homopolymerization of an optionally substituted olefin, comprising:

contacting an optionally substituted olefin with the catalyst composition of claim 3, whereby the optionally substituted olefin undergoes homopolymerization.

18. The method of claim 17, further comprising contacting at least one activator with the catalyst composition and the optionally substituted olefin.

19. A method for catalyzing copolymerization of a first optionally substituted olefin and at least one other optionally substituted olefin, comprising:

contacting a first optionally substituted olefin and at least one other optionally substituted olefin with the catalyst composition of claim 3, whereby the first optionally substituted olefin and the at least one other optionally substituted olefin undergoes copolymerization, and wherein the first optionally substituted olefin and the at least one other optionally substituted olefin are different from one another.

20. The method of claim 19, further comprising contacting at least one activator with the catalyst composition, the first optionally substituted olefin, and the at least one other optionally substituted olefin.

* * * * *